US012717552B2

(12) United States Patent
Byrraju

(10) Patent No.: US 12,717,552 B2
(45) Date of Patent: Aug. 25, 2026

(54) NATURAL SOLUTION LANGUAGE

(71) Applicant: BRANE COGNITIVES PTE. LTD., Singapore (SG)

(72) Inventor: Ramalinga Raju Byrraju, Hyderabad (IN)

(73) Assignee: BRANE COGNITIVES PTE. LTD., Singapore (SG)

( * ) Notice: Subject to any disclaimer, the term of this patent is extended or adjusted under 35 U.S.C. 154(b) by 289 days.

(21) Appl. No.: 18/662,736

(22) Filed: May 13, 2024

(65) Prior Publication Data

US 2024/0296017 A1 Sep. 5, 2024

Related U.S. Application Data

(63) Continuation of application No. 17/420,587, filed as application No. PCT/SG2020/050004 on Jan. 3, 2020, now Pat. No. 12,032,928.

(30) Foreign Application Priority Data

Jan. 10, 2019 (IN) ............................ 201941001135
Jul. 16, 2019 (IN) ............................ 201941028675

(51) Int. Cl.
*G06F 8/30* (2018.01)
*G06F 21/32* (2013.01)
*H04L 9/00* (2022.01)

(52) U.S. Cl.
CPC ................ *G06F 8/31* (2013.01); *G06F 21/32* (2013.01); *H04L 9/50* (2022.05)

(58) Field of Classification Search
CPC ........................................................ G06F 8/30
See application file for complete search history.

(56) References Cited

U.S. PATENT DOCUMENTS

2001/0051938 A1* 12/2001 Hart ......................... G06N 5/02 706/60
2003/0130918 A1* 7/2003 Polk ....................... G06Q 30/02 705/1.1

(Continued)

FOREIGN PATENT DOCUMENTS

AU 2020205593 7/2023
CA 3125015 1/2014

(Continued)

OTHER PUBLICATIONS

Office Action for Russian Application No. 2021119227728, dated Jun. 2, 2023, with translation, 41 pages.

(Continued)

*Primary Examiner* — Jae U Jeon
(74) *Attorney, Agent, or Firm* — Klarquist Sparkman, LLP

(57) ABSTRACT

A computer-implemented method that effectively replaces ‘programming code’ in conveying application or solution logic to the computer using a natural language-based design. Without taking any reference to alien symbols or keywords, NSL uses standard and familiar natural-language-like constructs (any natural language, not just English) using a computer-implemented method to technically convey complex operating, application, and solution logic to the machine agents (computers) in a user-friendly way. Using the same computer-implemented methodologies, it has the power to translate or reverse engineer all existing programming code into NSL. Fundamentally, NSL requires no ‘programming code’ expertise. Users can quickly and easily convey the logic directly to the computer or recruit available solution components with ease. In addition, the elimination of artificial barriers between information and processes, and merging them, solution logic embedded in computer pro- (Continued)

grams and applications is brought into the purview of information search principles.

45 Claims, 79 Drawing Sheets

(56) References Cited

U.S. PATENT DOCUMENTS

| | | | | |
|---|---|---|---|---|
| 2005/0119876 | A1* | 6/2005 | Ferrieux | G10L 15/142 704/E15.048 |
| 2005/0273335 | A1 | 12/2005 | Chang et al. | |
| 2013/0152092 | A1 | 6/2013 | Yadgar | |
| 2015/0278820 | A1 | 10/2015 | Meadows | |
| 2015/0286747 | A1 | 10/2015 | Anastasakos | |
| 2016/0203007 | A1* | 7/2016 | Ueno | G06F 9/44505 713/100 |
| 2016/0357519 | A1 | 12/2016 | Vargas | |
| 2017/0239576 | A1 | 8/2017 | Hsiao | |
| 2018/0129956 | A1 | 5/2018 | Saxena | |
| 2019/0121854 | A1 | 4/2019 | Amri | |
| 2020/0389472 | A1* | 12/2020 | Drapeau | H04L 63/1416 |
| 2022/0253288 | A1 | 8/2022 | Byrraju | |

FOREIGN PATENT DOCUMENTS

| | | | |
|---|---|---|---|
| CA | 2879778 | | 9/2021 |
| CN | 1716192 | | 1/2006 |
| CN | 1889043 | | 1/2007 |
| CN | 103617159 | | 3/2014 |
| CN | 107851000 | | 3/2018 |
| CN | 108255814 | | 7/2018 |
| CN | 108509185 | | 9/2018 |
| CN | 108874380 | | 11/2018 |
| CN | 108885545 | | 11/2018 |
| EP | 1832975 | A1 | 9/2007 |
| JP | 2002182913 | A | 6/2003 |
| JP | 2009181550 | A | 8/2009 |
| JP | 2016512367 | | 4/2016 |
| JP | 6279066 | | 2/2018 |
| KR | 2012137424 | | 11/2012 |
| KR | 101511832 | B1 | 4/2015 |
| WO | WO 2011088053 | | 7/2011 |
| WO | WO 2014152069 | | 9/2014 |
| WO | WO 2016174638 | | 11/2016 |
| WO | WO 2017186469 | | 11/2017 |
| WO | WO 2018218371 | | 12/2018 |

OTHER PUBLICATIONS

First Examination Report for Indian Application No. 201941001135, dated Jan. 30, 2023, 9 pages.
International Search Report for PCT Application No. PCT/SG2020/050004, mailed Mar. 27, 2020, 3 pages.
International Search Report for PCT Application No. PCT/SG2021/050446, mailed Nov. 12, 2021, 3 pages.
Written Opinion for PCT Application No. PCT/SG2021/050446, mailed Nov. 12, 2021, 8 pages.
International Preliminary Report on Patentability for PCT Application No. PCT/SG2021/050446, mailed Feb. 7, 2023, 9 pages.
Raza et al., "Compositional Program Synthesis from Natural Language and Examples," Proceedings of the Twenty-Fourth International Joint Conference on Artificial Intelligence (IJCAI 2015), Jul. 25-31, 2015, Buenos Aires, Argentina, Jul. 1, 2015, pp. 792-800, XP055439560, retrieved from the Internet: URL https://www.ijcai.org/Proceedings/15/Papers/117.pdf, 9 pages.
Desai et al., "Program Synthesis Using Natural Language," Software Engineering, ACM, 2 Penn Plaza, Suite 701, New York, NY 10121-0701, May 14, 2016, pp. 345-356, XP058257825, DOI: 10.1145/2884781.2884786 ISBN: 978-1-4503-3900-1.
International Search Report and Written Opinion for counterpart PCT Application No. PCT/SG2020/05004, mailed Mar. 27, 2020, 8 pages.
Desai et al., "Program Synthesis using Natural Language," arXiv, May 14, 2016, 15 pages.
Communication pursuant to Article 94(3) EPC for European Application No. 20 700 857.4-1203, dated Jun. 9, 2022, 7 pages.
Communication pursuant to Article 94(3) EPC for European Application No. 20 700 857.4-1203, dated Dec. 22, 2022, 4 pages.
Communication under Rule 71(3) EPC for European Application No. 20 700 857.4-1203, dated Jun. 23, 2023, 216 pages.
Response to Communication pursuant to Rules 161(1) and 162 EPC for EP Application No. 20 700 857.4 (EP Application No. 20 700 857.4 (EP 3 903 182), filed Feb. 15, 2022, 71 pages.
Response to communication pursuant to Article 94(3) EPC for EP Application No. 20 700 857.4 (EP 3 903182), filed Oct. 18, 2022, 54 pages.
Response to communication pursuant to Article 94(3) EPC for EP Application No. 20 700 857.4 (EP 3 903182), filed Mar. 23, 2023, 79 pages.
Examination report No. 1 for Australian Application No. 2020205593, dated Jun. 20, 2022, 6 pages.
Examination report No. 2 for Australian Application No. 2020205593, dated Jun. 14, 2023, 2 pages.
First Statement of Proposed Amendments for Australian Patent Application No. 2020205593, dated Jun. 7, 2023, 1 page.
Second Statement of Proposed Amendments for Australian Patent Application No. 2020205593, dated Jun. 16, 2023,1 page.
Request to Amend a Complete Specification for Australian Patent Application No. 2020205593, dated Jun. 7, 2023, 7 pages.
Request to Amend a Complete Specification for Australian Patent Application No. 2020205593, dated Jun. 16, 2023, 2 pages.
Response Summary for Australian Application No. 2020205593, submitted Jun. 7, 2023, 2 pages.
Claim as Accepted for Australian Application No. 2020205593, dated Jun. 16, 2023, 16 pages.
Notice of Acceptance for Australian Application No. 2020205593, dated Jun. 22, 2023, 3 pages.
Claims of divisional Australian Patent Application No. 2023203892, amended first Statement of Acceptance, claims, clean copy, dated Jun. 28, 2023, 3 pages.
Specification and claims of divisional Australian Patent Application No. 2023203892, amended first Statement of Acceptance, marked up copy, dated Jun. 28, 2023, 208 pages.
Claims of Australian Patent Application No. 2020205593, amended second Statement of Acceptance, claims, clean copy, dated Jun. 16, 2023, 16 pages.
Specification and claims of Australian Patent Application No. 2020205593, amended second Statement of Acceptance, marked up copy, dated Jun. 16, 2023, 140 pages.
Claims of Australian Patent Application No. 2020205593, clean copy claims, dated Jun. 7, 2023, 16 pages.
Specification of Australian Patent Application No. 2020205593, clean copy description, Jun. 7, 2023, 124 pages.
Specification and claims of Australian Patent Application No. 2020205593, marked up copy, dated Jun. 7, 2023, 192 pages.
First Statement of Proposed Amendments for Australian Patent Application No. 2023203892 (Divisional of AU 2020205593), dated Jun. 28, 2023, 1 page.
International Preliminary Report on Patentability for International Application No. PCT/SG2020/050004 issued Jun. 16, 2021, 6 pages.
Office Action from Chinese Patent Application No. 202311106989.X, (w/English translation) dated Mar. 16, 2024, 13 pages.
Notice of Eligibility to Grant from Singapore Patent Application No. 11202105981Y, Apr. 3, 2024, 6 pages.
Yu et al., "Research and Implementation of Component Assembly Compiling Technology," (with English language Abstract) Journal of Liaoning Institute of Technology, vol. 26, No. 1, Feb. 2006, 4 pages.
Liu et al. "Survey on Intelligent Search and Construction Methods of Program," (with English language Abstract) Ruan Jian Xue Bao/Journal of Software, 2018, 29(8): 2180-2197, 198 pages.

(56) References Cited

OTHER PUBLICATIONS

First Office Action (w/English translation) received in Chinese counterpart Application No. 202080008550.1, dated Apr. 18, 2024, 21 pages.

* cited by examiner

FIG. 4

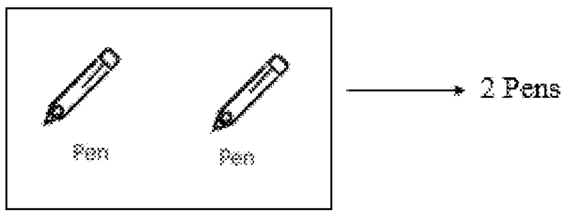

FIG. 5

Book room

Check room availability. Get customer information. Get room stay information. Get transport information. Get laundry information. Get price. Book room.

FIG. 6

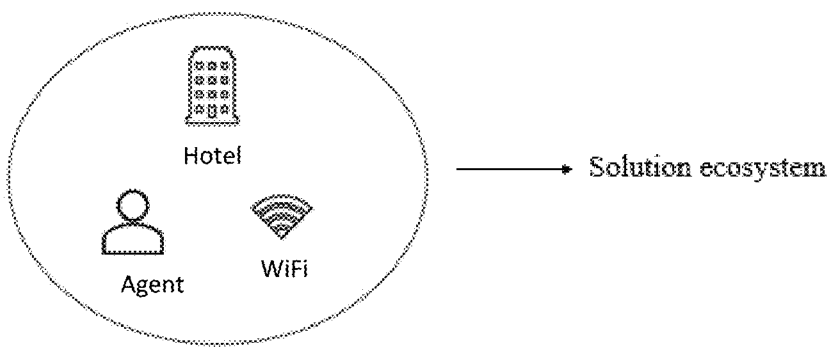

FIG. 7

Book room.

Check room availability. Get customer information. Get room stay information. Get transport information. Get laundry information. Get place. Book hotel room.

Note: Bold and underline represents reality state. In NSL, they are in red.

Frozen entities

Modification of entities

HOTEL ROOM

| | IDENTITY | SPACE | TIME | MONEY |
|---|---|---|---|---|
| PRIMARY | ROOM NO | TELANGANA | IN DATE | PRICE |
| SECONDARY | | HYDERABAD | IN TIME | |
| TERTIARY | | JUBILEE HILLS | | |

HOTEL ROOM

| | IDENTITY | SPACE | TIME |
|---|---|---|---|
| PRIMARY | ROOM NO | TELANGANA | IN DATE |
| SECONDARY | | HYDERABAD | IN TIME |
| TERTIARY | | JUBILEE HILLS | |

Example: All the hotel rooms will carry the following standard attributes:- Price, Wi-Fi FIG. 17
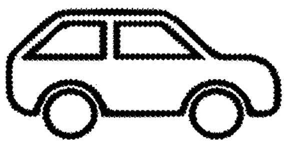
CAR
| | IDENTITY | SPACE | TIME |
|---|---|---|---|
| PRIMARY | TS 9999 | TELANGANA | PURCHASE DATE |
| SECONDARY | MARUTI | HYDERABAD | 1ST SERVICE DATE |
| TERTIARY | MODEL NO: 1234 | | |
FIG. 18
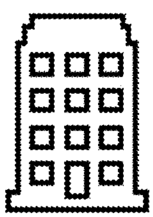
HOTEL
| | IDENTITY | SPACE |
|---|---|---|
| PRIMARY | HOLIDAY INN | TELANGANA |
| SECONDARY | BLOCK 5 | HYDERABAD |
| TERTIARY | ROOM NO: 510 | FINANCIAL DISTRICT |
FIG. 19
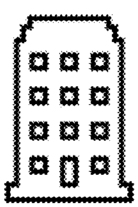
HOTEL
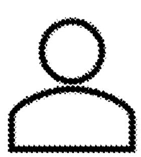
CUSTOMER FIG. 23
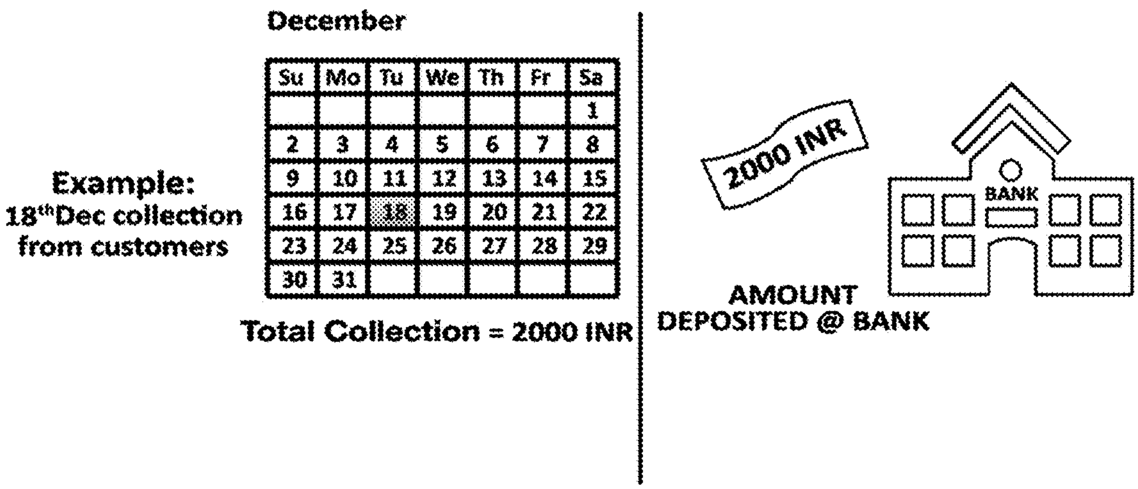
FIG. 24
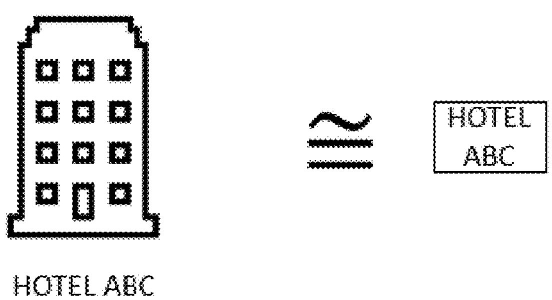
FIG. 25
Book room. ← Global statement of intent
Check room availability. Get customer information. Get room stay information. Get transportation information. Get room stay information. Get laundry information. Get place. Book hotel room. ] Local statement of intent

FIG. 31

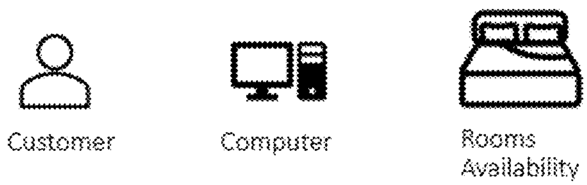

Natural Language: Customer intends to book a hotel room online
Natural Solutions Language: Customer book hotel room

FIG. 32

Book room. ← Global statement of intent

Check room availability. Get customer information. Get room stay information. Get transportation information. Get laundry information. Get place. Book hotel room. ] Local statement of intent The above are the static statements of intent. When an event arises and the entities are triggered, the static statements of intent turn dynamic.

FIG. 33

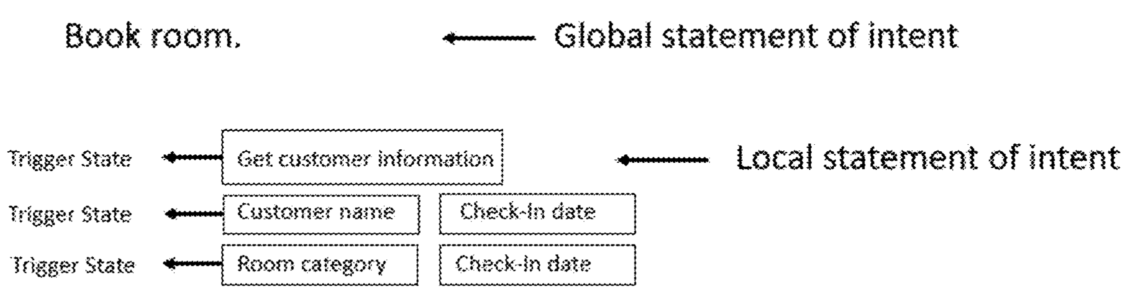

FIG. 41

FIG. 42

FIG. 43

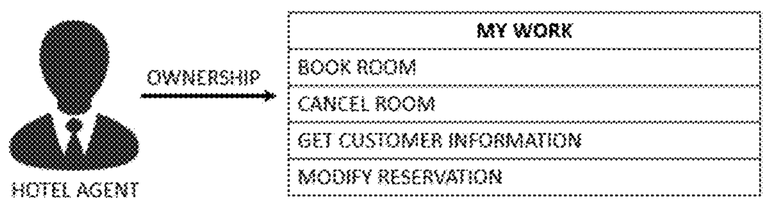

FIG. 44

| | | | |
|---|---|---|---|
| Physical Functions |  Book Room<br>Check Room Availability,<br>Get Customer Information,<br>Get Room Stay Info,<br>Get Price, Book Room. | | |
| Mind Functions | Availability of Rooms on Weekends | | |
| Information Functions | Rooms Available<br>Deluxe – 3<br>Super Deluxe – 8<br>Luxury – 10 | Deluxe | Wi-Fi Cost, LED TV;<br>Size-200 Square Feet |
| | | Super Deluxe | Free Wi-Fi, LCD TV;<br>Size-250 Square Feet |
| | | Luxury | Free Wi-Fi, 60 inch LCD TV;<br>Size-300 Square Feet |

Book room. ← Global statement of intent

Paragraph-I:-

Check room availability. Get customer information. Get room stay information. Get place. Book hotel room.

Paragraph-II:-

Check room availability. Get customer information. Get room stay information. Get transportation information. Get laundry information. Get place. Book hotel room.

FIG. 58

Java Code:

```
Package com.Hotel reservation
Public class fare{
        public int fare calculator
        (int rate, int days, int s)
        {
        if (s==1)
        {
        return days * rate;
        }
        if (s==2)
        {
        return days * rate *2;
        }
```

Natural language:

Fare calculator:

If occupancy = 1, fare is equal

To number of days* rate

If occupancy = 2, fare is equal

To number of days * rate *2

FIG. 59

Information ~ Sachin had prepared dinner ~ Conveys meaning
~ Sachin may have prepared dinner ~ Conveys meaning
Prescriptive information ~ Sachin prepares dinner
Value ~ Sachin prepares dinner

FIG. 60

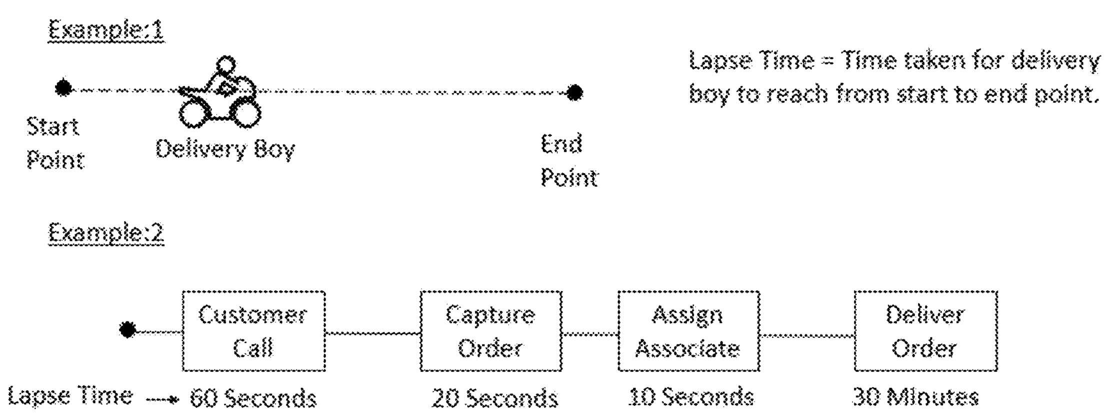

Every stakeholder can process only entities of importance dynamically using various filters – time-filter, space-filter, agent-filter, etc.,

FIG. 73

DNA

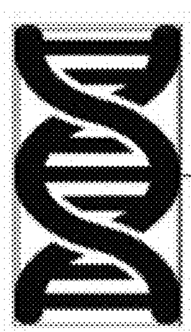

Book room.

<u>Check room availability</u>. <u>Get customer information</u>. <u>Get room stay information</u>. <u>Get transport information</u>. <u>Get laundry information</u>. <u>Get place</u>. <u>Book hotel room</u>.

Note: Bold and underline represents reality state. In NSL, they are in red.

FIG. 74

Book room

Check room availability. Get Customer information.
Get room stay information. Get transport information.
Get laundry information. Get price. Book room.

Natural Solutions Language : Book room.

Natural Language : Book a Hotel Room.

Natural Solutions Language : Make Payment.

Natural Language: Make payment for the invoice.

LSI:

Call Centre Officer ______ Customer ( Suggested Verbs: Call, Mail, validate,...)

LSI:

______ Customer Information ( Suggested Verbs: Get, Update, Check, validate,...)

FIG. 98A

Paragraph in Static state

Book Hotel Room.

Get Customer Information. Select Room Type Luxury. Get Room stay Information. Calculate Fare Room. Book Hotel Room.

| Entity | Customer | | | |
|---|---|---|---|---|
| Primary Attributes | Name: | Age: | Sex: | Id Proof: |

FIG. 98B

Book Hotel Room.

<u>Get Customer Information.</u> Select Room Type Luxury. Get Room Stay Information. Calculate Fare Room. Book Hotel Room.

| Entity | **<u>Customer</u>** | | |
|---|---|---|---|
| Primary Attributes | **<u>Name: Raju</u>** | | |
| Secondary Attributes | **<u>Age: 60</u>** | **<u>Sex: M</u>** | **<u>Id Proof: Aadhar</u>** |

An event has arrived when the customer information is captured.

As the entities and the attributes of this LSI arrived, the LSI turned into Dynamic State (Reality).

FIG. 98C

<u>Book Hotel Room.</u>

<u>Get Customer Information. Select Room Type Luxury. Get Room Stay Information. Calculate Fare Room. Book Hotel Room.</u>

| Entity | **<u>Booking Confirmation</u>** | | |
|---|---|---|---|
| Primary Attributes | **<u>ID No: 12</u>** | **<u>Booking name: Raju</u>** | **<u>Fare: 6,000</u>** |

As all events have arrived, the GSI has turned into dynamic state with all LSI states turning to dynamic state.

Note: For representational purpose, "<u>Bold and Underline</u>" above indicate dynamic/ reality state. In NSL, they are in "Red".

FIG. 99B

Book Hotel Room.

Get Customer Information. Select Room Type. Get Room Stay Information. Calculate Fare Room. Book Hotel Room.

| Entity | Customer | | | |
|---|---|---|---|---|
| Primary Attributes | Name: Sridhar | | | |

Customer name

Book Hotel Room.

Get Customer Information. Select Room Type Super Deluxe. Get Room Stay Information. Calculate Fare Room. Book Hotel Room.

| Entity | Super deluxe room | | | |
|---|---|---|---|---|
| Primary Attributes | Rate: 2,500 | Room availability: Yes | | |

Room rate is a "constant" based on the type of room selected.

Book Hotel Room.

Get Customer Information. Select Room Type Super Deluxe. Get Room Stay Information. Calculate Fare Room. Book Hotel Room.

| Entity | Room stay Information | | |
|---|---|---|---|
| Primary Attributes | Number of days: 2 | Occupancy: 2 | |

Entered based on customer's inputs

Book Hotel Room.

Get Customer Information. Select Room Type Super Deluxe. Get Room Stay Information. Calculate Fare Room. Book Hotel Room.

| Entity | Room fare |
|---|---|
| Primary Attributes | Number of days * Rate * Occupancy: 10,000 |

Fare calculated by the machine agent

Book Hotel Room.

Get Customer Information. Select Room Type Super Deluxe. Get Room Stay Information. Book Hotel Room.

| Entity | Booking Confirmation | | | |
|---|---|---|---|---|
| Primary Attributes | ID No: 0sdx2 | Booking name: Sridhar | Fare: 10,000 | Cost of transportation: 0 |

Booking confirmation with booking number, customer name and fare.

FIG. 101

| Particulars | Java Program | NSL |
|---|---|---|
| Professionals required for developing the application | Java Programmer, UI/UX developer, Data base programmer | Any literate person |
| Application development time | 160 hours approximately | 2 hours |
| Solution training time | 120 hours approximately | 4 hours |
| Cost to build the application | USD 16,000 approximately | USD 200 approximately |
| Solution logic | Under the hood | Above the hood |

FIG. 102G

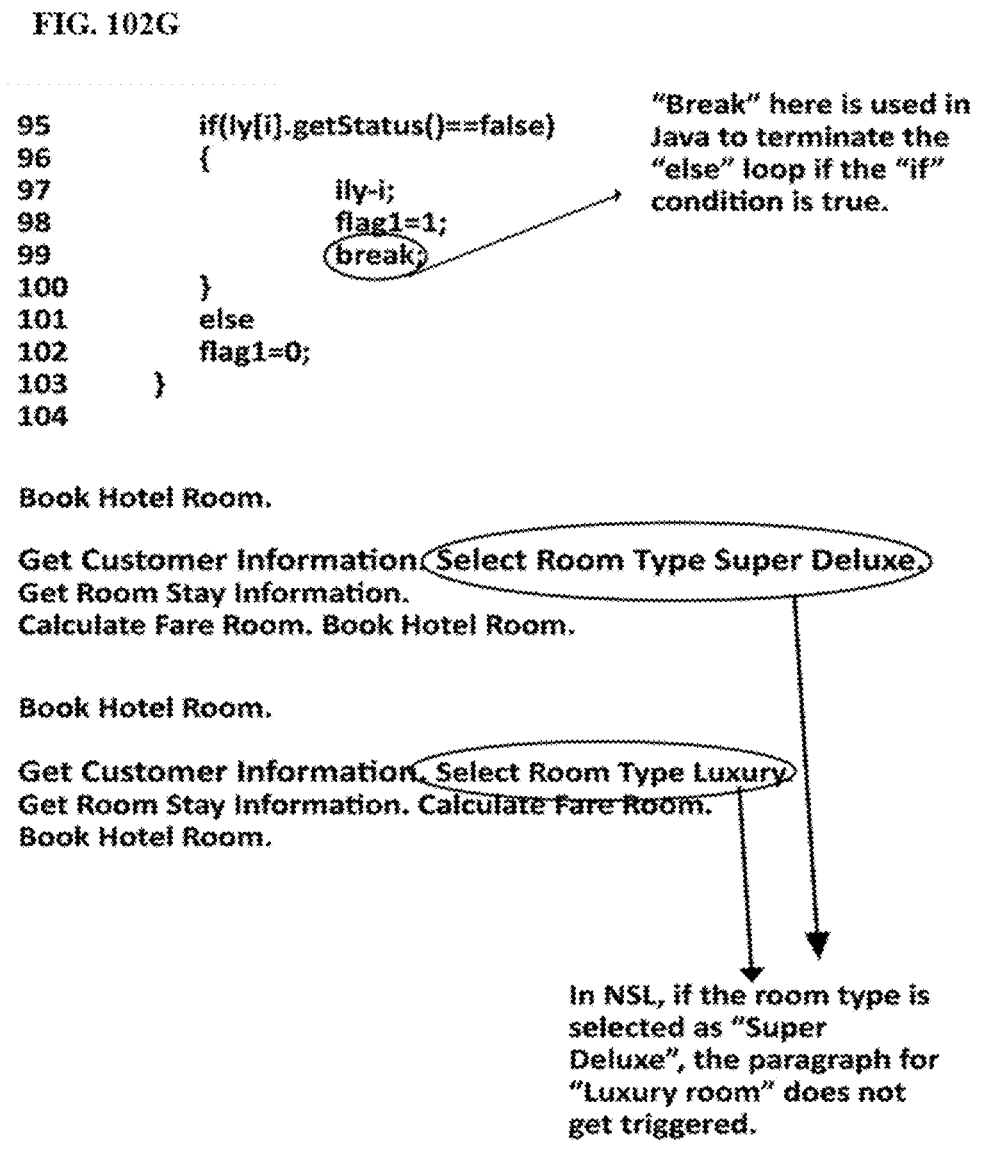

```
            if(ily[i].getStatus()==false)
            {
                        ily-i;
                        flag1=1;
                        break;
            }
            else
            flag1=0;
        }
```

"Break" here is used in Java to terminate the "else" loop if the "if" condition is true.

Book Hotel Room.

Get Customer Information. Select Room Type Super Deluxe.
Get Room Stay Information.
Calculate Fare Room. Book Hotel Room.

Book Hotel Room.

Get Customer Information. Select Room Type Luxury.
Get Room Stay Information. Calculate Fare Room.
Book Hotel Room.

In NSL, if the room type is selected as "Super Deluxe", the paragraph for "Luxury room" does not get triggered.

FIG. 103

```
Class Book:
        Public void BookLuxury(Customer c, Luxury ly,int type,int ily,int Id,int d)
         {   Fare f=new FareC
             If(Id==1)
                     System.out.println("Single Luxury Room is booked"):
                     Ff=f.farecalculator(d,ly.rate,Id);
                     Bookno=ily+"lx1";
             BookDisplay(ff,c.name,bookno);
         }
}
public void BookDisplay(int ff,String name,String b)
{
     System.out.println("Booking number"+bookno);
     System.out.println("Customer number"+cust.no);
     System.out.println("Booking Name"+name);
     System.out.println("Fare is"+ff);
}
```

Process being converted to code. In NSL each component of Java code has been converted into information equivalent as shown below.

NSL representation

LSI: Book Luxury Room.

| Entities | Room | Room | Customer | Room | Room Fare |
|---|---|---|---|---|---|
| Attibutes | Type:<br>Rate: | Occupancy | No.of days: | Booking id: | Formula:<br>days*occupancy*<br>rate |

FIG. 106

The below table shows a few Java constructs and their corresponding NSL equivalents

| # | JAVA CONSTRUCT | NSL EQUIVALENT |
|---|---|---|
| 1 | Java Classes and class constructs | Independent Entity |
| 2 | Class Members | Attribute |
| 3 | Java method invocation, execution | Drivers (CD, CES) |
| 4 | Development / Runtime | Potentiality/Reality |
| 5 | Java Constants | Constants |
| 6 | Java Variables at various scope levels | Variables |
| 7 | Java Numerals and numeric constants | Number |
| 8 | Java Keywords, Operators | Words, Operators |
| 9 | Simple java programming block | Basic CU |
| 10 | Program block execution | Transaction CU |
| 11 | Looping Constructs | Recursive CU |
| 12 | Conditional Constructs (if, switch, etc.,) | Alternative CU |
| 13 | Java Tokens | ID Assignment |
| 14 | Java full lifecycle ID | Contextual ID |
| 15 | Frameworks, libraries and JDK | Block Boxes |

FIG. 107C

```
Case8:

    school.calculatePercentageOfStudent();
    break;

Case 9:
    school.junkFunction();
    break;

Case 10:
    System.out.println("Exiting...\n Have a nice day.");

    System.exit(0);
    break;

default:

    System.out.print("Invalid option!!!\n");
    continue;

        }
}
```

Get Subject Details.
Get Teacher Info,
Assign Subject Teacher.
Calculate Student Marks In NSL, the construct of the solution is such that every event (each customer) has a paragraph.

"Continue "is used here to update the UI with the list of available options that the program offers. Ex: Entering marks of students for each subject. After an activity is completed, the UI refreshes again using the same section of code for entering marks of next student.

FIG. 107D

```
class PersonalInfo
{
    String name;
    String mobile;
    String email;
    transient short age;
    Address address;
}
```

"Transient "Key word is used in cases where attributes can be selectively called for differentiation In NSL, this is used at a "UI" level where the UI is attached as an attribute to an entity and can be switched on/off.

FIG. 107E

```
Class Subjects
{
  String name;
  int pass_mark;
  public long max_mark;
  int std;
  public void addSubject()
  {
```

The long keyword is used to declare a variable as a numeric type. A long value can hold a 64-bit integer number which ranges from -263 to 263 - 1

| Entities | Subject | | |
|---|---|---|---|
| Primary Attribute | Name | Pass_ Mark | Max_ Mark |
| Secondary Attribute | | Datatype: Integer Size = 50 | |

In NSL, a large numerical value of an attribute is captured by defining the size during Entity Creation.

FIG. 107F

```
class PersonalInfo
{
   String name;
   String mobile;
   String email;
   transient short age;
   Address address;
}
```

The short keyword is used to declare a variable as a numeric type. A short value can hold a 16-bit integer number

| Entities | Student | | |
|---|---|---|---|
| Primary Attribute | Name | Mobile | Age |
| Secondary Attribute | | | Datatype: Integer Size = 10 |

In NSL, a large numerical value of an attribute can be captured by defining the size during Entity Creation.

FIG. 107G

```
public void junkFunction()
 {
   byte b;
   int i=10;
   do
   {
     i=i-5;
   }while(i>=0);
```

Is a data type. It will allocate one byte per variable.

| Entity | Student |
|---|---|
| Primary Attribute | Name |
| Secondary Attribute | Datatype: Integer Size = 10 |

In NSL, a numerical value of an attribute is captured by defining the size during Entity Creation.

FIG. 107H

```
While(true)
  {
    school.showOptions();
    option = scanner.nextInt()
    switch (option)
    {
    case 2:
      Teacher teacher = new Teacher();
      teacher.addTeacher();
      school.teachers.add(teacher);
      break;
    default:
      System.out.print("Invalid option!!\n");
      continue;
    }
  }
```

Is used when a switch case is defined and when a user inputs a value that is not listed in any of the cases inside the switch, the program will execute the default segment.

Get Subject Details. Get Teacher Info, Assign Subject Teacher.

Assign Subject Teacher. Assign Marks to Subject. Calculate Student Marks.

Assign Subject to Student. Calculate Student Marks. Calculate Percentage of Marks.

In NSL every scenario has a separate paragraph and is highly differentiated.

FIG. 107M

```
}

public  strictfp float  calculatePercentageOfStudent ()
{
        System.out.println(" Enter role number of the student:");
        int role_number  = scanner.nextInt();
        Student  student = getStudent(role_number);
        float total = 0;
        float subject_total = 0;
        for (int i=0;i<marks.size();i++)
        {
                if(marks.get(i).student==student)
                {
                total = total +  marks.get(i).getMarkScored();
                subject_total = subject_total+
marks.get(i).subject.max_mark;
                }
        }
        float percentage = (total/subject_total) * 100;
        System.out.println("Percentage of
"+student.name+"="+percentage);
        return percentage;
}
```

| Entity | Total Marks Percentage | |
|---|---|---|
| Attributes | Name | Sridhar |
| Secondary Attribute | Marks Attained | 955 |
| Tertiary Attribute | Total Marks | 1000 |
| 4th Attribute | % of Marks | 95.5% |

The attribute % of marks is freezed at one value after decimal for the entity percentage of marks.

Strict floating point(fp) key word is used in this program to standardize the accuracy of the value after a decimal. Ex: Percentage of marks should have only 1 number after a decimal. Ex: 95.5%

FIG. 107N

```
final int total_marks=100;

    System.out.println("Enter role number of the student:");

    int role_number=scanner.nextInt();

    Student student= getStudent(role_number);

    float total= 0;

    float subject_total= 0;

    for(int i=0;i<marks.size();i++)

    {

    If(marks.get(i).student==student)

    {

    total=total+marks.get(i).getMarkScored();

    subject_total=subject_total+marks.get(i).subject.max_mark;
```

| Entity | Total Marks Percentage in Mathematics | |
|---|---|---|
| Attributes | Name | Sridhar |
| Secondary Attribute | Marks Attained | 85 |
| Tertiary Attribute | Total Marks | 100 |

Final Key word is used in this program to fix the value of the Attribute -Total Marks The Attribute Total Marks is fixed at 100 and cannot be changed.

In NSL, the value of an attribute is fixed
in an entity and cannot be changed wherever it is reused.
It represents the last level of differentiation.

FIG. 108B

Book Hotel Room.

Get Customer Information. Select Room Type. Get Room Stay Information. Calculate Fare Room. Book Hotel Room.

| Entity | Customer | | | |
|---|---|---|---|---|
| Primary Attributes | Name: Vivek | | | |

Customer name

Book Hotel Room.

Get Customer Information. Select Room Type Super Deluxe. Get Room Stay Information. Calculate Fare Room. Book Hotel Room.

| Entity | Luxury room | | | |
|---|---|---|---|---|
| Primary Attributes | Rate: 1,000 | Room availability: Yes | | |

Room rate is a "constant" based on the type of room selected.

Book Hotel Room.

Get Customer Information. Select Room Type Super Deluxe. Get Room Stay Information. Calculate Fare Room. Book Hotel Room.

| Entity | Room stay Information | | |
|---|---|---|---|
| Primary Attributes | Number of days: 3 | Occupancy: 2 | |

Book Hotel Room.

Entered based on Customer's inputs

Get Customer Information. Select Room Type Super Deluxe. Get Room Stay Information. Calculate Fare Room. Book Hotel Room.

| Entity | Room fare |
|---|---|
| Primary Attributes | Number of days * Rate * Occupancy: 6,000 |

Fare calculated by the machine agent

Book Hotel Room.

Get Customer Information. Select Room Type Super Deluxe. Get Room Stay Information. Book Hotel Room.

| Entity | Booking Confirmation | | | |
|---|---|---|---|---|
| Primary Attributes | ID No: 01x2 | Booking name: Vivek | Fare: 6,000 | Cost of transportation: 0 |

Booking confirmation with booking number, customer name and fare.

FIG. 109

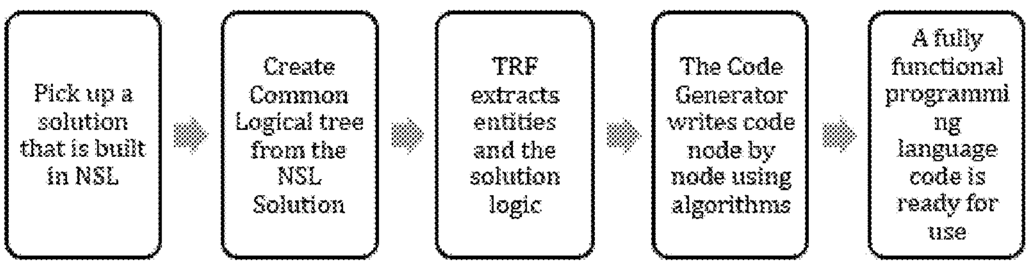

FIG. 110

| Particulars | NSL | Python Program | C Program |
|---|---|---|---|
| Solution construct | Fill out the deposit slip.<br>Validated by Teller.<br>Verify Check.<br><br>CU's: 3<br>Entities participating: 8 | print( "  ATM  Banking Services " )<br>print( "1) Balance  2) WithDraw  3) Deposit  4)Quit " )<br>print( "Enter options : " )<br>option_select = input("Enter Here :")<br>if option_select == "Balance":<br>print( balance )<br>else :<br>  if option_select == "WithDraw":<br><br>....Line 21 | #include<stdio.h><br>int main()<br>{<br>printf("ATMBankingServices");<br>printf("1)Balance2)WithDraw3)Deposit4)Quit");<br>printf("Enteroptions:");<br>scanf("%d",&option_select );<br>if (option_select == "Balance")<br>printf("%d",new_balance))<br><br>.... .. Line 33 |
| Inputs | Enter amount to deposit: 123<br>Username: ABC<br>Password: XYZ | Enter amount to deposit: 123<br>Username: ABC<br>Password: XYZ | Enter amount to deposit: 123<br>Username: ABC<br>Password: XYZ |
| Outputs | Balance displayed<br>28,017 | Balance displayed<br>28,017 | Balance displayed<br>28,017 |

NATURAL SOLUTION LANGUAGE

CROSS-REFERENCE TO RELATED APPLICATIONS

This application is a continuation of U.S. patent application Ser. No. 17/420,587, filed on Mar. 11, 2022, which is a U.S. National Phase application of PCT/SG2020/050004, filed Jan. 3, 2020, which claims the benefit of India Patent Application No. 201941001135, filed in India on Jan. 10, 2019, and India Patent Application No. 201941028675, filed on Jul. 16, 2019, all of which are hereby incorporated herein in their entirety by reference.

TECHNICAL FIELD

The present disclosure relates to the field of Information Technology. More particularly, the present disclosure relates to computer-implemented methods, systems and computer-readable media for designing and deploying solutions.

BACKGROUND

Software engineering, design, and architecture practices have changed and evolved quite significantly over the last 60 years. For the sake of simplicity, many levels of abstraction in communicating the logic of operations to the computer can be grouped into two groups: (1) high-level application logic being imparted through programming languages; and (2) operating-systems-and-below that mediate or deal with the computers and their operations more directly.

There are primarily three popular operating systems: Microsoft Windows, Apple Mac OS X, and Linux. However, there are hundreds of programming languages. Generally speaking, all programming languages are extensively driven by code (symbols that have specific meanings and functions removed from natural language and arithmetic). It takes several weeks to several months for software specialists and engineers to master any of the programming languages and participate in creation or maintenance of solutions. As a consequence, the users of the solutions are generally incapable of creating or modifying the solutions as the situations warrant without the interventions of technology specialists.

Over the years, the computing and communication power behind information technology has grown quite enormously. In general, software design and management techniques have improved with movement towards component-based design, service-oriented architecture, web services, business process management, and agile project management methodologies. At the same time, the landscape of technology has become more complex as the number of moving parts has proliferated. The common user continues to be alienated from the computer as he is not in a position to directly participate in the solution design or influence it on an on-going basis as compared to what is possible. This over-dependence of the user on the technology experts and mediators is due to the programming languages being very different from the natural languages. The current state of technology systems has failed to realize a technical, creative, and innovative opportunity for computer language being nearly the same as the natural language.

BRIEF DESCRIPTION OF DRAWINGS

Features, aspects, and advantages of the present disclosure will be better understood when the following detailed description is read with reference to the accompanying drawings (sometimes called "figures").

FIG. 4 is an example of undifferentiated entities where two pens are distinct yet same-as-other entity.

FIG. 5 is an example of the Potential Entity states, where the solution is built by a user.

FIG. 6 is an example of the qualified entities in the context of solution ecosystem.

FIG. 7 is an example of the Real Entity states, where events arrived.

FIG. 17 is an example of the general attributes that are selected for use based the circumstances in which an entity is placed within a solution environment.

FIG. 18 is an example of the levels of attributes.

FIG. 19 is an example of the Real Entities that exist physically in nature.

FIG. 23 is an example of the understanding on truth values.

FIG. 24 is an example of all the entities existing physically in the physical world.

FIG. 25 is an example of the local statements of intent and global statement of intent in terms of natural language.

FIG. 31 is an example of the way natural language and Natural Solutions Language works.

FIG. 32 is an example of the static statements of intent which only express the intent but lacks the ability to transform them into reality.

FIG. 33 is an example of the dynamic statements of intent which are the underlying transformation causing entities.

FIG. 41 is an example of the human agents.

FIG. 42 is an example of the value creators and consumers.

FIG. 43 is an example of the ownership of entities with respect to agents.

FIG. 44 is an example of mind function, physical function, and information function.

FIG. 58 is an example of the difference between code and natural language.

FIG. 59 is an example of the difference between meaning and value.

FIG. 60 is an example of lapse times.

FIG. 73 is an example that DNA is converted into Information.

FIG. 74 is an example of Text Based User Interface (TBUI).

NSL Technology Re-translation Framework (TRF).

Figure 76:
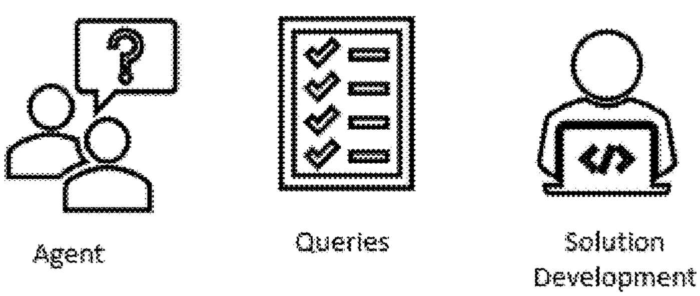

FIG. 76 is an example of Query Based Solution Development (QBSD).

Figures 77, 78, 79:
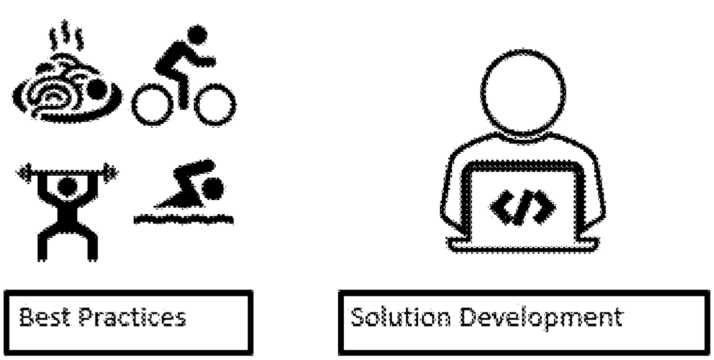

FIG. 77 is an example of Natural Solution language like initiative of NSL.

FIG. 78 is an example of Auto Verb Assignment (AVA) in NSL.

FIG. 79 is an example of Practice Based Solution Development (PBSD).

Figure 80:
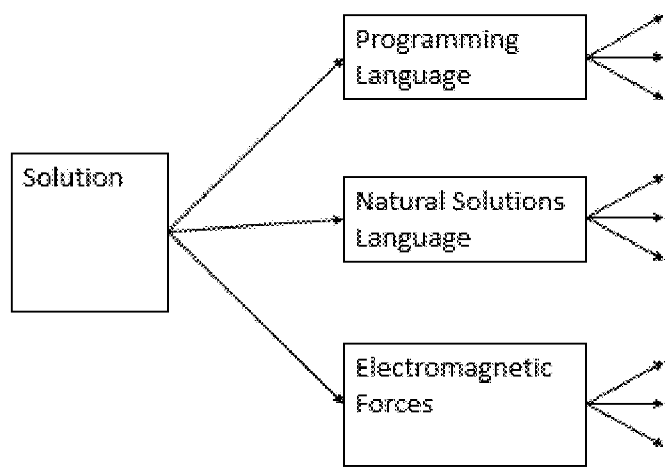

FIG. 80 is an example of Substrate Independence in NSL.

Figure 81:
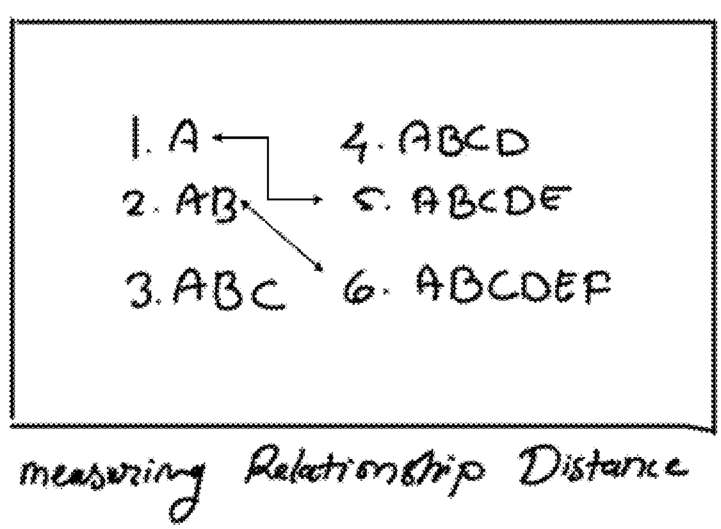

FIG. 81 is an example of Quantification of Solutions.

Figure 82:
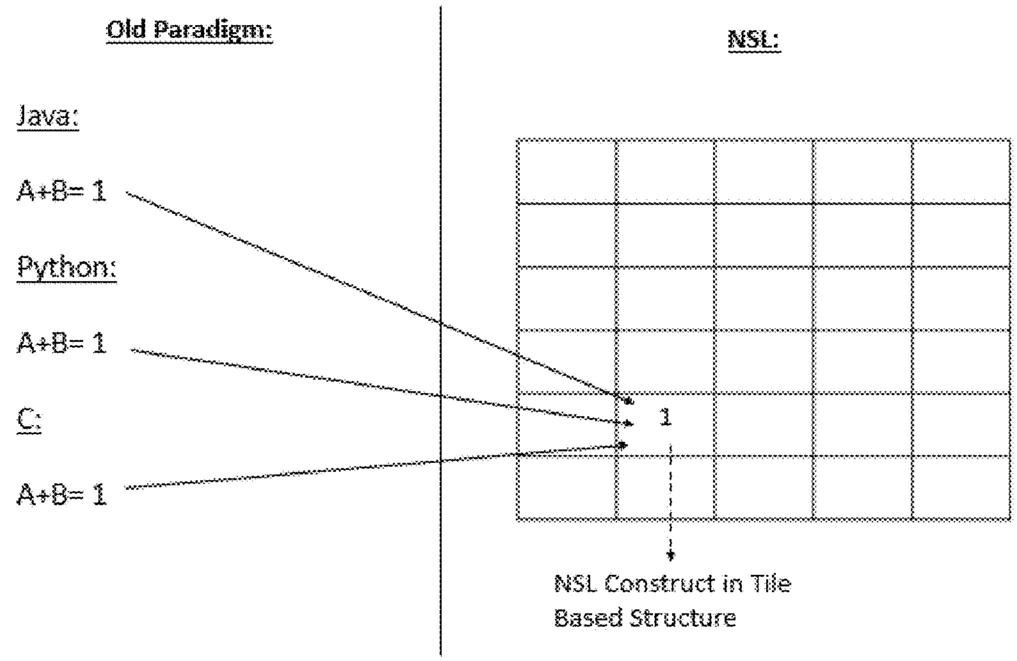

FIG. 82 is an example of logic compression through identification of redundancies.

Figure 83:
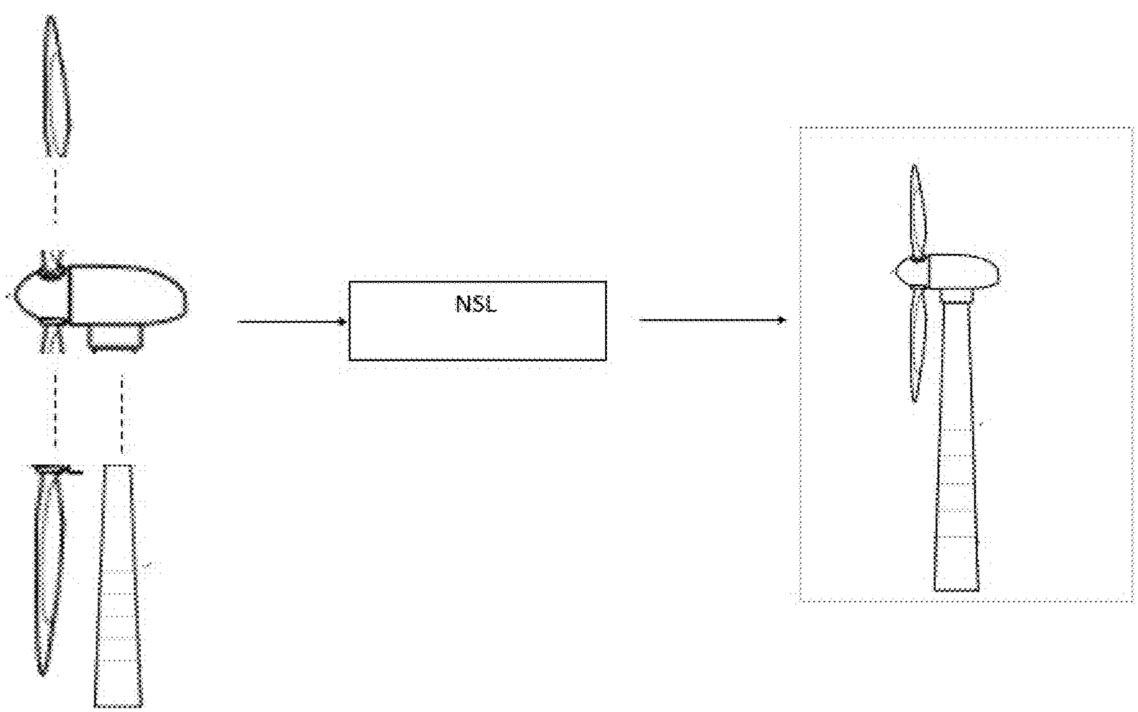

FIG. 83 is an example of Applying NSL principles to Engineering Design.

Figure 84:
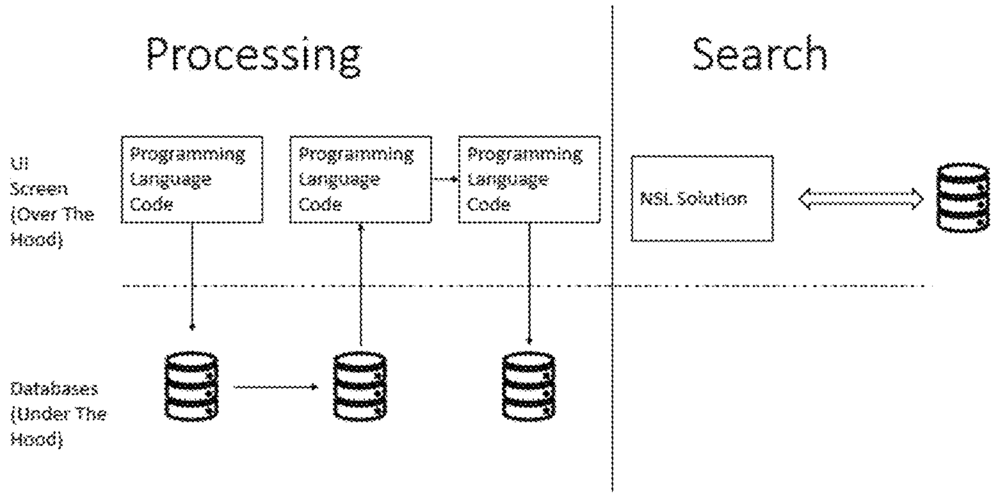

FIG. 84 is an example of the difference between Processing and Search Based Approach.

Figure 85:
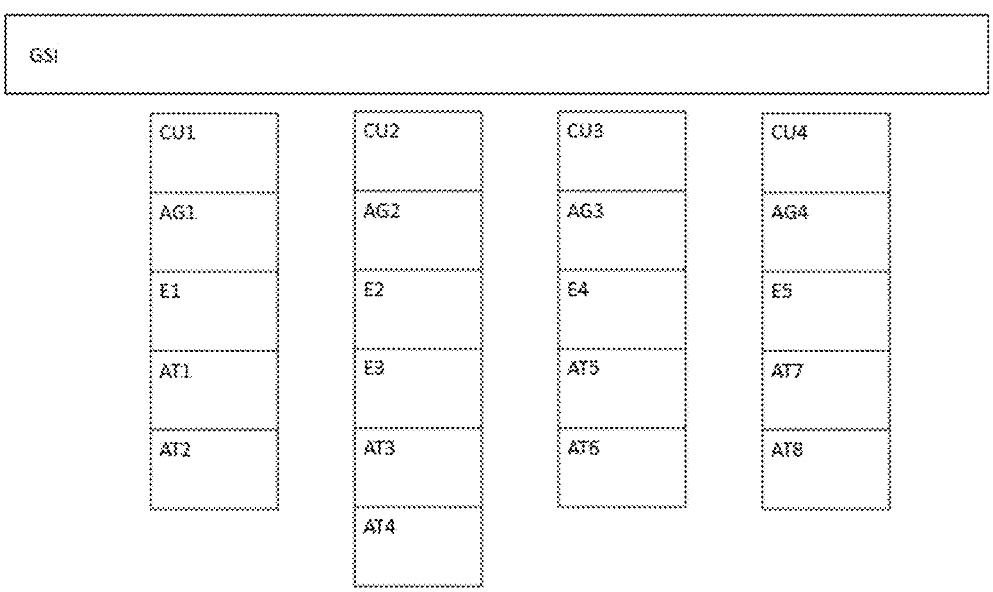

FIG. 85 is an example of Containers.

Figure 86:
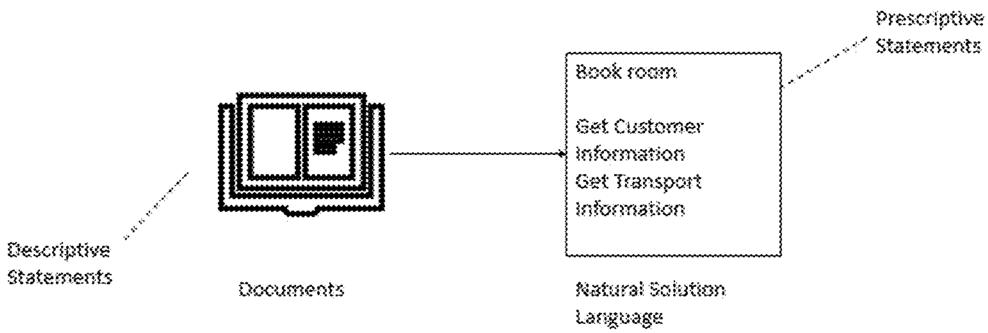

FIG. 86 is an example of documents being converted to NSL format.

Figure 87:
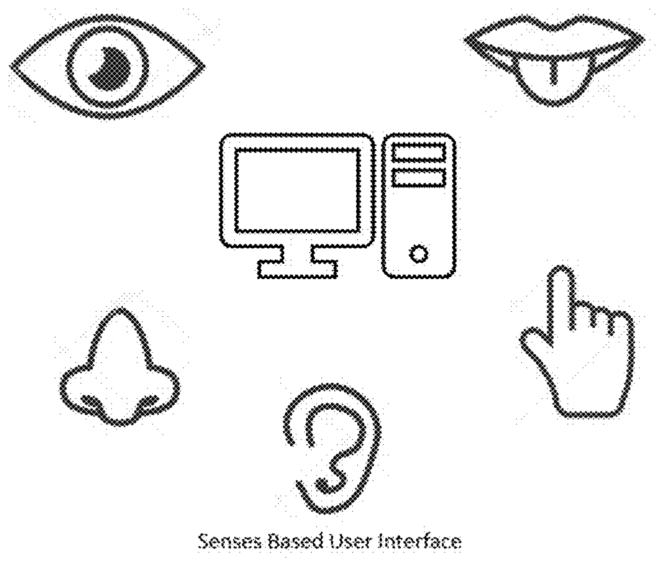

FIG. 87 is an example of Senses Based User Interface.

Figure 88:
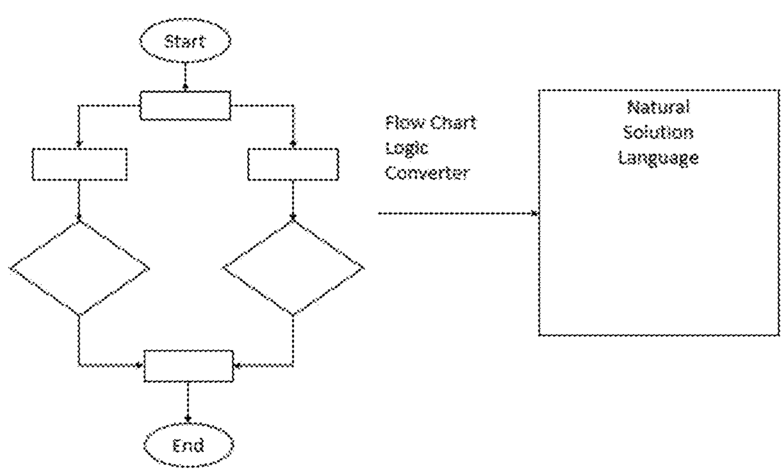

FIG. 88 is an example of Flow Chart Logic Conversion.

Figure 89:
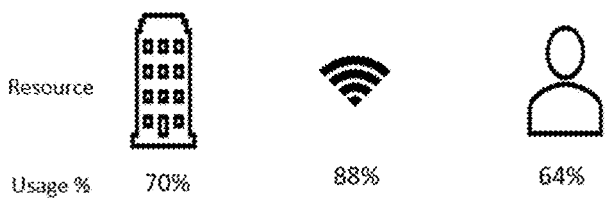

FIG. 89 is an example of Resource Optimization and Idle time Identification Framework.

Figure 90:
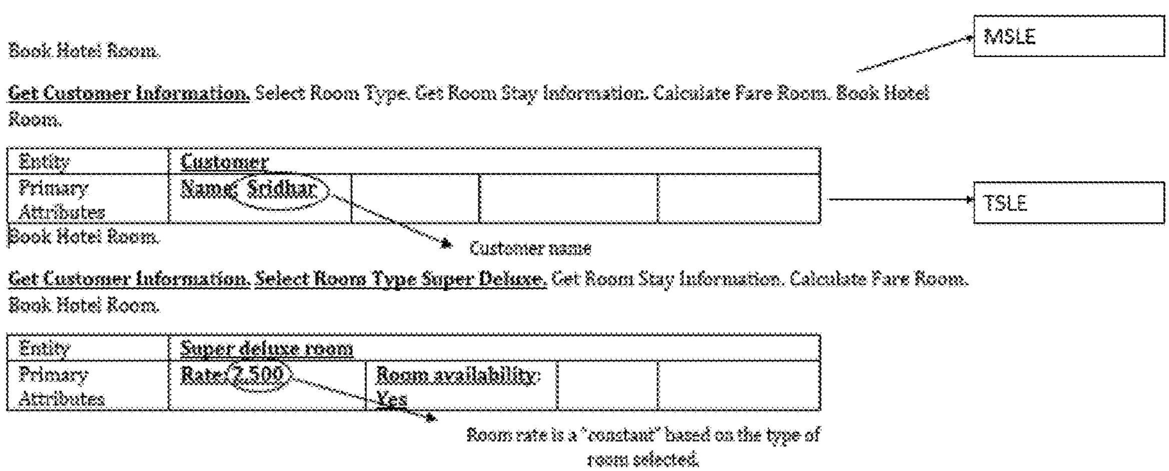

FIG. 90 is an example of Meta Solution Logic Entities and Transaction Solution Logic Entities.

Figure 91:
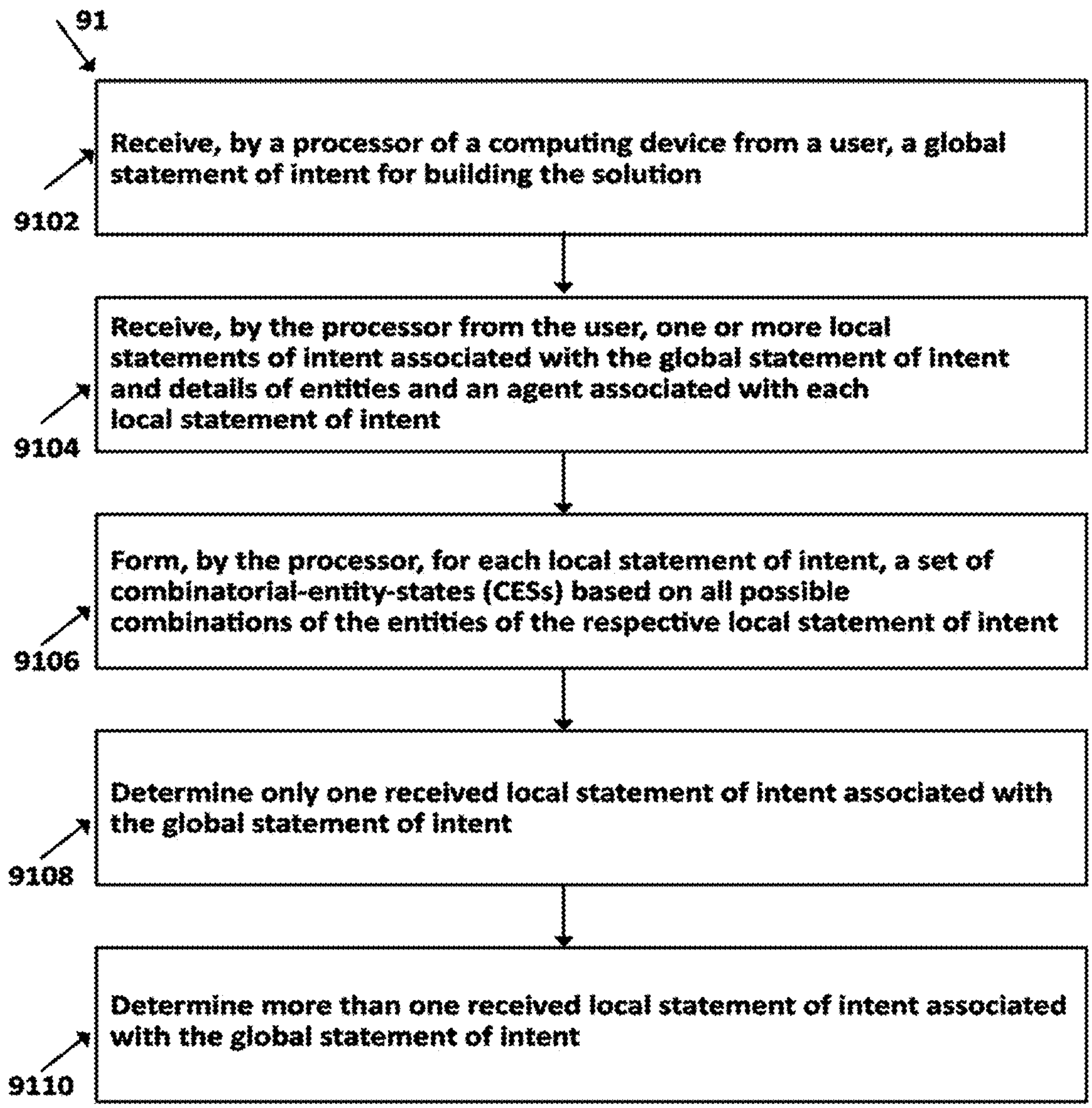

FIG. 91 represents a flowchart depicting a method for building a computer-implemented solution using a natural language understood by users and without using programming codes.

Figure 92:
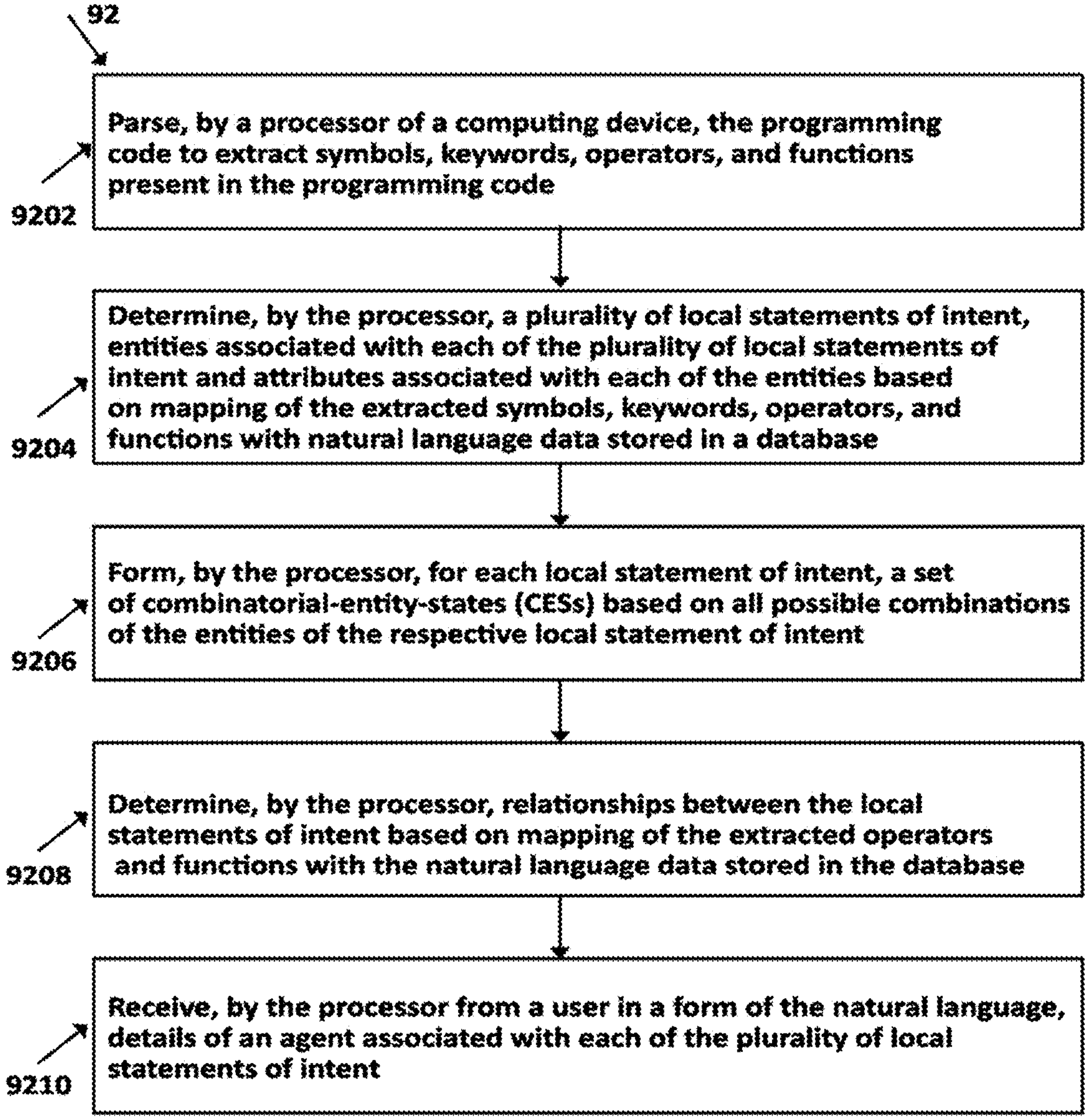

FIG. 92 represents a flowchart depicting a method for converting a programming code into a natural language to build a natural language-based computer-implemented solution.

Figure 93:
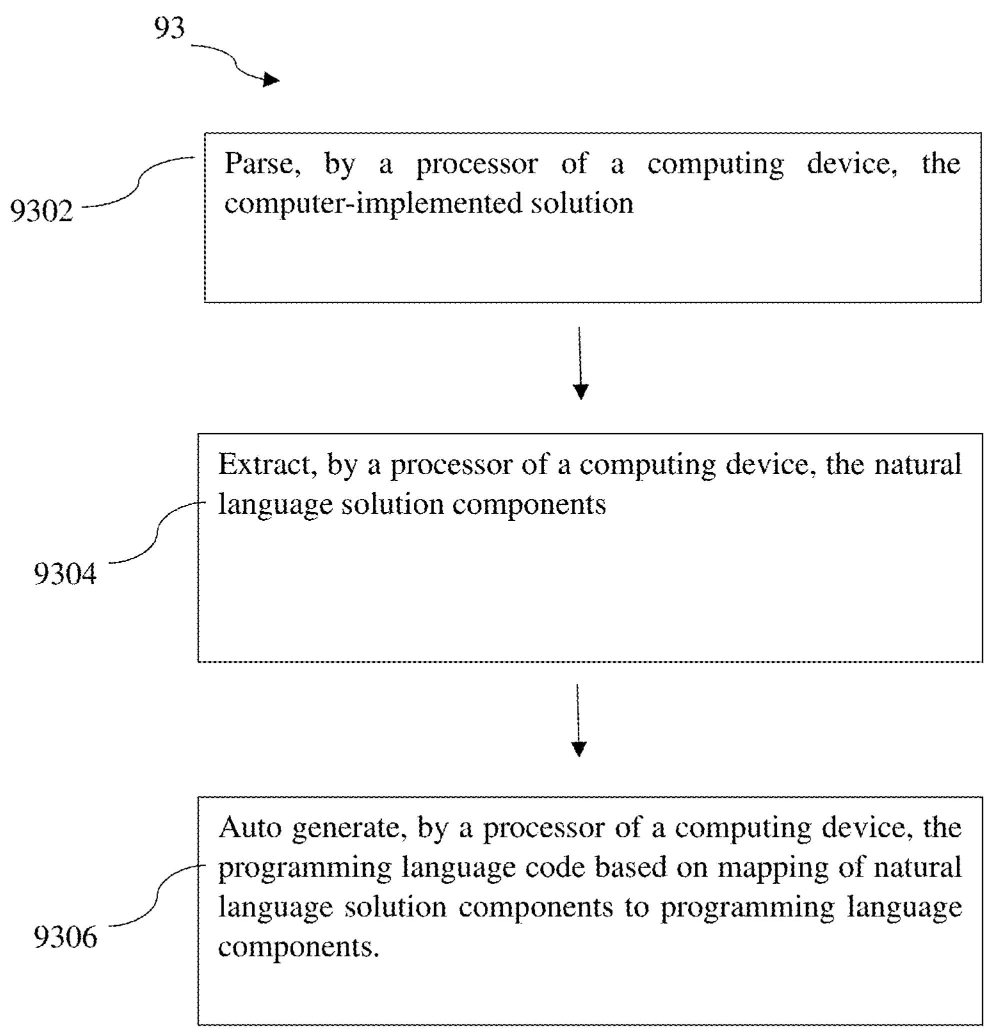

FIG. 93 represents a flowchart depicting a method for converting a computer-implemented solution built based on a natural language into a programming code.

Figure 94:
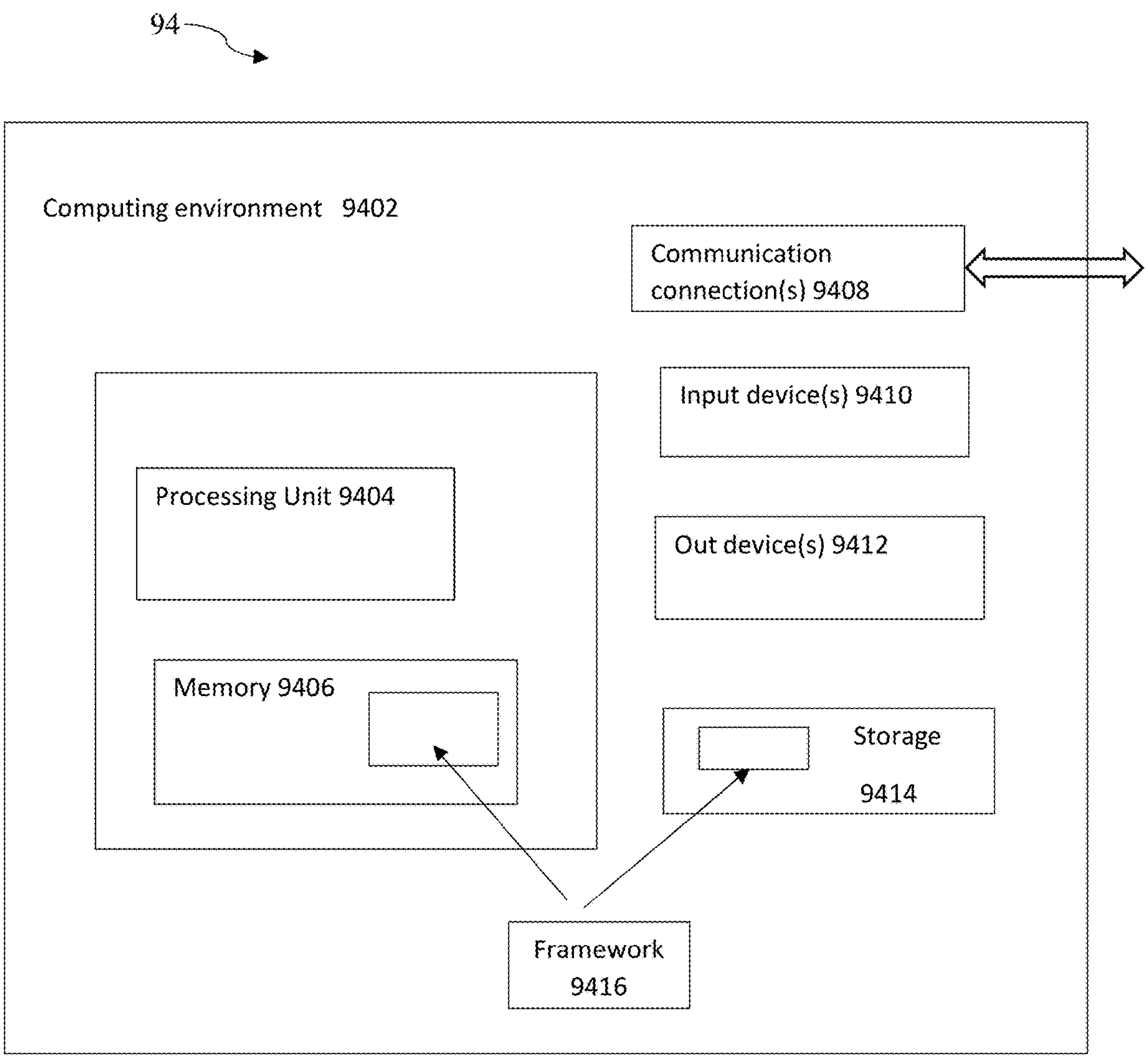

FIG. 94 represents a generalized computer network arrangement for NSL.

Figure 95:
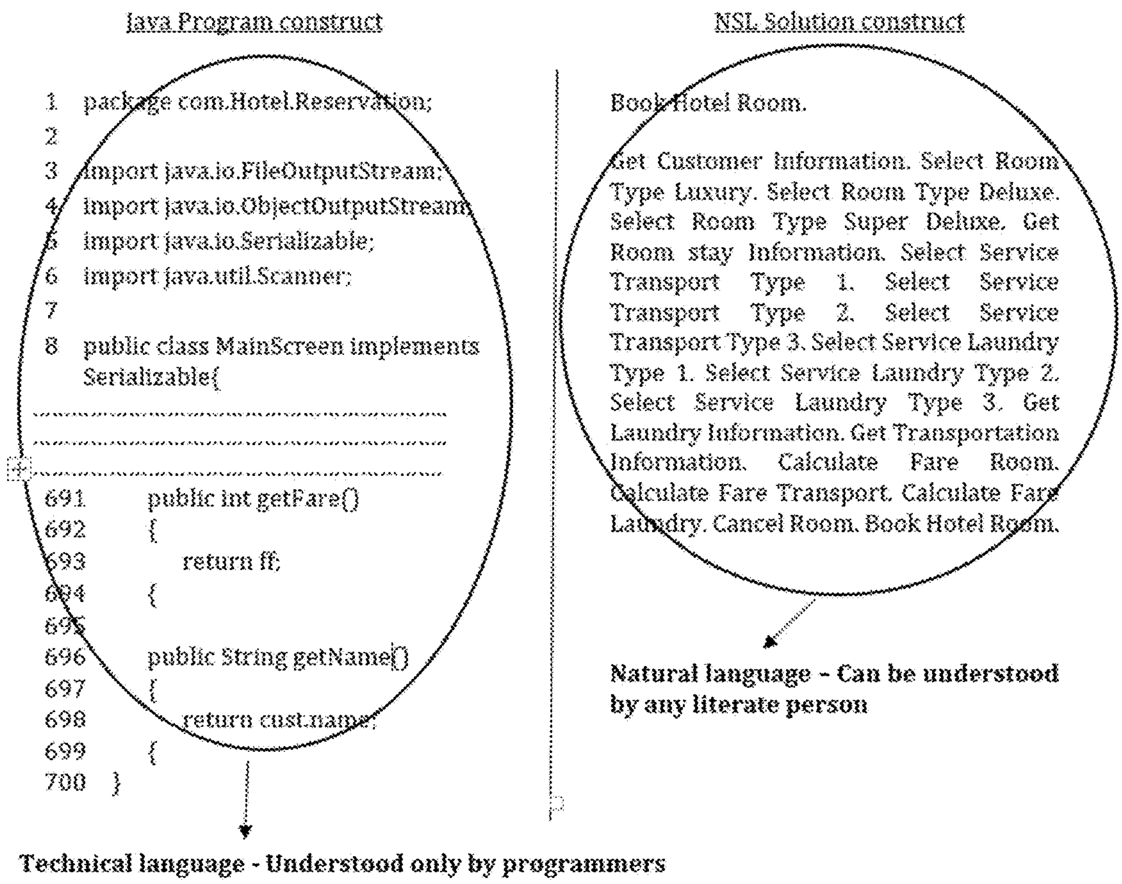

FIG. 95 is a diagram showing an example of a representation of a Java Program and a corresponding NSL Solution.

Figure 96:
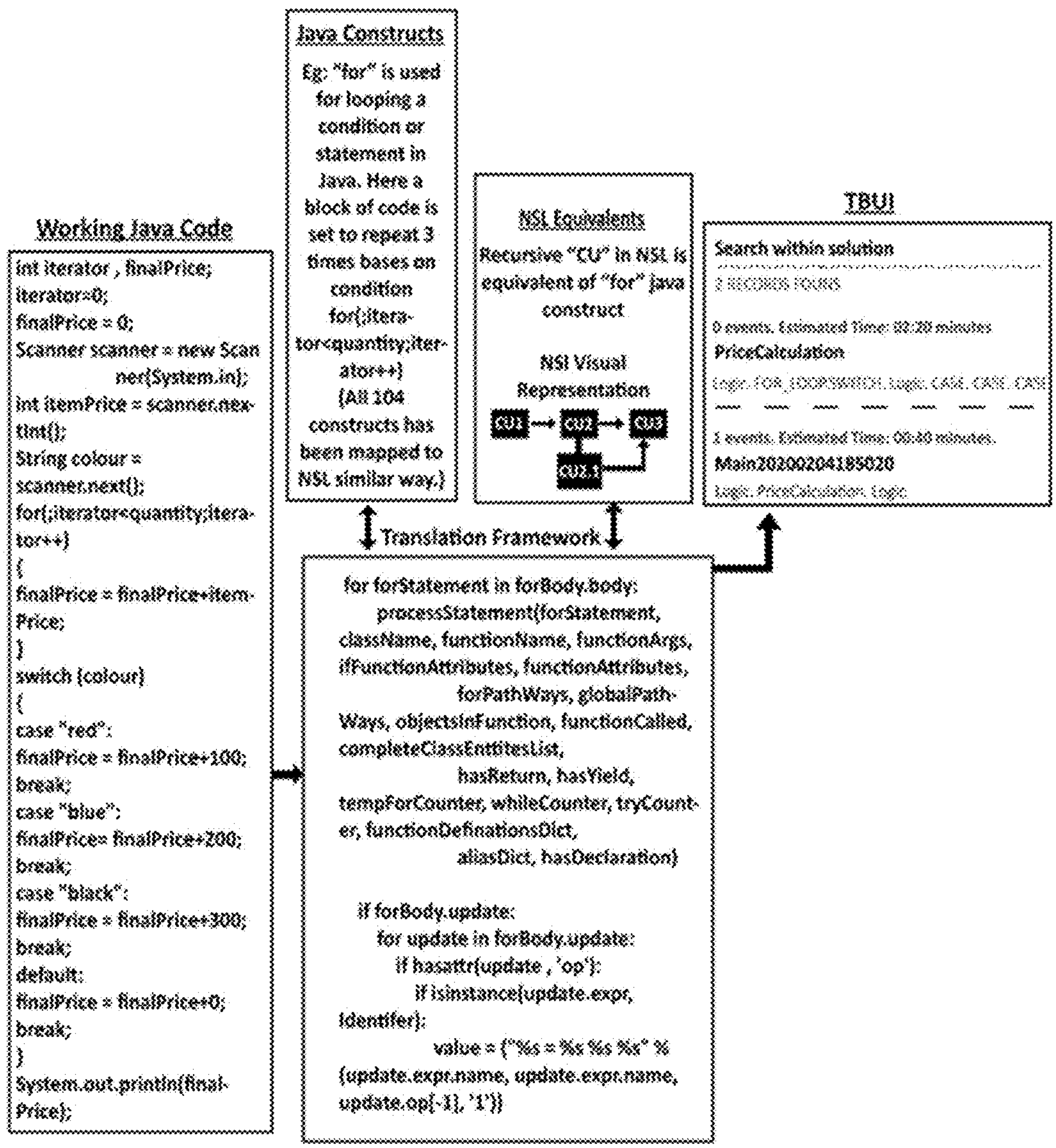

FIG. 96 is a diagram showing an example of a representation of a translation of a Java Program into an NSL Solution using a technology translation framework.

Figure 97A:
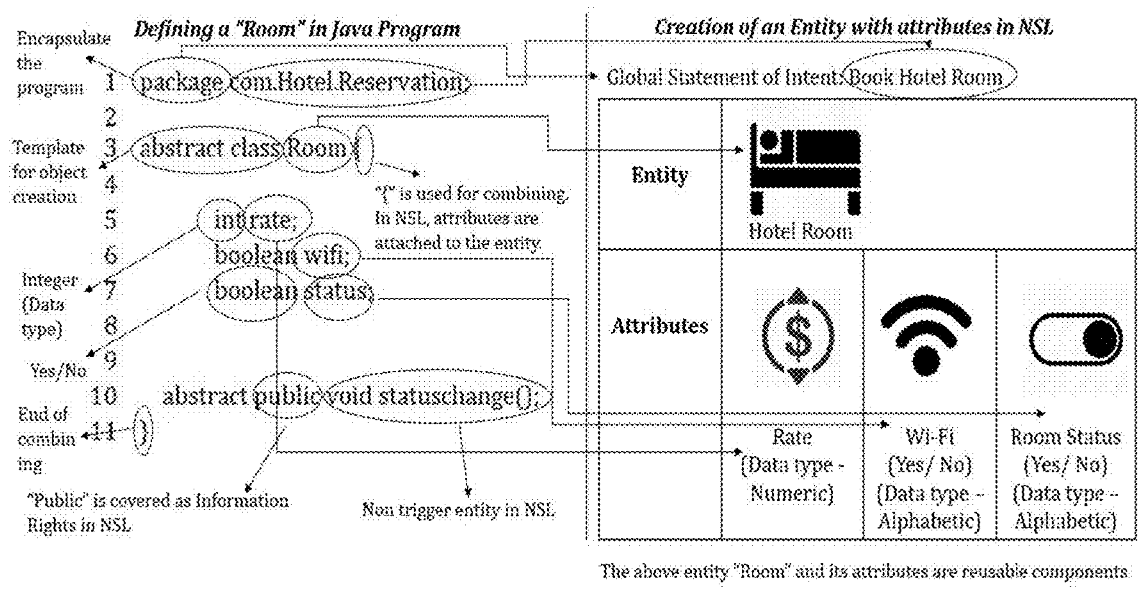

FIG. 97A is a diagram showing an example of a representation of an entity creation with attributes through one-to-one mapping of the Java Program to the NSL equivalent.

Figure 97B:
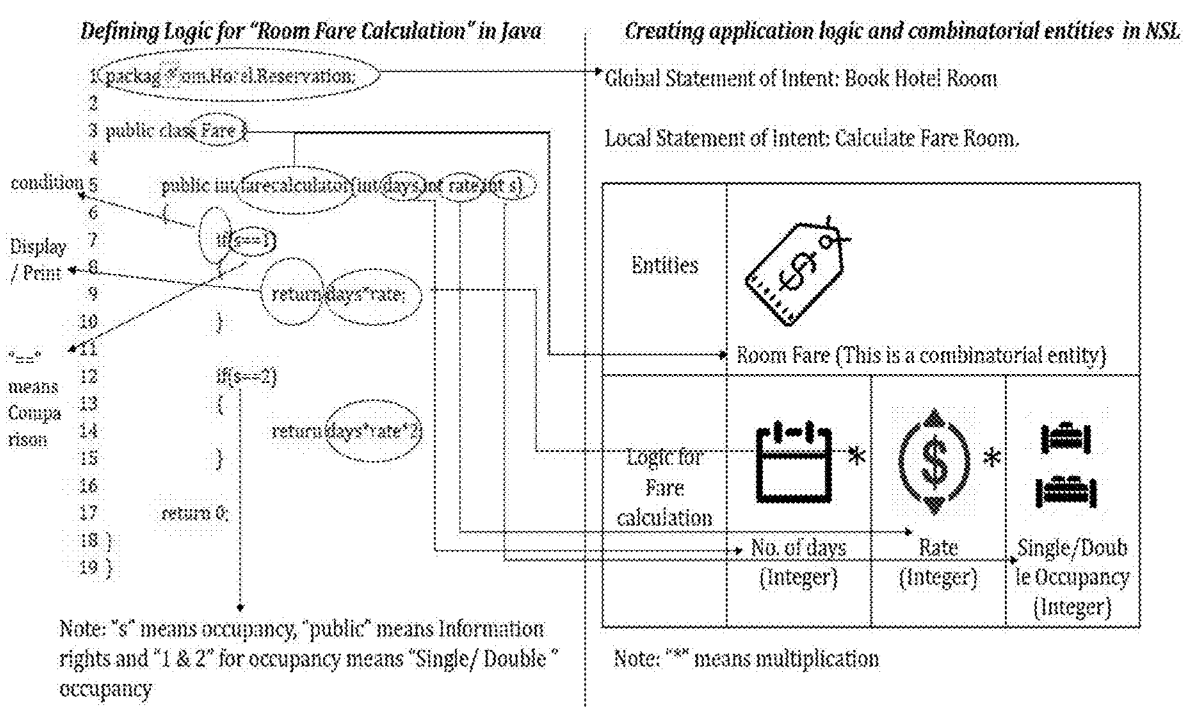

FIG. 97B is a diagram showing an example of a representation of functions in NSL through the one-to-one mapping of the Java Program to the NSL equivalent.

FIG. 98A is a diagram showing an example of a representation of a Paragraph in static state when the solution is constructed.

FIG. 98B is a diagram showing an example of a representation of a sentence turning into Dynamic from Static as "an event arrived when the customer information is captured."

FIG. 98C is a diagram showing an example of a representation of a Paragraph in dynamic state when the information is filled up.

Figure 99A:
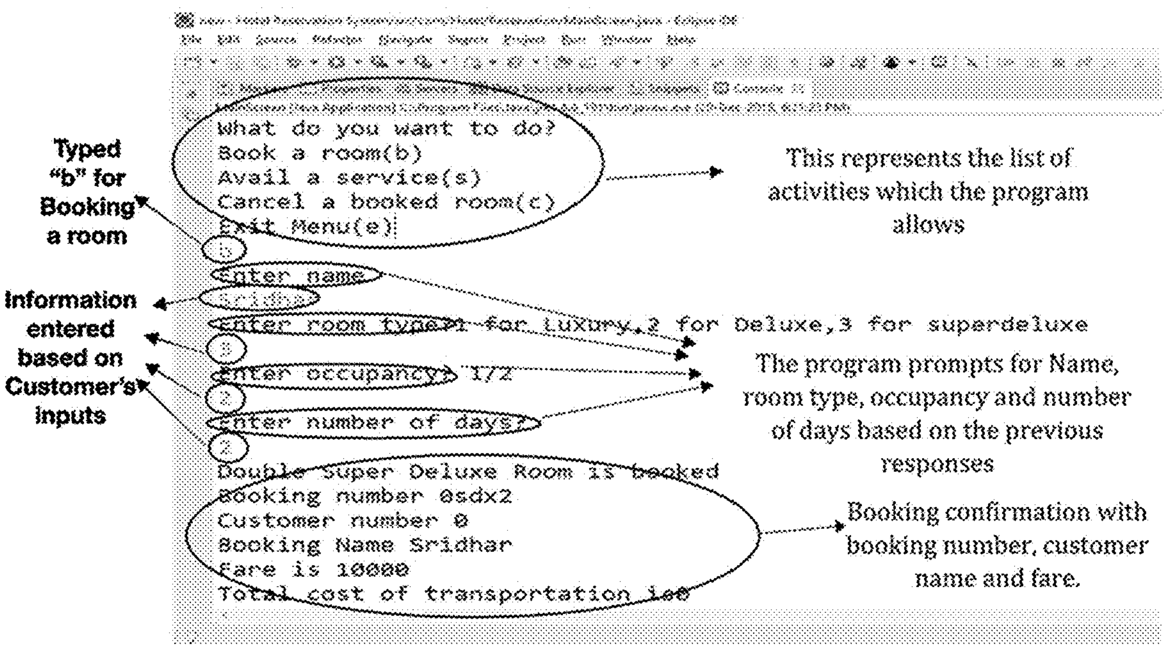

FIG. 99A is a diagram showing an example of a representation of inputs and outputs of a Java Program.

FIG. 99B is a diagram showing an example of a representation of inputs and outputs of an NSL Solution.

Figure 100A:
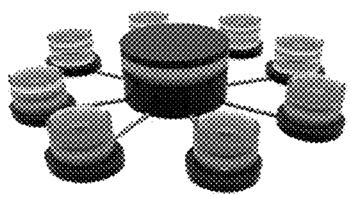

FIG. 100A is a diagram showing an example of a representation of managing databases.

Figure 100B:
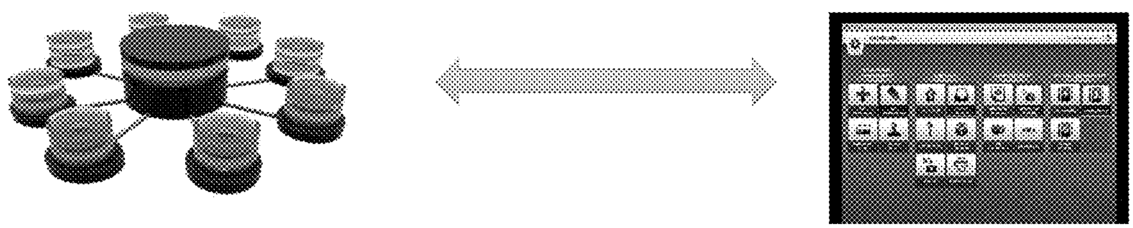

FIG. 100B is a diagram showing an example of a representation of managing user interfaces.

Figure 100C:
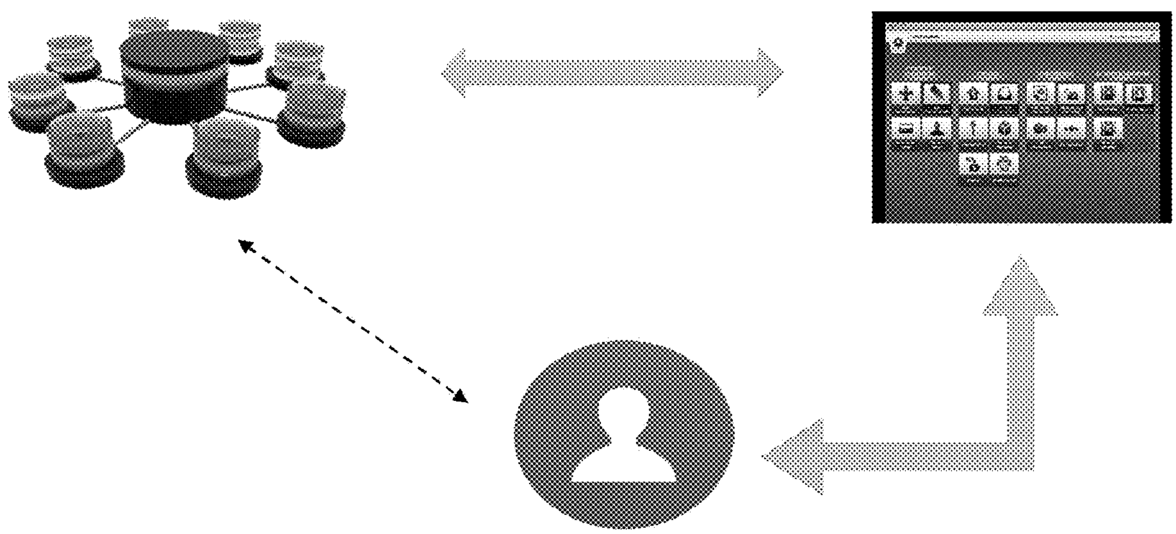

FIG. 100C is a diagram showing an example of a representation of connecting entities to agents.

FIG. 101 is a diagram showing an example of a representation of Operational metrics explaining the time, efforts, and cost required to build the Hotel Reservation System solution in NSL and Java.

Figure 102A:
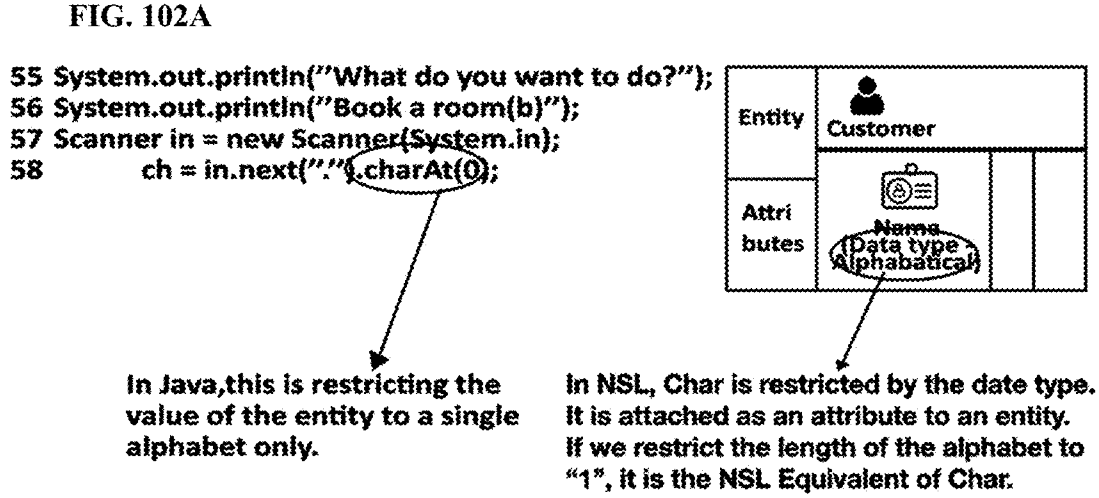

FIG. 102A is a diagram showing an example of a representation of the way the Keyword "Char" is used in Java and the way it is represented in NSL.

Figure 102B:
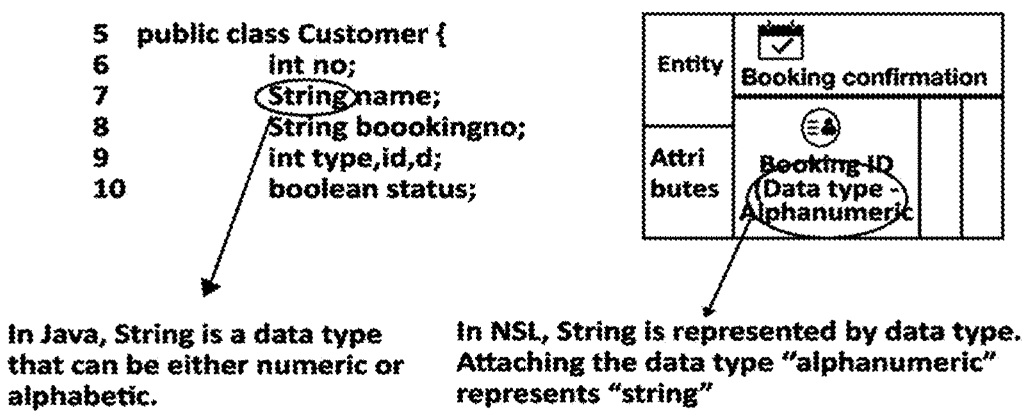

FIG. 102B is a diagram showing an example of a representation of the way the Keyword "String" is used in Java and the way it is represented in NSL.

Figure 102C:
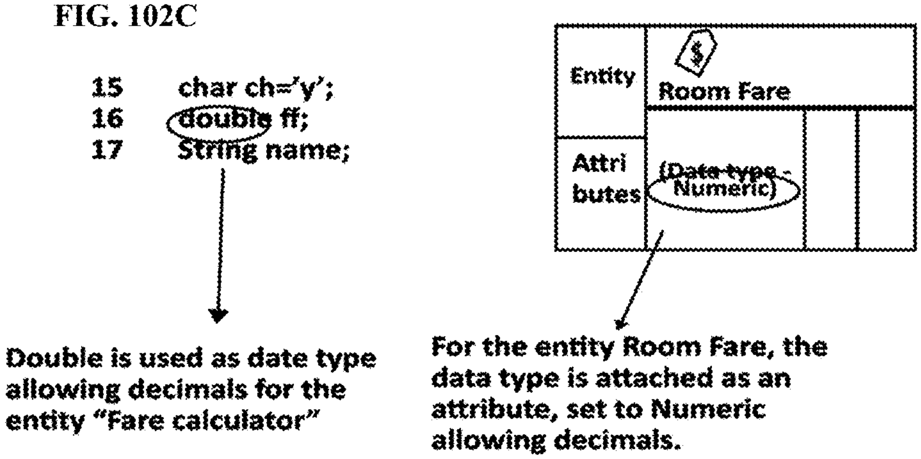

FIG. 102C is a diagram showing an example of a representation of the way the Keyword "Double" is used in Java and the way it is represented in NSL.

Figure 102D:
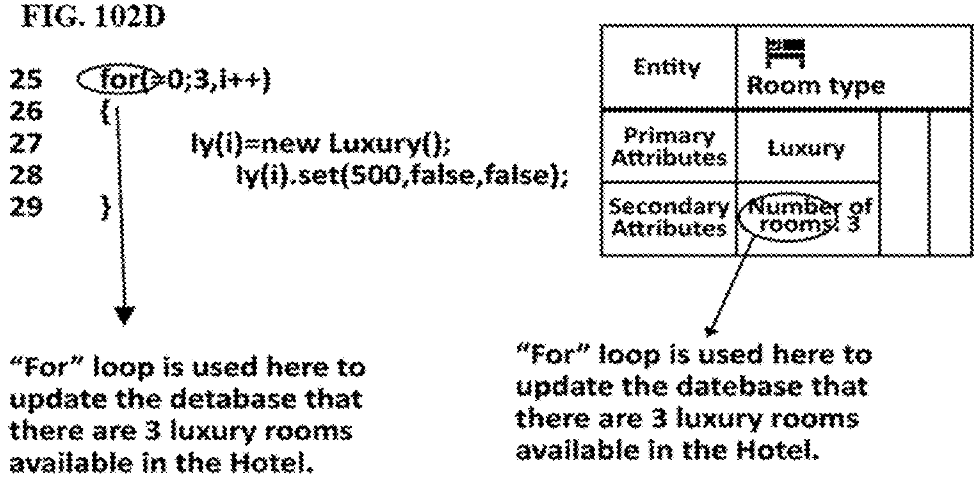

FIG. 102D is a diagram showing an example of a representation of the way the Keyword "For" is used in Java and the way it is represented in NSL.

Figure 102E:
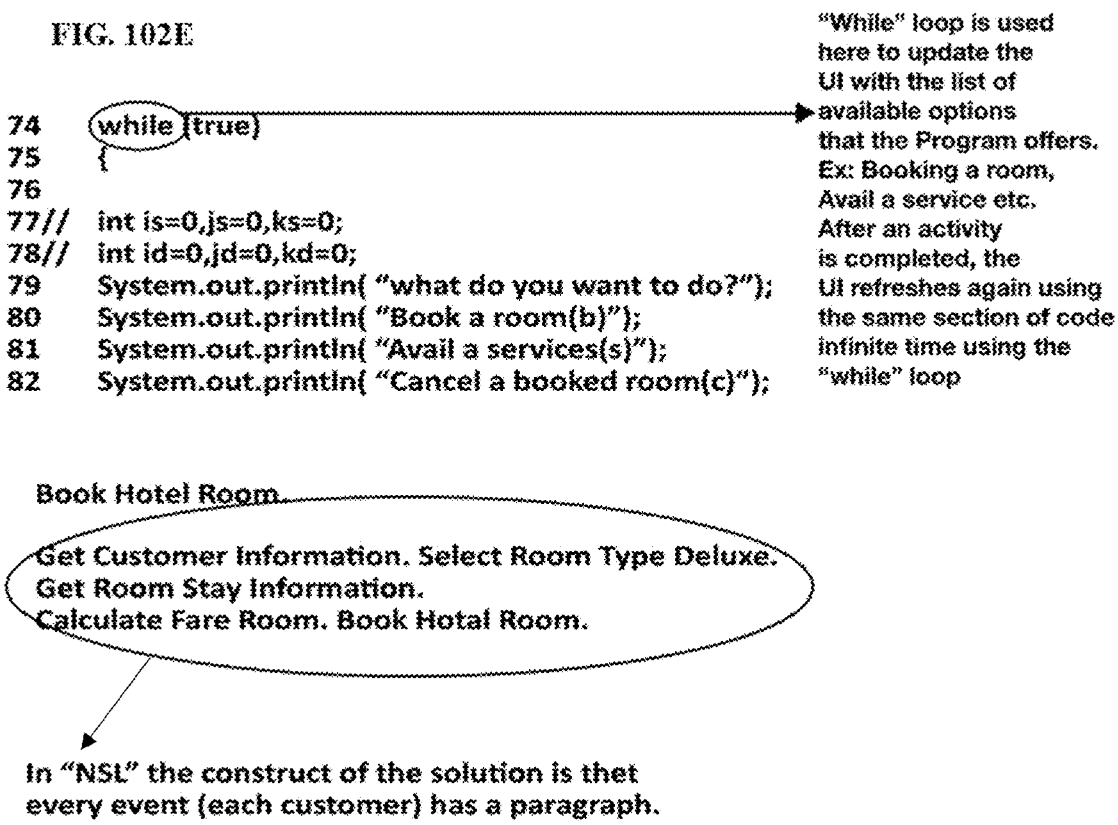

FIG. 102E is a diagram showing an example of a representation of the way the Keyword "While" is used in Java and the way it is represented in NSL.

Figure 102F:
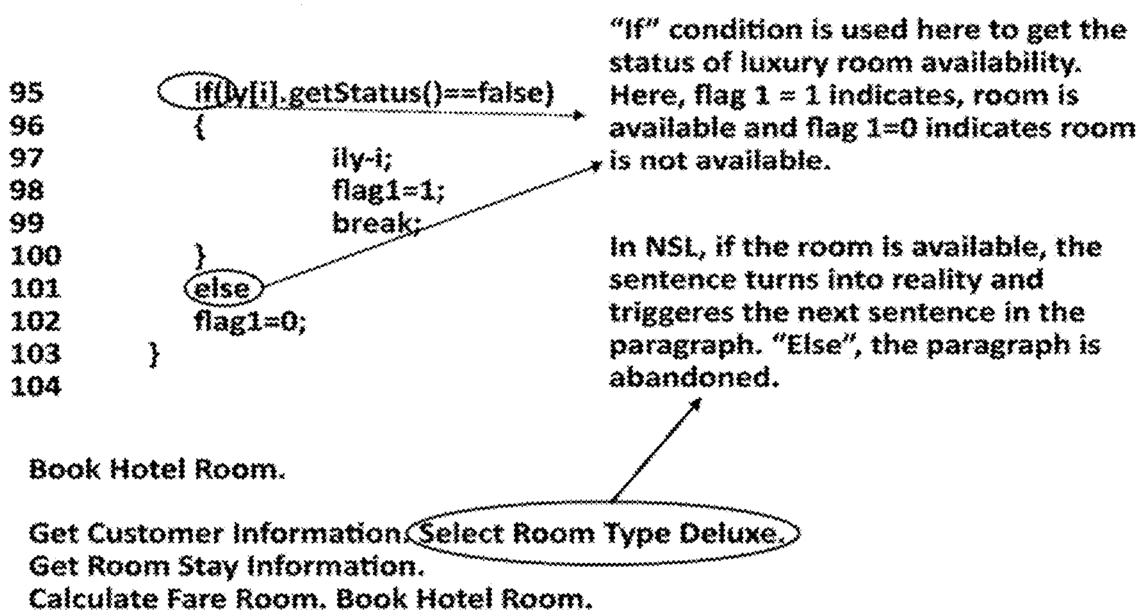

FIG. 102F is a diagram showing an example of a representation of the way the Keyword "If" is used in Java and the way it is represented in NSL.

FIG. 102G is a diagram showing an example of a representation of the way the Keyword "Break" is used in Java and the way it is represented in NSL.

FIG. 103 is a diagram showing an example of a representation of converting process into information.

Figure 104:
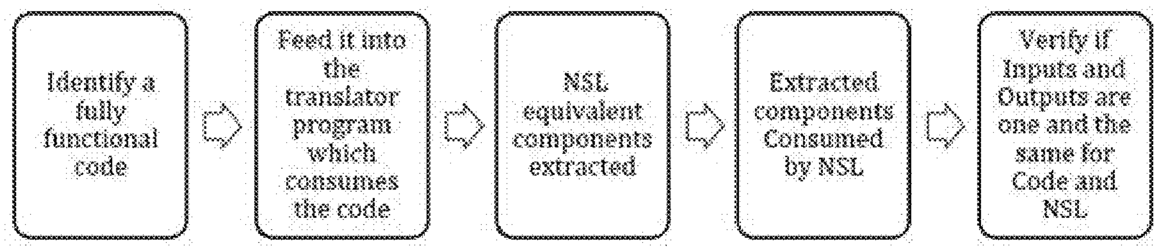

FIG. 104 is a diagram showing an example of a representation of an NSL Technology Translation Framework Methodology.

Figure 105:
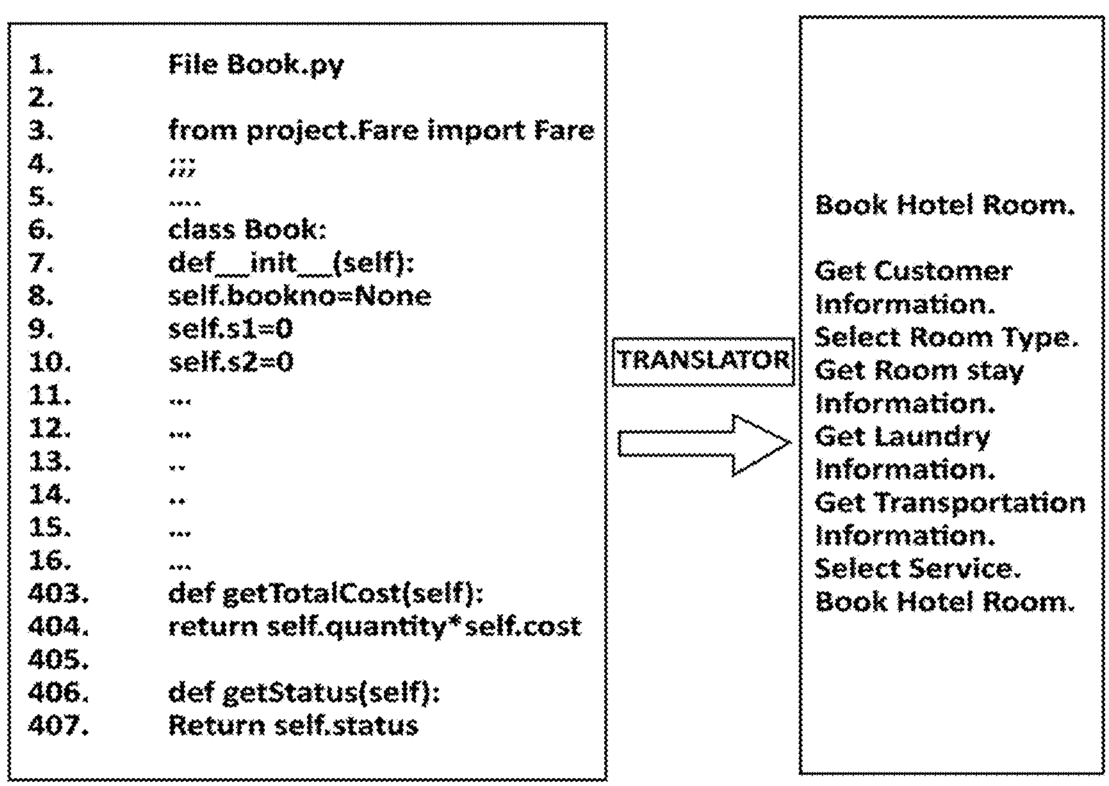

FIG. 105 is a diagram showing an example of a representation of the Python Program and the NSL Solution.

FIG. 106 is a table showing examples of a few Java constructs and their corresponding NSL equivalents.

Figure 107A:
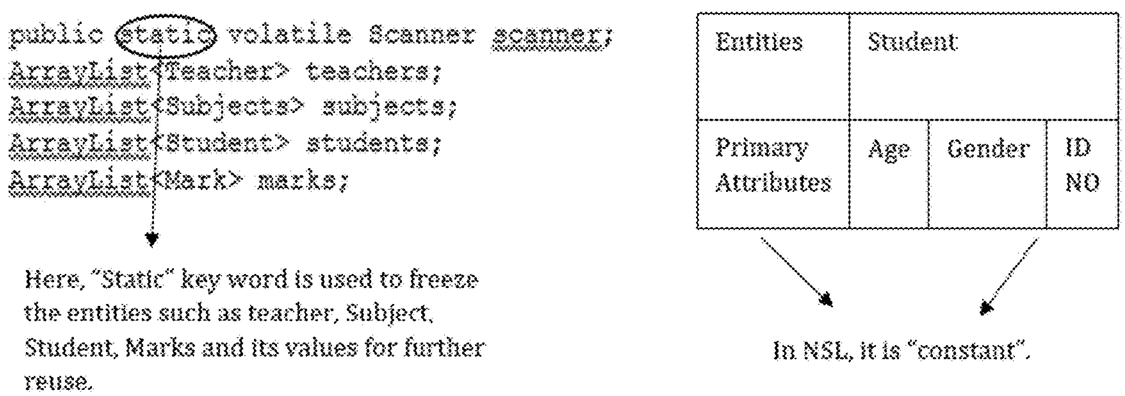

FIG. 107A is a diagram showing an example of a representation of the way the Keyword "Static" is used in Programming and the way it is represented in NSL.

Figure 107B:
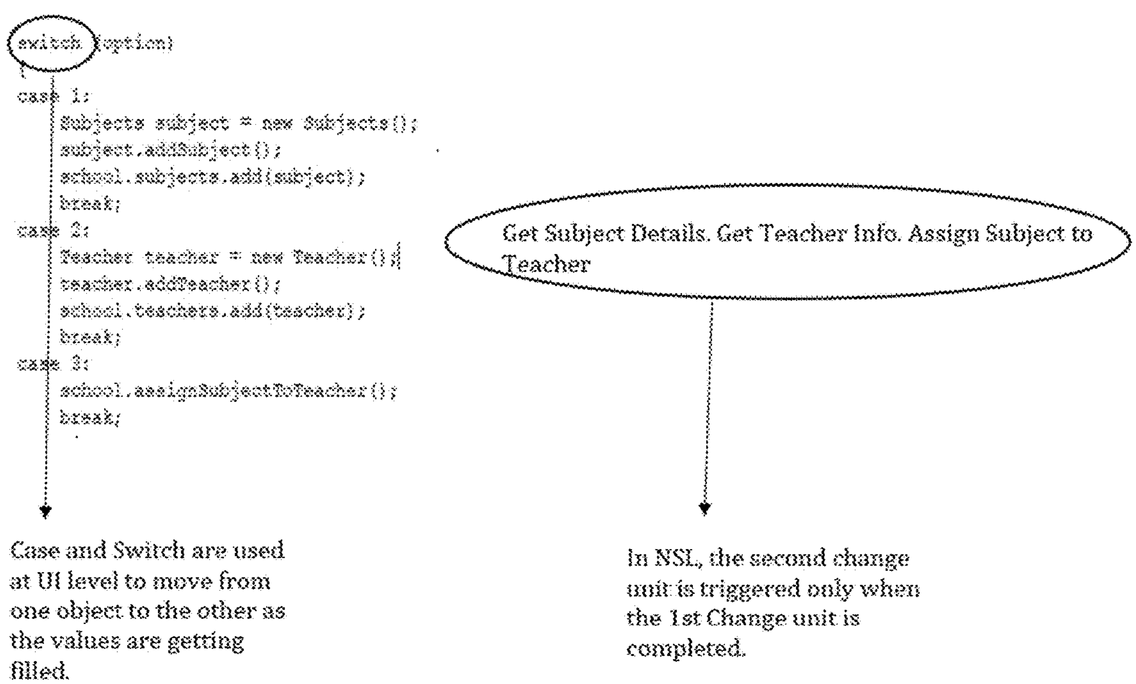

FIG. 107B is a diagram showing an example of a representation of the way the Keyword "Switch" is used in Programming and the way it is represented in NSL.

FIG. 107C is a diagram showing an example of a representation of the way the Keyword "Continue" is used in Programming and the way it is represented in NSL.

FIG. 107D is a diagram showing an example of a representation of the way the Keyword "Transient" is used in Programming and the way it is represented in NSL.

FIG. 107E is a diagram showing an example of a representation of the way the Keyword "Long" is used in Programming and the way it is represented in NSL.

FIG. 107F is a diagram showing an example of a representation of the way the Keyword "Short" is used in Programming and the way it is represented in NSL.

FIG. 107G is a diagram showing an example of a representation of the way the Keyword "Byte" is used in Programming and the way it is represented in NSL.

FIG. 107H is a diagram showing an example of a representation of the way the Keyword "Default" is used in Programming and the way it is represented in NSL.

Figure 107I:
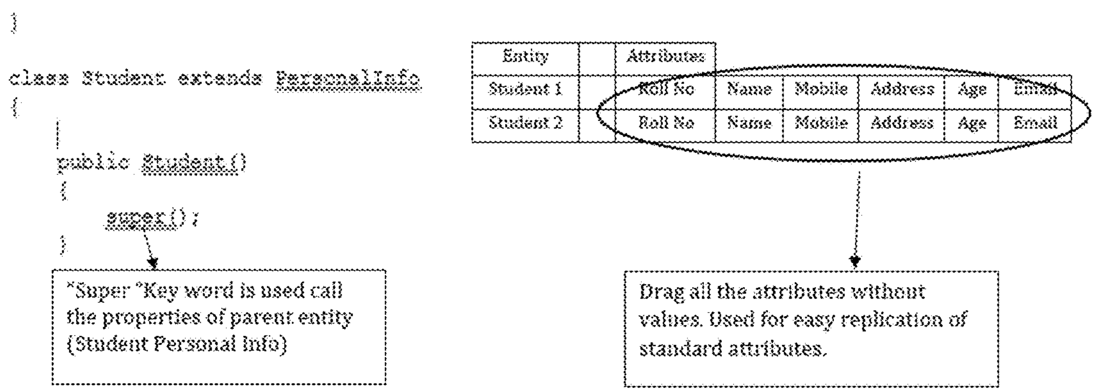

FIG. 107I is a diagram showing an example of a representation of the way the Keyword "Super" is used in Programming and the way it is represented in NSL.

Figure 107J:
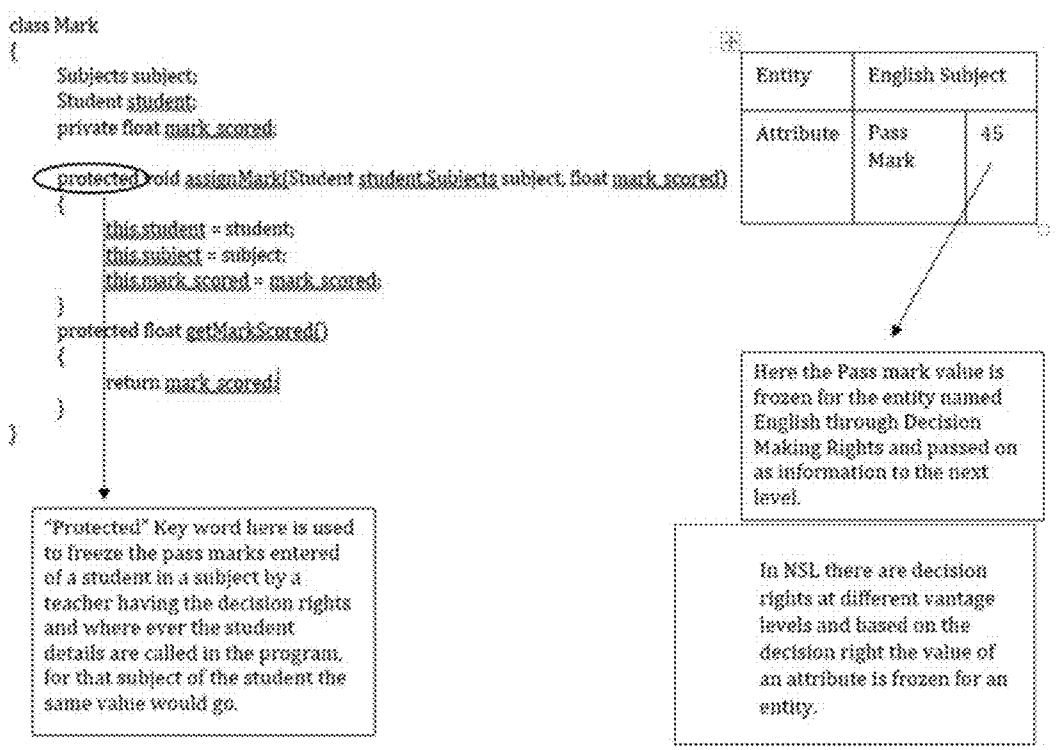

FIG. 107J is a diagram showing an example of a representation of the way the Keyword "Protected" is used in Programming and the way it is represented in NSL.

Figure 107K:
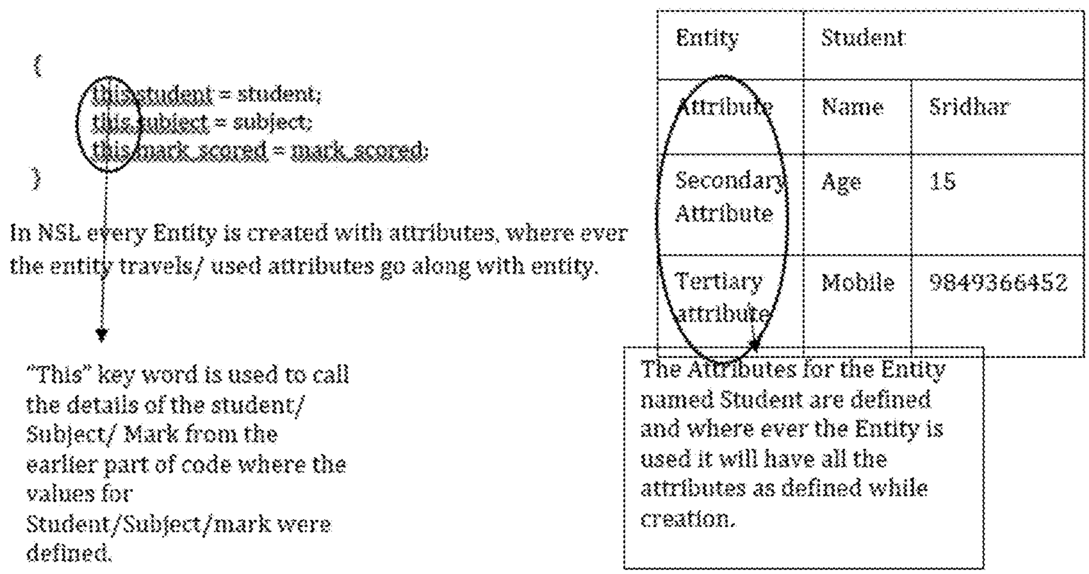

FIG. 107K is a diagram showing an example of a representation of the way the Keyword "This" is used in Programming and the way it is represented in NSL.

Figure 107L:
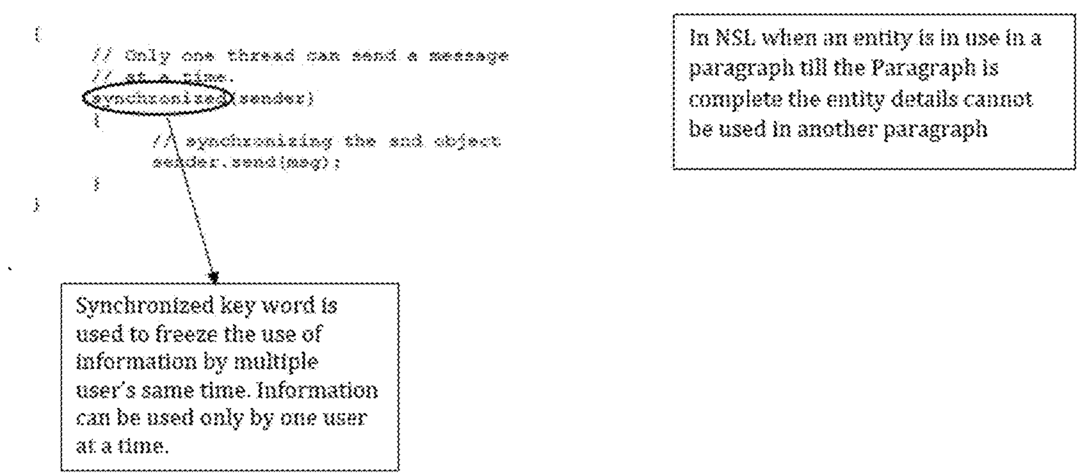

FIG. 107L is a diagram showing an example of a representation of the way the Keyword "Synchronized" is used in Programming and the way it is represented in NSL.

FIG. 107M is a diagram showing an example of a representation of the way the Keyword "Strictfp" is used in Programming and the way it is represented in NSL.

FIG. 107N is a diagram showing an example of a representation of the way the Keyword "final" is used in Programming and the way it is represented in NSL.

Figure 108A:
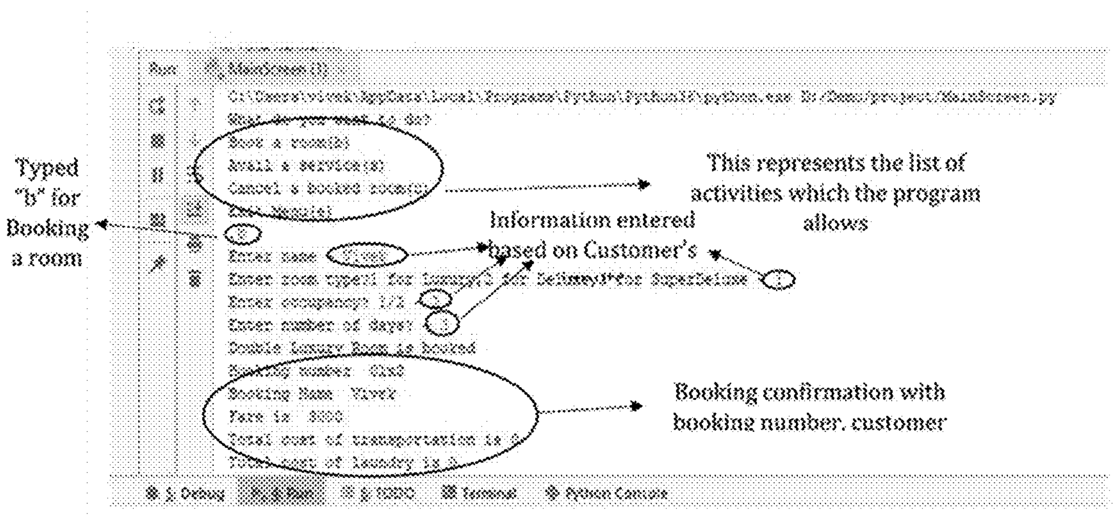

FIG. 108A is a diagram showing an example of a representation of inputs and outputs of a Python Program.

FIG. 108B is a diagram showing an example of a representation of inputs and outputs of NSL Solution.

FIG. 109 is a diagram showing an example of a representation of an NSL Technology Re-translation Framework Methodology.

FIG. 110 is a diagram showing an example of a representation of an NSL Solution and the equivalent Python and C Programs with inputs and outputs.

Figure 111:
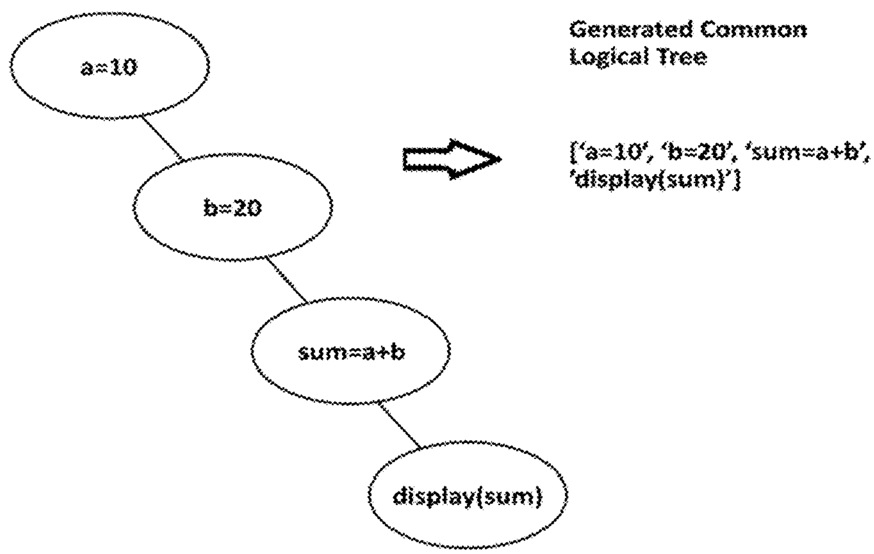

FIG. 111 is a diagram showing an example of output generated by common logical tree.

Figure 112:
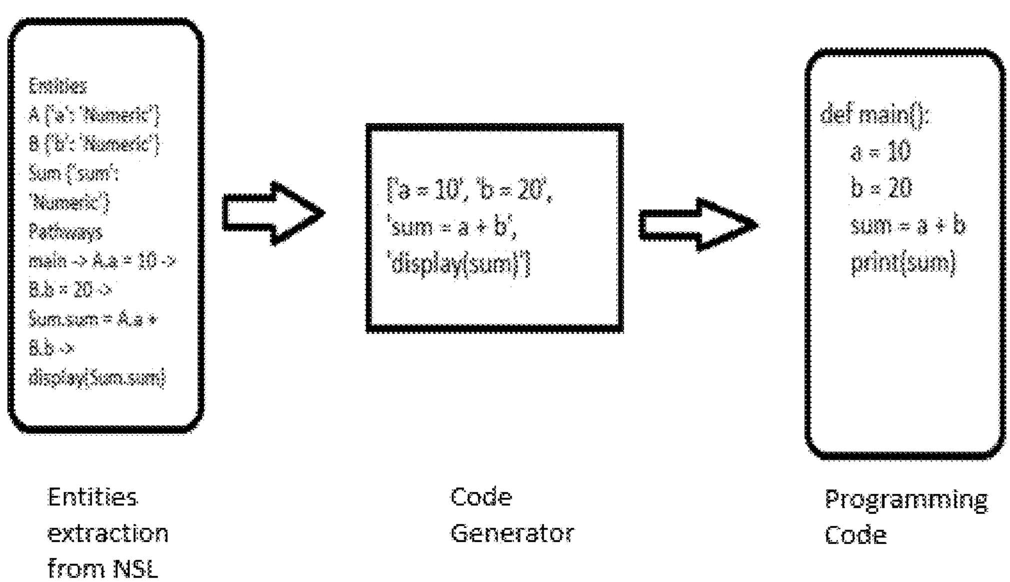

FIG. 112 is a diagram showing an example of code generation from NSL to Programming languages.

Figure 113:
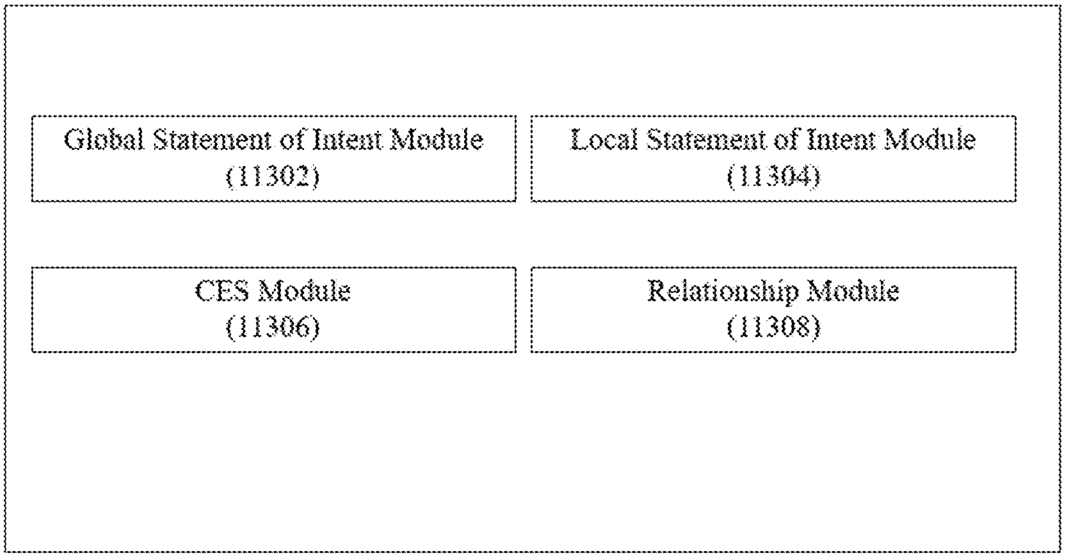

FIG. 113 represents a system for designing and deploying a solution.

Figure 114:
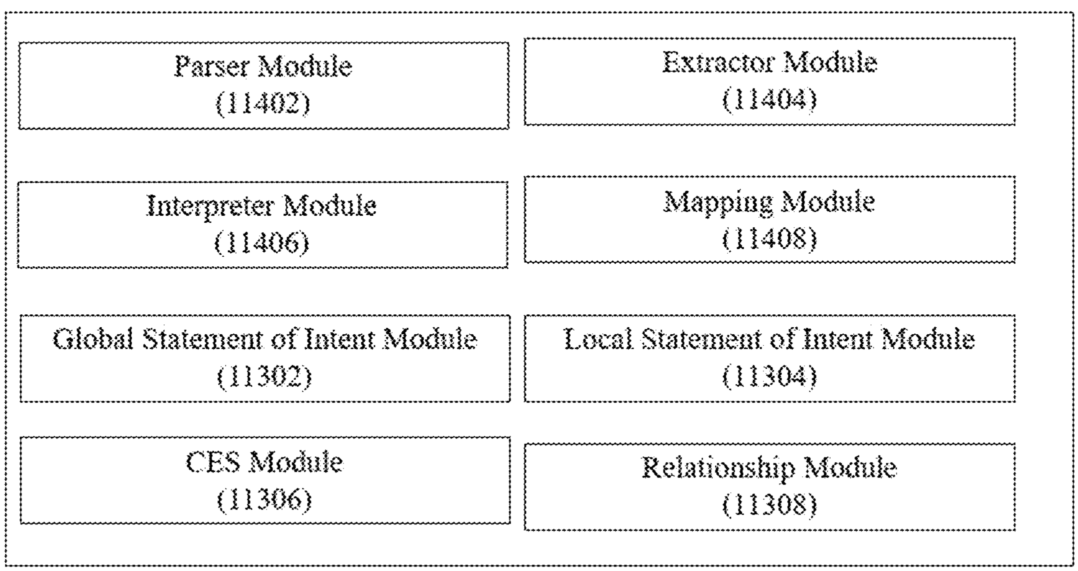

FIG. 114 represents a system for translating and converting a programming language code into a natural language.

Figure 115:
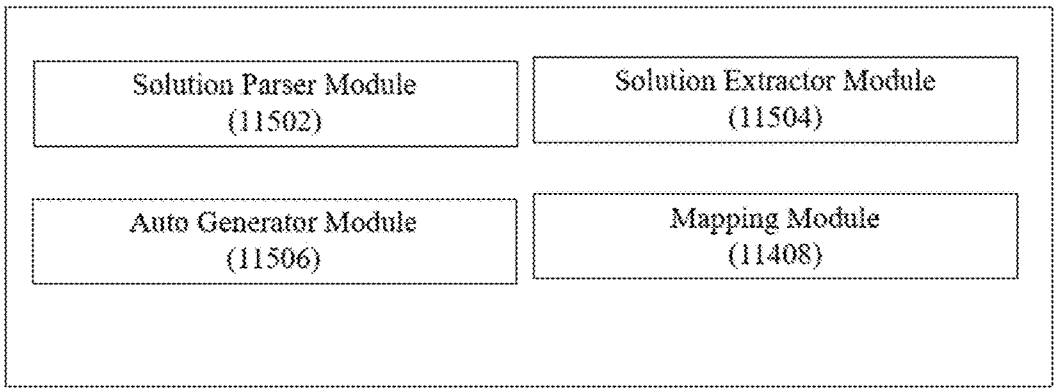

FIG. 115 represents a system for translating and converting a solution constructed in NSL into a programming language.

Figure 116:
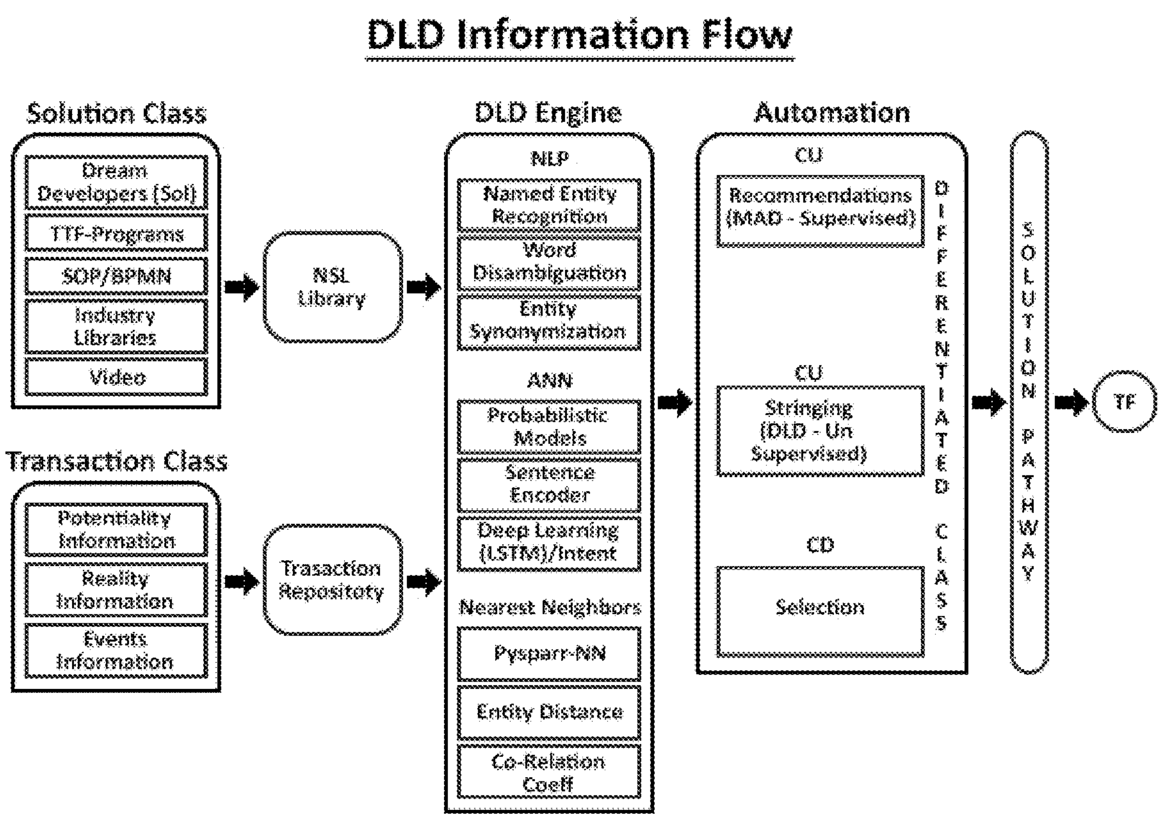

FIG. 116 is a diagram showing an example of DLD information flow and components present in the DLD Engine.

Figure 117:
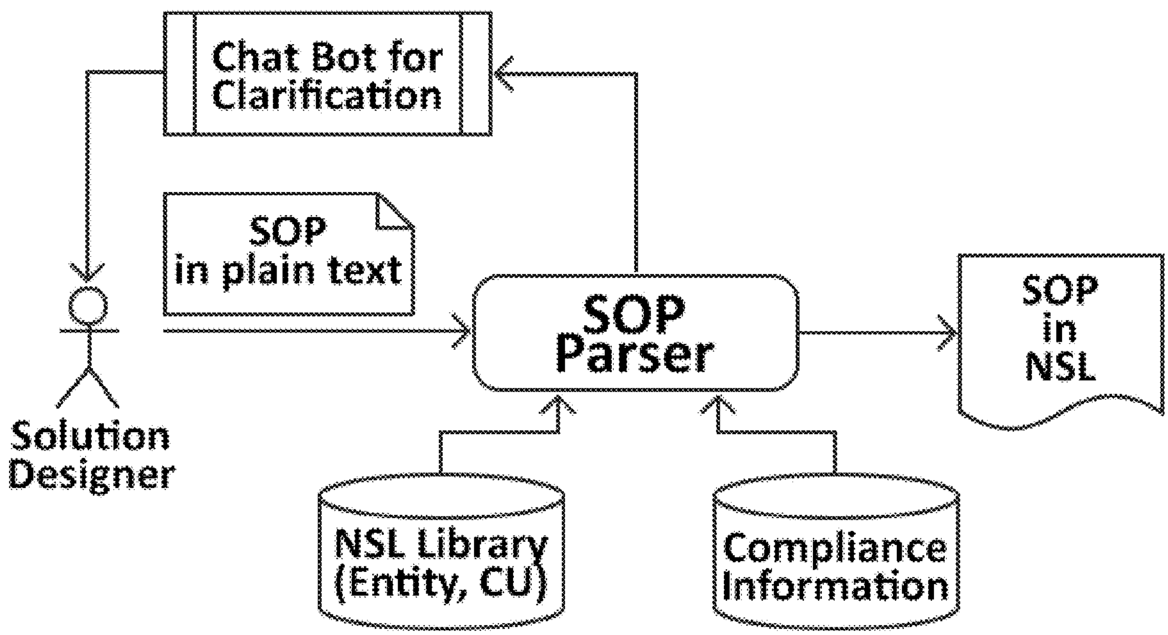

FIG. 117 is a diagram showing an example of converting SOP into NSL.

Figure 118:
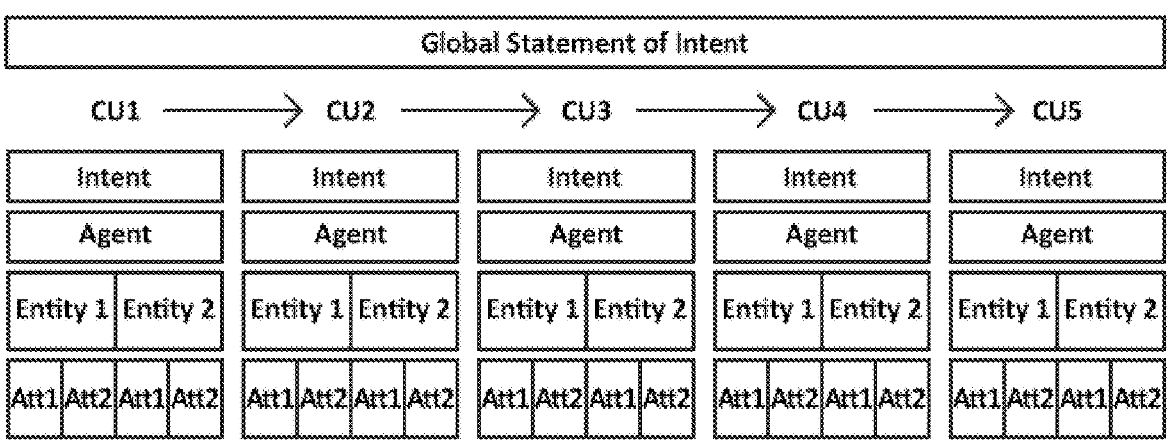

FIG. 118 is a diagram showing an example of sequential change units.

Figure 119:
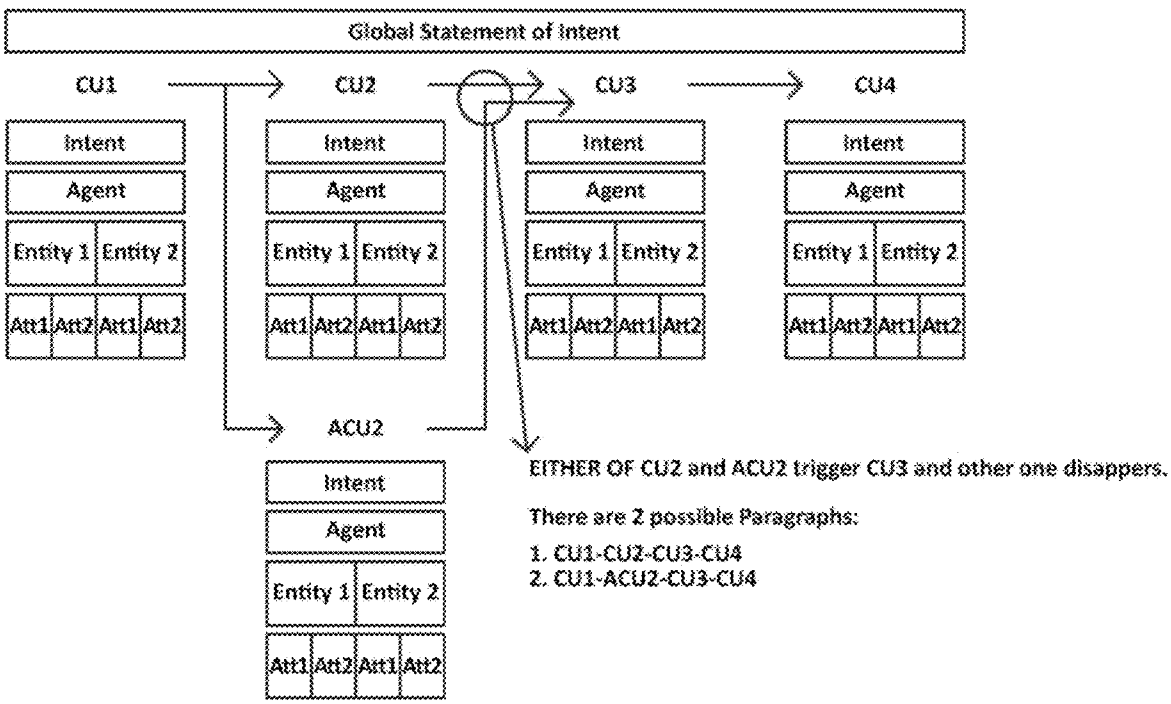

FIG. 119 is a diagram showing an example of alternative change units, wherein either of CU2 or ACU2 trigger CU3 and the other one disappears.

Figure 120:
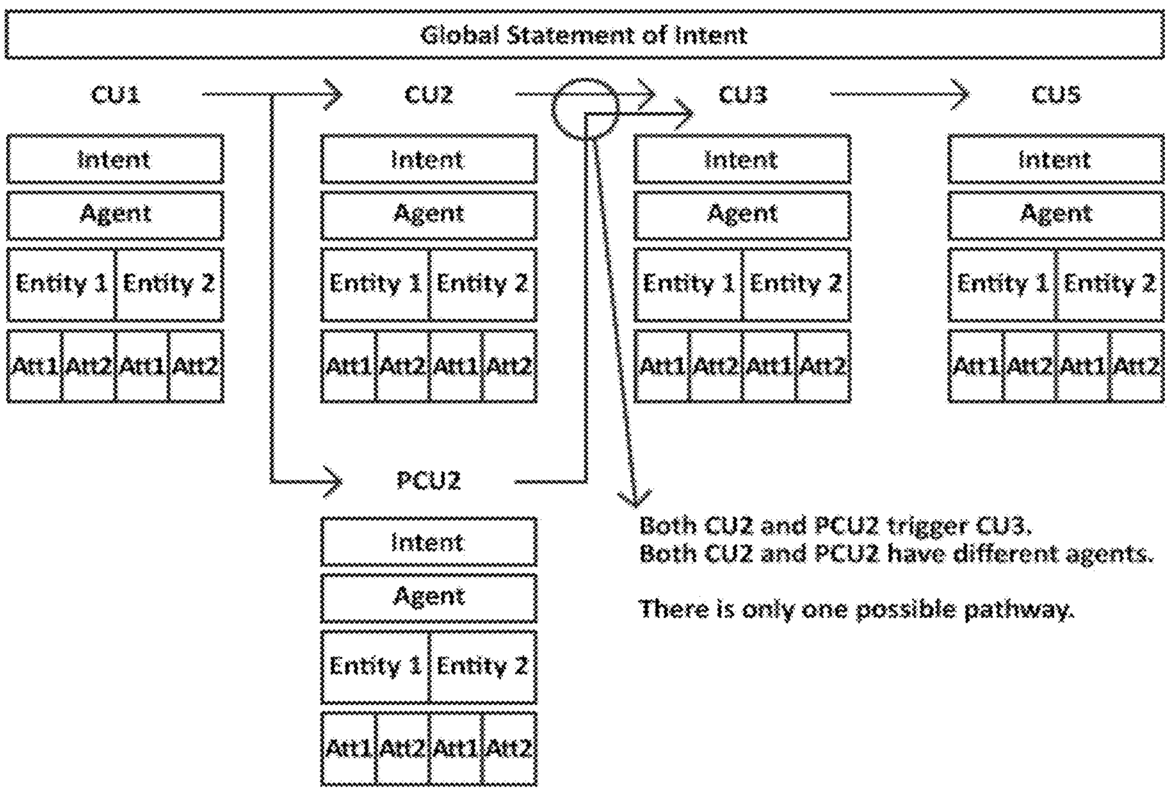

FIG. 120 is a diagram showing an example of parallel change units, wherein both CU2 and PCU2 shall trigger CU3.

Figure 121:
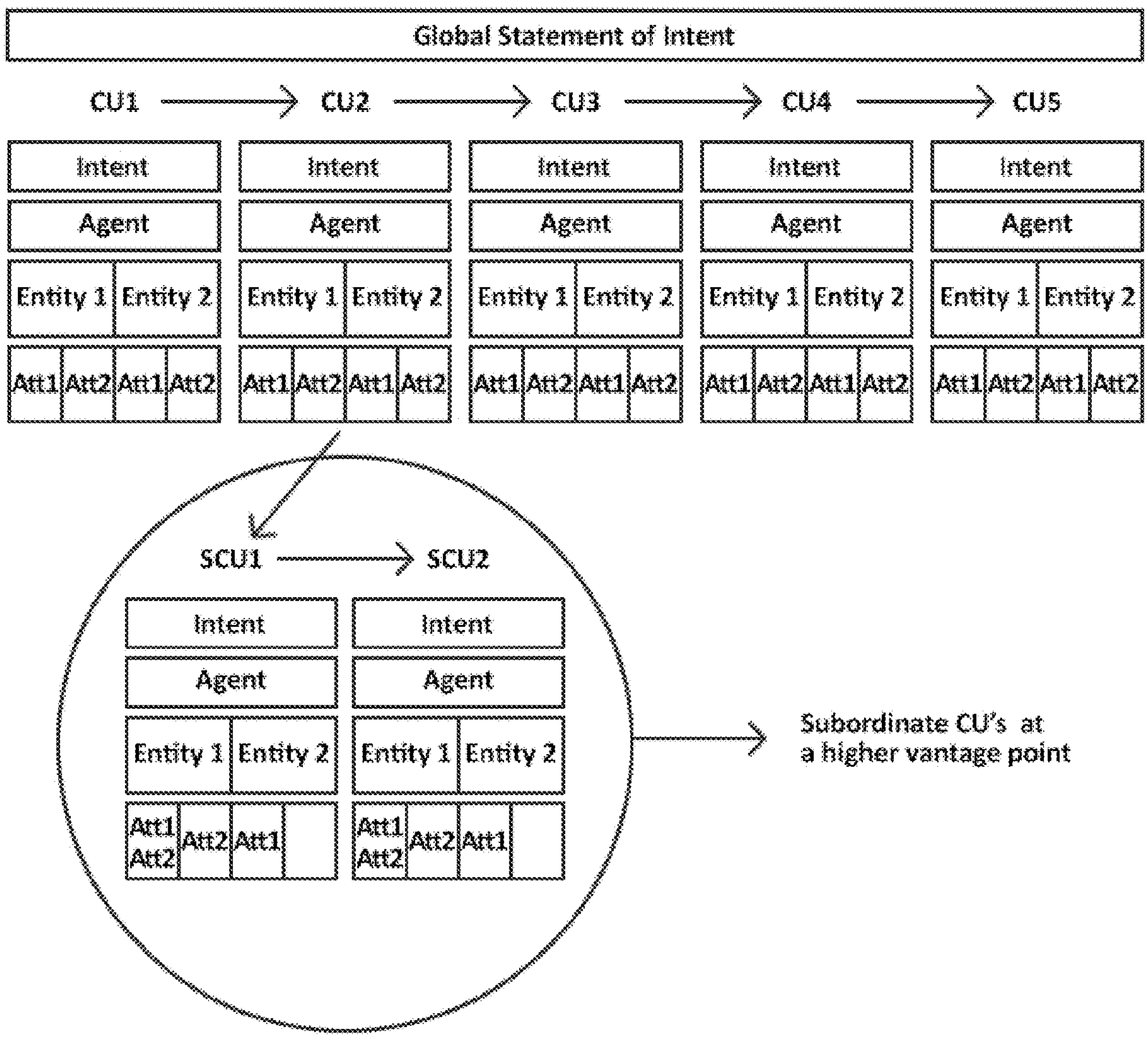

FIG. 121 is a diagram showing an example of subordinate change units.

Figure 122:
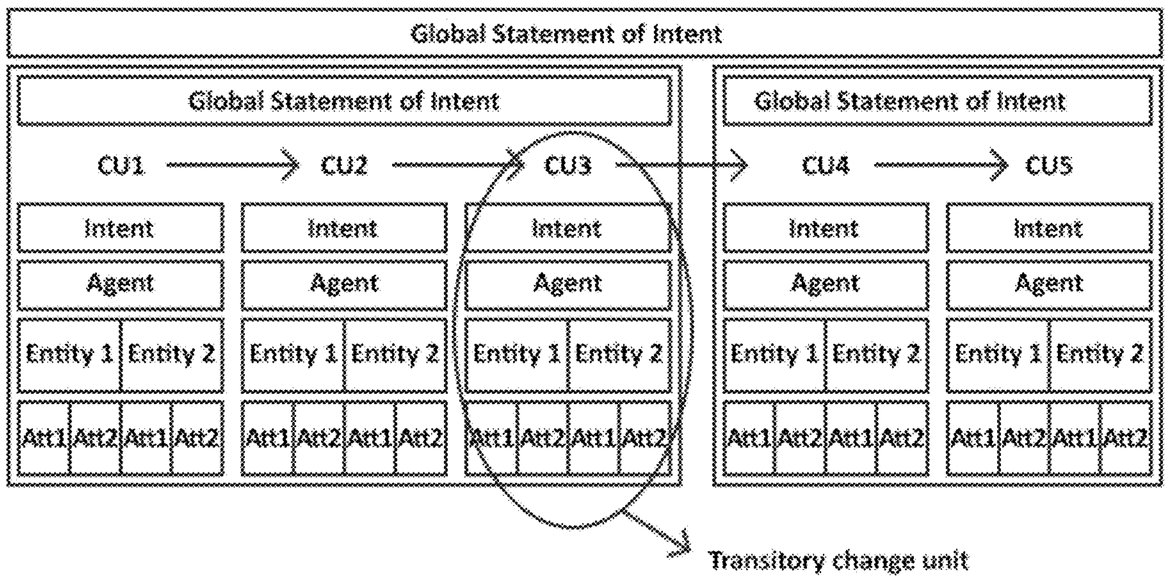

FIG. 122 is a diagram showing an example of transitory change units.

Figure 123:
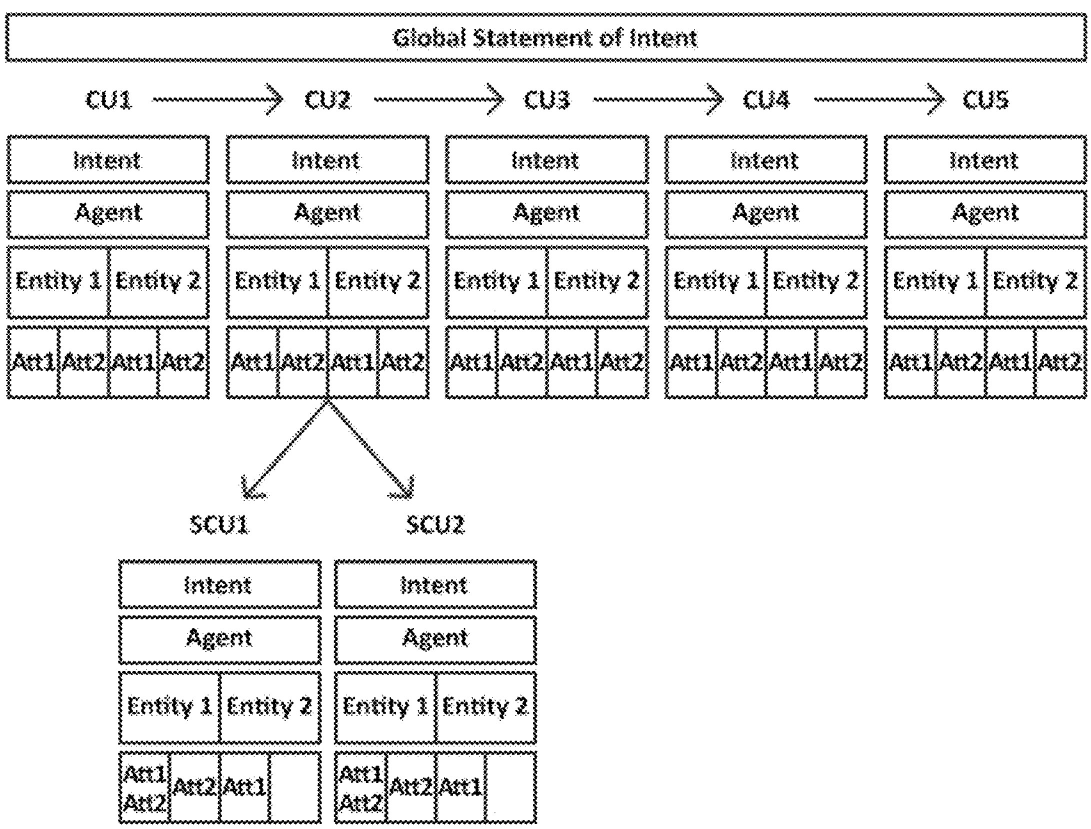

FIG. 123 is a diagram showing an example of embedded sub change units.

Figure 124:
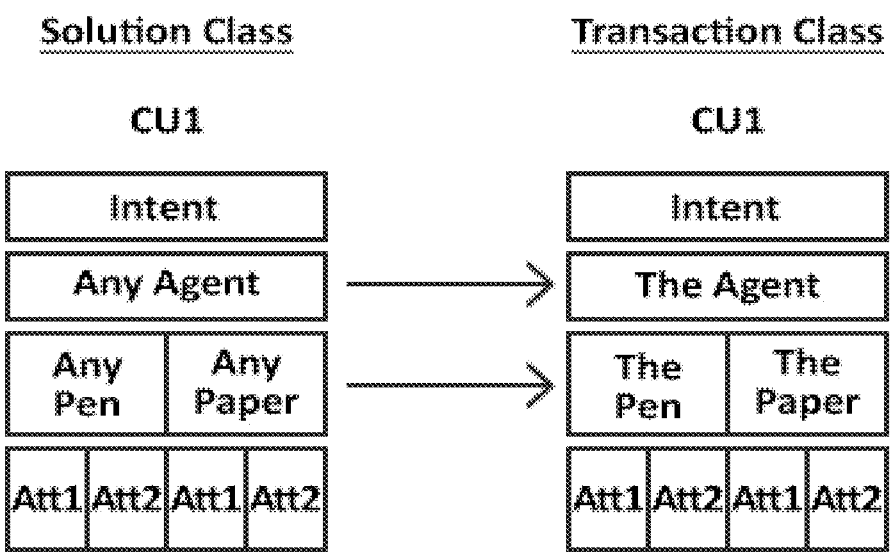

FIG. 124 is a diagram showing an example of solution class and transaction class.

Figure 125:
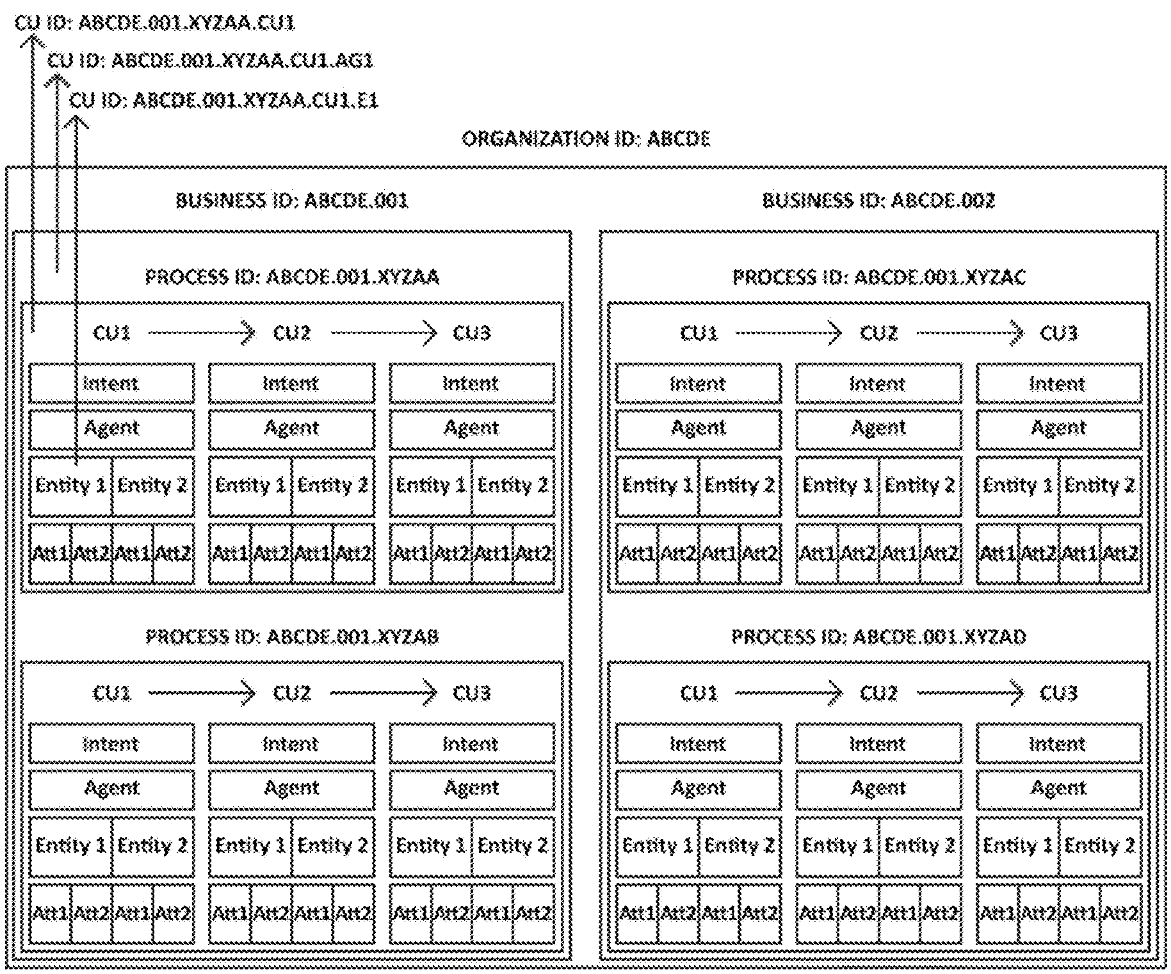

FIG. 125 is a diagram showing an example of contextual triple identities.

Figure 126:
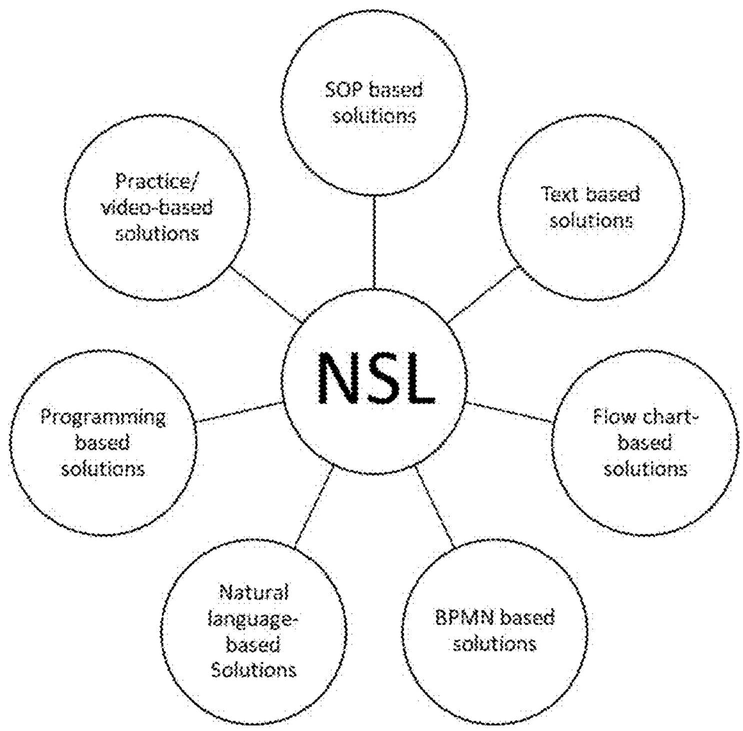

FIG. 126 is a diagram showing an example of NSL acting as a HUB.

Figure 127:
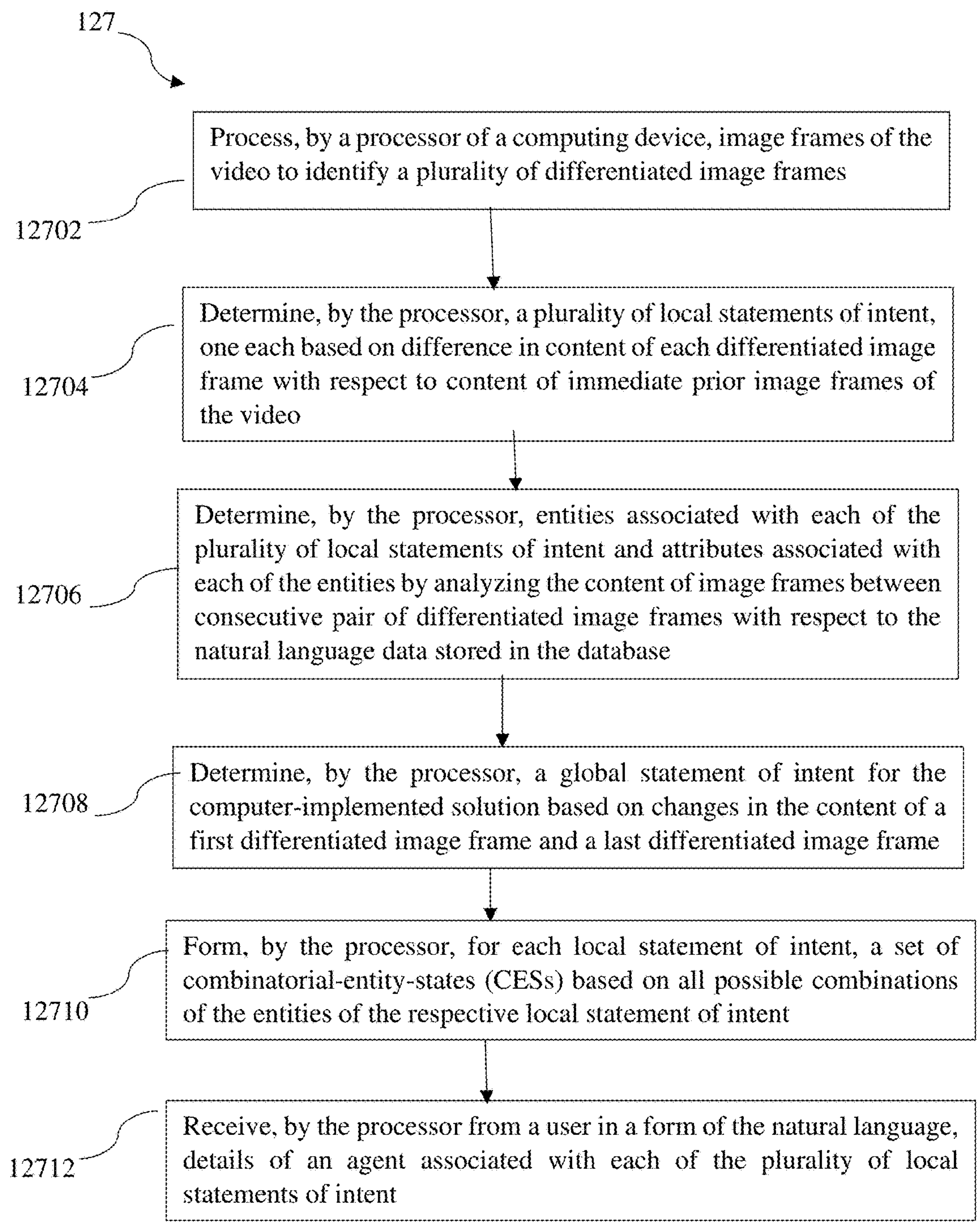

FIG. 127 represents a flowchart depicting a method for building a computer-implemented solution using a video and a natural language understood by users and without using programming codes.

Figure 128:
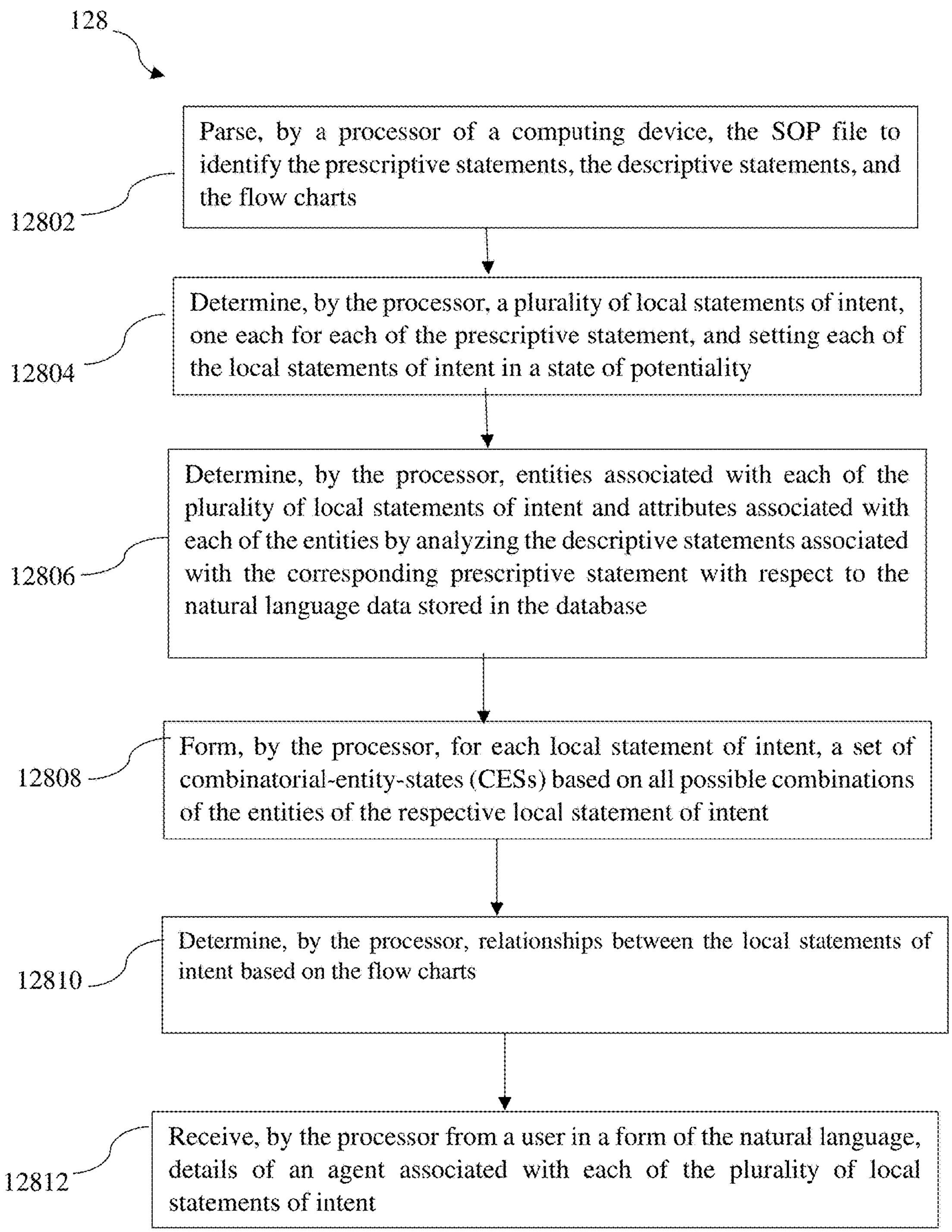

FIG. 128 represents a flowchart depicting a method for building a computer-implemented solution using a standard operating procedure (SOP) file and a natural language understood by users and without using programming codes.

DETAILED DESCRIPTION

While system, device or apparatus, and method are described herein by way of examples and embodiments, those skilled in the art recognize that system and method for providing solutions are not limited to the embodiments or figures described. It should be understood that the figures and description are not intended to be limiting to the particular form disclosed. Rather, the intention is to cover all modifications, equivalents, and alternatives falling within the spirit and scope of the appended claims. Any headings used herein are for organizational purposes only and are not meant to limit the scope of the description or the claims. As used herein, the word "may" is used in a permissive sense (e.g., meaning having the potential to) rather than the mandatory sense (e.g., meaning must). Similarly, the words "include", "including", and "includes" mean including, but not limited to.

The following description is a full and informative description of the best method and system, device, or apparatus presently contemplated for carrying out the present disclosure which is known to the inventor at the time of filing the patent application. Of course, many modifications and adaptations will be apparent to those skilled in the relevant arts in view of the following description, accompanying figures, and the appended claims. While the system, device or apparatus, and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique, and not in limitation thereof, since the present technique is defined solely by the claims.

As a preliminary matter, the definition of the term "or" for the purpose of the following discussion and the appended claims is intended to be an inclusive "or" That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself, and any combination thereof, such as "AB" and/or "BA." It is worth noting that the present discussion relates to exemplary embodiments, and the appended claims should not be limited to the embodiments discussed herein.

For the purpose of description herein, a processor may be implemented as microprocessors, microcomputers, microcontrollers, digital signal processors, central processing units, state machines, logic circuitries, and/or any devices that manipulate signals based on operational instructions. Among other capabilities, the processor may fetch and execute computer-readable instructions stored in a non-transitory computer-readable storage medium coupled to the processor. The non-transitory computer-readable storage medium may include, for example, volatile memory (e.g., RAM), and/or non-volatile memory (e.g., EPROM, flash memory, NVRAM, memristor, etc.).

For the purpose of description herein, a memory may be a memory of a computing device and may include any non-transitory computer-readable storage medium including, for example, volatile memory (e.g., RAM), and/or non-volatile memory (e.g., EPROM, flash memory, NVRAM, memristor, etc.).

For the purpose of description herein, a module, amongst other things, include routines, programs, objects, components, data structures, and the like, which perform particular tasks or implement particular data types. The module further include modules that supplement applications on a computing device, for example, modules of an operating system.

Terminologies Relating to Natural Solution Language (NSL)

Each of the terms listed below have specific roles and applications with respect to computer implemented NSL methodology. These individual technological and methodological elements have their roles explained with respect to the general new paradigm NSL creates.

It is claimed that Natural Solution Language (NSL) will effectively replace programming languages by communicating with the machine in a natural-language-like fashion. For Natural Solution Language (NSL) to cause a transformative technical effect, a computer-implemented method is required to be applied. This method requires a sensitive approach to entities and their relationships as the situations warrant. Entities and their relationships come in different variations and each one of those variations has to be properly defined and treated.

To explain the workings of NSL so that it is understood well, the following steps were taken: a) A list of all the relevant NSL terms has been provided. These are needed to be understood in the specific context of NSL for better appreciation of NSL; b) Each of the terms has been defined or explained as appropriate; c) The terms have been supported by figures as appropriate. Few integration level figures were provided for the individual figures to fit as appropriate; and d) The terms were supported by examples where necessary.

Solution Design: In the context of NSL, solution design is about setting up potentiality states of entities-individually and in the form of combinatorial-entity-states such that access to combinatorial-entity-solution-states happen through a cascade of controlled changes when operationalized.

Entities: Anything that is distinct is an entity. That is, anything that has a standing of its own and can be represented in terms of information is an entity. In language, entities are represented by words, symbols or numbers. Example: A sand grain also qualifies to be an entity, just as a car is qualified to be an entity.

Differentiated Entities: Anything that is distinct and at the same time different from other entities is a differentiated entity. That is, as compared to some other entity, it is different. In natural language, these are represented by words. Example: A 'pen' is different from a 'paper'.

Un-Differentiated Entities: Anything that is distinct and also same-as-some other entity or entities is considered un-differentiated from the other entity or entities. Such 'recurrences' happen in space and time. These recurrences fall in the domain of mathematics and are represented by numbers. From a solution design perspective, if one entity can be effectively replaced by some other entity without affecting the outcome, such entity is considered recurrent in either space or time. Example: If there is a pen and a paper on the table, we say, 'there is a pen and a paper' on the table. But, if there is one pen and 'another pen' on the table, we say, 'there are two pens on the table.'

Way World Works (WWW) Principles: Rather than just the traditional technology, NSL is a blend of understanding from science and technology creating a new paradigm in solution architecture. WWW are the principles that guide the way our universe or nature functions as understood and appreciated by current day science. NSL logic takes advantage of all the scientific insights with respect to the way the world works and brings to bear certain innovative methodologies with respect to solutions that human-agents-seeks through the use of computers. Example: That all things are made up of particles, that when particles combine, they give rise to emergent properties, that all things happen in space and time, that all events are driven by energy, so on and so forth are way-world-works principles. These in turn have a bearing on what agents do and how they cause movements from one desired state to another through directed changes.

Potential Entities Vs Non-Potential Entities: Solution design involves entities and their relationships. These entities are chosen from the real world in the context of solution design. Those that are chosen for the potential they hold with respect to the solution are declared as 'potential-entities.' Those that are not made part of the solution related 'potentiality set' are left out and would have no relevance from the perspective of the solution ecosystem.

Potential-Entity-States: Solution ecosystems consist of informational entities chosen from the 'real world' into the 'solution world' by the 'solution designers' called 'potential entities.' These are 'entities-that-matter' or 'qualified entities' or entities that have the 'potential to influence' the solution ecosystem. In other words, 'potential entities' could exist, or permitted in the solution ecosystem to exist, but don't exist in reality. Example: A person is admitted as a member of a club. There is a potential that the member could attend the club. Attendance of a member is possible only if one has a membership in the club. While so, the member may or may not be present in the club at a given point in time. When not present, the member is in a state of 'potentiality' and when present the member would be in a state of 'reality'.

Real-Entity-States: Reality state is a state in which an entity could-individually or in a combinatorial-form-exist and does exist. Example: A member of a club, who is entitled to attend the club, shows up.

Solution Ecosystem: The solution designers choose and use potential entities from the 'real world' to establish relationships between them. The relationships between potential entities are such that they combine and interact in ways that solutions could be had along the established pathways of change.

Totipotent Entities: These are the most generalized or 'un-differentiated' entities where only a 'freestanding-entities' status is granted. Example: A 'room' is an entity, and a 'key' is an entity. In their totipotent form, these count as two entities.

a. Entities get differentiated as combinations with more and more entities happen. Example: A person is at a generalized state and is one of the 7 billion people and others who have ever lived. As this entity-person is combined with attributes and other-entities, such as space, time, color, and race, a person becomes more and more differentiated.

b. In a solution ecosystem, when every entity is at a generalized totipotent level, all that one would have is a count of the total number of entities that have participated in the solution ecosystem. This is similar to the states of the cells before they become differentiated cells.

Independent Entities: These are entities at the level of which binary events happen—that is, switching between potentiality and reality happen resulting in changes in combinatorial-entity-states in which they participate. Example: A pen may move into existence or disappear from existence. As an independent entity event happens, it could change the state of the combinatorial ecosystem it is a part of. If it exists along with paper as a potential entity, together they can give rise to $2^2$, or 4, potential combinatorial states.

An independent entity, however, also drags its attributes (dependent entities) with it and can get further modified in many ways if events happen at the level of its attributes.

a. Implied Entities: Many times, entities connected to other entities are implied and ignored. Example: If a person enters a street, it is implied that he is there in association with the clothes he wears. Clothes are implied. Similarly, it is implied that there is air for the human agents to breathe. In case of room reservation, the presence of an 'agent' for inputting the information may be implied. The designer of the solution takes such implied entities as a given. Even attributes are implied most of the time. All change happens within the 'change units' (SIs). Change occurs only when physical interactions take place in space and time. If the space and time of one independent entity is known, the space and time attributes of other entity may be implied. It may even be the case that, for the solution designer, not specifying those attributes may not alter the essence of the design making the designer not specify the same.

b. Frozen Entities: The solution architecture/design is based on the principles of controlled differentiations. When a solution designer selects an entity as a potential entity to participate in the solution, the selected entity is already in a highly differentiated state. At the level of human agents, all independent entities are already at highly differentiated states as each one of them is composed of trillions upon trillions of particles (atoms or subatomic particles). They are regarded as frozen entities as the solution designers consider them to be only in a binary state of potentiality or reality.

c. Deletion of Entities: When an independent entity or a combinatorial entity switches from a 'reality state' to a 'potentiality state' it is considered deleted.

d. Creation of Entities: When an independent entity or a combinatorial entity switches from a 'potentiality state' to a 'reality state' it is considered to have been created.

e. Modification of Entities: When an independent entity has the values in its dependent entity change, the entity is considered to be in a modified state. It may be noted that any change in the frozen state significant enough to matter, will result in the entity being deleted and a new entity being created. Example: If a rod is bent so that it becomes a bracelet, 'the rod' should be considered deleted and 'the bracelet' should be considered as having been created.

Attributes: An attribute is also an entity but one that is dependent on some other entity for its existence. Such dependent entities are explicitly referred to as attributes. Dependence is defined as presence of one entity being owed to the presence of another independent entity. Example: A pen may exist in space and time. Here, space and time are considered attributes or dependent entities. Note that a 'spatial unit' or a 'temporal unit' qualify to be called entities in their own right. As they are dependent on the higher-level entity, we refer to them as attributes. When the pen is deleted, the attributes are automatically deleted.

Types of Attributes: There are three types of attributes: a) Essential Attributes: These are attributes that are always present with reference to entities. Example: space, time, identity, number, logic, user interface (UI) and the like; b) Standard Attributes: These are attributes that are standardized based on the nature of the solution environment; c) General Attributes: These are attributes that are selected for use by the solution designers based the circumstances in which an entity is placed within a solution environment.

Levels of Attributes: There is no limit to the number of levels at which attributes can exist. The first level is called the 'primary attribute,' the second level is called the 'secondary attribute,' the third level is called the 'tertiary attribute,' and so on. Example: If at the first level, space is defined as India, each state would exist at the secondary level, and each city at the tertiary level.

Real Entities: Entities that exist physically in nature (in reality), irrespective of agents and the artificial representational entities agents create for the purpose of representing that reality.

Representational Entities: Representational entities are created by agents such that they can effectively represent other real entities or other representational entities. Representational entities derive value from the real or other representational entities that they represent. Representational entities are also physical just as real entities—that is, they also exist in space and time. Generally speaking, there is much lower level of differentiation connected with them as compared to the entities they represent. Example: A pen may consist of $10^{24}$ atoms while the atoms that make up the 'word pen' may possess a million times fewer atoms. There are two types of representational entities: perpetual and informational.

Perceptual Entities: Perceptual entities are created by human agents naturally in their own brains in the form of given neuronal states. Nature has designed the brains through a process of evolution for them to represent entities in the real world-Real Entities or Informational Entities they have created for the purpose of communication with other agents. Brains have the ability to store, process, and retrieve these representational entities-senses help in inputting these representational entities and the body has the ability to propagate these to other agents through communication.

Informational Entities: Informational entities are entities artificially created by human agents for the purpose of communicating the representational entities in their possession to other agents in the ecosystem.

Truth Values: Though the representational entities purportedly represent 'real entities' or 'other representational entities', the truth values may vary due to many factors including the uncertainty inherent in nature or the understanding, motivation, or intentions of human agents. Example: It may be represented that 'X' is at place 'Y' but that may or may not be a correct statement. If it is correct, the statement is considered to be 'true,' and if it is incorrect, the statement is considered to be 'false'.

Info Content—Real Entities vs Representational Entities: We can go by a simple principle that, in theory, all entities in the real world could be represented by informational entities without exception. This presupposes enough knowledge about the 'real entity' to be represented in terms of information. Given that knowledge, theoretically, all entities can not only be represented by informational entities, but their information content can also be measured in terms of bits of information. The question arises as to what the information content is with respect to the 'representational entities' that represent that 'real entity'. Generally speaking, the information content of the representational entity would be quite low. The information content of a 'real agent' could run into upwards of $2^{70}$ bits of information; however, that agent's name will need no more than few bits of information to effectively represent the 'real agent'. Though not all information inherent in the 'real entity' is expressed by the 'representational entity', just enough information is used to effectively represent the real entity for the purposes at hand. Based on optimization principles, there is tremendous economy in the use of information by the agents that balance between differentiation and integration.

Physical Reality: All entities—real, perceptual, and informational entities—exist 'physically' in the physical world. While it is intuitive to come to that conclusion with respect to real entities, it should be explicitly noted that even perceptual and informational entities exist in physical reality-space and time. The fact that they derive their value from being representational entities does not change the character of those also being physical.

Change Drivers: The entities along with its attributes which bring about the change in the change unit are known as change drivers. Attributes are also entities, but they are dependent on independent entities. There can be any number of levels of attributes, as explained above, that differentiate independent entities even further. Each driver has their own unique and distinct identity and intrinsic information.

Change Units (CUs): A change unit is one that is described by a statement-of-intent from the natural language point of view. Value of any kind happens only through controlled changes and that happens only inside the change units. It is by knitting together the local change units (making paragraphs by combining sentences) that we get to the global change units that human agents desire or intend. In the interest of simplicity, NSL treats these change units as synonymous with statements-of-intent (SIs). Therefore, CUs and SIs are used interchangeably in this document. Local Statements of Intent are local 'change units' expressed as statements of intent (sentences) in terms of natural language. Global Statement of Intent are 'global change units' expressed as global statements of intent (paragraphs) in terms of natural language.

It may be noted that 'information technology' has the ability to represent all entities in the world in information terms. This is how what happens in the change units is captured fully in the statements-of-intent.

Size of Change Units (CUs): The sizes of the CUs are optimized by bringing proper balance between 'increase in the number of CUs' or 'increase in the number of independent entities (variables) within the CUs' for the purpose of getting to the intended CUs. Example: In theory, the number of CUs can be made to increase to infinity. One's travel from home to airport could be a CU. Each travel from one cross road to another till one gets to the airport can be a CU. Each turn of the wheel of the car can be a CU, and so on. But that would add to the complexity and our ability to handle the same. On the contrary, if the size of CU is increased, it would lead to an increase in the variables within a CU dramatically increasing the variable states within a CU leading to great complexity again. Going from one's house in India to a particular remote place in the United States could be a change unit. But that change would consume so many entities (variables) making it unwieldy. The number of entities involved in this CU would be so high that their combinations will make the system highly complex (There will be far too many cars, aircrafts, hotels, entities such as passports, visas, and all their attributes.) In consideration of the complexity in either case, designers apply optimization principles to bring a balance between the two extremes. CUs are represented by 'statements of intent' and are considered to be synonymous with them for the purpose of solution design.

Events: All events arrive into one local-statement-of-intent or the other, and all events are about an individual entity being turned from one state to another—a state of potentiality to reality or vice versa. The occurrence of an event by way of arrival or departure of an individual entity into or from an LSI results in the state of the combinatorial set as a whole changing. If there are 6 variable entities in the LSI, there could be 64 different states in which the combinatorial entities could exist. A binary state change at the individual entity level can lead to any one of the 64 different states in LSI. While 63 other states may be in non-trigger combinatorial-entity-states, the 64th one would be in a trigger state influencing other LSI states or itself.

Binary States: In NSL solution design, all entity states are expressed as existing only in binary states. That is, they either exist in potentiality or reality states. Every state is discrete and there is no intermediary state. In this view of things, each word operates in a binary state, and even sentences and paragraphs exist in binary states. Agents only keep changing the vantage points from which they view the entities. As one zooms in or zooms out, the vantage points change, but each vantage point is in a binary state. The choice of binary states in NSL solution design is a choice for discrete states versus continuous-akin to a choice of the digital versus analog. When events happen, there are state transitions with the excluded middle. In theory, these binary states can also be represented by assigning values of being 'true or false'.

Variability: It is generally preferred that most of the entities exist in binary states, and the variability is only between those states. The variability could be higher for two reasons: First, at higher vantage points, all the subset entity values together can increase the number of combinatorial-entity-states and therefore the variability. Example: If there are 10 subset entities, they give rise to a variability of $2^{10}$, or 1024. Second, though any number of states could be expressed through a combination of many binary states, in the interest of simplicity, the system provides for a large number of states being together stated at the last rung of the differentiation ladder as information where necessary. Example: While the person is in a particular city, such person could be at any one of a million spatial coordinate points.

Constants: Entities whose states will always remain the same are considered to be constant. Example: If the existence of a build is taken as a given during the period of relevance, it would be considered as a given.

Inputs: These are essentially events with respect to LSI. These are events fed into the system by either human agents, or as facilitated by machine agents. Example: A human agent keying in the time of the day or as captured directly by the system based on a machine agent feed. The input can be in the form of switching an existing entity into a potentiality or reality state, or alternatively, introducing a new entity into the ecosystem or deleting an existing entity from the ecosystem through entity qualification process. Input introduction is done by agents in general based on the 'decision rights' that they possess.

Outputs: These are essentially events caused by LSI in one or more other LSIs or in itself.

Lapse Times: As explained, when a trigger state is attained in a statement of intent, it precipitates one or more changes in one or more statements of intent including its own statement of intent. All changes take time, called 'lapse time'. Whether the change is driven by human agents or machine agents, the lapse time is always involved. In some instances, such changes can happen in fractions of seconds, and, in other instances, the length of time can be as high as hours or even days. All the entities involved in interactions producing the required change would be occupied during the lapse time and will become available for involvement in any other trigger only after the completion of the previous action.

Full Life Cycle of a Solution: There is a fractal-like self-similarity with respect to every local and global-statement-of-intent. This symmetry and recurrence of pattern appears with respect any value creating activity and directed change. The systems are meant to provide for an ability to 'sense' the environment, 'select' from the same, and 'act' on it-what may be called an 'SSA' cycle. NSL appreciates the presence of this full life cycle behind every solution and effectively deals with it. The system provides for all possibilities with respect to any change being first 'sensed' (same as what human senses do), 'select' one or more entities from the possibilities (same as human minds do), and 'act' on the one or more selected entities (same as what human bodies do). The essence of this full life cycle of a solution requirement gives rise to the existence of the 'agent functions' described subsequently.

Natural Language: The way natural language works is that each word is like a code only people speaking the same language are aware of. Sentences are constructed by combining words within the bounds of grammar to deal with a unit of change. By further sequencing sentences, natural languages generate the capacity to convey complex reality. Notice that natural language is a form of code that is connected with reality. The code works by combining words and sentences in particular ways. Each time one code-entity is combined with another code-entity, it results in a differentiated combined-code-entity. Each combination is an outcome of selection from a spectrum of possibilities. Cascades of such combinations result in unique combinations driven by differentiation principles. Natural language, just as programming languages, relies on the principles of differentiation to achieve its objectives. Substituting the programming code with natural language is the paradigm shift NSL brings about through use of well tested fundamental principles behind 'natural language structures.'

Code vs Natural Language: Code is a representational entity that is understood only by agents who have the ability to decipher the same and make sense of it. Programming code is one that could convey functionality to a computer. The meaning of code and its application is within the domain of programmers. They use this code to convey application logic to the computer. Natural language is also a form of code. That is the reason why English-speaking people will not understand Russian speaking people and vice versa. What NSL does is to bring the ability to convey application logic to the computer so close to the natural language, it is no longer necessary to have separate code writers. The users can deal with the same directly at the user interface levels through the use of NSL.

Natural Solution Language (NSL): This is a slightly modified version of natural language, a computer-implemented method, where things are recast in the form of capturing only statements of intent and making all descriptive statements subservient to the statements of intent. These statements of intent exist in two states:

Static Statements of Intent: These only express the intent but lack the ability to transform them into reality. Static entity states are those entity states that have no properties of being able to trigger changes in other states. If there are 6 variables in a system (independent entities and their attributes), they could potentially exist in 64 different states. But only the 64th state is capable of triggering change when all the variables are present in the 'reality' state. All the other entity states are called 'static entity' states. A point to be noted in this respect is that a statement of intent (SI) is just another independent entity that describes the nature of desired change, participating in the 'change unit'. The existence of an SI is based on the fact that, for any action to follow, it has to be backed up by an agent's intention.

Dynamic Statements of Intent: These are the underlying, transformation causing entities behind the statements of intent that collectively trigger on attaining a certain desired state, called Trigger Combinatorial-Entity-States, as influenced by events at the independent entity level. Dynamic entities states are those entity states that have the ability to cause further changes in one or more entity states, including themselves. In the previous example, the 64th state is the 'dynamic entity' state. In other words, for a static statement of intent to become dynamic and fulfill a statement of intent, it needs to be powered by a trigger CES.

Natural Language vs NSL: In natural language, events happen letter-by-letter and word-by-word sequentially. However, in NSL, potential entities are built by designers up to the paragraph level word-by-word and sentence-by-sentence first. Events happen at the word level or at the phrase level across the paragraph—but not necessarily sequentially. However, events happen within the bounds of NSL logic or grammar or prescribed method as implemented by the computer. Natural language codifies the application logic for the computer using natural language instead of technical programming language. Users can now build or use application logic without reliance on any technical skill with greater ease and effectiveness. In the process, a layer of abstraction in the form of complex programming code is eliminated.

Meaning vs Value: In natural language, informational differentiations result in conveying meaning. One sequence of words will convey one meaning as compared to another sequence of words. Value in NSL context is used synonymously with 'solution' or 'fulfillment of intent state' (global statement of intent). Just as a series of differentiating words convey meaning in natural language, a series of differentiating entities lead to value or 'fulfillment of statements of intent'.

Quantification of Value: All change happens at the independent entities level, resulting in the combinatorial-entity-states. These changes happen by way of events. An event is a switch between potentiality state to reality state, and vice versa. Every statement of intent requires all its independent entities to attain reality states for the change trigger to happen. This clearly establishes the count of independent and associated attributes to turn to reality states for the local statement of intent to be fulfilled. By extension, it also proves that each global statement of intent requires a given number of quantifiable cumulative entity reality states. Just as information can be quantified by a count of 'bits', value can also be quantified through count of binary entity states.

Relativity of Value: What is of value to one agent may not be so for another. What is of value is relative to the agent or agents seeking that value. In NSL, each paragraph represents a global unit of value with respect to the agent carrying the global statement of intent. We have called this the value consumption. From the perspective of consumer of value, the local statements of intent could have different agents playing the role of value creators, and those change units are enablers of value. Now, if we were to switch the perspective to the agent involved in the local statement of intent, that local statement of intent gets converted into a global statement of intent. The local statement of intent becomes the last fulfillment of intent statement in the paragraph that services the consumption need of the agent involved. The considerations of relative-value lead us to networked structures where differentiation pathways would be crisscrossing each other servicing different agents.

Commonality Between Natural Language and NSL: Both are driven by differentiation principles and have synonymous entities: a) Nouns: These are similar to independent entities in NSL. b) Adjectives: These are similar to attributes that qualify independent entities in NSL. c) Verbs: These are descriptors of change as reflected in statements of intent in NSL. d) Adverbs: These are attributes that qualify the verbs contained in statements of intent in NSL. e) Sentences: These are similar to statements-of-intent composed of all the potentiality entities that could trigger requisite directed changes in NSL. and f) Paragraphs: From the NSL solution design perspective, a paragraph is one that consists of many statements of intent that could lead to the fulfillment statement of intent through a series of controlled changes. The paragraph as a whole is seen as a global statement of intent.

Paragraphs of Logic: NSL relies on some 'essential attributes' for all entities. Just as space and time, one of the essential attributes of NSL entities is specification of 'logic' that defines entity interactions. Each entity should specify its 'logic counterpart'. This logic counterpart is a participant in the logic defining paragraph vis-à-vis each global statement of intent. As per this, each time a global statement of intent is born with respect to an agent, it seeks out the paragraph of logic with respect to that intent. It then creates a customized potentiality paragraph of its own through the use of 'paragraph of logic'. Likewise, each participating entity in this new paragraph plays the role of its counterpart in the paragraph of logic.

NSL Libraries: NSL reduces all solutions to capturing all potentiality entities and their relationships. It creates a library of potentiality entities at the most simple to most complex and differentiated levels. These libraries have the potential to cover a range of solution environments. Thereafter, through use of search and drag and drop techniques entities of potentiality can be reused with minimal additional effort.

Reusable Components: The ability to minimize the redundancy in building solution logic by using existing entities at various vantage points is what reuse of components is about. These are the reusable entity components that are made available in the libraries that NSL builds.

The Differentiation Principles: At the level of human existence, all entities exist only in combinatorial states and are highly differentiated. Even a speck of dust carries trillions of atoms and has a structure of its own. Other things remaining the same, each time an independent entity, chosen from an array of possibilities, combines with an existing combinatorial-entity-state, the resulting combinatorial-entity-state is more differentiated. This is the principle of differentiation. The opposite of this happens when independent entity values are ignored resulting in un-differentiation or generalization or integration. Addition of entities results in differentiation and subtraction of entity values results in integration. The principles are somewhat similar to differentiation and integration in 'calculus'. Example: If there is a combinatorial-entity-state 'A-B-C', and one adds an independent entity 'D' to it, the resultant combinatorial-entity-state is 'A-B-C-D' which is a differentiated form of A-B-C arising out of the addition of entity 'D'. If the value of 'D' is ignored, while the combinatorial-entity-state still remains, un-differentiation has occurred and 'A-B-C' and 'A-B-C-D' now have the same values and are counted as 'two A-B-Cs'.

There could be differentiations or integrations (generalizations) that are conducive to human agents, or detrimental to them, or ones agents are agnostic to. For the purpose of solution architecture, information entities represent real entities or other information entities. All entities in solution design, whether independent or combinatorial, are treated as though they exist in discrete (frozen) binary states of potentiality or reality. These binary entities in turn combine with other binary entities each time creating new combined entity states. The design treats each of these new combined states also as existing in binary states. All combinatorial-entity-states exist within the ecosystem of one change unit or the other-equated with local-statements-of-intent in NSL.

Agents are good at both 'differentiation' and 'integration' (generalization). As one differentiates, other things remaining the same, one is consuming more bits of information. When one is generalizing, one consumes fewer bits of information. A fine balance between the two is important for survival. The brain has only a limited capacity.

By ignoring values, one has the ability to move towards generalization or integration. When all entities are recognized for their existence, but all values are ignored, we have the most integrated situation of there being only the entity count at one end. But on the other hand, by differentiating all entities, one moves to the other end of the differentiation tree where all entities are at their most differentiated states.

Interestingly, when a combinatorial-entity-state in one 'change unit' causes a change in other 'change units' by changing combinatorial-entity-states in those 'change units', the new states are combined with the old combinatorial states creating a cascade of changes. From the natural language perspective, these are same as sentences being strung together to form paragraphs. From NSL perspective, each change unit is the same as a local-statement-of-intent combining to form a global-statement-of-intent.

Vantage Points: Each basic entity exists in a binary state at an individual level. Entities also combine to form combinatorial entities. Vantage points refer to the relative positions from which we may view entities. If we were to view an entity holistically from a higher vantage point—a higher rung of the differentiating ladder that consists of all its sub-sets—the connected entity count would be quite high. On the contrary, if we were to view an entity that is at a lower vantage point—a lower rung of the differentiating ladder—the connected entity count would be much lower. Example: Let us imagine a higher vantage point 'A' from which we view in the direction of differentiation. 'A' could have a differentiated subset 'A-B'. If that combines with 'C', we have a second level more differentiated subset 'A-B-C'. 'A-B' encompasses only subset 'A-B-C'. 'A-B' has fewer connected entities in the direction of differentiation as compared to 'A'. Another way of putting it is that higher vantage point entities carry more information with them as compared to lower vantage point entities.

Directionality: This is about moving up or down the differentiation tree based either on addition of entity values or on deletion of entity values. As we add new entity values, one would be moving in the positive direction of differentiation. By deleting values, one would be moving in the negative direction of differentiation—that is, in the direction of 'un-differentiation' or 'generalization' or 'integration'.

Combinatorial-Entity-States (CES): When independent entities (dragging with them their attributes) combine with other independent entities, those give rise to combinatorial states that are differentiated and have emergent properties of their own. CES are housed in local statements of intent (LSI) each representing a unit of change-which is equivalent of a sentence. A collection of such LSI leading to a bigger desired change are referred to as Global Statements of Intent (GSI)—which is equivalent of a paragraph. The size of CES in an LSI is proportionate to the number of independent entities participating. Each LSI will entertain $2^n$ states, where 'n' is the number of independent entities, as each independent entity could exist either in a state of 'potentiality' or 'reality'. Fundamentally there are two kinds of Combinatorial-Entity-States in each Local statements of intent:

Non-Trigger CES: These are entity combinations that do not cause alteration in the combinatorial-entity-states in other local-statements-of-intent or within the same LSI to which they belong. Example: If there are four independent entities, as binary variables, they give rise to $2^4$ entity states—that is, 16 CES. Of these states, 15 states are non-trigger CES as they do not trigger any change.

Trigger CES: These combinatorial-entity-states trigger changes in one or more other LSI or within the same LSI. Trigger CES are those where all the independent entities and their attributes are in a state of reality. When a CES in one LSI influences CES in other LSIs, those sentences get connected. LSIs are grouped together based on their involvement in the realization of GSI, making a paragraph. Example: Going by the previous example, the 16th state is the trigger state as all four independent entities are present in a state of reality in that state.

It was already stated that independent entities being connected together give rise to combinatorial-entity-states that are differentiated. When local-statements-of-intent are also connected together, the combinatorial entity states gets further extended to application of differentiation principles even at the level of paragraphs. Theoretically, paragraphs can be combined into chapters or even higher levels of abstraction.

APIs vs Programs: Application Programming Interfaces help access other programming solutions using methods that are similar to programming code in the first place. NSL has the ability to communicate the API logic to the computer in the same way that it does in programming languages and can effectively perform the same functions.

Shared Entities: A shared entity is one that is common across many local or global statements of intent. There are many independent entities that are part of a trigger state for a given statement of intent. When a statement of intent is in a trigger state, during the lapse time associated with the trigger, that entity would not be available for participation with respect to any other statement of intent. But once the triggered change is completed, the participating entity becomes available again as a shared entity across all the related statements of intent.

Pathways of Change: Pathways of Change are created by cascades of changes that trigger-combinatorial-entity-states within local-statements-of-intent, leading to the fulfillment of global-statements-of-intent. NSL logic lays down these pathways of change. In programming logic, such transitions from one state to another are achieved by applying principles that go by different names under different circumstances. Here are few such examples: a) Constraints: These are restrictions placed on choices being made between many possibilities. In NSL logic, differentiation principles are applied to achieve the same outcome. These are nothing but 'reduction in the sets of possibilities' at the cusp of any change as choices are made. b) Rules: These are most often a series of constraints placed on the system that are sensitive to circumstances. c) Algorithms: These are the same as 'rules' but are often used in the context of 'information systems.'

Converting a Process into Information: One of the most dramatic things that NSL does is that it also converts a process into information. NSL strictly relies on differentiation principles and converts processes and functions into information by stringing together related changes as combinatorial-entity-states. When one CES influences another CES through a causative trigger, both CES get unified, which are called the 'extended CES'. It is these extended CES that bring all processes and application logic into the domain of information. Once the conversion to information happens, those entities are subject to search principles similar to any other information. Just as information is quantifiable, solutions also become quantifiable.

Levels of Abstraction in IT: Information technology is driven by multiple levels of abstraction. At the bottom end of this abstraction ladder are electromagnetic states that signify binary states of 0s and 1s. At the other end are application logic and solutions as experienced by users. NSL replaces the programming code level effectively with natural language like features.

Agents: Agents are also entities. Agents are both creators of solutions and consumers of solutions. Agents are differentiated from 'nature' as they are driven by purpose. In other words, they seek favorable changes and avoid unfavorable ones. As every solution deals with controlled change, it is presupposed that all change units are influenced by agents-whether human agents or machine agents. As all change requires energy, agents use the energy inherent in them, or borrow it from one or more combinatorial entities, and provide directionality to change by following predetermined pathways or through application of free will.

- a. Human Agents: Also referred to as 'stakeholders', human agents play multiple roles depending on the requirements the solution environment imposes on them. Some change units are driven by human agents of necessity. Example: A physical delivery of some 'hard asset' will require human agents to be involved.
  - i. Value Creators: Every statement-of-intent (change unit) is driven by one agent or the other. Those statements-of-intent or 'those agents connected with the statements-of-intent' are considered value creators if the same relate to the 'local-statements-of-intent', but not the 'global-statements of intent'. If all the local-statements-of-intents and the global-statement-statement-of-intent have the same agent driving them, both the 'creator' and 'consumer' functions have the same agent involved.
  - ii. Value Consumers: Agents connected with the global-statements-of-intent (those statements that fulfill the statements of intent) are considered value consumers. These GSIs sit at the statements-of-intent at the end of the paragraphs.
  - iii. Teams: Where the changes in LSI are driven by human agents collectively, there is the presence of more than one human agent. In such a team effort, responsibility for directionality is taken either by a leader or as per the decision rights specified among the team members.
  - iv. Ownership: Ownership of any entity is based on the ability of an agent to directly or indirectly physically-influence the entity as it participates in controlled change. Physical influence also involves representational entities as they are equally physical in nature. Ability to influence also depends on the decision rights assigned to the agents—that is, they should also have the entitlement to influence. Information rights, per se, entitle agents to be in possession of information, even if they cannot have the right to influence.
  - v. Agent Functions: The agent functions that take place within statements-of-intent can be divided into three layers of statements of intent. (a) First Layer-Physical Functions: Physical functions relate to participation of independent entities resulting in combinatorial-entity-states (CES) that form the backbone of statements-of-intent. Physical functions serve the principal function of facilitating solutions, while the other two categories either directly or indirectly support physical functions. (b) Second Layer—Information Functions: Information functions relate to entities that are connected to combinatorial-entity-states and serve only the function of providing information but are not involved in the physical function. By extension, these information functions are connected to statements-of-intent and the agents who drive them. Information functions keep the agents well informed and play a role in dynamic solution re-design and other value adding functions like analytics, machine learning, and artificial intelligence. (c) Third Layer—Mind Functions: Mind functions, from the computer-implemented-NSL perspective, emulate the functions of the human mind in the real world. These functions 'anticipate' entity states and guide the physical functions in the process of bringing about desired transformations. Anticipation generally applies to 'temporal aspects' that concern the future. But anticipation can apply to all situations where there is uncertainty. In theory, uncertainty can pertain to things in the past or present also. Example: One may not fully know about, but could attempt to anticipate, what happened yesterday or what is happening in the other room at the present. A revision in 'estimates' or 'anticipation' could happen at the instance of every event. If such an anticipation has a bearing on the physical function at the present, those are feedback into physical function as entities that influence. Apart from playing a similar role such as information function, mind function also helps in advance planning and optimization matters.
  - vi. Information Rights: These are the rights of the human agents for information with respect to specific independent or combinatorial entities and statements-of-intent connected thereto.
  - vii. Decision Rights: These are the rights of the human agents to change the potentiality or reality states of individual or combinatorial entities and statements of intent connected thereto.
- b. Machine Agents: These are synonymous with 'computers' where the units of change are driven by the machine agents—as designed by human agents or other machine agents-so that proper outputs are generated in response to inputs. Machine agents essentially emulate human agents in their ability to consume inputs, bring about a controlled change among them (process those inputs), and generate outputs. In one sense, human agents impart qualities of being purpose driven into machine agents.
- c. Mother Nature: Mother Nature is the third kind of agent that is capable of influencing transformations. However, since Mother Nature does not possess a purpose, such transformational outcomes produced by Mother Nature are taken as implied entities in designing of solutions by the human agents.

Agents Act as per Dictates of Solution Designer: Solution designer is an architect of solutions. Solutions are made up of one or more than one change unit. Each change unit is controlled by an Agent. This solution is laid out as a potentiality. For example, a director narrates the script and makes sure the actors are adhering to the script as desired by the director. Director in this case is the solution designer and actors are the agents, who can be individuals or teams.

Team to be Treated as an "Agent": Agents can be individuals or a team comprising of multiple members. Team is the combination of agents having an identity of its own. NSL allows teams to be treated as an agent based on the choice of the solution designer. Example: In a solution that involves approval by the "Board of Directors", the Board is treated as an agent though it is a team.

Collaborative Agents and Adversarial Agents: NSL allows for agents to be classified as collaborative and adversarial, wherein agents working together towards achieving a common goal/wish are called Collaborative agents; whereas agents trying to compete with each other (similar to in a "Gaming environment") are called Adversarial agents.

Adjudication System: As a general rule one 'paragraph' accommodates only one global-statement-of-intent (GSI). If there are more GSIs, there need to be more paragraphs. There could be related paragraphs arising out of the fact that they have shared local-statements-of-intent. This is similar to 'scenarios' in the general process-oriented approach. There could be instances where the same global-statement-of-intent could service different paragraphs with variations in the local-statements-of-intent contained in them. This is similar to the same outcome being achieved through different sub-processes. NSL uses differentiation principles to address this issue. It injects additional differentiation 'entities into the system' (similar to constraints) to fine tune the possibilities to only one paragraph remaining to service the global-statement-of-intent. In case of there being no paragraphs remaining to service global-statement-of-intent, the system could explore the possibility of eliminating some entities—thereby creating un-differentiations—potentially resulting in at least one paragraph that makes the global-statement-of-intent to come into existence. This is the same as eliminating some constraints.

Entity Triumvirate: Agents, change units and general entities (either independent or dependent entities) co-exist and bring about the intended change. There cannot be one without the other. There are trillions of entities in the universe but entities that matter come together contextually. Change cannot happen without an agent. Change is always driven by Agents and Agents have intent and are driven by purpose. For any change to happen interactions between entities must happen and it should happen physically. Example: In order to write a letter, the following entities need to come together: (a) Agent (Person writing the letter) (b) General entities (Pen, Paper & Table) (c) Intent (To Write a letter) The Triumvirate fulfils the intent/wish by making directed changes through interactions.

Nearest Neighbor: In order to get to a desired state, there is a need to transition through many local Combinatorial Entity States. All these transformational states are attained through directed change. All these states operate by the nearest neighbor principle and the nearest neighbor applies to the entity triumvirate e.g., agents, change units and general entities equally. For a wish to be fulfilled, connected Change Units are order sensitive. This is for the simple reason that connections between Change Units is established through interactions, or cause and effect principles, where the order becomes an important ingredient. When the cause and effects happen, the change happens in a sequence and therefore, cause will always be in t1 and the effect in t2. Example: A letter cannot be posted unless its written. The next change unit becomes the nearest neighbor of any change unit selected and so on. This applies similarly to agents and general entities.

Stakeholder Engagement Center (SEC): This is synonymous with user interfaces. SEC has the ability to recognize all entities that hold potentiality with respect to any agent and present the same at the user interface levels in a structured fashion. The system recognizes relevant entities based on the fact that all change-units are driven by one agent or the other—clearly establishing ownership. The additional fact that all entities have the decision and information rights over them clearly specified, makes entity distribution across agents and navigation easy.

Measurement Framework: Measures are objective statements of reality. Something needs to be presented at the optimal level of clarity for the same to happen. Usually it means that there needs to be a sufficient level of granularity in the information provided or sufficient differentiation. Example: It is one thing to say that 'something was delivered' and it is another thing to say that 'something was delivered in less than 30 minutes'. If one is looking for that level of detail, then the second statement becomes a measure. Another aspect of measures in the measurement framework is determining if the additional differentiation is good or bad. These value judgments are introduced through what are referred to as 'norms.' So, if 'delivering something in less than 30 minutes' is considered good, that becomes the norm. Generally, a green color may be assigned to things that are considered good, and a red color to those that are considered bad.

Distributed Mission Control Center (MCC): An MCC pulls together those entities that are of importance in the regular course of human agents performing their responsibilities or fulfilling their needs. These entities of importance are pulled together from among the entities that pertain to agents—that is where they have either information rights or decision rights. Distributed MCC is about the ability of the system to first automatically recognize the entities that pertain to specific agent or agents; then pick up entities of importance for the agent(s)' functions.

Dynamic Mission Control Center: Dynamic MCC is different from the Distributed MCC only to the extent that the entities of importance are presented to the concerned agents customized to the specific 'times', 'events', and the 'agent(s)' queries'. Since differentiations/events happen at each entity level, just as we enter each letter to conduct an information search, agents are empowered to enter words/numbers (entities) to have any other queries answered.

User Interfaces (UI): Entities can exist at different levels of abstraction either in the databases or at the user interface levels. It is at the level of user interfaces that the human agents exercise their 'information rights' or 'decision rights'. UI plays quite a prominent role in NSL as the 'users' are in charge of creation or use of solutions-so all things happen over the hood rather than under the hood. NSL drives the behavior of entities at the UI level by making UI an 'essential attribute'. These attributes specify how an entity should appear at the UI level, its address (which screen and place on the screen), and whether it is sensitized for navigation or inputting of information, and the like.

Text Based User Interface (TBUI): In an NSL paradigm all entities are dealt at a more intuitive natural language representation layer, and hence NSL uses Text Based User Interface. Natural languages have existed for thousands of years and are highly intuitive. Natural languages capture differentiations through their differentiation constructs which flow from general to specific, making it appear highly structured and naturally progressive. TBUI is based on the principles of natural language (text) design and hence is more structured than a conventional Graphical User Interface (GUI). The TBUI synthesizes the classic principles of book design with the innovation of technology and science akin to electronic books and has an additional capability to add images and videos to the textual representation. The TBUI makes the navigational experience of the user better and provides the user with a holistic view at each vantage point. In contrast, most of the Graphical User Interfaces (GUI) present information with parts distributed generally and randomly and do not offer a holistic integrated view.

NSL Technology Framework: An innovative technical effect that NSL brings about is due to a combination of a unique method and a technology framework. NSL rides over a standardized technology framework that caters to a wide range of application requirements where the 'users' are the primary drivers of solutions. The Technology framework, encapsulating all the innovative methods described in this document, sits on top of the operating systems to cater to any kind of application logic to be conveyed to the computers. Effectively, the user remains agnostic to this underlying technology framework, and is empowered to use NSL in a natural language like fashion. In summary, NSL technology framework is a thin additional layer on top of existing operating systems which gives life to principles and methods behind NSL based on differentiation principles. In addition, it also helps automate most of the otherwise human agent functions. But for enhancements from time to time, the NSL technology framework will remain a constant. Just like an operating system, it conveys NSL logic to the computer without use of any code and through natural-language-constructs.

Reengineering: NSL conveys application logic to the computer in a natural language like fashion. In doing so, it eliminates the need for writing programming code which is an under the hood operation. The user is unaware of the nature of the solution configuration or its action in case of programming code. NSL, being user-friendly, brings the solution creation and use of application to the level of UI. It has many features that would reduce redundancies, increases the reuse of solution components, and, most importantly, optimizes the differentiation or solution pathways.

Matrix-Based/Tile-Based Approach: The world of Information Technology is built around Machine Agents. Each programming language has its own set of keywords, operators, symbols, and functions. Since the instruction to the Machine Agent should be definitive, each keyword, operator, symbol, and function have a definitive meaning. These functions either carry the same meaning in each programming language or may be represented differently. In the tile-based approach, each tile has been equated to a particular function under each of the programming languages and NSL. These equated functions in each tile express the same solution logic to the machine agents/system. Technically, NSL+Technology Framework is equal to a Programming Language.

Technology Translation Framework (TTF): One of the most significant attributes of NSL is the ability to convert any programming code into natural language like NSL format based on the same principles that deal with controlled differentiations using NSL methods and NSL Technology Framework (NSL-TF), thereby surfacing the logic for direct use and influence of the users or stakeholders. TTF rides over the matrix-based/tile-based approach which encapsulates the keywords, operators, symbols, and functions of each programming language and its representation in NSL. The TTF analyzes the construct of the code, identifies the programming language it is written in, and, using the matrix, picks up the matching NSL equivalent of every keyword, operator, symbol, function, or combinations thereof.

Technology Re-translation Framework (TRF): An innovative framework that NSL brings about is the ability to convert any solution constructed in NSL into any programming language. TRF is based on the same matrix-based approach on which TTF is based upon. The TRF understands the NSL construct and identifies the matching keyword and functions in the programming languages, thereby constructing the code in any programming language selected by the user.

360° Any To Any (A2A): The TRF, together with TTF, completes a full life cycle of the regime called 360° Any to Any ("A2A"), which is the ability to convert the solution in any programming language or any natural language to any other programming language or natural language. Just like meaning is constant and can be expressed across various natural languages, the solution logic can be expressed in any programming or natural language substrate. In NSL, solutions are a special class of information known as prescriptive information. The prescriptive information expressed in a potentiality state becomes a reality when acted upon, and that prescription is performed at a class level, and, when their members arrive, the reality happens at a transaction level. Any member arriving at the defined classes will behave the same way as the class. These are replacing the traditional processes. The events that arrive select from the potentiality text and when that happens, the whole thing becomes capable of being expressed in natural language format. In other words, there is a certain differentiation cycle NSL adheres to, where differentiations are expressed appropriately and contextually, and such differentiations as per NSL are expressible in any substrate. The NSL, through TTF and TRF, is capable of extracting the solution logic embedded in each of the substrates and treating them the same way as it is treated in the original substrate. This A2A has been tested with the principle that the inputs being the same, the outputs were the same in every solution built in various programming or natural languages. In short, the NSL construct acts as a hub and other programming languages are like spokes. For example: If a programming language has to be translated to another programming language, the programming languages have to touch the HUB called NSL and then branch out as another programming language.

NSL Language Agnostic: NSL takes an entity-based approach and creates solutions based on creation of intent fulfillment combinatorial-entity-states. As the foundations are in reliance on differentiation principles, what really matters is the reality behind the 'real entities' and the 'representational' entities. The language used for the purposes of representation is not material. NSL, in that sense, is language agnostic.

Query Based Solution Development (QBSD): All solutions happen only on account of change. If there is no change, there is no solution. For the change to happen, there is always a need for direction and that direction is provided by the agents. The agents have to provide not only the direction, but also the energy required for the change. Therefore, all change, in the presence of agents, becomes contextual, and everything is all about moving from one desired CES to another. This occurs through a series of steps. To arrive at the series of steps, interrogatives are needed, that is, asking the right questions. A solution is built only when all the questions what, why, when, and where are answered. Each question initiates an action and is physical in nature and can be expressed in space and time. NSL provides for a very simple and powerful tool for solution development using Queries called the Query Based Solution Development (QBSD). QBSD is a predefined series of questions, which, when responded to, will help one create a solution in NSL. Since, the creation of a solution in NSL is based on a natural language text like structure, solution creation in NSL is as simple as responding to these predefined set of questions. This is an interactive system where the user is responding to the queries posed by the Machine to construct a desired solution.

Natural Language Like initiative: NSL conveys application logic to the Computer in a natural language like fashion. However, the construct may not read like natural language if the sentence is not framed with the grammar of that natural language. NSL uses the information provided in the solution construct and, with the help of the existing language libraries, creates sentences which read like natural language providing the user with an experience akin to reading a solution in a book. NSL will not make the construct too verbose as it uses optimal information in the construction of the sentences. If the information is not optimal, NSL expands the breadth of the search by checking the information available at various levels of the solution design such as the agent, the entities, the attributes, and so on. In the absence of optimal information, even upon expanding the breadth of search, the sentences are framed at a generic level without too much granularity but in the right context. If the information to be expressed is more than desired as part of the sentence construct, the additional information is attached to the information layer to further support the change unit.

Auto Verb Assignment (AVA): In most scenarios, verbs are no more than the descriptors of the change as reflected in the statements of intent. The description can be at a generic level or granular level, so that it expresses things in a meaningful fashion to the Human Agent. Generally, they do not carry any functional value in NSL, unless the designers intend to give a functionality. However, verbs are essential in every statement of intent to ensure that the statements of intent read like natural language. In creating a new solution in NSL, one has the flexibility to choose the verb in their statements of intent. However, for existing solutions converted from Programming languages to NSL using TTF, the verb is not automatically generated as the base programming code will generally not contain verbs. Auto Verb Assignment is an enhanced tool in NSL which automatically assigns verbs to functions so as to make them appear closer to Natural Language. AVA uses verb libraries created in NSL to choose the correct verb that is best suited for the verb phrase construction.

Practice Based Solution Development (PBSD): Anything that solves a problem is a solution. The problems are always in the context of agents. In the NSL paradigm, solutions are no longer limited to technology as is generally understood. NSL is an entity-based solution model, based on the Way the World Works principles. Solutions exist in day to day practices. Any practice that solves a problem is about how entities interact to provide specific results. NSL captures the best practices as recorded by an agent and has the ability to identify the entities that matter through a given process. Thereafter, by elevating the particular entities to the status of the classes, the generic solution logic can be captured. NSL provides machine aided guidance for the users to perform the actions as derived from the practice.

Substrate Independent: Just as the same meaning can be expressed in different languages, the solution logic can also be expressed through many substrates. NSL has eliminated the distinction between process and information, wherein processes are a special class of acted upon information. Information, by itself, is non-physical and conceptual in nature. It is represented by the nature of distinctiveness of entities. All distinctiveness should express itself through one substrate or the other. Presence of substrates for information to express itself is a necessity. In other words, there is a certain differentiation cycle NSL adheres to, where differentiations are expressed appropriately and contextually, and such differentiations as per NSL are expressible in any substrate. Example: A '0' or a '1' can be represented by a glass that is empty or full or it can be represented by an empty transistor or a transistor filled with electrons.

Quantification of Solutions: Just as Information is quantified in information theory in 'bits', NSL quantifies solutions through identification of the distance between entity relationships. (a) Binary events: Distance between entity relationships can be measured in terms of minimum number of binary events it takes to get from one CES to another. For example: If entity 1 is 'A', entity 2 is 'AB' and entity 3 is 'ABC', the minimum number of binary events required to happen to get from entity '1' to entity '3' is '2'. The principle is those differentiation, when ignored or recognized, result in either a merger or 2 entities becoming identical. NSL eliminates the difference between structure and process and what counts is only the directionality of the differentiation. (b) Space: Because each CES is either explicitly stated or implied and operates in space, how much distance has been covered can be gleaned. (c) Time: Since there is stated or unstated time associated with each CES, the time could potentially be assessed, and, hence, the distance can be measured in time. (d) Resource consumption: When things are moving from one CES to another, it requires a set of entities that participate, called resources. Behind every resource, there is value that can be assigned, and, hence, the resource consumption required for each CES can be measured.

Logic Compression Through Elimination of Redundancies: Programming languages require a special effort to decode logic in any existing system. Since decoding complex logic takes more time than writing new code, programmers do not take advantage of existing code. The new code that they write increases redundancies between systems. As NSL is a natural language and is fully transparent and searchable, redundancies can be eliminated, and existing solution components can be reused.

Reduction In Computational Resources On Account Of Solution Logic Compression: Since NSL helps in logic compression by eliminating redundancies, everything is transparent in NSL, and the solution is processed through a simple search mechanism, there is a reduction of the computational resources like the RAM and CPU in processing solutions in NSL as compared to any programming language.

Applying NSL Principles to Engineering Design: Engineering design process is a methodical series of steps that engineers use in creating functional products and processes. The process is highly iterative in that parts of the process often need to be repeated many times before another can be entered. The part(s) that get iterated and the number of such cycles in any given project may vary. Every entity in NSL is informational, highly differentiated, and a combination of the entities leads to more differentiation. In addition, NSL Principles can be applied to engineering design by identifying the components that make up the overall design as each part is differentiated and combining the parts, until a desired combinatorial state is reached, to make a new distinct one. The interaction between those parts will operate by the same extended CES principles which is equivalent to a function or a process.

Process vs Search: A program lays out the logic of how to react to events. The events, being the inputs, use appropriate database items as stipulated by the logic and generate outputs. Outputs become an integral part of databases. The programming requires a lot of processing based on the logic contained in the program and processing of entities contained in the database. On the contrary, in NSL, the system only relies on the search principles completely transforming the way solutions are handled. NSL identifies as appropriate to the solution possible information pathways, which are akin to a special class of information, that any event can take through CES. The result is a significant reduction in the consumption of the computational resources, with Solution logic and transactional logic remaining the same, hence killing the process.

Containers: In NSL, fundamental change and value creation is done in Change Units. Every Change Unit has a defined set of boundaries. In NSL, every Change Unit is a container, and the transactions happen in the containers. The output from one container is a variable entity in one of the subsequent containers as designed in the solution logic. The container system assumes importance in the context of assigning identities and is best designed to create hierarchies and structures by defining agents and entities as being part of Change units and attributes being part of entities and so on. There are varied kinds of containers, and the varied containers have a varied number of slots. Each container is auto assigned identities based on their sequence such as CU1, CU2, and so on until the last CU. Every Entity in NSL has a unique identity. An entity can have multiple identities: one being a fundamental identity and the rest contextual identities. That means, in the context of particular change, a slot is assigned based on the role. If the entity is participating in multiple change units, it will have multiple identities—one identity in each participating change unit. Therefore, the entity will have one individual identity and one or more identities on account of the space that it is occupying in the other change units. The agents, entities, and the attributes participating in each of the CU are also auto numbered in a sequence. Each of the potential CES in each CU has a distinct id generated, however, by design, only one CES in the CU qualifies to be in a trigger state.

Documents Converted into NSL Format: Every Natural Language has descriptive, prescriptive, interrogative and, exclamatory statements. The prescriptive statements are where action or change is involved, and the descriptive statements provide information. Exclamatory sentences are more about laying emphasis. All descriptive and prescriptive statements arise out of answering the interrogative statements. The questions and answers pertain to entities, combinatorial entity states, or extended CES, which in turn are applied to space and time based on the priorities in which they operate. NSL has the ability to convert the text in any document to descriptive and prescriptive statements, where the prescriptive statements are akin to CUs and the descriptive statements are attached as information to the prescriptive statements and sit in the information layer.

Senses Based User Interface: The reach of NSL is beyond technology solutions and its horizon extends to all the existing solutions in the world. NSL is an entity based solution model which uses advanced models for recognizing entities through pattern recognition, taking those entities as inputs, after separating out entities that are relevant and that are not relevant to influence the environment in creating the right kind of outputs akin to what others are doing with driverless vehicles. Most often interfaces are limited to screens and voices, as the solutions are primarily technology related solutions. Since NSL extends beyond technology solutions, NSL is a significant addition to the interfaces called the Senses Based User Interface, where the inputs can be created by the primary five senses: vision, touch, hear, taste, and smell and the extra sensory. Extra sensory is one which human senses are not capable of capturing but machine agents are capable of capturing like x-rays, radio waves. etc. Senses help gauge the surrounding environment and helps one to make informed decisions. NSL extends user interfaces beyond regular screens across devices and catapults the reach enormously. The inputs to the system are based on the patterns in the environment which are registered in the mind. NSL has the ability to store what is appropriate and discount the inappropriate inputs. NSL recognizes the entities in the real world and responds appropriately to the solution that the user is seeking.

NSL and DNA: We live in an information driven world. Similar to existing process barriers that block the penetration of information into solution environments, barriers also exist with respect to information as contained in the DNA of living beings. There is an opportunity to convert information contained in the DNA to an NSL format so that it becomes searchable and readable.

Artificial Neural Networks: Each statement-of-intent (SI) operates as though it is a neuron. Events in SI are like firings of neurons on reaching a threshold of potentiality, propagating the change outwards into other neurons—and in this case into another SI. The collection of SIs in a solution environment fulfill their functions like the neural networks. Artificial Neural Networks are gaining ground and the solution design inherent in NSL is most conducive to effectively put these principles to practice.

Flow Chart Logic Convertor: This is one form of Practice based Solution development where solution logic is extracted from existing flowcharts. The construct of a Flow chart is like one sentence leading to another, e.g., in NSL terms, a series of LSI's interacting to achieve a GSI. However, the Flow Charts generally do not carry any additional information of the entities, agents, and attributes participating in each sentence. NSL extracts the solution logic from the processes in any flow chart and converts it into information. The extracted information can be used to construct the transformational pathways in NSL. If the process is branching out into multiple scenarios arriving at the same GSI, they are created as related paragraphs in NSL.

Resource Optimization and Idle Time Identification Framework: NSL also has Resource optimization and idle time identification framework wherein users can define optimal usage of all the available resources at their disposal. This framework has automated techniques of tracking real time entity participation in value creation activity. Every change unit and combinatorial entity state is connected to an event log of space and time which enables NSL to capture the entity usage metrics in real time. NSL has the ability to capture the number of times an entity has participated in a trigger state and how many times a Change Unit got triggered. These utilizations can be captured over a period of time or at any given point in time. Optimal differentiation principles help the users with Analytics and improving decision making capabilities for resource optimization framework. Resource usage and minimal idling helps in extracting maximum value for money.

Meta Solution Logic Entities: In NSL, solutions are a special class of information known as prescriptive information. The Prescriptive information expressed in a potentiality state, when acted upon, becomes a reality. The prescription is done at a class level, and, when their members arrive, the reality happens at a transaction level. The solution design is set at the class level, and the class itself can be as differentiated as the solution design requires it to be. For example: If person is at class level, literate persons and illiterate persons are subclasses within the class. Relationships are defined at class levels. The fundamental underlying principle is that behavior of the members, with respect to interactions and the outcomes it produces, is the same as the behavior of the class it belongs to. Therefore, when transactions happen the system determines the entity class they belong to. The logic is borrowed from a generic class, and vantage points can vary from the most specific member to a highly generic class. This will help in identifying how many people have used the logic of the solution called a "Solution Level Transaction Count". This is similar to how videos show the number of views.

Transaction Solution Logic Entities: A solution architect defines classes and subclasses and creates potential level paragraphs. Events arrive at member level, and they select the appropriate class. It starts with desire being formed, and the agent being selected. Classes can themselves be highly differentiated by adding any number of sub classes. Transaction solution logic entities help users extract meaningful insights on real time solution design usage metrics. The most sought-after solution design components are easily identified and are used extensively for recurrent activities for all participant stakeholders. All transactions are members of solution classes. This helps in identifying "Entity Usage Count"-how many times has an entity been used in a particular period or how many entities are being used at a particular time and so on. Transactions and their count help users unlock value judgement principles to prioritize entity inventory and planning mechanisms.

Logical Operators Converted To NSL: The World of Solutions uses the three primary logical operators 'and', 'or' and 'not' for Solution design either in technology or otherwise. Since, NSL deals with solutions, it is imperative that there is a mechanism to deal with these three logical operators which are embedded in the principles of differentiation on which NSL is based. (a) Operator 'And': The construct of NSL is such that, to arrive at a GSI, all the LSI's have to be fulfilled. Therefore, if each sentences has to be fulfilled in a sequential manner, the logical operator 'And' is automatically taken care of by the virtue of the design of NSL. (b) Operator 'Or': NSL provides for related paragraphs which provide for multiple pathways to arrive at a common GSI. Related paragraphs explain the way the logical operator 'Or' is dealt with in NSL. (c) Operator 'Not': NSL provides for a switch between potentiality states and reality states for every entity which encompasses the functionality of the logical operator 'Not'.

NSL APIs: APIs are intermediaries between two systems in which they deliver the request from one system in a particular protocol, and the response is provided by the other system. NSL has the capability to express these API's in natural language constructs thereby making them more intuitive. NSL can convert any existing systems, middleware, or operating systems into NSL format. In short, NSL has API's that are developed in a natural language construct which seamlessly integrate with any existing solution while preserving the user experience.

Conversational Solution Design: Conversational solution design is a variation of QBSD. One of the significant things that NSL does is to make interactions with machine agents feel closer to interactions with human agents following certain stipulated procedures. Therefore, Conversational Solution Design is the ability to create solutions by conversation with machine agents.

Attaching Programming Code to NSL Constructs: When a Programming Language is converted into NSL using the TTF, there is a given level of correlation established between the code construct in Programming Languages and the solution construct in NSL. Therefore, NSL attaches the segment of program to each sentence constructed in NSL so as to serve the purpose of documentation. The users may derive significant value in attaching the converted code to appropriate portions of NSL constructs.

Curating Open Source Solution Logic in Programming: This is similar to re-engineering, wherein once the open source programs are converted into NSL using the TTF, NSL guides in performing appropriate value additions to the construct so as to eliminate redundancies and improve efficiencies in the solution. This would have been highly challenging in the programming languages as the logic is spread across multiple sections and it would require humongous efforts to arrive at such an outcome.

Reverse Engineering TBUI: TBUI is a layer of differentiation by itself which establishes a clear visual of where an entity, agent, or a CU appears. NSL identifies the differentiations that the TBUI has caused in a solution, and these differentiations can be alternatively expressed by adding the TBUI as a proper attribute to each of the entity participating.

Correlation Coefficient and Relation Between Entities: In NSL construct, everything is an entity and only vantage points differ. Any vantage point entity can be compared with any other vantage point entity to see if there is any correlation between them. If there is no correlation, it is 0; otherwise, it can vary between 0 to 1. A perfect positive or perfect negative correlation are at the extreme ends.

Visual Mapping of NSL: NSL is about differentiation principles which can be visually represented also—how a change unit looks, how they are connected, and how they come to exist can also be visually represented. There is an opportunity to connect each programming translation to one of these elements of the visual construct as appropriate which has a given value addition of its own.

The Three Perspectives-Learning, Development, and User: NSL provides all three perspectives i.e. Learning, Development, and User at the TBUI level as every entity is transparent in NSL. (a) The Learning Perspective: In the paradigm of programming languages, the process of learning the programming, e.g., earning the requisite degree, skill set, and practice, is distributed across place, time, and mediums. NSL provides an interactive system as part of the layout of TBUI, wherein any new user can learn NSL through the intuitive learning modules and take an immediate assessment of the learning skills acquired. These learning modules equip the new users with the requisite skillset in a very short span of time and aid in self certification of the user by the end of the learning module. This learning perspective is absolutely transparent and can be viewed as a part of the user's journey with NSL. (b) The Development Perspective: The solutions prepared using programming languages follow a software development life cycle and many of the things that happen in the cycle are not transparent and happen away from the system in which the final solution functions. In NSL, the solution development life cycle itself is shortened to obtaining information for the set of questions and all that appears on NSL in a transparent fashion. (c) The User Perspective: At a user level, only some of the elements of the databases appear selectively in Programming languages; the rest happen in the program which is under the hood and the databases which are under the hood. In NSL, everything is transparent, and all that the user needs are appropriate information and decision rights to view that information.

Extracting Additional Information Based on Entity Interactions: All change happens on account of interaction between entities, and, hence, information about other entities can be extracted if the information about one of the interacting entities is known. Imagine a pen, paper, table, and a person with an intent to interact and, in the process, have generated a written paper. When one has the information about the location of only the pen and the time in which it existed at that location, with this limited information of the broader principles of interaction, one may glean the information about other entities. This will have enormous importance from the point of view of analytics.

Basic Change Units: Basic Change Units are the fundamental unit where all the transactional interactions between entities and the resultant trigger states happen. Basic Change Units exist and operate the same way irrespective of the vantage points at which they exist. At higher vantage points, the information layer tends to carry lot more information.

Sequential Change Units: These are the CUs that, the Basic CU is capable of influencing through one or more events when triggered. Sequential CU utilizes 'AND' operator principles. CES states are maintained within basic CU as well as sequential CU's to form E-CES. Example, for preparing tea, one needs to put the tea bag in a cup, fill the kettle with water, boil the water in the kettle, pour some boiled water into the cup and add sugar to the cup. These are the sequential steps in the preparation of tea.

Alternate Change Units: Alternate CUs are utilized by the solution designer when multiple alternatives are available to reach the fulfilment state or the next enabling state. Only one of the alternatives plays out and the others disappear. This CU utilizes the 'OR' operator principles. Example, A payment can be made using one of the payment options—credit cards, net banking, cash on delivery, gift vouchers.

Parallel Change Units: When two LSIs belonging to the same GSI have no shared entities and have no direct or indirect dependencies, they are called parallel CUs. The system has the ability to automatically identify them and label them accordingly. Example, in a food delivery app as the customer selects food from a restaurant and pays for it, a notification is triggered to the restaurant for preparation of food and is also sent to the delivery boy for pickup and delivery. Two events are triggered in parallel.

Nested Change Units: Nested CU's are an additional type of CU's added to a Basic CU to give it the power of significantly more information at the transaction level. It is like an SSA cycle within an SSA cycle of the Basic CU.

Subordinate Change Units: In a Solution ecosystem, as one moves from one vantage point to a higher vantage point, all the CU's at a lower vantage point are subsumed in a CU at a higher vantage point. Those CU's at the lower vantage point are the subordinate CUs to the CUs at the higher vantage point.

Embedded Change Units: The solutions constructed in NSL may consist of multiple layers; wherein if solution is an activity, it may consist of multiple tasks. Each task may further contain multiple sub-tasks wherein, from the vantage point of each task, it is a change unit by itself. NSL provides this ability to layer CUs within CUs, wherein the higher-level CUs get triggered only if the lower level CUs attain fulfilment. There are two types of Embedded CUs—(1) Recursive Change Units that are number driven and (2) Sub Change Units that are change units within change units.

Transitory Change Units: Transitory change units are to be viewed as enabling change units. Transitory change units gain significance when there are scenarios of paragraphs connected to other paragraphs where information exchange or E-CES extend into multiple paragraphs or chapters. Example, "Writing letter" has to be completed in order to post the letter. The last LSI i.e. a state of getting the written letter ready which is a GSI by itself for one change agent, becomes a Transitory change unit for the GSI of Postal department.

Solution Class: A solution architect defines classes and subclasses and creates potential level paragraphs. Events arrive at member level and they select the appropriate class; it always starts with a desire being formed and the agent being selected. It is important to separate out the entities that are at the vantage point of solution logic from entities at transaction logic. In the solution logic the variables are 'Any LSI', 'Any Human Agent', 'Any Pen', 'Any Paper', etc. that lay out the principles of entity relationships.

Transactional Class Potentiality: The transaction class is a member of the solution class. When a transaction is carried out, the user can select from different possibilities and options that the solution class allows, and which are in potentiality state. Example, when writing a letter, a user can choose from ball pen, ink pen, or pencil; pick any paper whether green, blue or orange.

Transaction Class Reality: When an event arrives at the transaction class potentiality, a transaction class reality is born. Each transaction is unique. It is the solution class that can give birth to any number of transaction classes.

Nested Mind: All solutions can be built suing connected differentiating classes, which differentiations can either be on account of what happens at a CES or an E-CES. Inherent in every change unit is a playout of fractal like SSA cycle. In the presence of agents, senses detect things in the environment, the mind makes appropriate selection from many possibilities and the body provides the requisite energy to complete the change cycle. In keeping with the ever present SSA cycle, there are 3 layers attached to every change unit that houses entities and CES pertaining to them. Sensing pertains to information layer; selection relates to mind layer and action is performed in the physical layer. SSA cycle is present both at the solution class and transaction class. NSL provides for all possibilities with respect to sensing the state of the eco-system and determining whether it is conducive or not (through assignment of norms), assessing the potentialities therein, selecting from the same, and acting by invoking appropriate change drivers in the physical layer. The nested mind is the mind layer of the nested change unit which is inherent in every change unit. The nested mind constantly evaluates the state of all independent entities and the CES at all vantage points where the states evaluated can be Good, Bad or Ambivalent. Incidentally, it can deal with degrees of each one of those. The states as assessed by mind are either known states or Un-known States. Unknown states could belong to the Past, Present, or Future. The mind anticipates/assesses/guesses things about unknown states based on the available information. It generates possibilities and ignores inconsequential possibilities. The nested mind makes value judgements about consequential possibilities (Good/Bad/Ambivalent) or incidentally identifies opportunities and risks. It assigns likelihoods/probabilities to these consequential possibilities. The nested mind informs the agents selectively about the opportunities/risks in the information layer; and intervenes and alters the transformational pathways by altering the change drivers in the physical function layer. The actions of the nested mind include matters relating to resource optimization as desired by the agents. The mind layer operates in either a batch mode or a real-time mode, at the choice of the user.

Contextual Triple Identities: The solution ecosystem operates by the simple principle that no general entity and no agent can exist outside a change unit and that no change unit shall exist without a general entity or an agent occupying it. Agents and general entities come together in a change unit to fulfill a wish. When they come together, they form combination of entities which are further unique and differentiated. Each general entity and change unit in NSL is informational and carries a unique identity. Agents and general entities can participate in multiple change units. Based on the change unit in which they (Agents and Independent entities) participate, they derive contextual identities. These Contextual triple identities act as universal solution logic builders.

a. Change unit identities: Change units define solution logic in terms of how class level differentiated entities come together and laydown pathways of change towards solutions. Identities are assigned to each of the CUs in the following manner:
   i. Solution Ecosystem Identity: NSL allows for the maximum number of subsets that may exist. Example: If the ecosystem is an organization, the number of organizations that the system deals with will define the size of the subsets. If the subsets can be possibly 10,000 organizations, then one can provide for a five-digit identity (Example: "abcde" is a five-digit identity)
   ii. Level One Change Unit Subsets: If an organization has a maximum of 1000 businesses, then one has to provide for four digits (Example: "abcde.1234" is level one change unit identity where "abcde" is the solution ecosystem identity)
   iii. Level Two Change Unit Subsets: Based on the maximum possible subsets within the level one change unit subset, one can determine the potentiality space, say six digits (Example: "abcde.1234.ABCDE" where "abcde.1234" is the level one change unit subset identity)
   iv. More Levels of Subsets: Similar to the Level one and Level two change unit subset identities mentioned above, NSL allows the users to create identities at any required granular level.
   v. Processes: Descending down the vantage points of an ecosystem, one would encounter what is akin to processes in the old paradigm. Processes are sets of 'basic change units' strung together yielding given outcomes. Depending on the number of processes the last of the vantage points accommodates, one can assign a more differentiating number based on the maximum number of expected processes that would ever exist in the system.
   vi. Basic Change Units: Basic Change Units are the fundamental unit where all the transactional interactions between entities and the resultant trigger states happen. Depending on the maximum number of CUs that can exist within a process or a sub-process the membership numbers can be assigned.
   vii. Connected Basic CU identities: Each of the following types of connected basic CUs have unique identities, identifiable by the type of the basic CU identities.
      A. Alternative CUs: These further differentiate a basic CU by an identity starting with 'A" and accommodate members up to a maximum defined size. Example: ( . . . Axxxx).
      B. Sequential CUs: These are the CUs that the Basic CU is capable of influencing through one or more events when triggered. Since the basic CU gets likewise influenced by other CUs, it would be redundant to specify the preceding sequential CUs. The succeeding sequential CUs are assigned a differentiating number starting with an 'S'. Example: ( . . . . Sxxx).
      C. Recursive CUs: These are CUs within CUs that function recursively and can be assigned a number starting with 'RC'. Example ( . . . RCxxx).
      D. Sub-process CUs: These are CUs within CUs but are sub-processes within CUs requiring assignment of identities to each of the sub-process CUs. They can carry identities starting with 'SU'. Example: ( . . . SUxxxx).
      E. Transactional CUs: These are born when a transactional wish is born as permitted by class level basic CUs. They are identified by attaching differentiating unique transactional numbers based on the maximum number of transactions a class level CU permits. It should be noted that even if one transactional CU is born, the entire associated class level process will replicate itself as a transactional process and would be numbered accordingly.
   viii. Layers within CUs: There are three layers within each basic CU: Physical (P), Information (I), and Mind (M). Each of these can be identified by their initials.
   ix. Independent entity slots: These are the independent entity slots within each level. They bear identities starting with 'E'. Example: ( . . . Exxx).
   x. Level 1 Attribute Slots: These can be identified by the alpha-numeric—L1A.
   xi. More Attribute Level slots: One can follow the same methodology to assign identities such as L2A, L3A, etc.
   xii. Combinatorial Entity States: The system further provides the possibility of assigning automated CES numbers for their respective slots based on the principle of $2^n$ binary variables within the basic CU.
   xiii. States: Each slot, whether it is an independent entity slot, an attribute slot, or a CES slot, exists in a state of either 'potentiality' (P) or 'reality' (R) and can be identified as such.
   xiv. Using this system implemented model, the number of CUs at all vantage points, layers, and slots within the change units can be uniquely identified. The numbering system also provides the distances between any entity to any entity based on differentiation principles.

b. General entity identities: Any entity that is distinct, either differentiated (unique) or un-differentiated (identical), shall be represented through unique identities. All general entities are physical (and informational) whether they are real or representational. The identity assignment of the general entities can be done in the following way:

i. Classes: These entities belong to limited classes which at least includes Agents, Intents, Hard Assets, Soft Assets, Attributes, and Money based on the choices of the solution designer. They bear identities based on principles similar to that of CUs. Each subset's maximum size is first determined and based on the same number of digits required for the subset would be appropriately determined.
ii. Any number of Sub-classes: There shall be any number of subclasses born as required and identified until such time the most granular general entity is put in place. The granularity is based on a simple principle of what matters from the point of view of the solution designer.

c. Agent identities: Any distinct Agent, shall be represented through unique identities. Agents are either human agents or machine agents. The identities assignment is unique to the type of agent.

NSL as a HUB: NSL permits deployment of solutions built not only in natural language based NSL format, but also in any of the several substrates such as programming, practices, text, processes by acting as a platform that supports deployment of solution construct in those several substrates. Just as the same meaning can be expressed in different languages, the solution logic can also be expressed through many substrates. NSL has eliminated the distinction between process and information, wherein processes are a special class of information, acted upon. Information is represented by the nature of distinctiveness of entities. All distinctiveness should express itself through one substrate or the other. Presence of substrates for information to express itself is a necessity. In other words, there is a certain differentiation cycle NSL adheres to, where differentiations are expressed appropriately and contextually, and such differentiations as per NSL are expressible in any substrate. NSL acts as a HUB that allows execution of the solutions in any of the several substrates mentioned above without loosing the truth value associated.

Extracting Solution Logic From Semi-Transparent Solution Environments: A Semi-transparent solution environment is one where a part of the solution is transparent and over the hood as represented by its user interfaces and the balance lies under the hood and logic is hidden. NSL, through the use of TTF, converts the part of the solution that is transparent into NSL and recreates the balance using similar solutions present in the solution libraries.

Converting SOPs to NSL: With reference to FIG. 117, a Standard Operating Procedure (SOP) contains prescriptive statements, descriptive statements, flow charts, or combinations thereof. The prescriptive statements are where action or change is involved; the descriptive statements provide information; and flow charts are one statement leading to another statement. NSL has the ability to convert the text in any document to descriptive and prescriptive statements, where the prescriptive statements are akin to the physical layer of the CUs, the descriptive statements are attached as information to the prescriptive statements and sit in the information layer, and the flow charts are similar to a series of LSI's interacting to achieve a GSI. NSL eliminates redundancies, if any, from the information extracted and knits together the solution in NSL format. NSL contains within it, a distributed document parsing system to parse thousands of SOP documents written in natural language to create NSL equivalent. This system called "Parse2Run", has achieved wide applicability, scalability, high performance, and high availability, and can parse and understand SOP documents written in natural language. Parsing of the SOP can tell about entities and how they interact to form an understanding of the process. Once Parse2Run has parsed the SOP, it can translate the understanding of process atop of NSL Platform which can then execute this procedure. Parse2Run is one of the core components, which utilizes Natural Solution Language (NSL) constructs. Core of Parse2Run is an NLP engine which finds the Entity and elements of text that defines a process. First step of understanding document is to find out parts of speech of the document. Once the part of speech is understood, it resolves the co-references such as pronouns by their antecedents. Parse2Run traverses the inheritance relationship to further remove ambiguity. Even after this, some part of the document may not be understood as there can be more than one, equally possible, interpretations of the information written in SOP. Parse2Run will mark this point and will converse with the Solution Designer to disambiguate it. Parse2Run is multi-pass system and in every pass, it focuses on specific aspect. Parse2Run keeps improving its understanding of SOP document in each pass. The various levels of pass are as under:

a. Core Pass: Parse2Run forms core language-based understanding of the document. It has base forms of words, parts of speech, normalize dates, times, and numeric quantities, mark up the structure of sentences in terms of phrases and syntactic dependencies.
b. Reference Pass: After basic level of understanding, Parse2Run finds which noun phrases refer to the same entities. This minimizes the search space of concepts and allow the correlation to happen across different part of the documents.
c. Relationship Pass: Parse2Run finds sentiments, extract particular or open-class relations between entity, get the quotes people said, etc.
d. Understanding Pass: The system has ability to have deeper understanding of the concepts as expressed in natural language.
e. Process Pass: Parse2Run finds the information of the Process itself as written in the SOP document. Semantics will be used to convert this information into NSL constructs.
f. Enrichment Pass: Parse2Run enriches the entities from already curated information. Entity information can be enriched from the existing data model or available domain models. This enrichment updates entities with attributes.
g. Compliance Pass: Parse2Run enriches the process from compliance point of view. Compliance can be either provided by the organization or it can be specified by government for a given industry. This enrichment pass allows the process to be monitored for violations by AI systems.

Developer Less Development: NSL provides the ability for constructing solutions with very minimal human intervention through a process called Developer less development (DLD). DLD provides Machine Aided Design for accelerating solution design. When one is clear about the start point and the end point of a solution, DLD provides the options of multiple pathways to the solution designer to pick and choose the pathways of relevance based on the fact that DLD analyzes the solution libraries, identifies similar solutions, and displays the probable pathways to the solution. Developer Less Development (DLD) allows automation and recommendation of solution classes by implementing Supervised and Unsupervised Machine Learning Models. DLD provides for full automation of Solution Class with a focus on automating the LSI or Change Unit nearest neighbor recommendation using a Supervised Learning Approach. The present disclosure uses the Nearest Neighbor Concept in NSL to make the Machine Learning Prediction. NSL has high level of affinity from Change drivers to Change units. When multiple transactions happen, there is a definite pattern and that is recognized by the machine. DLD uses both solution class and transaction class information for making the recommendation to the Solution Creator. As shown in the FIG. 116, the solution content has been extracted through the TTF Layer from Various Programs, Video, SOP, Dream Developer Created Content. DLD engine is mining the rich solution content which are part of the NSL Solution Library. Further, Transaction data from the Transaction Class is extracted and fed into the DLD engine which enables identifying the distances at various levels. The Distance calculation can be accomplished by using NSL Entity values, time and space using Machine Learning Algorithms. The DLD engine uses NLP, ANN, Nearest neighbors' techniques/components for processing the solution content. The NLP technique includes named entity recognition, word disambiguation, entity synonymization components. The ANN technique includes probabilistic models, sentence encoder, Deep learning components. The nearest neighbor's technique includes pysparr-NN, Entity distance, co-relation coefficient components. The DLD engine uses the Probabilistic models for the various permutations and combinations to make predictions.

NSL Overcomes Physical Barrier: The World is being seen more and more in terms of being informational. Information is used to represent physical entities and multiple physical entities are represented in each solution. Physical entities can be represented in multiple ways as long as the truth value is preserved. Unique entities are represented in words and identical ones are done by number. Example: Book, 2 books. In the Programming world, the solutions are created but when data is stored in the databases, the context is lost; context would be required to be re-created to make sense of that physical entity. Therefore, information stored about that physical entities is inadequate to accurately identify the actual physical entity. Also, many inferences of one physical entity are created and hence it ends up in creating lot of documentation. Any change of a physical entity does not percolate to all references where that entity is being used. NSL maintains the entire lineage and as long as the "truth value" is preserved, the presentation of that physical entity in the Informational model is accurate and dynamic. Example: A person is a bundle of information, name of that person is the attribute of that person, his identity is the numeric representation of that person and so on. The right substrate can also use the same information in the right medium. Example: Machines deal well with numeric values and humans deal better with visual representations of the same physical entity.

NSL Overcomes Process Barrier: Traditionally, in the programming world, there is a strong separation between instructions set (process/function/algorithm) and the (input/output) data set. So, the whole logic of what's contained in the process flow, the information flowing through the process, the status of process is all opaque and under the hood (programs sometimes log status to files to provide some view). In NSL, the whole solution logic is expressed as solution classes based on differentiation. The logic, thus constructed, plays out at runtime, when instances start arriving. This leads to CES states and E-CES states that define the entire solution in a very transparent manner. So, the whole opaque process construct, is converted into information that is very transparent and "over the hood". Once it is expressible as Information, it is automatically searchable.

NSL Overcomes Class Barrier: Solution Logic is defined at a class level (called Solution classes). Transaction classes are formed when instances arrive into these solution classes (at runtime) and the defined solution logic plays out. So, logic defined at (differentiated) class level is: "a pen, a paper, a person" and at transactional level, it becomes "this pen, this paper, this person" and so on. In Programming languages, if the data that gets stored (in databases), without additional context, one is unable to relate that data segment to the particular class it belongs to. So, any relation between the class (which contains solution logic) and instances (that play out the solution logic) gets lost and that context needs to be re-created every time, there is a need to analyze data. In NSL, solution logic is expressed as a special class of Information (expressed as sentences) and has its members (database) hanging to it as they play out. So NSL, records the entire journey and the entire context (using contextual ID's) and association of members with their respective classes, is maintained as data in the database. Hence, NSL provides an efficient and effective way to measure distances between entities, establish correlations and probabilities.

NSL Overcomes UI Barrier: In Programming Languages, the (Graphical) UI usually renders the input and output field values. The position of components is fixed as determined by the programmer as they build the system. This is a highly inflexible way of rendering information and any changes need to be done at the code level, re-tested and then published. Since NSL is based on the bedrock of differentiations, NSL leverages the user interface properties as yet further differentiations of the entities that need to be rendered e.g. font sizes, colors, which screen the component appears on, starting position to render the component on that screen etc. are nothing but additional differentiations that get attached to the entity as attributes. So, the system can render itself based on these optimal differentiated values (for various screen sizes).

NSL Overcomes Screen Barrier: Traditional systems have limited, UI to GUI rendering on computer screens. So, for most part users are stuck to the terminal and that seemingly is the only mechanism to interact with technical solutions. NSL provides for user interfaces and experiences to have the ability to "jump out of the screens" using sense-based interfaces e.g., solutions that can leverage touch, vision, smell, hearing, taste, to interact with various solution. This is on account of the fact that NSL is an entity based model and entities and interactions can be understood through pattern recognition. For example: A camera can act as eyes and is able to see the world.

NSL Overcomes Ambiguity Barrier: Traditionally, there are huge dis-clarities between business stakeholders and technologists. Each had their boundaries of knowledge. Transfer of knowledge and interpretation had gaps. Then teams made the interpretations even more complex. Attrition of technical team members made the process even worse. By democratizing solutions, NSL empowers the business stakeholders to build solutions on their own as technology specialists are not required to build the solutions on NSL; thereby eliminating the ambiguity barrier.

NSL Overcomes Mind Barrier: Typically, the current world looks at analytics as a special function and uses it in select cases. In NSL, the nested change units with the mind embedded in them, is integral to every Change Unit constantly recording and analyzing the ecosystem. The nested minds emulate the conscious mind and possess situational awareness and response. The nested mind does real time analysis, has the power to analyze the past, present and the future and make choices for all actions to be done now or in the future.

NSL Overcomes Human Barrier: By training the machine to understand natural language and empowering it with a world of well-constructed libraries, NSL is ushering in the era of Developer less development akin to driver less cars. The machine is able to give precise constructs once the start point and the wish are specified, thereby eliminating the over dependence on Humans to write solutions. NSL brings about a whole new shift in solution development by equating man with machine. Developer less development makes use of available information leading to dynamic decision making to alter solutions using SSA cycles at Both Class and Transaction levels.

NSL Overcomes Man-Machine Barrier: There are 2 codes at the moment-natural language and programming language. SSA cycle is inherent in both Human Agents and Machine Agents. By equating both the codes, NSL alienates the SSA cycles present in Human and Machine Agent Systems, thereby making the differences disappear. NSL is the universal language of solutions which will make the machine and man talk like friends. These are synonymous with 'computers' where the units of change are driven by the machine agents—as designed by human agents or other machine agents-so that proper outputs are generated in response to inputs. Machine agents essentially emulate human agents in their ability to consume inputs, bring about a controlled change among them (process those inputs) and generate outputs. In one sense, human agents impart qualities of being purpose driven into machine agents.

Explanation of Instances and Figures

Instance 1 pertains to testing of NSL done in the context of a hotel reservation system program written in Java Programming language. This Java Program contained 700 lines of code and was effectively replaced by NSL. Thereafter, NSL, through the use of its 'technology framework (NSL-TF), was tested for producing the same results as the Java Program.

Instance 2 pertains to testing of NSL Technology Translation Framework (NSL-TTF). NSL-TTF consumes and translates a hotel reservation system program written in Python Programming language into NSL automatically. Such NSL-TTF produced NSL is fed into the NSL-TF to effectively produce the same results as the original Python program to establish that NSL can deal with any code written in the past.

Instance 3 pertains to testing of NSL Technology Retranslation Framework (NSL-TRF). NSL-TRF consumes and translates an ATM service solution written in NSL into Python and C Program automatically. The programs generated the same results as the original solution in NSL.

Instance 1

Figures associated with Instance 1 include FIGS. 95-103. The Objective of the Java Program is a Hotel Reservation System application allowing users to book three types of hotel rooms-Deluxe, Super Deluxe, and Luxury, along with the option to select three types of transportation and laundry services.

Instance 1 Step 1: Summary of Java Program and NSL solution: a) The Hotel Reservation System Java Program consists of 700 lines of code; b) The code uses 16 key words, 6 operators, and 5 symbols of the Java Program; c) This system addresses 96 scenarios; d) The same solution is built in Natural Solution Language using 13 independent entities, 90 dependent entities (attributes), and 18 LSI's. These 18 LSI's can address 96 scenarios; e) FIG. 95 is a diagram showing an example of a representation of a Java Program and a corresponding NSL Solution; f) and FIG. 96 is a diagram showing an example of a representation of a translation of a Java Program into an NSL Solution using a technology translation framework.

Instance 1 Step 2: The manner in which NSL captures solution logic in programming code: An NSL construct is all about bringing together entities that matter. It is extremely intuitive as it almost resembles natural language. The sequence of building the solution in NSL entails: a) Creating independent entities (Equivalent of Nouns). b) Attaching attributes to the entities for differentiations (Equivalent of Adjectives and Adverbs). c) Creating change units/combinatorial entities (Equivalent of Sentences). d) Stringing together the change units/Local Statements of Intent to create the Global Statement of Intent (Equivalent of Paragraphs). e) Attaching rules, Constraints, formulae as attributes where applicable. f) FIG. 97A is a diagram showing an example of a representation of an entity creation with attributes through one-to-one mapping of the Java Program to the NSL equivalent. g) FIG. 97B is a diagram showing an example of a representation of functions in NSL through the one-to-one mapping of the Java Program to the NSL equivalent.

Instance 1 Step 3: Transformation from Static state to Dynamic state: a) Once a solution is constructed in NSL, the LSI's are in a static/potentiality state. As and when an event arrives (e.g., when transactions happen), the combinatorial entity states transform from static/potentiality to Dynamic/reality. b) FIG. 98A is a diagram showing an example of a representation of a Paragraph in static state when the solution is constructed. c) FIG. 98B is a diagram showing an example of a representation of a sentence turning into Dynamic from Static as "an event arrived when the customer information is captured." d) FIG. 98C is a diagram showing an example of a representation of a Paragraph in dynamic state when the information is filled up.

Instance 1 Step 4: Verifying whether the outputs are same in NSL and Java: The Java application and the solution built in NSL were tested using different inputs covering multiple scenarios. The output of the Java Application and the output of the NSL solution are the same given the same inputs under both the applications. a) FIG. 99A is a diagram showing an example of a representation of inputs and outputs of a Java Program. b) FIG. 99B is a diagram showing an example of a representation of inputs and outputs of an NSL Solution.

Instance 1 Step 5: Technology Framework supporting NSL: NSL is supported by a technology framework which coexists with any operating system. The fundamental principles of the framework are laying out differential pathways for entities and their relationships. The technology framework is standardized as all the principles of NSL are laid down and it remains the same irrespective of any application logic.

The framework has the following major components: a) Managing databases b) Managing user interfaces c) Connecting entities to agents d) Information search principles e) The framework deals with all kinds of scenarios as under: i) Adjudication: The attribute structures provided in the framework help the users to differentiate each paragraph uniquely. The framework has provided for every possible scenario to be stored as independent paragraphs. ii) Shared entities:

Technology framework captures space and time events wherever defined which enables pattern recognition and estimations. This will allow users to estimate when an entity will be available for the next activity. iii) Independent paragraphs: The technology framework differentiates every paragraph as an independent paragraph.

FIG. 100A is a diagram showing an example of a representation of managing databases. FIG. 100B is a diagram showing an example of a representation of managing user interfaces. FIG. 100C is a diagram showing an example of a representation of connecting entities to agents.

Instance 1 Step 6: Operational Metrics-Java v/s NSL: FIG. 101 is a diagram showing an example of a representation of Operational metrics explaining the time, efforts, and cost required to build the Hotel Reservation System solution in NSL and Java.

Instance 1 Step 7: The manner in which NSL addresses Keywords, Operators, and Symbols: The Hotel Reservation System Java Program used 16 Keywords, 6 Operators, and 5 Symbols. The following is an explanation of how NSL addresses each of these Keywords, Operators, and Symbols:

Keyword "Public": FIGS. 97A and 97B represent the way the Keyword "Public" is used in Java and the way it is represented in NSL.

Keyword "Int": FIGS. 97A and 97B represent the way the Keyword "Int" is used in Java and the way it is represented in NSL.

Keyword "Char": FIG. 102A is a diagram showing an example of a representation of the way the Keyword "Char" is used in Java and the way it is represented in NSL.

Keyword "String": FIG. 102B is a diagram showing an example of a representation of the way the Keyword "String" is used in Java and the way it is represented in NSL.

Keyword "Double": FIG. 102C is a diagram showing an example of a representation of the way the Keyword "Double" is used in Java and the way it is represented in NSL.

Keyword "Boolean": FIG. 97A is a diagram showing an example of a representation of the way the Keyword "Double" is used in Java and the way it is represented in NSL.

Keyword "For": FIG. 102D is a diagram showing an example of a representation of the way the Keyword "For" is used in Java and the way it is represented in NSL.

Keyword "While": FIG. 102E is a diagram showing an example of a representation of the way the Keyword "While" is used in Java and the way it is represented in NSL.

Keyword "If": FIG. 102F is a diagram showing an example of a representation of the way the Keyword "If" is used in Java and the way it is represented in NSL.

Keyword "Else": FIG. 102F represents the way the Keyword "Else" is used in Java and the way it is represented in NSL.

Keyword "Break": FIG. 102G is a diagram showing an example of a representation of the way the Keyword "Break" is used in Java and the way it is represented in NSL.

Keyword "Return": FIG. 97B represents the way the Keyword "Return" is used in Java and the way it is represented in NSL.

Keyword "Print": The "Print" Keyword in Java is used for printing functionality. In NSL, print is represented as "User Interface" that is attached as an attribute to an entity.

Keyword "Class": FIG. 97A represents the way the Keyword "Class" is used in Java and the way it is represented in NSL.

Keyword "Package": FIGS. 97A and 97B represent the way the Keyword "Package" is used in Java and the way it is represented in NSL.

Keyword "Import": FIG. 97A represents the way the Keyword "Import" is used in Java and the way it is represented in NSL. In NSL, they are reusable components.

Symbol "{ }": FIG. 97A represents the way the Symbol "{ }" is used in Java and the way it is represented in NSL.

Symbol "( ):" FIG. 97B represents the way the Symbol "( )" is used in Java and the way it is represented in NSL.

Symbol ";": The ";" Symbol in Java is used to end a statement. In NSL, "." is used to end a sentence.

Symbol ",": The "," Symbol in Java is used to differentiate variables. In NSL, entities are differentiated by the attributes attached to them.

Symbol "[ ]": The "[ ]" Symbol in Java is used to list functionality. In NSL, the differentiation is done through a next level attribute.

Operator "=": In NSL, this arithmetical operator is used by attaching a value to an entity.

Operator "==": FIG. 97B represents the way the Operator "==" is used in Java and the way it is represented in NSL.

Operator "<": FIG. 102D represents the way the Operator "<" is used in Java and the way it is represented in NSL.

Operator "+": This is defined as a formula in NSL and attached as attributes. NSL OS can handle all arithmetical functionalities.

Operator "–": This is defined as a formula in NSL and attached as attributes. NSL OS can handle all arithmetical functionalities.

Operator "*": This is defined as a formula in NSL and attached as attributes. NSL OS can handle all arithmetical functionalities.

Instance 1 Step 8: The manner in which NSL eliminates a process: NSL converts processes and functions into information and brings the application logic into the purview of information search principles. Hence, any function which was under the hood in Java Program is also viewable by the end user in NSL.

FIG. 103 is a diagram showing an example of a representation of converting process into information.

Instance 2

Figures associated with Instance 2 include FIGS. 104-108B. NSL has a proprietary Technology Translation Framework that consumes any programming code and automatically generates an equivalent NSL application logic. It can then ride on the NSL Technology Framework to produce the same results as programs written in any programming language.

Instance 2 proves that NSL Technology Translation Framework works with respect to Python Programming code. To test this a hotel reservation system program code was picked. The output of the Python Program is a Hotel Reservation System application allowing users to book three types of hotel rooms-Deluxe, Super Deluxe, and Luxury, along with the option to select three types of transportation and laundry services.

The entities, attributes, change units, and relationship between change units (application logic) were automatically extracted from the Python Program by the translator, and the extracted components were fed into NSL automatically producing the exact same output as that of the Python Program.

FIG. 104 is a diagram showing an example of a representation of an NSL Technology Translation Framework Methodology.

Instance 2 Step 1: Summary of Python Program and NSL solution: a) The Hotel Reservation System Python Program consists of 391 lines of code. b) The code uses 8 key words, 4 operators, and 4 symbols of the Python Program. c) This system addresses 96 scenarios. d) The same solution is built in Natural Solution Language using 13 independent entities, 90 dependent entities (attributes), and 18 LSI's. These 18 LSI's can address 96 scenarios. e) FIG. 105 is a diagram showing an example of a representation of the Python Program and the NSL Solution. FIG. 106 is a table showing examples of a few Java constructs and their corresponding NSL equivalents.

Instance 2 Step 2: The NSL Technology Translation Framework-Methodologies used: The Technology Translation Framework of NSL uses a compilation of Keywords, Operators, and Symbols from traditional commonly used programming languages and their NSL equivalents. Below is a list of few keywords and their NSL equivalents that the translator deals with the following terms.

Keyword "Static": FIG. 107A is a diagram showing an example of a representation of the way the Keyword "Static" is used in Programming and the way it is represented in NSL.

Keyword "Switch": FIG. 107B is a diagram showing an example of a representation of the way the Keyword "Switch" is used in Programming and the way it is represented in NSL.

Keyword "Case": FIG. 197B represents the way the Keyword "Case" is used in Programming and the way it is represented in NSL.

Keyword "Continue": FIG. 107C is a diagram showing an example of a representation of the way the Keyword "Continue" is used in Programming and the way it is represented in NSL.

Keyword "Transient": FIG. 107D is a diagram showing an example of a representation of the way the Keyword "Transient" is used in Programming and the way it is represented in NSL.

Keyword "Long": FIG. 107E is a diagram showing an example of a representation of the way the Keyword "Long" is used in Programming and the way it is represented in NSL.

Keyword "Short": FIG. 107F is a diagram showing an example of a representation of the way the Keyword "Short" is used in Programming and the way it is represented in NSL.

Keyword "Byte": FIG. 107G is a diagram showing an example of a representation of the way the Keyword "Byte" is used in Programming and the way it is represented in NSL.

Keyword "Default": FIG. 107H is a diagram showing an example of a representation of the way the Keyword "Default" is used in Programming and the way it is represented in NSL.

Keyword "Super": FIG. 107I is a diagram showing an example of a representation of the way the Keyword "Super" is used in Programming and the way it is represented in NSL.

Keyword "Protected": FIG. 107J is a diagram showing an example of a representation of the way the Keyword "Protected" is used in Programming and the way it is represented in NSL.

Keyword "This": FIG. 107K is a diagram showing an example of a representation of the way the Keyword "This" is used in Programming and the way it is represented in NSL.

Keyword "Synchronized": FIG. 107L is a diagram showing an example of a representation of the way the Keyword "Synchronized" is used in Programming and the way it is represented in NSL.

Keyword "strictfp": FIG. 107M is a diagram showing an example of a representation of the way the Keyword "Strictfp" is used in Programming and the way it is represented in NSL.

Keyword "final": FIG. 107N is a diagram showing an example of a representation of the way the Keyword "final" is used in Programming and the way it is represented in NSL.

Instance 2 Step 3: Verifying whether the outputs are the same in NSL and Python: The Python application and the solution built in NSL using the Technology Translator Framework were tested using different inputs covering multiple scenarios. The output of the Python Application and the output of the NSL solution are the same given the same inputs under both the applications.

FIG. 108A is a diagram showing an example of a representation of inputs and outputs of a Python Program.

FIG. 108B is a diagram showing an example of a representation of inputs and outputs of NSL Solution.

Instance 3

Figures associated with Instance 3 include FIGS. 109-112. NSL has a proprietary Technology Re-translation Framework that consumes any NSL solution and automatically writes an equivalent Programming code in all the major programming languages.

Instance 3 proves that NSL Technology Re-translation Framework works for conversion to Python and C Program. To test this an ATM service solution was picked. The output of the NSL solution is the ability to allow users to fill out the deposit slip, validate the slip by the teller and verify the check.

The Common Logical tree of NSL-TRF extracts all the entities, attributes, change units, and relationship between change units (application logic) from NSL node by node and writes code in programming languages using the tile-based structure by performing a series of steps like adding configuration parameters, creating a variable and datatype list, and creating a dictionary.

FIG. 109 is a diagram showing an example of a representation of an NSL Technology Re-translation Framework Methodology.

Instance 3 Step 1: Summary of NSL solution and the equivalent Python and C Programs:

The NSL solution consists of 3 Change Units and 8 entities.

The same solution is converted to 21 lines of code in Python Program.

The same solution is converted to 33 lines of code in C Program.

FIG. 110 is a diagram showing an example of a representation of an NSL Solution and the equivalent Python and C Programs with inputs and outputs.

Instance 3 Step 2: The NSL Technology Re-translation Framework-Methodologies used: The Technology Re-translation Framework of NSL uses a compilation of Keywords, Operators, and Symbols from traditional commonly used programming languages and their NSL equivalents.

Instance 3 Step 3: NSL-TRF uses common logical tree to extract entities and their relationships. The code generator generates the code in the programming languages selected.

FIG. 111 is a diagram showing an example of output generated by common logical tree FIG. 112 is a diagram showing an example of code generation from NSL to Programming languages.

NSL Terminologies Relating to Figures

Solution Design: FIGS. 107A-107C are figures showing examples of representations of the Solution design.

Figure 2:
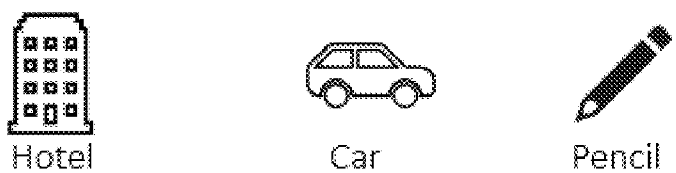
FIG. 2 represents an example that anything distinct is an entity.

Entities: FIG. 97A represents sample entities. FIG. 2 also represents that anything distinct is an entity.

Figure 3:
FIG. 3 is an example of differentiated entities where pen and paper are distinct and different entities.

Differentiated entities: FIG. 97A represents differentiated entities. FIG. 3 represents differentiated entities where pen and paper are distinct and different entities.

Un-differentiated entities: FIG. 4 represents undifferentiated entities where two pens are distinct yet same-as-other entity.

WWW Principles: Self-explanatory.

Potential Entities vs Non-Potential Entities: FIG. 97A represents potential entity "Hotel Room".

Figure 1:
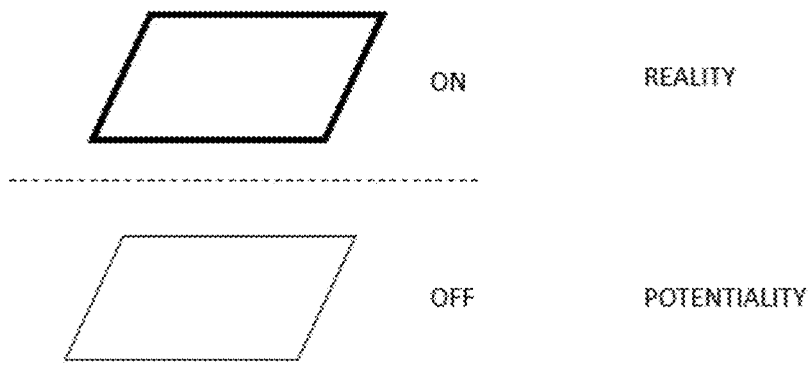
FIG. 1 is an example of the potentiality and reality of states.

Potential-Entity-States: FIG. 1 and FIG. 98A represent Potential-Entity-States.

Real-Entity-States: FIG. 1 and FIG. 98C represents Real-Entity-States.

Solution Ecosystem: FIG. 6 represents Solution Eco system.

Figure 8:
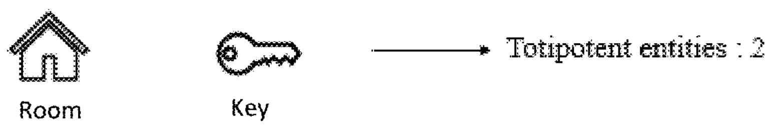
FIG. 8 is an example of Totipotent Entities, at highest generalization level.

Totipotent Entities: FIG. 8 represents Totipotent Entities.

Figure 9:
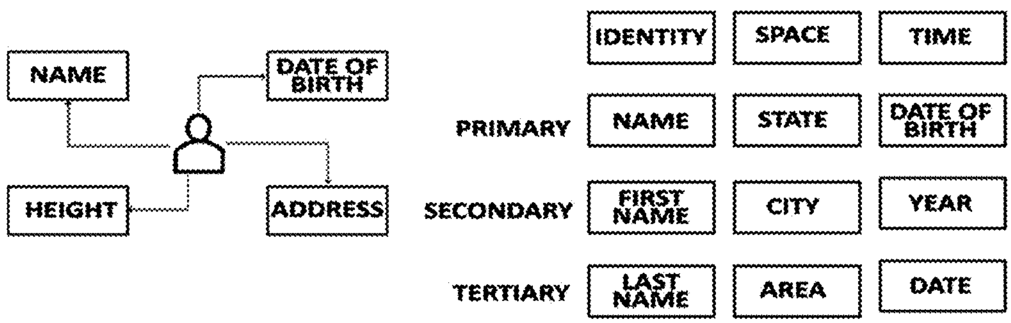
FIG. 9 is an example of an Independent Entity that drags its attributes along with it.

Independent Entities: FIG. 97A depicts "Hotel room" which is an independent entity. FIG. 9 also represents Independent Entities that drag its attributes along with it.

Figure 10:
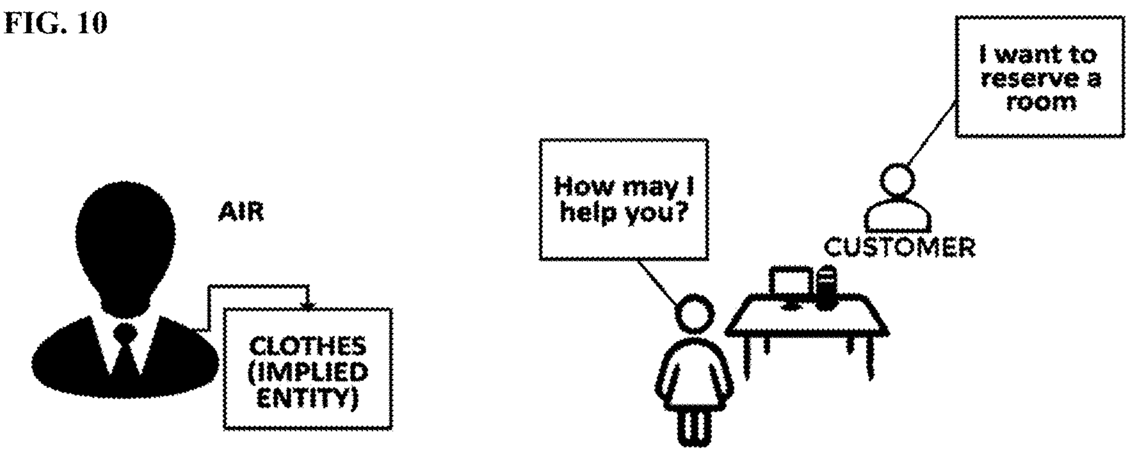
FIG. 10 is an example of Implied Entities.

Implied Entities: In FIG. 97B, Machine agent is an implied entity. FIG. 10 represents Implied Entities.

Figure 11:
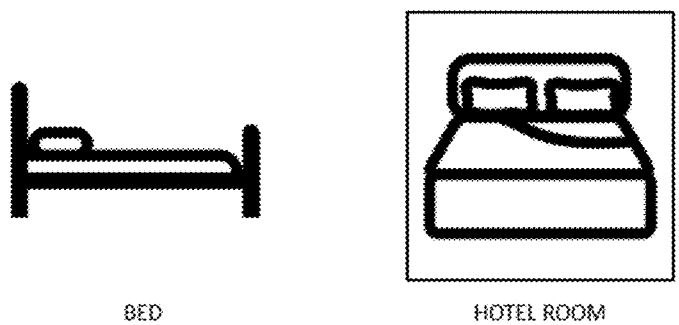
FIG. 11 is an example of Frozen Entities where the solution designers consider them to be only in a binary state of potentiality or reality.

Frozen Entities: In FIG. 97A Hotel room is a frozen entity. FIG. 11 represents Frozen entities where the solution designers consider them to be only in a binary state of potentiality or reality.

Figure 12:
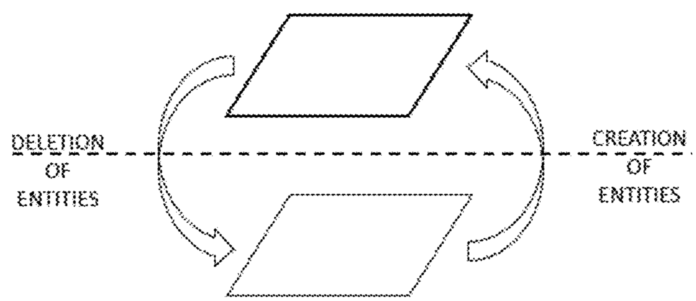
FIG. 12 is an example of creation and deletion of entities.

Deletion of Entities: FIG. 12 represents deletion of entities

Creation of Entities: FIG. 97A depicts the creation of entity "Hotel Room". FIG. 12 also represents creation of entities.

Figure 13:
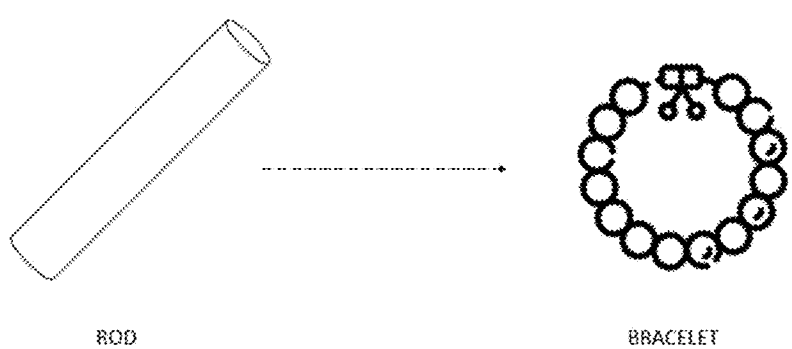
FIG. 13 is an example of modification of entities.

Modification of Entities: FIG. 13 represents modification of entities.

Figure 14:
FIG. 14 represents the dependency of attributes on some other entity for its existence.

Attributes: FIG. 97A depicts the addition of attributes to the entity "Hotel Room". FIG. 14 also represents the dependency of attributes on some other entity for its existence.

Figure 15:
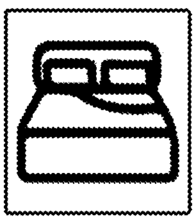
FIG. 15 is an example of the essential attributes that are always present with reference to entities.

Essential Attributes: FIG. 15 represents the essential attributes that are always present with reference to entities.

Figure 16:
FIG. 16 is an example of the standardization of attributes based on the solution environment.

Standard Attributes: FIG. 16 represents the standardization of attributes based on the solution environment.

General Attributes: FIG. 17 represents the general attributes that are selected for use based the circumstances in which an entity is placed within a solution environment.

Levels of Attributes: FIG. 18 represents the levels of attributes.

Real Entities: FIG. 19 represents the Real entities that exist physically in nature. FIG. 97A also represents the real entity "Hotel Room".

Figure 20:
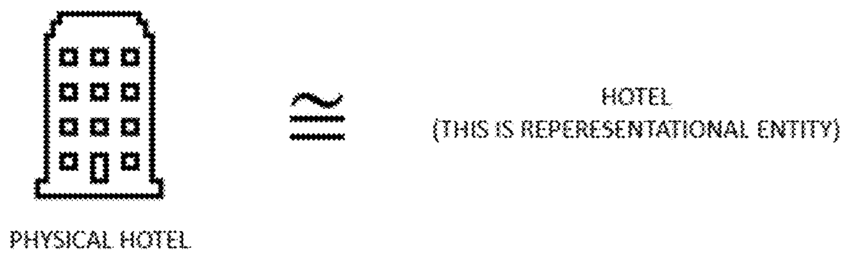
FIG. 20 is an example of the entities that represent other real entities or other representational entities.

Representational Entities: FIG. 20 represents the entities that represent other real entities or other representational entities.

Figure 21:
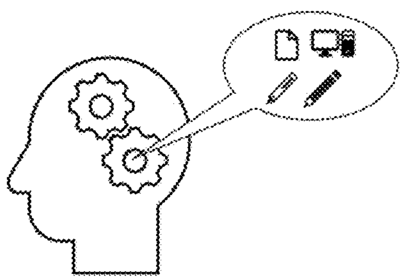
FIG. 21 is an example of the entities that are created by human agents naturally in their own brains in the form of given neuronal states.

Perceptual Entities: FIG. 21 represents the entities that are created by human agents naturally in their own brains in the form of given neuronal states.

Figure 22:
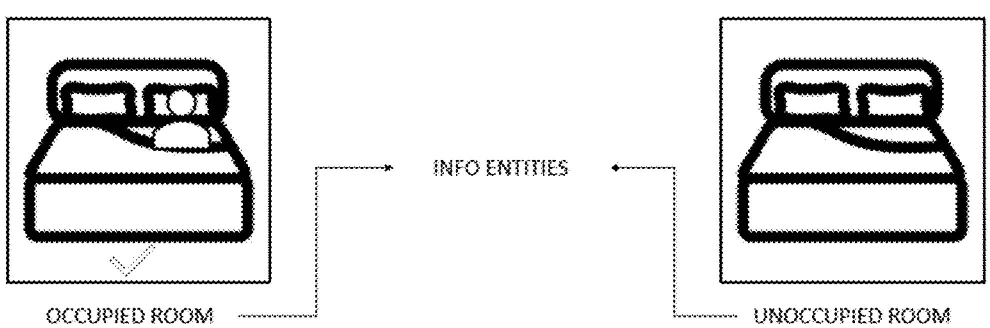
FIG. 22 is an example of the informational entities.

Informational Entities: FIG. 22 represents the informational entities.

Truth Values: FIG. 23 represents the understanding on truth values.

Info content—Real vs Representational: FIG. 20 represents the entities that represent other real entities or other representational entities.

Physical Reality: FIG. 97A "Hotel Room" is an entity which exists in Physical Reality. FIG. 24 also represents that all the entities exist physically in the physical world.

Change Units: a) Local Statement of Intent: FIG. 98A contains LSI's and GSI. FIG. 25 represents the local statements of intent and global statement of intent. b) Global Statement of Intent: FIG. 98A contains LSI's and GSI. FIG. 25 represents the local statements of intent and global statement of intent.

Figure 26:
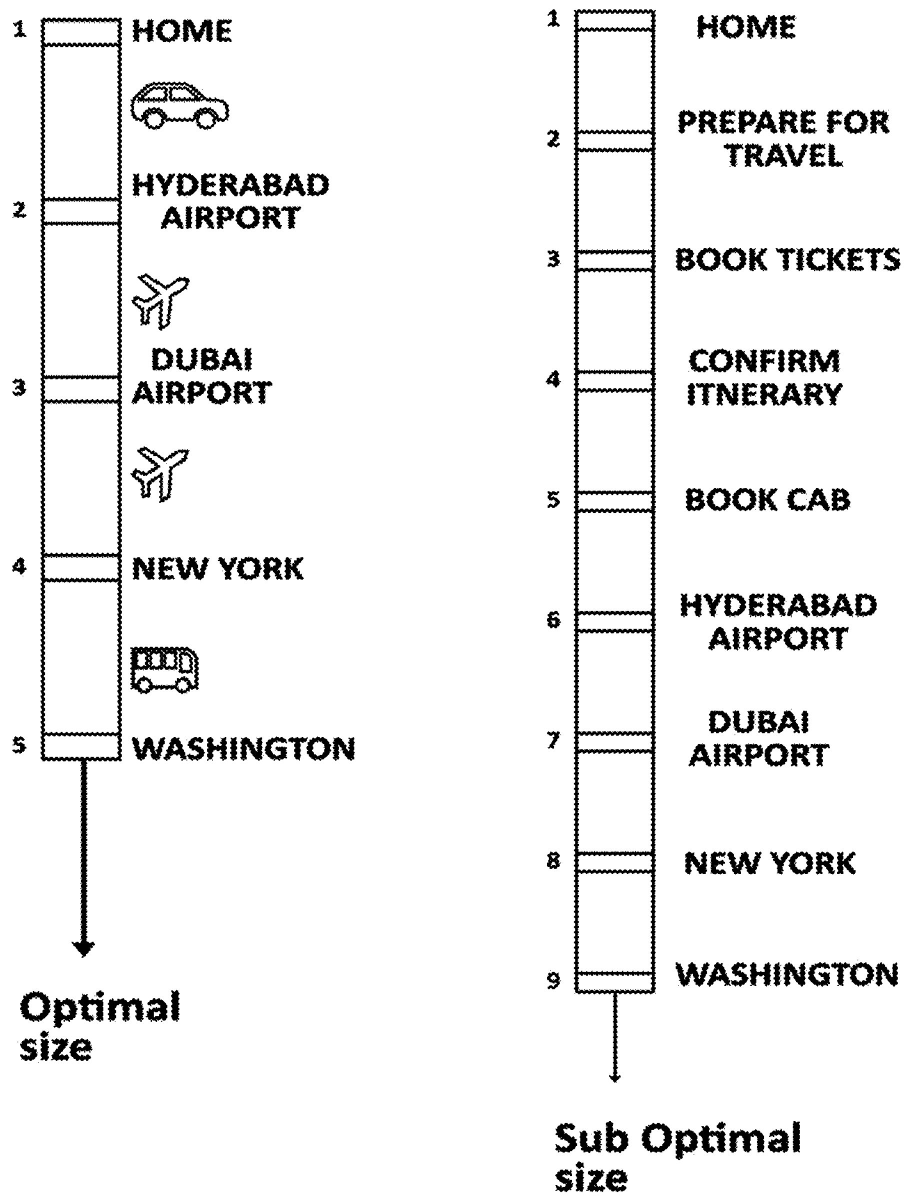
FIG. 26 is an example of the size of change units.

Size of Change Units: FIG. 26 represents the size of change units.

Figure 27:
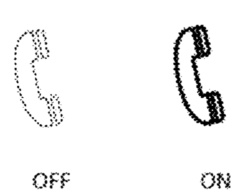
FIG. 27 is an example of the binary states of entities.
Figure 28:
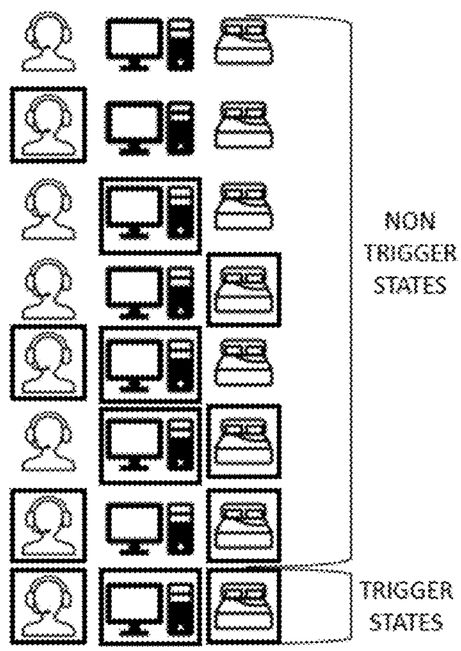
FIG. 28 is an example of variability.
Figure 29:
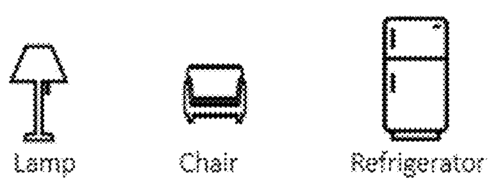
FIG. 29 is an example of the entities whose states will always remain the same.

Events: a) Binary states: FIG. 99A represents each entity in potentiality state. FIG. 27 represents the binary states of entities. b) Variability: FIG. 28 represents variability. c) Constants: FIG. 29 represents the entities whose states will always remain the same.

Figure 30:
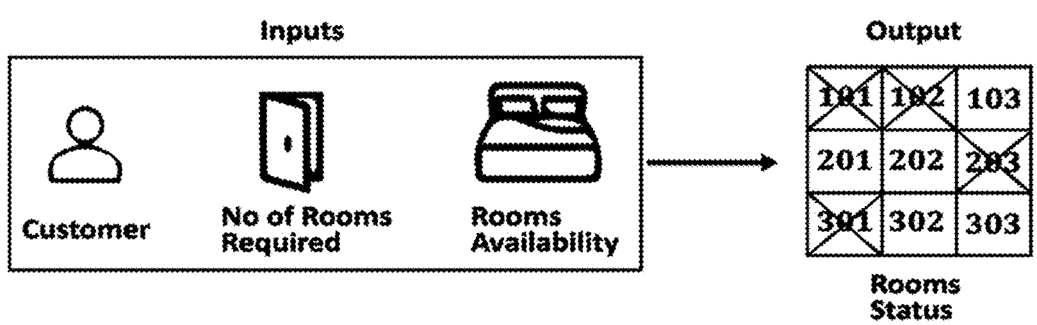
FIG. 30 is an example of the inputs and outputs.

Inputs: FIG. 99B represents inputs and outputs in a solution. FIG. 30 represents the inputs and outputs.

Outputs: FIG. 99B represents inputs and outputs in a solution. FIG. 30 represents the inputs and outputs.

Lapse Times: FIG. 60 represents lapse times.

Figure 67:
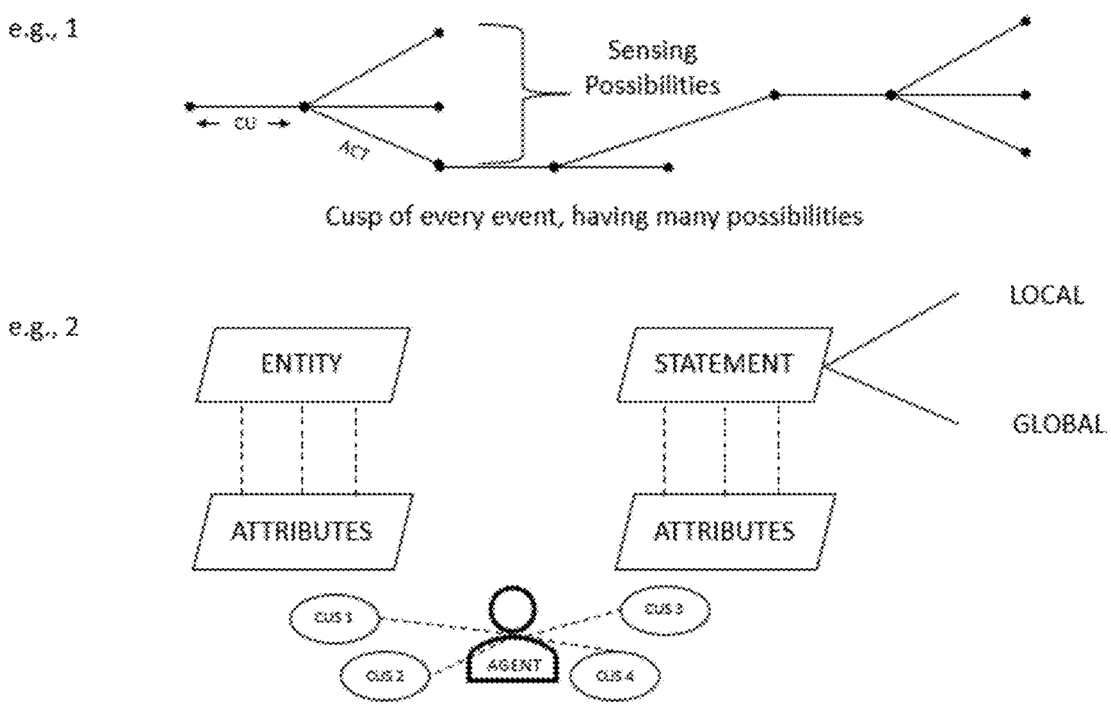
FIG. 67 is an example of Full Life Cycle of a Solution.

Full Life cycle of a solution: FIG. 67 represents Full Life Cycle of a Solution.

Natural Language: FIG. 31 represents the way natural language works.

Code vs Natural Language: FIG. 58 represents the difference between code and natural language.

Natural Solution Language) a) Static Statements of Intent: FIG. 99A represents the statement of intent in static state. FIG. 32 also represents the static statements of intent which only express the intent but lack the ability to transform them into reality. b) Dynamic Statements of Intent: FIG. 99C is a diagram showing an example of a representation of a statement of intent in a Dynamic state. FIG. 33 also represents the dynamic statements of intent which are the underlying transformation causing entities.

Meaning vs Value: FIG. 59 represents the difference between meaning and value.

Figure 61:
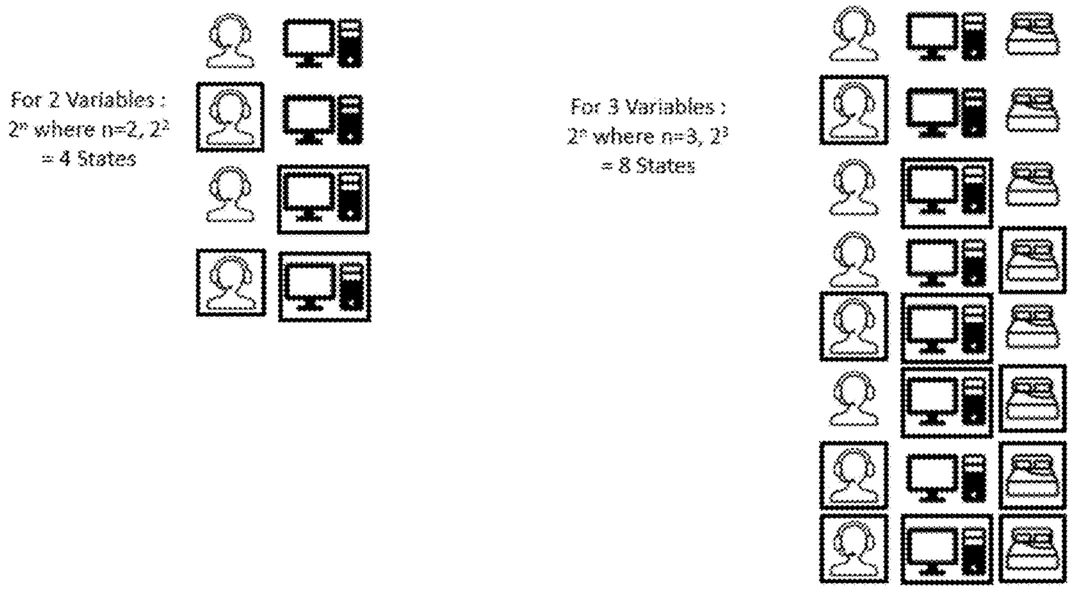
FIG. 61 is an example of Quantification of value.

Quantification of value: FIG. 61 represents Quantification of value.

Figure 62:
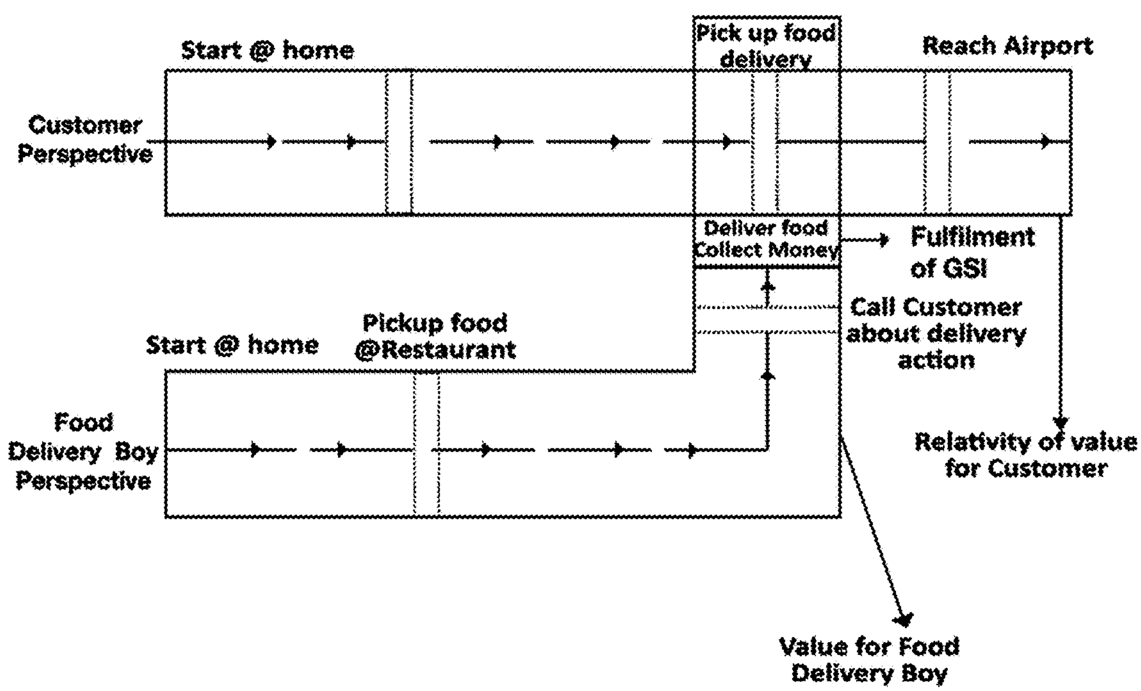
FIG. 62 is an example of Relativity of value.

Relativity of value: FIG. 62 represents Relativity of value.

Figure 52:
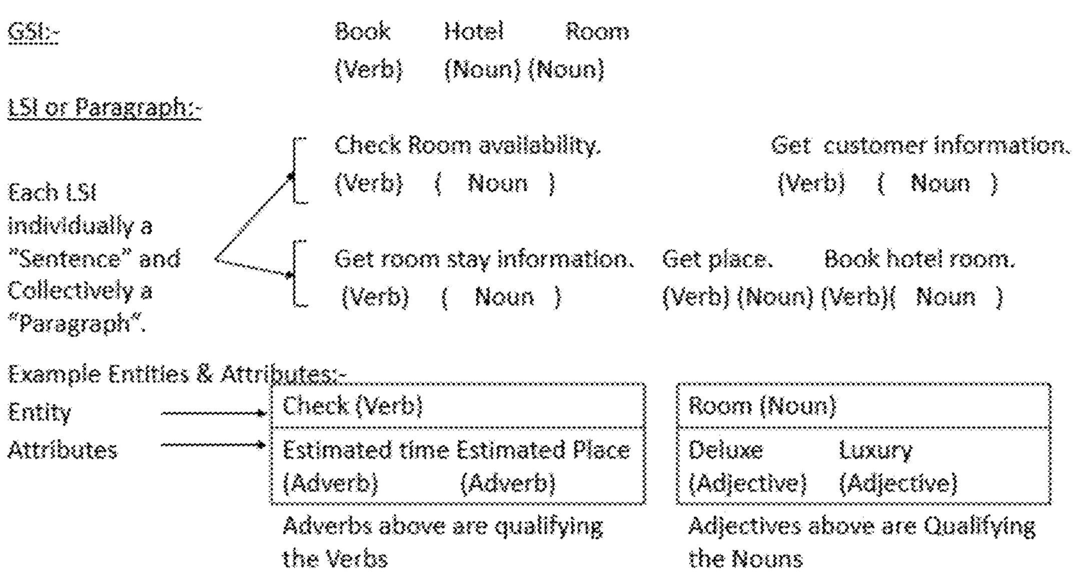
FIG. 52 is an example of the commonality between natural language and natural solutions language (NSL).

Commonality between Natural language and NSL: FIG. 52 represents the commonality between natural language and natural solutions language (NSL).

Figure 63:
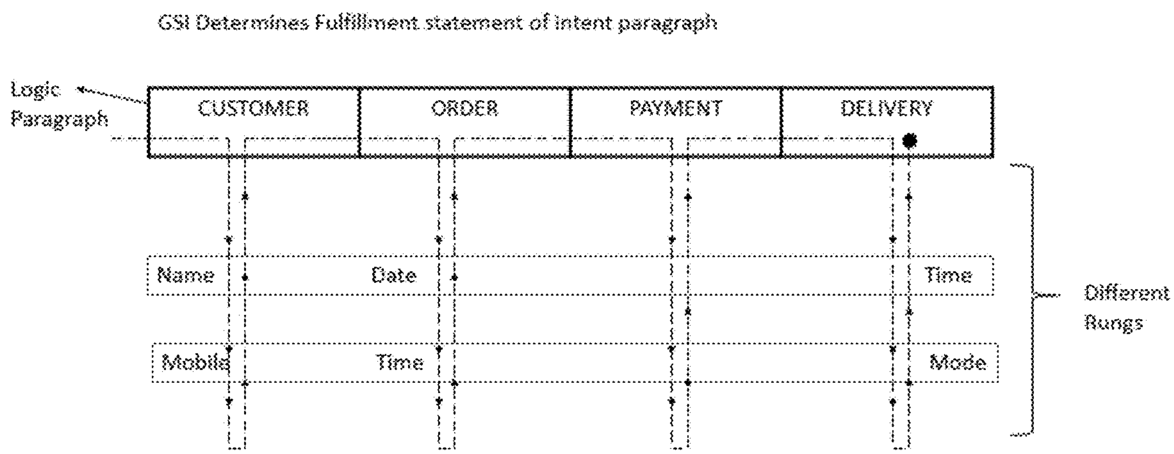
FIG. 63 is an example of Paragraphs of Logic.

Paragraphs of Logic: FIG. 63 represents Paragraphs of Logic.

Figure 55:
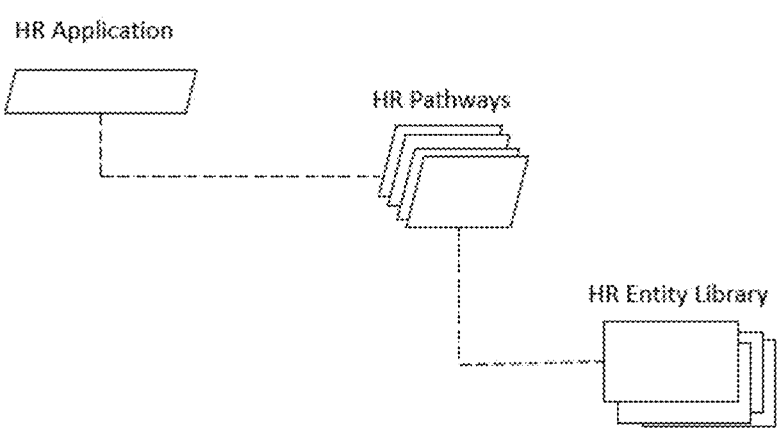
FIG. 55 is an example of NSL libraries.

NSL Libraries: FIG. 55 represents NSL libraries.

Figure 53:
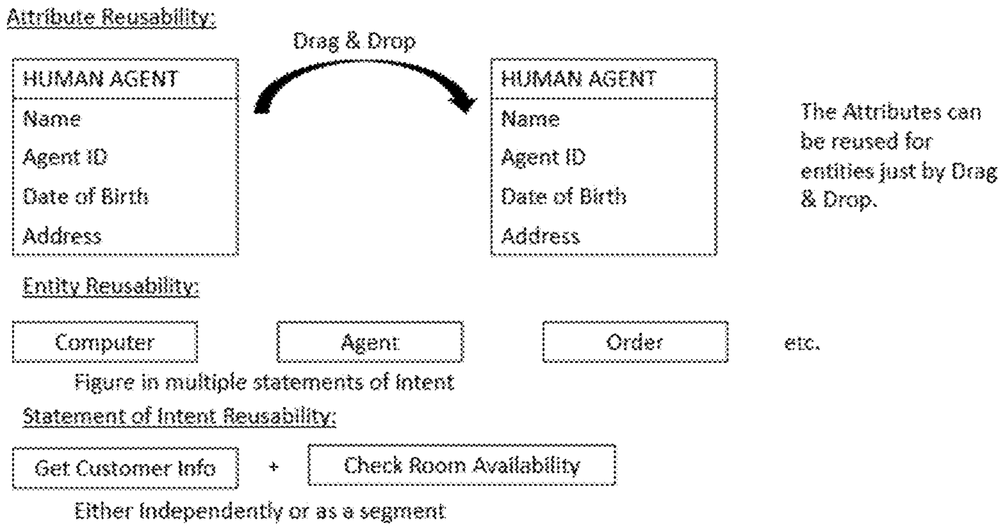
FIG. 53 is an example of reusability of components.

Reusable components: FIG. 97A represents Hotel Room and its attributes which are reusable components. FIG. 53 also represents of reusability of components.

Figure 34:
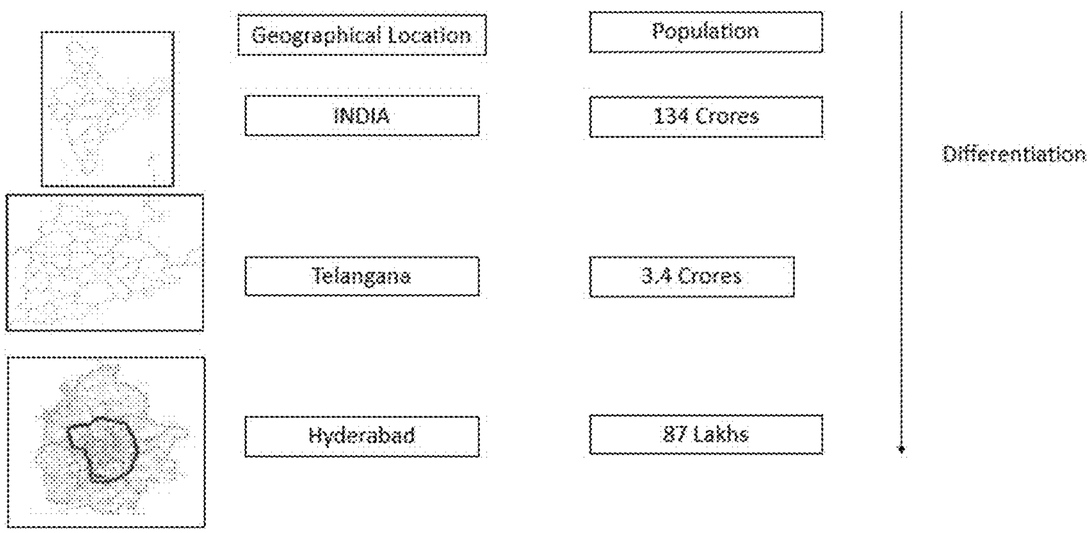
FIG. 34 is an example of the differentiation principles.

The differentiation principles: FIG. 34 represents the differentiation principles.

Figure 35:
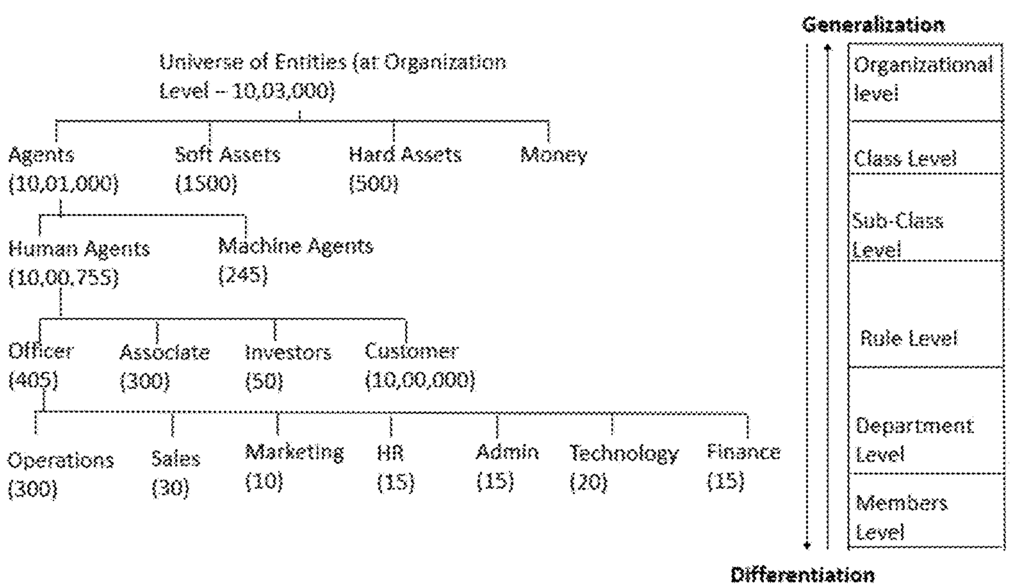
FIG. 35 is an example of vantage points.

Vantage points: FIG. 35 represents vantage points.

Figure 36:
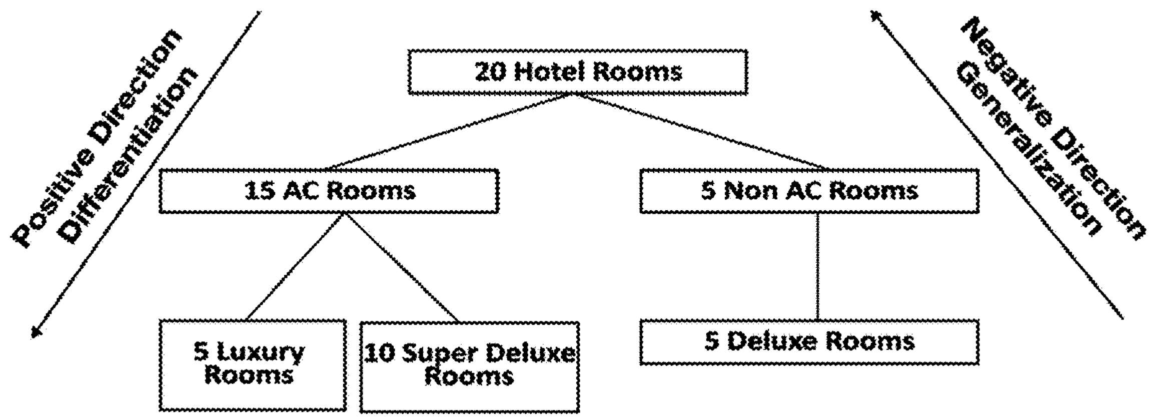
FIG. 36 is an example of directionality in the context of moving up or down the differentiation tree.

Directionality: FIG. 36 represents directionality in the context of moving up or down the differentiation tree.

Figure 37:
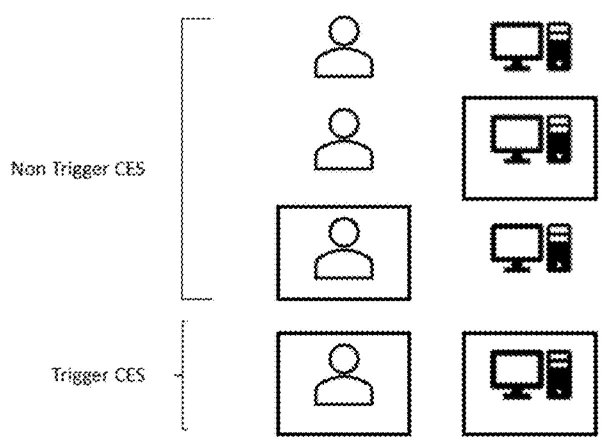
FIG. 37 is an example of the non-trigger and trigger combinatorial-Entity-states (CES).

Combinatorial entity states: FIG. 99B represents the trigger combinatorial entity states where, when an event arrives, the trigger happens. FIG. 37 also represents the non-trigger and trigger combinatorial-Entity-states (CES).

Figure 65:
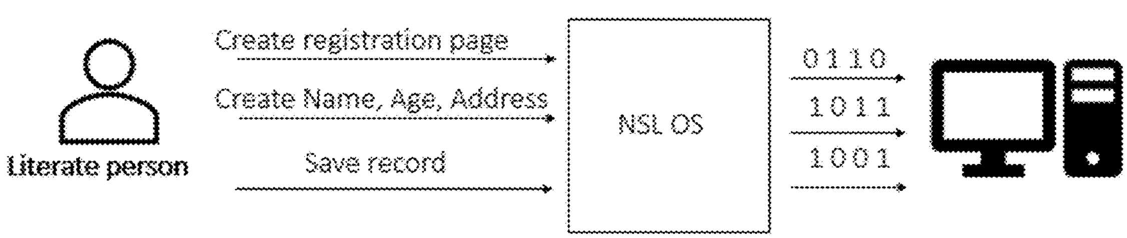
FIG. 65 is an example of the difference between APIs and Programs.

APIs vs Programs: FIG. 65 represents the difference between APIs and Programs.

Figure 38:
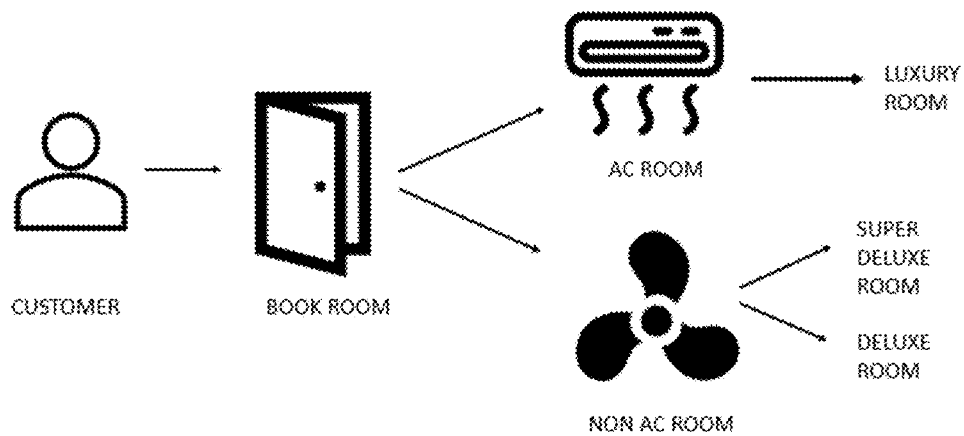
FIG. 38 is an example of constraints which are nothing, but the restrictions placed on choices being made between many possibilities.
Figure 39:
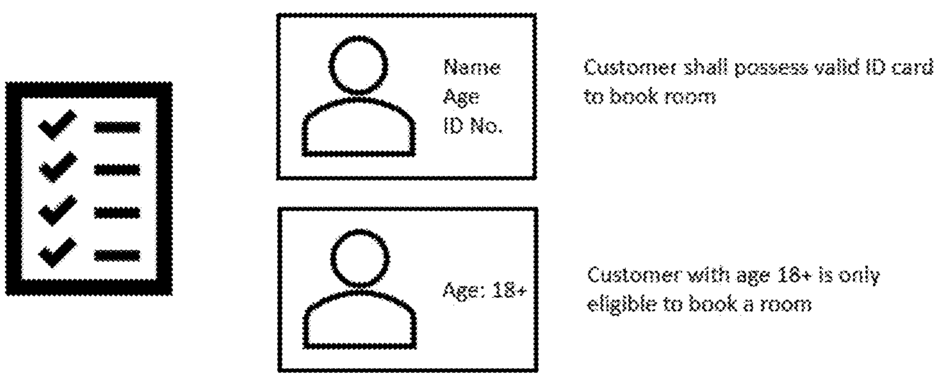
FIG. 39 is an example of rules which are most often a series of constraints placed on the system.
Figure 40:
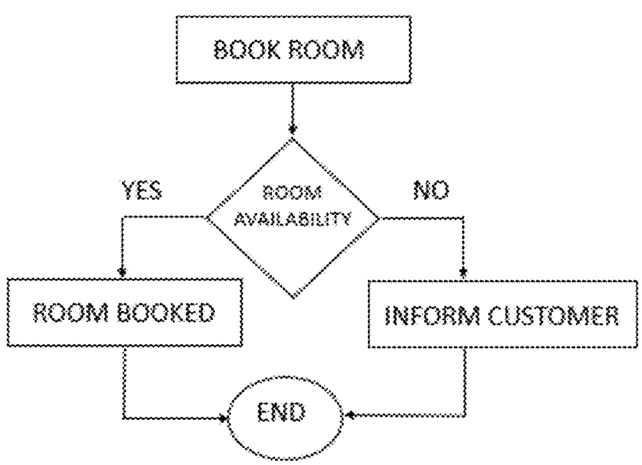
FIG. 40 is an example of algorithms which are the same as rules but often used in the context of information systems.
Figure 56:
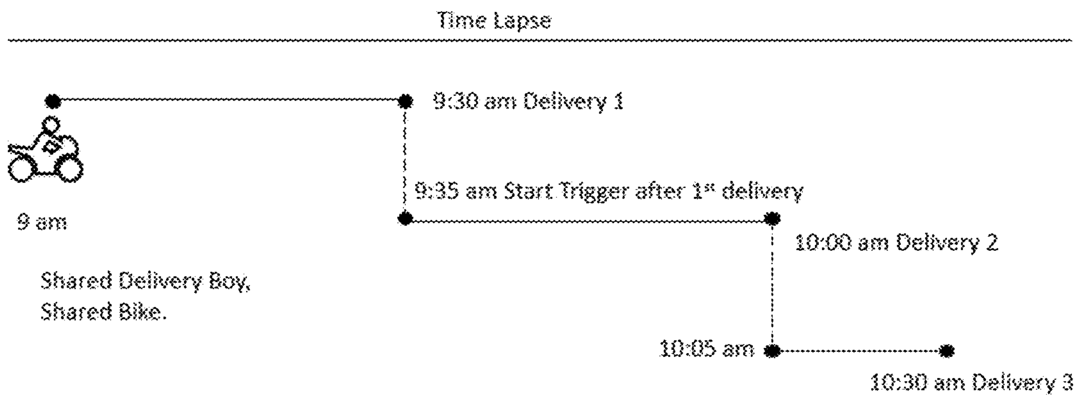
FIG. 56 is an example of shared entities.

Shared Entities: FIG. 56 represents shared entities: Pathways of Change: a) Constraints: FIG. 97A, the room occupancy has only 2 states which is a constraint placed in the system. FIG. 38 also represents constraints which are nothing, but the restrictions placed on choices being made between many possibilities. b) Rules: FIG. 97B states the rule for computing the room fare. FIG. 39 also represents rules which are most often a series of constraints placed on the system. c) Algorithms: FIG. 40 represents algorithms which are the same as rules but are often used in the context of information systems.

Converting a process into Information: FIG. 103 represents how process is converted into information.

Figure 66:
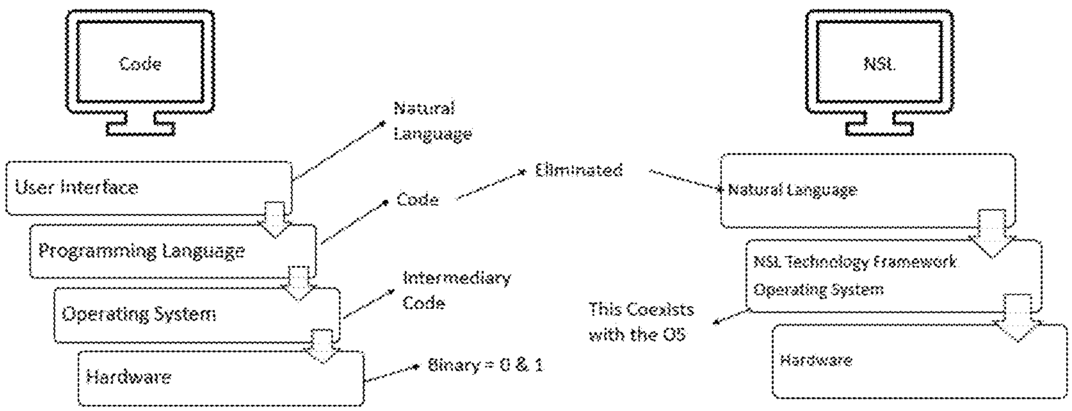
FIG. 66 is an example of the understanding on levels of abstraction in IT.

Levels of Abstraction in IT: FIG. 66 represents the understanding on levels of abstraction in IT.

Agents can include Human Agents, Machine Agents, and Mother Nature.

Human Agents: FIG. 41 represents the human agents (for example: a) Value Creators: FIG. 42 represents the value creators and consumers. b) Value Consumers c) Teams d) Ownership: FIG. 43 represents the ownership of entities with respect to agents. e) Agent Functions: FIG. 44 represents mind function, physical function, and information function.)

Figure 47:
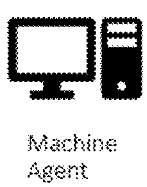
FIG. 47 is an example of the machine agents.

Machine Agents: FIG. 47 represents the machine agents.

Figure 48:
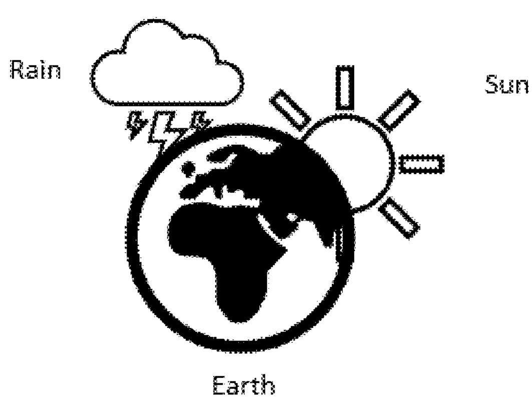
FIG. 48 is an example of Mother Nature which is the third kind of agent capable of influencing transformations.

Mother Nature: FIG. 48 represents Mother Nature which is the third kind of agent that is capable of influencing transformations.

Figures 49, 50:
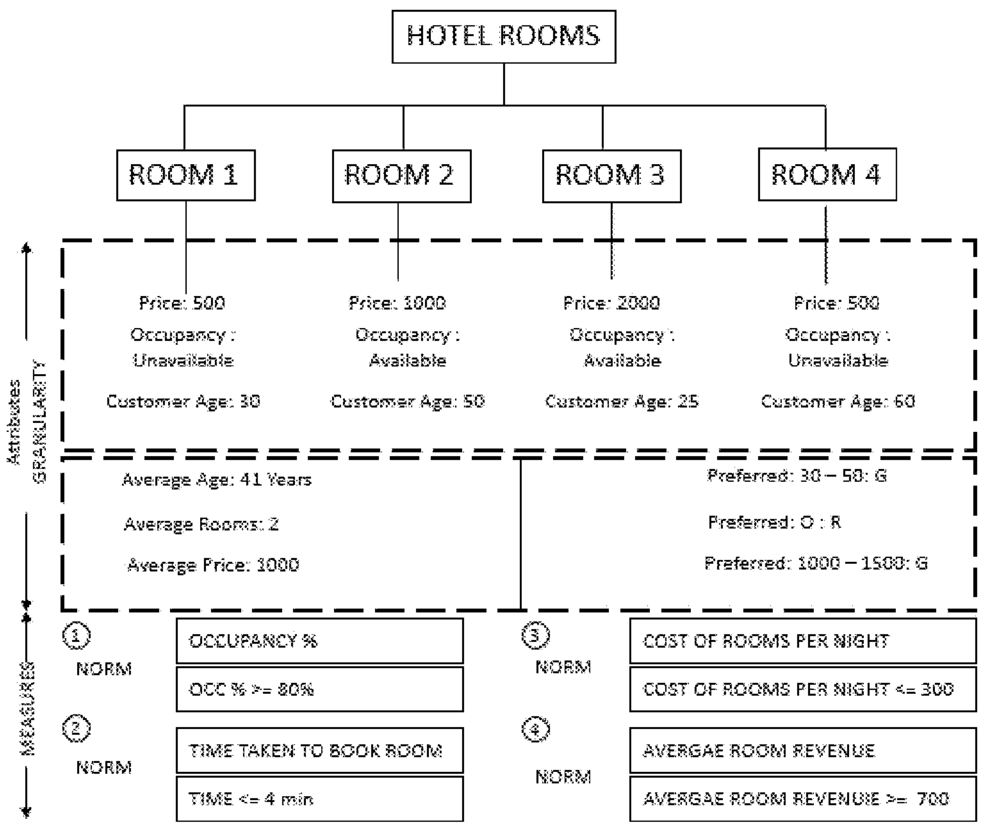
FIG. 49 is an example of adjudication system.
FIG. 50 is an example of measurement framework.

Adjudication System: FIG. 49 represents the adjudication system, wherein there are 2 paragraphs and the agent chooses which paragraph is required to fulfill the intent.

Figure 57:
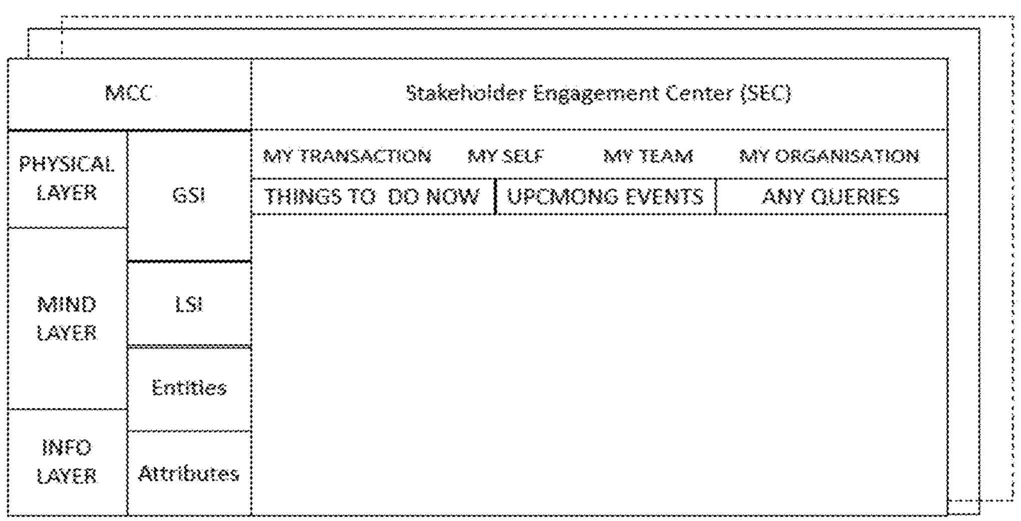
FIG. 57 is an example of Stakeholder Engagement Center (SEC).

Stakeholder Engagement Center: FIG. 57 represents Stakeholder Engagement Centre (SEC).

Measurement Framework: FIG. 50 represents measurement framework.

Figure 70:
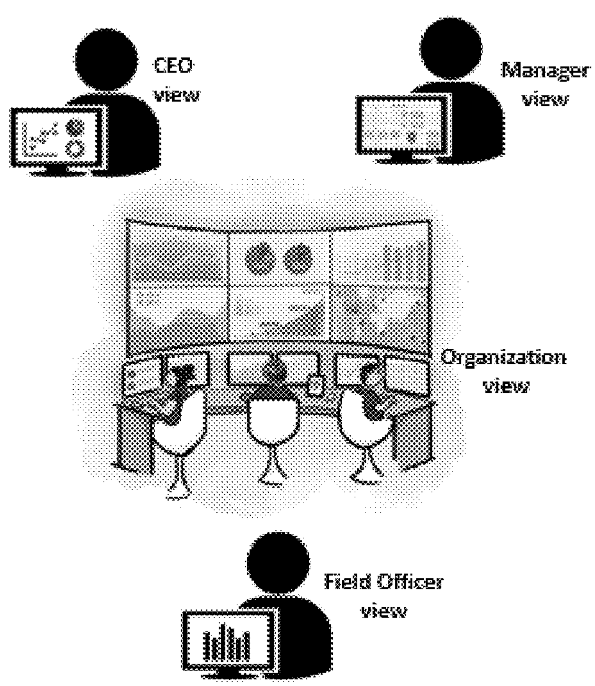
FIG. 70 is an example of the concept of Distributed Mission Control Center.

Distributed Mission Control Center: FIG. 70 represents Distributed Mission Control Center.

Figure 71:
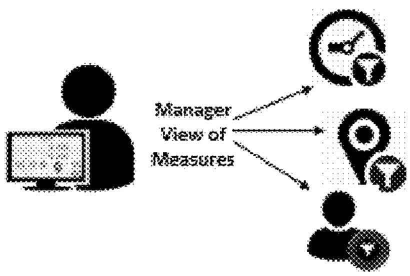
FIG. 71 is an example of Dynamic Mission Control Center.

Dynamic Mission Control Center: FIG. 71 represents Dynamic Mission Control Center.

Figure 51:
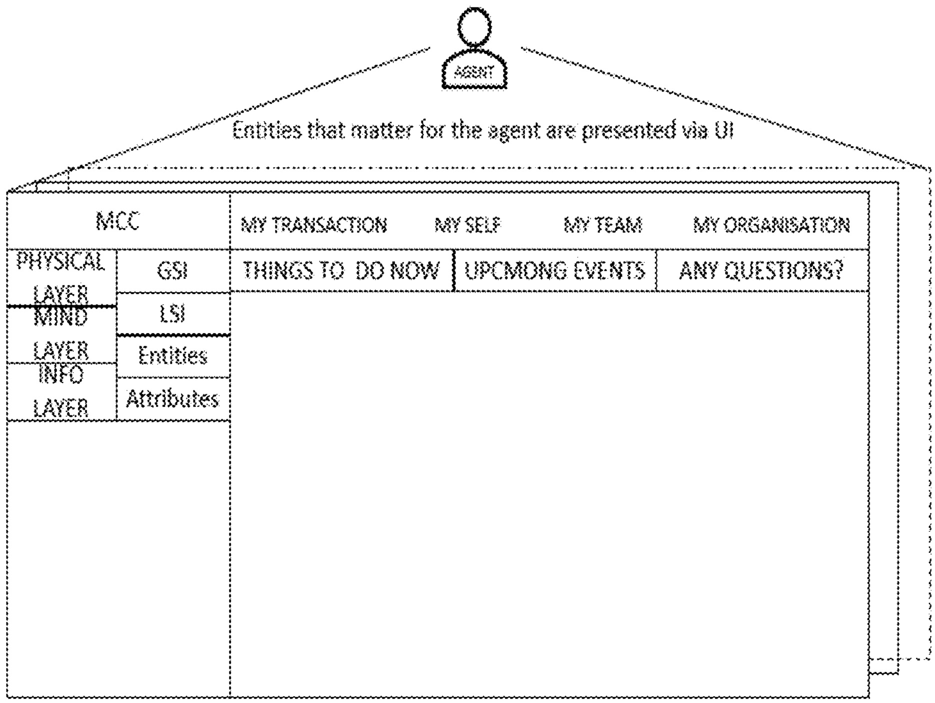
FIG. 51 is an example of the entities that pertain to agents.

User Interfaces: FIG. 51 represents the entities that pertain to agents presented through User Interfaces.

Figure 69:
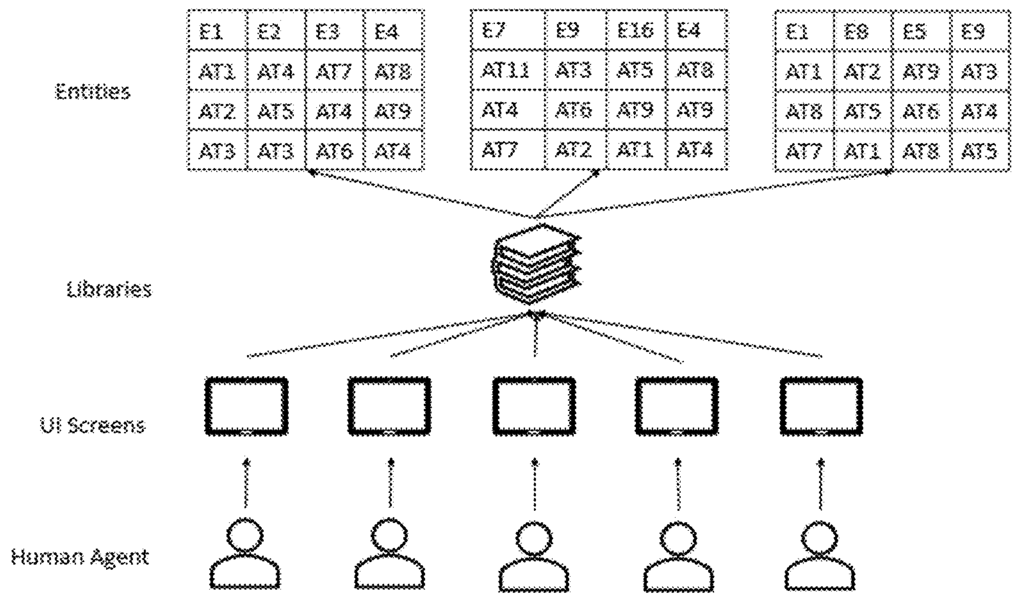
FIG. 69 is an example of the NSL Technology Framework.

NSL Technology Framework: FIG. 69 represents the NSL Technology Framework.

Figure 54:
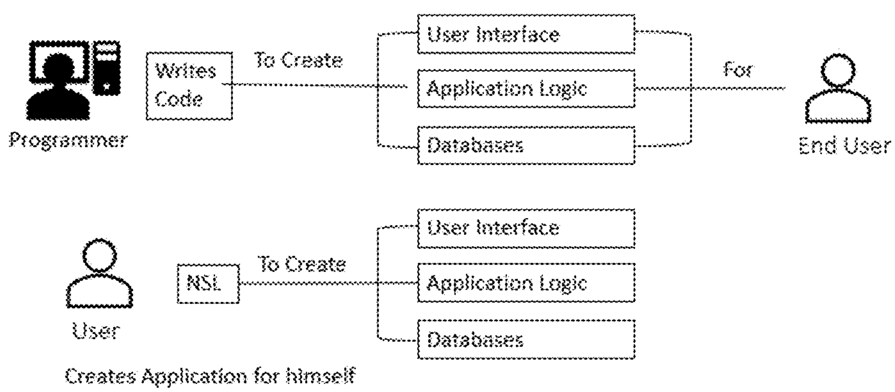
FIG. 54 is an example of re-engineering.

Reengineering: FIG. 54 represents re-engineering.

Figure 68:
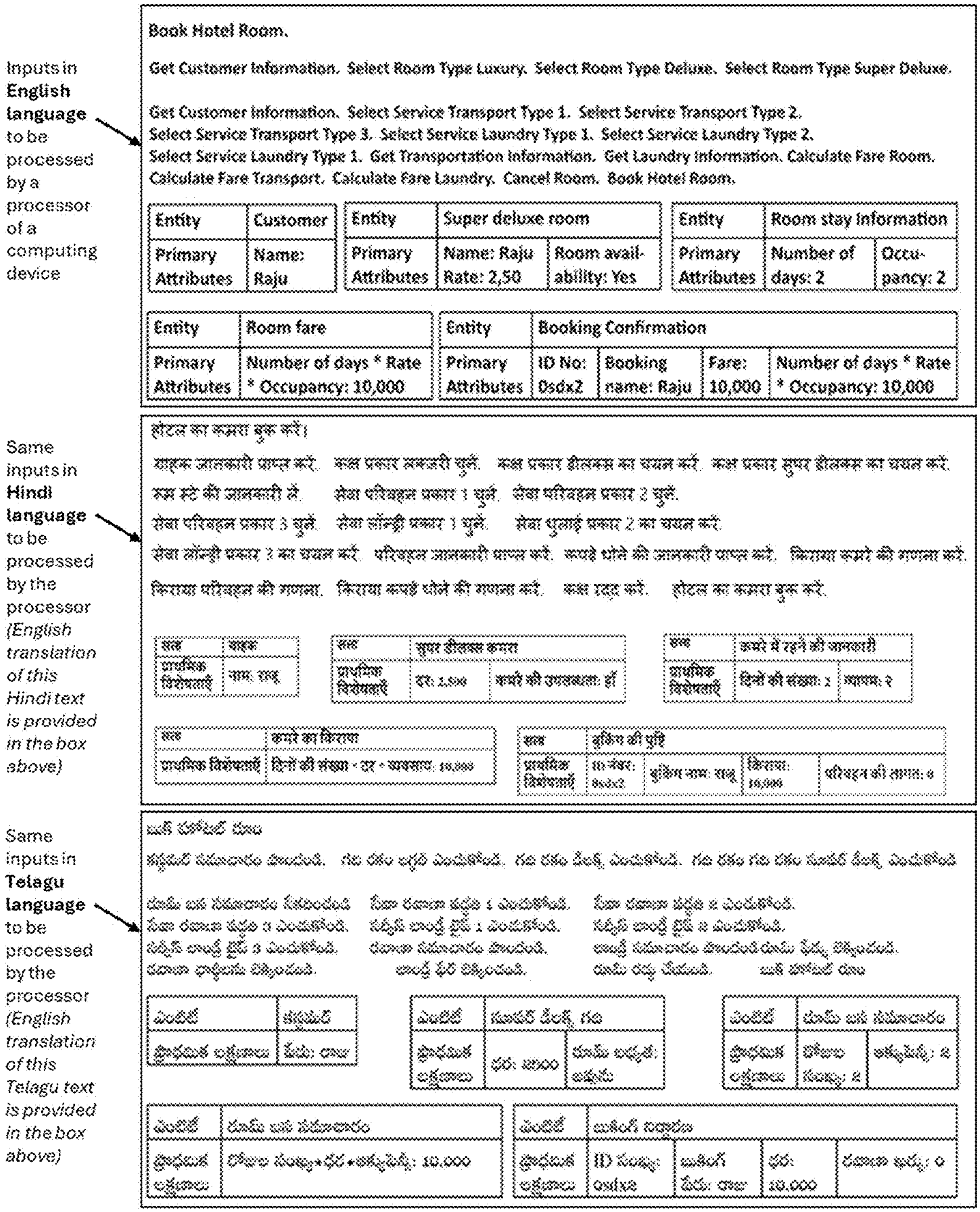
FIG. 68 is an example that NSL is language agnostic.

NSL Language Agnostic: FIG. 68 represents that NSL is language agnostic.

NSL and DNA: FIG. 73 represents that DNA is converted into information.

Figure 64:
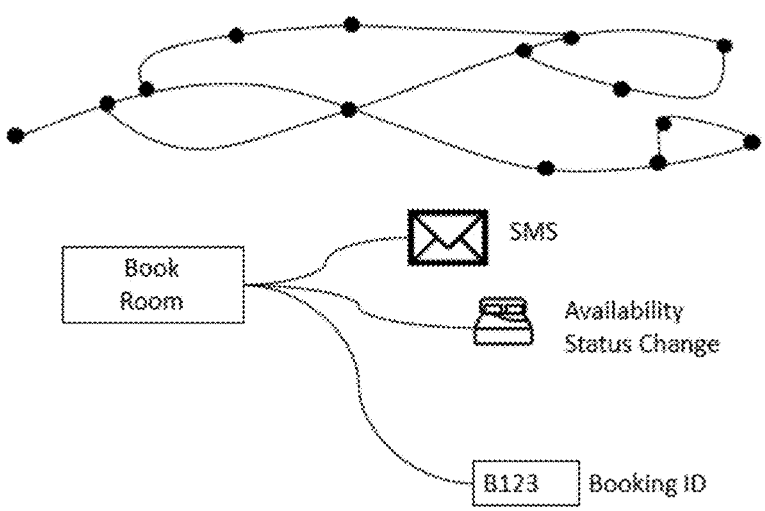
FIG. 64 is an example of Artificial Neural Networks.

Artificial Neural Networks: FIG. 64 represents Artificial Neural Networks.

Concepts of NSL Relating to Figures

Everything in the world can be explained in terms of entities and their relationships. (The same has been explained in greater detail with reference to FIG. 2 and FIG. 97A where the hotel room is related to Wi-Fi, rate, and room status as attributes.)

Any information technology solution design can also be done in an entity centric way. (The same has been explained in greater detail with reference to FIG. 2 and FIG. 97B where the hotel room fare calculation is expressed in an entity centric way by bringing together number of days, rate, and single/double occupancy as a combination.)

Anything distinct from an agent's perspective is an entity. (The same has been explained in greater detail with reference to FIG. 2 and FIGS. 97A and 97B where hotel room and room fare are two distinct entities.)

There are different types of entities. (The same has been explained in greater detail with reference to FIGS. 2, 3, and 4 and FIG. 99B where entities, attributes, change units, and pathways serve as different types of entities.)

All things qualify to be called entities whether they are hard or soft, tangible or intangible. (The same has been explained in greater detail with reference to FIG. 2 and FIGS. 97A and 97B where hotel room is a tangible hard asset whereas room fare is intangible soft asset.)

Entities can be unique (being different from others, differentiated) or they can be recurrent (same as others, undifferentiated). (The same has been explained in greater detail with reference to FIGS. 3 and 4 and FIG. 102D where recurrence is explained in the form of the number of rooms for a unique luxury room.)

Entities that exist independent of human agents are called 'real entities'. (The same has been explained in greater detail with reference to FIG. 19 and FIG. 97A where hotel room exists as a real entity (physically present).)

Entities that lack value on their own, but derive value on account of standing for other entities with respect to the solution, are called representational entities. (The same has been explained in greater detail with reference to FIG. 20 and FIG. 97B room fare is a representational entity.)

Representational entities are of two types: perceptual entities and informational entities. (The same has been explained in greater detail with reference to FIGS. 21 and 22 and FIG. 97B.)

Perceptual entities are those entities that are registered in the minds of human agents as perceived by senses or as processed by the mind. (The same has been explained in greater detail with reference to FIG. 21.)

Informational entities are those entities created by agents to represent any other entity: real, perceptual, or informational. (The same has been explained in greater detail with reference to FIG. 22 and FIG. 97B where hotel reservation has a global statement of intent acts as an informational entity.)

All entities can be represented by information-entities. (The same has been explained in greater detail with reference to FIG. 22 and FIG. 97B where hotel reservation has a global statement of intent acts as an informational entity.)

Data is also information, generally used in the context of less processed context. (The same has been depicted in FIG. 99B where rate for super deluxe room acts as data giving information about the fare.)

Unique entities can be represented by 'words' and recurrent entities by 'numbers.' (The same has been explained in greater detail with reference to FIG. 102D where unique entities are explained in the form of the word luxury—room and number: 3 represents recurrence.)

Information-entities carry truth-values with them. (The same has been explained in greater detail with reference to FIG. 23.)

All entities are physical irrespective of they being 'real, perceptual, or informational' entities; that is, they exist in space and time. (The same has been explained in greater detail with reference to FIG. 28 and FIG. 98A where the hotel room, which is a real entity, exists in space and time, and the attributes age: 60, sex: male, id proof: Aadhar number are informational entities which arrive in space and time.)

All entities dealt at the level of information technology (IT) are information-entities representing real-entities or other representational-entities. (The same has been explained in greater detail with reference to FIG. 22 and FIG. 98A where the hotel room which is a real entity exists in space and time, and the attribute age: 60 is tagged to the real entity with name Raju.)

Agents are also entities. (The same has been explained in greater detail with reference to FIG. 98A where customers act as agents.)

All change is caused by agents. (The same has been explained in greater detail with reference to FIG. 99A where entry of name, room type, occupancy, and number of rooms is done by the hotel reservation agent.)

There are three kinds of agents-Mother Nature, Human Agents, and machine agents. (The same has been explained in greater detail with reference to FIGS. 41, 47, and 48 and FIG. 99B room fare calculation and booking id are generated by a machine agent whereas room stay information, occupancy, and name of the customer are entered by a human agent.)

Human and machine agents are driven by purpose. They prefer some entity states, they avoid some entity states, and they are neutral to some entity states. (The same has been explained in greater detail with reference to FIG. 99B room fare calculation and booking id are generated by a machine agent whereas room stay information, occupancy, and name of the customer are entered by a human agent.)

On the contrary, there is no purpose behind changes caused by mother nature.

From hereafter, we shall be referring to agents only in the limited context of human agents and machine agents unless we otherwise refer to mother nature explicitly.

The word 'agent(s)' shall generally imply human and machine agents. (The same has been explained in greater detail with reference to FIG. 99B room fare calculation and booking id are generated by a machine agent whereas room stay information, occupancy, and name of the customer are entered by a human agent.)

Human agents and machine agents can alternatively be called the stakeholders and computers for convenience.

NSL is predicated upon what may be called differentiation principles. (The same has been explained in greater detail with reference to FIG. 34 and FIGS. 97A and 97B where hotel room and room fare get fully differentiated.)

Other things remaining the same, when a new entity is added to or created in the existing combinatorial entity state (CES), the new CES stands more differentiated. (The same has been explained in greater detail with reference to FIG. 107A where student gets more differentiated when we attach age, gender, and id number.)

Likewise, other things remaining the same, when an entity is deleted from an existing CES, the new CES stands less differentiated. (The same has been explained in greater detail with reference to FIG. 103 where a booked luxury room is fully differentiated when more information is attached in the form of name, type, rate, occupancy, number of days of stay, and booking id.)

Generally speaking, the more differentiated an entity is, the more information (quantified in bits) it consumes. If it is less differentiated, it consumes less information. (The same has been explained in greater detail with reference to FIG. 103 where a booked luxury room is fully differentiated when more information is attached in the form of name, type, rate, occupancy, number of days of stay, and booking id.)

In solution design, there is a hierarchy of differentiations that exist. (The same has been explained in greater detail with reference to FIG. 34 and FIG. 102B where booking confirmation has booking id attached in a hierarchical form which further has alphanumeric datatype attached (structural hierarchy).)

The differentiation tree begins at 'independent entities' potentially carrying with them a multitude of dependent entities call 'attributes' in one or more layers of differentiation. (The same has been explained in greater detail with reference to FIG. 34 and FIG. 102B where the independent entity booking confirmation has booking id as a dependent entity which further has alphanumeric datatype attached.)

Then, there are combinatorial entity states resulting from combinations of independent entities within the domain of local statements of intent (LSI), which is equivalent to sentences. (The same has been explained in greater detail with reference to FIG. 32 and FIGS. 98A and 98B where get customer information, select room type etc., are LSIs or sentences which exist in CES.)

LSI, in its static form, also counts as one of the independent entities, even though it expresses or describes a unit of change. (The same has been depicted in FIG. 98A where get customer information, select room type etc., exist in a static entity state.)

Attributes attached to each of the independent entities is equivalent to adjectives in a sentence. (The same has been explained in greater detail with reference to FIG. 14 and FIG. 98A where customer is an independent entity and age, sex, and id proof are adjectives.)

Attributes attached to each of the LSI are equivalent to an adverb in a sentence. (The same has been explained in greater detail with reference to FIG. 14.)

Among the combinatorial entity states, there are 2n−1 binary non-trigger CES, where 'n' is the number of independent entity and attribute states. (The same has been explained in greater detail with reference to FIG. 37.)

Only one of the CES counts as a trigger CES that is responsible for extending the hierarchy of CES, called the extended CES, resulting in a combination of LSIs. (The same has been explained with reference to FIG. 37.)

It also so happens that, in a trigger CES, all the independent entities and their attributes are in a state of reality. (The same has been explained in greater detail with reference to FIG. 37.)

Such collection of LSIs together leads to global statements of intent, which is equivalent of a paragraph. (The same has been explained in greater detail with reference to FIG. 32 and FIG. 95.)

Such hierarchy of differentiations can get extended to paragraphs within paragraphs in theory. (The same has been explained in greater detail with reference to FIG. 34 and FIG. 95.)

The principles guiding the formation of differentiations equivalent to an NSL grammar has many similarities to grammar in natural language. (The same has been explained in greater detail with reference to FIG. 34 and FIG. 95.)

The differentiation principles owe their origin to principles as contained in set theory, calculus, biological systems, and many other scientific principles. (The same has been explained in greater detail with reference to FIG. 34.)

The most un-differentiated or generalized form of an entity can be called the totipotent entity. (The same has been explained in greater detail with reference to FIG. 8.)

If there are a given number differentiated entities in the solution ecosystem; the differentiating values of those are ignored; and only their existence is recognized, then what remains is only the differentiated form. (The same has been explained in greater detail with reference to FIG. 34.)

This can be illustrated by the following.

If there are five states, A, AB, ABC, ABCD, and ABCDE. If the value of 'E' in state ABCDE is ignored, it becomes equated with the previous state ABCD.

If the value of 'D' in the fourth state is also ignored, then it becomes equated with ABC, and there are three ABCs in the system.

If we go all the way up to A, and everything else is recognized for its existence but ignored for its value, then there will be only five 'A' left in the system without any differentiations attached with them. (The same has been explained in greater detail with reference to FIG. 34.)

If 'A' is recognized just as an entity, devoid of any other differentiations such as being a person or a car or a car having a color, so on and so forth, such most generalized form leaves only an entity count without any differentiations. (The same has been explained in greater detail with reference to FIG. 34.)

In solution design, any addition to a CES is the same as constraints leading to differentiating solution pathways. (The same has been explained in greater detail with reference to FIG. 102F where availability of room as a constraint leads to either booking room or not reserving a room.)

If there are a multitude of such successive or related additions or constraints, these are same as what are referred to as rules in the traditional solution building.

An algorithm is a rule as implemented by a machine agent. (The same has been explained in greater detail with reference to FIG. 40 and FIG. 102D where room rate 500 and Wi-Fi is not available, and status is unavailable is set to every luxury room by a machine agent by default as an algorithm.)

While the user interfaces and solution architecture takes the levels of differentiation to the lowest level of independent entities and attributes, the fundamentals of information technology extend these levels of abstractions to alphabets, numbers, and symbols, and then to binary digits 0s and 1s, and all the way down to electromagnetic forces in the transistors or storages devices. (The same has been explained with reference to FIG. 66.)

There are free standing independent entities. (The same has been explained in greater detail with reference to FIG. 9.)

Independent entities are free standing to the extent that events can happen at their level or at the level of their attributes causing alteration in the combinatorial-entity-states (CES) that they are part of. (The same has been explained in greater detail with reference to FIG. 9 and FIGS. 98A and 98B where customer entities age, sex, and id proof are causing alteration in get customer information change unit.)

Attributes are entities that are dependent on independent entities. (The same has been explained in greater detail with reference to FIG. 14 and FIG. 97A where room rate, Wi-Fi, and room status are dependent on hotel room which is an independent entity.)

In other words, attributes owe their existence to independent entities and cannot exist without them. (The same has been explained with reference to FIG. 14 and FIG. 97A where room rate, Wi-Fi, and room status are dependent on hotel room which is an independent entity. If a hotel room is deleted then Wi-Fi and status automatically do not exist)

However, events can happen at their level independently modifying the state of the independent entities and CES.

There can be many levels of attributes. (The same has been explained in greater detail with reference to FIG. 18 and FIG. 102D where there are two levels of attributes for room type entity.)

Each independent entity is highly differentiated as it is composed of trillions of particles, and already carries with it a huge amount of information (information being nothing but that which represents differentiations in entities). (The same has been explained in greater detail with reference to FIG. 9 and FIG. 97A where the hotel room is the independent entity which is fully differentiated with rate, Wi-Fi, and room status as attributes.)

Independent entities shall be viewed as entities in a frozen state meaning that they exist in binary states of potentiality or reality.

Independent entities do not lend themselves to being modified even when they do carry with them huge number of particles or information.

Every CES is in a binary state of potentiality or reality, ready to change its state based on the dictates of events. (The same has been explained in greater detail with reference to FIG. 27 and FIGS. 98A and 98B where book a hotel room as a GSI CES exists in static and dynamic form.)

When entities combine, combinatorial-entity-states (CES) are created. (The same has been explained in greater detail with reference to FIG. 37.)

CES are even more differentiated as they are combinations of already highly differentiated independent entities. (The same has been explained in greater detail with reference to FIG. 37.)

Every CES is a binary state. (The same has been explained in greater detail with reference to FIG. 27.)

In information technology, all states are digitally representable.

Within a system, if a CES is permanently in a state of reality or in a state of potentiality, it is called a constant. (The same has been explained in greater detail with reference to FIG. 29 and FIG. 99B where the room rate has a fixed value.)

If a CES can oscillate between a state of potentiality or reality, it is called a variable state. (The same has been explained in greater detail with reference to FIG. 28 and FIG. 99B where the room availability and customer are variables.)

When a CES moves from potentiality to reality, it is seen as being created. (The same has been explained in greater detail with reference to FIG. 12.)

When a CES moves from reality to potentiality, it is seen as being deleted. (The same has been explained in greater detail with reference to FIG. 12.)

When a CES's sub-states undergo changes between potentiality and reality states, it is seen as being modified. (The same has been explained in greater detail with reference to FIG. 13.)

At higher CES vantage points, where all its sub-states can influence the status of the main state, modifications and variability can tend towards infinities in some cases. (The same has been explained in greater detail with reference to FIG. 99B where number of days and occupancy influence room stay information and the same influences book a hotel room GSI at a higher vantage point.)

All 'change' is dependent on energy.

All solutions and all things of value arise out of 'controlled change'. (The same has been depicted in FIG. 99B where five different LSIs have been connected together in a sequence to control the flow of events.)

Controlled change requires energy and direction-directed-energy.

In the solution design, all change happens in 'change units.' (The same has been explained in greater detail with reference to FIG. 25 and FIG. 99B where get customer information, elect room type, get stay information, calculate room fare, and book hotel room are change units where all the change happens.)

All solutions are agent specific. (The same has been explained in greater detail with reference to FIG. 98A where age, sex, and id proof are specific to the customer.)

In other words, in the absence of agents the concept of 'solutions' or 'value' loses its meaning.

Every change unit has one or more agents present. (The same has been explained in greater detail with reference to FIG. 99B where machine agent is generating the booking id and name, and number of days and occupancy are input by human agent.)

It is the agents-being part of CES—that act as the catalysts of controlled change. (The same has been explained in greater detail with reference to FIG. 99B where machine agent is generating the booking id and name, and number of days and occupancy are input by human agent.)

Solution designers choose change units based on principles of optimization. (The same has been explained in greater detail with reference to FIG. 26 and FIG. 98B where the GSI book hotel room has been constructed using 5 LSIs where as in theory the same can be expressed in infinite state changes.)

If the 'change unit' is too large, the independent entities and attributes participating in them in states of variability grow exponentially, making the system too complex. (The same has been explained in greater detail with reference to FIG. 26.)

If the change unit is too small, there will be a proliferation of change units with unmanageable redundancy creeping into the system. (The same has been explained in greater detail with reference to FIG. 26.)

In NSL, all change units are represented by either local-statements-of-intent (LSI) or global-statements-of-intent (GSI). (The same has been explained in greater detail with reference to FIG. 25 and FIG. 98B where the GSI book hotel room has been constructed using 5 LSIs.)

Statements of intent are akin to 'prescriptive statements' in natural language—in contrast with descriptive statements or interrogative statements.

All statements of intent not backed up by all potential combinatorial-entity states (where no events occur) ought to be viewed as 'static statements-of-intent'. (The same has been explained in greater detail with reference to FIG. 32 and FIG. 98A which exists at logic layer.)

In other words, a static-statement-of-intent is a constant, where it remains just an intent that is not acted upon. (The same has been explained in greater detail with reference to FIG. 32 and FIG. 98A which exists at logic layer and is not acted upon.)

A dynamic statement of intent, on the contrary, is backed by all potential combinatorial entity states where events occur. (The same has been explained in greater detail with reference to FIG. 33 and FIG. 98B where all events have occurred, and potentiality has been converted to reality.)

In other words, a dynamic statement of intent is one that is acted upon. (The same has been explained in greater detail with reference to FIG. 33 and FIG. 98B where all events have occurred, and potentiality has been converted to reality.)

Static statements of intent can be compared with a book full of prescriptive statements where the words do not undergo any change irrespective of who is reading it, or what is happening in the world. (The same has been explained in greater detail with reference to FIG. 32 and FIG. 98A.)

Dynamic statements of intent can be compared with a book full of prescriptive statements where the words dynamically adjust themselves based on who is reading it and what is happening in the real world. (The same has been explained in greater detail with reference to FIG. 33 and FIG. 98B.)

Since all changes in a solution are controlled by agents, and all changes are preceded by the intentions of agents; statements—of intent are always present as independent combinatorial entities in any trigger CES. (The same has been explained in greater detail with reference to FIG. 37 and FIGS. 98A and 98B.)

Presence of statements of intent may sometimes be implied and sometimes be explicitly stated, but their presence is inevitable.

Statements of intent are a necessary condition but not a sufficient condition to trigger a combinatorial entity state to exist. (The same has been explained in greater detail with reference to FIG. 37 and FIG. 99A where there is nothing which specifies the presence of hotel reservation agent.)

SIs are intentions of agents and trigger CES fulfill those intentions. (The same has been explained in greater detail with reference to FIG. 37 and FIG. 98B where capturing the last attribute fare becomes the trigger CES to fulfill book hotel room intention.)

SI as an independent combinatorial entity serves the primary purpose of serving as an interface to human agent. This can contain a descriptive term such as a verb that need not have a functional significance. (The same has been explained in greater detail with reference to FIG. 25 and FIGS. 98A and 98B where get, select, calculate, and book are verbs which only serve informational value and do not impact functionality.)

Alongside with it, the rest of the independent entities contribute to attainment of trigger CES. (The same has been explained in greater detail with reference to FIG. 37 and FIG. 98A where customer and its attributes help in fulfilling the trigger CES.)

A collection of LSIs lead to GSI. (The same has been explained in greater detail with reference to FIG. 32 and FIG. 98A) where collection of 5 LSIs connected in a sequence lead to fulfilment of book hotel room GSI.)

Combinatorial-entity-states (CES) are achieved through combination of entities at different levels—the hierarchies of differentiation as stated above.

First level CES arises out of the combination between independent entities and attributes (dependent entities) at various levels. (The same has been explained in greater detail with reference to FIG. 98A where customer has attached attributes of name, age, sex, and id proof.)

Second level CES arises out of the combination of two or more 'first level CES' within statements of intent. (The same has been explained in greater detail with reference to FIG. 98A where customer and hotel have independent entities combined.)

Third level CES arises out of combination of local statements of intent (equivalent of sentences) within global statements of intent (equivalent of paragraphs). (The same has been explained in greater detail with reference to FIG. 98A where LSIs are combined as a CES.)

In principle, the fourth level, and many levels above that, could arise out of a combination of global statements of intent leading to higher level differentiations that go beyond paragraphs.

The SI should be treated as independent entity and the attributes associated with it would be equivalent of 'adverbs' in natural language.

Attributes associated with each of the other independent entities could be treated as equivalent of 'adjectives' in the natural language. (The same has been explained in greater detail with reference to FIG. 52 and FIG. 97A where Wi-Fi, rate, and room status are adjectives.)

When entities combine, those combinatorial states will have emergent properties of their own. This is like oxygen atoms and hydrogen atoms having their own properties and when they combine, they are acquiring the properties of 'water'.

All entities exist in binary states of potentiality or reality—'potential entities' and 'real entities. (The same has been explained in greater detail with reference to FIG. 27.)

Solution designers select potentiality entities from the real world and leave out non-potential entities that have no relevance in the context of solution ecosystem.

There is, however, a possibility of implied entities participating in the solution ecosystem though not explicitly. (The same has been explained in greater detail with reference to FIG. 10 and FIG. 99B where hotel reservation agent is an implied entity.)

Implied entities are those that are taken as a given and have no uncertainty attached with them nor any consequential effects that they produce. (The same has been explained in greater detail with reference to FIG. 10 and FIG. 99B where hotel reservation agent is an implied entity.)

Similarly, entities in the ecosystem can be present that are ignored as they have no contributory effects on the solution design.

Existence of entities in binary states is central to NSL design principles. (The same has been explained in greater detail with reference to FIG. 27.)

A state transition happens when there is a change in the binary state of an entity on occurrence of an event. (The same has been explained in greater detail with reference to FIG. 30 and FIG. 98A where the value for age as 60, sex as M, and id proof as Aadhar are changing the state of CES.)

The size of the CES increases in proportion to the participating independent and attribute entities. (The same has been explained in greater detail with reference to FIG. 61 and FIG. 99B. There are 4 variables in the form of customer name, room availability, occupancy, and number of days of stay. A solution designer may also want to capture smoking/non-smoking preferences as additional variables)

NSL design requires all CES to exist only in discrete binary states of potentiality and reality. As entities are combined together, their individual status is ignored and only the combined status matters. (The same has been explained in greater detail with reference to FIG. 37 and FIG. 99B where book a hotel room is the CES comprised of all LSIs, independent entities and their attributes all combined together.)

An 'event', when it occurs, has a spatial and temporal stamp associated with it. That is, an event is always with reference to space and time. Example: Had a specific event happened yesterday in India or US? Only one of them is true. (The same has been explained in greater detail with reference to FIG. 98A where the attributes age: 60, sex: male, and id proof: Aadhar are informational entities which arrive in space and time.)

An event is supposed to have occurred when one of the independent entities or its attributes changes its states from potentiality to reality and vice versa resulting in one of the CES within a statement-of-intent (Change Unit). (The same has been explained in greater detail with reference to FIG. 37 and FIG. 98A where the attributes age: 60, sex: male, and id proof: Aadhar are informational entities which arrive in space and time.)

All events are caused by trigger CES in one or more SIs, including the SI that the event belongs to. (The same has been explained in greater detail with reference to FIG. 37 and FIG. 99B where capturing customer name is triggering capture of rate and room availability in the subsequent LSI.)

Similarly, trigger-CES cause one or more events within the SI it belongs to or another SIs. These are called the effects of an event. (The same has been explained in greater detail with reference to FIG. 99B where the selection of room type is determining the rate to be displayed automatically.)

Each time a trigger-CES happens, it consumes a certain amount of time, called the 'lapse time', before the same causes one or more events. (The same has been explained in greater detail with reference to FIG. 60.)

The spatial reference point for an event within a statement of intent is that space where the trigger CES happens. (The same has been explained in greater detail with reference to FIG. 37.)

While events happen at independent entity or attribute levels, they influence change in the combinatorial-entity-states within a statement-of-intent. (The same has been explained in greater detail with reference to FIG. 99B the name and room availability captures at attribute levels influence change in CES getting customer information.)

There could be varying levels of uncertainty pertaining to each event.

Probability theory can be applied to assign values to such events.

The number of 'possible states' within a statement-of-intent is 2n, where 'n' is the 'number of binary entities'—that is, if there are 6 binary variables or entities, there will be 64 CES. (The same has been explained in greater detail with reference to FIG. 61.)

The state where all the independent entities and their attributes are in a state of reality is the 'trigger CES', and all other states are non-trigger CES. In the previous example 64 the state is the trigger CES and the other 63 are non-trigger CES. (The same has been explained in greater detail with reference to FIG. 37.)

'Trigger CES' cause event(s) in other statements-of-intent (in the same paragraph or other paragraphs) or its own statement-of-intent. (The same has been explained in greater detail with reference to FIG. 37.)

Non-trigger CES don't cause any consequent events or changes. (The same has been explained in greater detail with reference to FIG. 37.)

Statements-of-intent are like neurons and trigger CES are like the firings of the neurons on the building up of action potentialities. (The same has been explained in greater detail with reference to FIG. 37.)

Statements of intent (SI) that influence other SI are considered to be related and are brought into the fold of CES. (The same has been explained in greater detail with reference to FIG. 95 where related SIs are brought together.)

Breaking of the process barrier happens when related SI give rise to new and extended CES.

When other SIs and their constituents are combined based on trigger CES relationships, the CES stands extended. (The same has been explained in greater detail with reference to FIG. 98B: a) Get Customer Information b) Get Customer Information. Select Room Type c) Get Customer Information. Select Room Type. Get room stay info . . . d) Statements a, b, c are getting extended based on their relationships.)

Every event is caused by one trigger-CES or the other. (The same has been explained in greater detail with reference to FIG. 37.)

Trigger-CES is the cause, and the resultant event is the effect. (The same has been explained in greater detail with reference to FIG. 37.)

When causes and effects are combined together as differentiated entities in the form of CES, called extended CES, process gets converted to information. (The same has been explained in greater detail with reference to FIG. 103 where process getting converted to information in the form of natural language.)

In the new paradigm, —where only independent entities and CES, including extended CES, exist, only differentiations between entities expressed as information exist.

The same 'differentiations principle' that governs information in capturing meaning also governs creation of solutions or value. (The same has been explained in greater detail with reference to FIG. 59 and FIG. 103 where process gets converted to information in the form of natural language.)

Now even solution states come into the domain of information and therefore into the domain of search engines. (The same has been explained in greater detail with reference to FIG. 103 where process getting converted to information in the form of natural language.)

In the context of 'agents', while agents remain agnostic to most other entities, some combinatorial entity states are favorable, and some are unfavorable.

In case of extended CES, connected SIs that lead to the global SIs are treated as belonging to the same paragraph. (The same has been explained in greater detail with reference to FIG. 63 and FIG. 98A where collection of 5 LSIs connected in a sequence leads to fulfilment of book hotel room GSI.)

All SIs, including Global SIs, are agent specific. (The same has been explained in greater detail with reference to FIG. 25 and FIG. 98A) where all 5 LSIs are specific to hotel reservation agent.)

A paragraph is defined as a collection of Local SIs that lead to fulfillment of a Global SI. (The same has been explained in greater detail with reference to FIG. 25 and FIG. 98A) where collection of 5 LSIs connected in a sequence leads to fulfilment of book hotel room GSI.)

Each paragraph services fulfillment of only one global statement of intent. (The same has been explained in greater detail with reference to FIG. 25 and FIG. 98A) where collection of 5 LSIs connected in a sequence leads to fulfilment of book hotel room GSI.)

If there are more than one Global SI, then the same should be accommodated in different paragraphs. (The same has been explained in greater detail with reference to FIG. 25 and FIG. 107H where every paragraph supports one GSI.)

NSL requires that all independent entities and their attributes belonging to the paragraph of global SI should be in a state of reality for the Global SI to be fulfilled. (The same has been explained in greater detail with reference to FIG. 98B where all events have already occurred.)

One fundamental criterion on which NSL relies on is, that for any SI to be fulfilled, all its independent entities and their attributes should be in a state of reality. (The same has been explained in greater detail with reference to FIG. 98B where all events have already occurred.)

This principle applies equally whether it is a Local SI (sentence level) or a Global SI (paragraph level).

NSL considers 'solution logic' as a fundamental attribute giving it the same status as that of 'space and time'.

This logic is defined and acted upon by agents. (The same has been depicted in FIG. 98A where logic is acted upon by hotel reservation agent.

All the differentiation pathways are defined by solution designers as potentiality paragraphs. (The same has been depicted in FIG. 98A where the book hotel room paragraph is laid down by solution Designer.)

When an agent has a new aspiration, it qualifies as a new global statement of intent. (The same has been depicted in FIG. 107*h* where assigned subject teacher calculates percentage marks has been accommodated in 3 different paragraphs.)

That statement of intent, by design, has to belong to one of the potentiality paragraphs as its subset. (The same has been depicted in FIG. 95 where NSL solution construct is shown.)

When a Global SI is born, it immediately latches on to a potentiality paragraph that has been defined in the differentiation pathways for the Global SI to be fulfilled. (The same has been depicted in FIG. 98A where GSI latched on to a potential paragraph.)

All Global SIs related to each other can be expressed as 'related paragraphs'. (The same has been depicted in FIG. 107*h* where 3 related paragraphs have been represented.)

Related paragraphs can be those that are serving the same Global SI (traditionally different processes leading to the same solution), or they could be paragraphs that have slight variations to the Global SI.

One of the related paragraphs could be the one that terminates the Global statement of intent. (The same has been depicted in FIG. 99B where book hotel room is the GSI which terminates the paragraph.)

CES that are common across multiple related paragraphs are called shared entities. Sharing relates to an entity having the potential to service more than one SI. (The same has been explained in greater detail with reference to FIG. 56 and FIG. 107*h* where assign subject teachers calculates student marks are shared entities.)

There are instances where multiple paragraphs can individually lead to fulfillment of a global statement of intent. NSL resolves the choice making from among the alternative paragraphs through an adjudication method. (The same has been explained in greater detail with reference to FIG. 49.)

Adjudication method relies on adding additional independent entities (that serve as constraints) to the existing combinatorial entities, such that, things are fine tuned for only one paragraph to remain to fulfill the statement of intent. (The same has been explained in greater detail with reference to FIG. 49.)

Alternatively, where there is no paragraph that can fulfill the global statement of intent, selective elimination of independent entities (that serve as removing constraints) could lead to the appearance of a statement of intent. (The same has been explained in greater detail with reference to FIG. 49.)

There is a lapse time associated with every Trigger CES before its influence is felt by way of causative events. (The same has been explained in greater detail with reference to FIG. 60.)

The lapse time could be long or short, but it always exists without exception. Generally speaking, machine agents' related lapse times are short—to be counted in fractions of a second. Human agents' related lapse times are long-varying from seconds to even hours or days. (The same has been explained in greater detail with reference to FIG. 60.)

NSL is based on the 'way world works' principles as established by science.

NSL emulates the behavior and functioning of human agents.

There are three layers of defined human agent functions. (The same has been explained in greater detail with reference to FIG. 44.)

The first is the physical function that precipitates events in SIs on fulfillment of trigger conditions. (The same has been explained in greater detail with reference to FIG. 44 and FIG. 99A where entering the name, room type, and occupancy are physical functions.)

The second is the information function that emulates the human senses and captures the state of the ecosystem to keep the agents informed. (The same has been explained in greater detail with reference to FIG. 44 and FIG. 99A where what do you want to do? Cancel a booked room, avail a service act as information entities.)

The third is the mind function that revaluates the environment on occurrence of each event and provides feedback to the physical function. (The same has been explained in greater detail with reference to FIG. 44.)

NSL provides for all three layers of paragraphs to exist as needed. (The same has been explained in greater detail with reference to FIG. 44.)

The default layer is the physical function layer. (The same has been explained in greater detail with reference to FIG. 44.)

Entities in the information function layer have made the grade of holding informational potentiality. That is, they could aid in analysis, serve the purpose of measurement, or be used in the context of future design. (The same has been explained in greater detail with reference to FIG. 44.)

The mind function layer guides the physical layer and helps in validating the trigger conditions. On occurrence of an event it reassesses (anticipates) and updates the present and future CES in the related statements-of-intent and guides the trigger process. (The same has been explained in greater detail with reference to FIG. 44.)

The mind function layer relies, among other things, on anticipated trigger CES, the lapse times associated with the trigger, and the probabilities associated with the trigger CES. (The same has been explained in greater detail with reference to FIG. 44.)

Advanced Planning and Optimization (APO) principles can be naturally made operative through use of ‘mind function layer’ in NSL. (The same has been explained in greater detail with reference to FIG. 44.)

NSL applies equally to Application Programming Interfaces (APIs) which also rely on similar differentiation principles in the process of accessing other internal or external solutions. (The same has been explained in greater detail with reference to FIG. 65.)

One of the most significant and dramatic aspects of NSL is that its construct is not only natural language like, but also one that is agnostic to any natural language. (The same has been explained in greater detail with reference to FIG. 68.)

Since NSL is based on differentiation principles, so long as there is adherence to the set differentiation methods, the system recognizes and operates just the same irrespective of the natural language used. (The same has been explained in greater detail with reference to FIG. 68.)

NSL solution language is not specific to English, but it can be written in any of the known natural languages with equal ease. (The same has been explained in greater detail with reference to FIG. 68.)

All that is required is to adhere to the levels of differentiations so that the NSL technology framework deals with the entities as appropriate to those levels of abstraction and produces the same results irrespective of language used. (The same has been explained in greater detail with reference to FIG. 68.)

Natural language forms the basis for information exchanges between human agents. (The same has been explained in greater detail with reference to FIG. 68.)

Natural language is also a form of code, such that, those who only speak Russian will not be able to communicate with those who only speak English. (The same has been explained in greater detail with reference to FIG. 52.)

Similarly, communication with the computer has long been done through various programming languages containing specialized code, requiring people trained in those programming languages to perform the task. (The same has been explained in greater detail with reference to FIG. 52.)

NSL creates a new paradigm by introducing a way of communicating solution logic to the computers through use of natural language like constructs. (The same has been explained in greater detail with reference to FIG. 66.)

Natural solution language uses innovative structures and methods, on top of a foundational technology framework, to effectively communicate solution logic to the machine agents (computers) in a natural-language-like fashion. (The same has been explained in greater detail with reference to FIG. 66.)

Entity relationships in NSL are similar to the parts of speech in natural language. (The same has been explained in greater detail with reference to FIG. 67).

Figure 72:
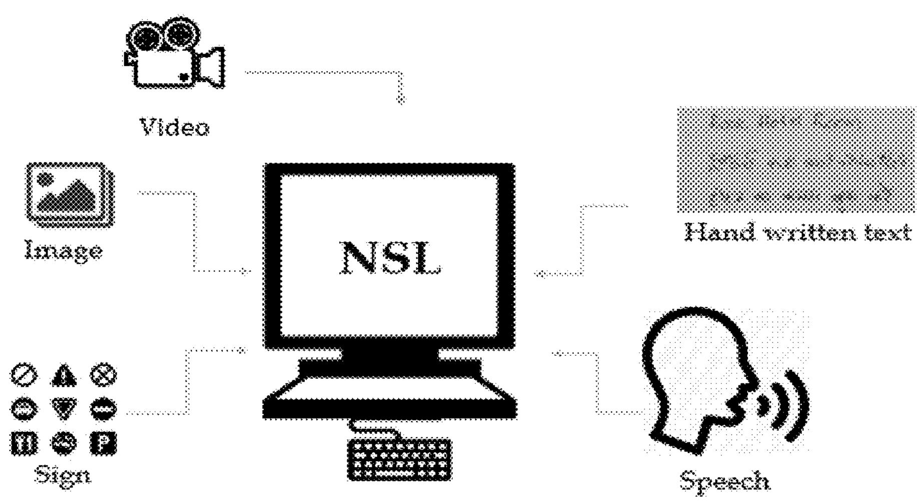
FIG. 72 is an example that NSL is agnostic to the medium of communication.

This gives the flexibility for NSL to convey solution logic to the computer in a medium agnostic manner. (The same has been depicted in FIG. 72.)

NSL, through use of advancements in character and image recognition techniques, and with a video camera connected to a computer, can convey solution logic directly to the computer in a hand-written form. (The same has been depicted in FIG. 72.)

Likewise, through use of advancements in voice recognition techniques, NSL solution logic can be voice recorded and conveyed to the computer directly. (The same has been depicted in FIG. 72.)

NSL is also extendable to sign languages. (The same has been depicted in FIG. 72.)

NSL also has the ability to extract solution logic based on videos that capture performance of solutions. (The same has been depicted in FIG. 72.)

Real and informational entities existing in the videos are recognized by the system. (The same has been depicted in FIG. 72.)

Change units as observed in the video are converted to ‘extended CES’ thereby capturing the process or solution logic. (The same has been depicted in FIG. 72.)

Since NSL reduces all solution logic to entities and their relationships, it is most naturally suited to deal with ‘system security’ to any desired level with a flexibility to wrap any identified entity individually or collectively cryptographically.

By extension, application of a blockchain such that solutions that seek high security while eliminating trusted parties can easily be achieved.

NSL has the ability to create a ‘measurement framework’ with characteristic ease. (The same has been explained in greater detail with reference to FIG. 50.)

NSL can push differentiation to the required limit so that the right kind of specificity and granularity is achieved for objectively determining the state of any entity or ecosystem. (The same has been explained in greater detail with reference to FIG. 34.)

Thereafter, it can also capture value judgments around the state of reality, traditionally called norms, quite naturally and generate colors such as green and red to inform human agents of the state of select entities. (The same has been explained in greater detail with reference to FIG. 50.)

NSL quite naturally captures CES at any desired vantage points as required. (The same has been explained in greater detail with reference to FIG. 35.)

NSL can easily administer performance status of any SIs in the ecosystem.

NSL can make effort and resource requirement estimates dynamically.

Since all SIs are owned and driven by human agents, it can build in functions that assess the 'understanding levels' of any human agents readily.

Each change unit, that is each SI, is subjected to ever present 'solution' or 'value' cycles (full-life-cycle of solution or value) called a PSA cycle. (The same has been explained in greater detail with reference to FIG. 67.)

'P' stands for 'possibilities' as existing at the level of the SI (Change Unit) being captured by the systems and the agents therein. (The same has been explained in greater detail with reference to FIG. 99A where hotel reservation agent is capturing all possibilities of either booking a room, booking transportation or laundry, or canceling a room.)

'S' stands for 'selection' where the system and the agents have the ability to make the right kind of choices from the available possibilities. (The same has been explained in greater detail with reference to FIG. 99A where hotel reservation agent is capturing all possibilities of either booking a room, booking transportation or laundry, or canceling a room so chosen by customer in his mind.)

'A' stands for 'Action' where the system and the agents have the ability to perform the right function for completing the PSA cycle. (The same has been depicted in FIG. 99A where hotel reservation agent has entered all possibilities of either booking a room, booking transportation or laundry, or canceling a room so chosen by customer in his mind.)

NSL recognizes and takes advantage of fractal-like behavior of solution cycles involved at all levels of the solution ecosystem and the inherent symmetries therein. (The same has been explained in greater detail with reference to FIG. 67.)

Since NSL takes a natural language-based approach to a solution design, it effectively eliminates entity differences between user interfaces and databases. (The same has been explained in greater detail with reference to FIG. 66 and FIG. 95.)

All entities exist at the user interface levels with respect to one human agent or the other. (The same has been explained in greater detail with reference to FIG. 51.)

Even 'machine agent' functions are transparent to one agent or the other, including the system administrators. (The same has been explained in greater detail with reference to FIG. 51 and FIG. 98B where booking id, a machine agent function, is transparent to agent and system administrator.)

NSL eliminates the existence of black boxes with respect to all entities present in the solution ecosystem.

Figure 45:
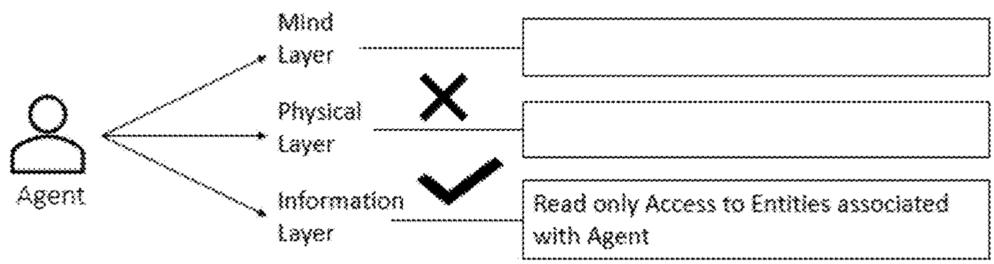
FIG. 45 is an example of information rights of human agents.
Figure 46:
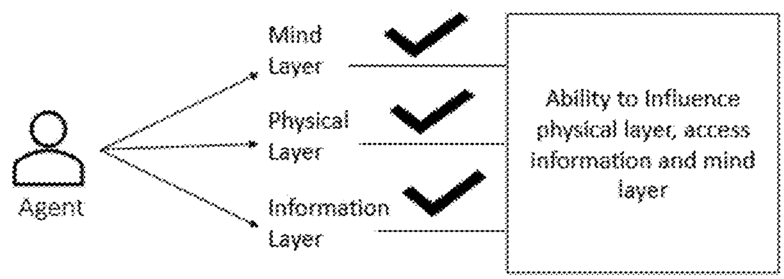
FIG. 46 is an example of decision rights of human agents.

Access to entities is provided to all human agents purely based on access privileges—information and decision rights. (The same has been explained in greater detail with reference to FIGS. 45 and 46.)

NSL technology framework helps the solution designers and users in determining all the pertinent differentiated entities. (The same has been explained in greater detail with reference to FIG. 69.)

Each of those differentiated entities are then tagged with information and decision rights as aided by the technology framework. (The same has been explained in greater detail with reference to FIG. 69.)

As each CES in the ecosystem is clearly identified at all vantage points, in most instances proper assignment of attribute values is driven systemically. (The same has been explained in greater detail with reference to FIG. 69 and FIG. 98A where assignment of attributes and their values are driven systemically.)

If an item at a higher vantage point is assigned an attribute value, the technology framework has the ability to assign the same values to all the entities falling under the same differentiation branch automatically without any manual intervention. (The same has been explained in greater detail with reference to FIG. 69 and FIG. 107I where every user under the superset student is given automatically the same attributes and values.)

NSL provides great flexibility to the stakeholders to organize their entities as they please within the bounds of laid down standards. (The same has been explained in greater detail with reference to FIG. 69.)

There are methods and tools made available to them so that they could move entities to any place on any screen that pertains to them. (The same has been explained in greater detail with reference to FIG. 69.)

The ownership of entities agent by agent is determined by a simple principle that all SIs and the participating CES in those SIs will belong to the agents that drive those SIs. (The same has been explained in greater detail with reference to FIG. 43.)

Two conditions incidentally determine such ownership—the ability to physically interact with those entities and the privileges provided to them. (The same has been explained in greater detail with reference to FIGS. 43, 45, and 46.)

The ownership right also extends to those agents who have a right to direct the participating agents to perform actions in SIs. (The same has been explained in greater detail with reference to FIGS. 43, 45, and 46.)

Business solutions also provide for an ability to exchange value at each event directly or implicitly.

This exchange of value in cash or kind is driven by the same principles that drive recording of transactions in financial systems.

In other words, value is exchanged each time an SI experiences an event as triggered by a CES in one or more other SIs, or when trigger CES causes events in one or more other SIs. (The same has been depicted in FIG. 62 and FIG. 99B there are 4 variables in the form of customer name, room availability, occupancy, and number of days which cater to trigger of 2 LSIs as a whole. Therefore, helping solution designers quantify information as value.)

Cause and effect principles expressed in NSL by way of an incoming event is caused by one or more trigger CES in one or more other SIs. (The same has been depicted in FIG. 99B there are 4 variables in the form of customer name, room availability, occupancy, and number of days which cater to trigger of 2 LSIs as a whole. Therefore, helping solution designers quantify information as value.)

Similarly, when trigger CES results in within an SI the same causing one or more events in one or more SIs. (The same has been depicted in FIG. 99B there are 4 variables in the form of customer name, room availability, occupancy, and number of days which cater to trigger of 2 LSIs as a whole. Therefore, helping solution designers quantify information as value.)

Correlations are also easily established between CES and events in the solution ecosystem in NSL following standard principles. (The same has been depicted in FIG. 97B where room fare is a CES which is equivalent to entities arrival in number of days and occupancy attributes.)

Natural Language Processing (NLP) as a subject and system deals with the computer understanding of natural language and development of applications thereto.

While the natural language principles are common to both NLP and NSL, the focus of NSL is to impart solution logic to the computers directly through the use of natural language like constructs for ease of use by the concerned human agents.

This natural affinity between NLP and NSL will make it much easier for NSL to make NLP systems and methods far more improved as compared to their current state. (The same has been explained in greater detail with reference to FIG. 52.)

The user friendliness associated with NSL can be taken to the next level through use of 'gaming techniques' in the context of NSL.

Gaming techniques can be deployed for providing better visual effects through animation, for training the user, for testing the solutions, for bringing greater interactivity between users, and the like.

User interfaces (UI) in NSL are designed to be CES centric giving greater flexibility for the UI to be configured for meeting the stakeholder needs with great versatility. (The same has been explained in greater detail with reference to FIG. 51.)

These user interfaces in the context of NSL are called Stakeholder Engagement Centers (SEC). (The same has been explained in greater detail with reference to FIG. 51.)

SEC automatically adjusts itself to accommodate and customize CES access to each stakeholder as needed and when needed. (The same has been explained in greater detail with reference to FIG. 51.)

As the NSL is aware of the information and decision rights of the agents, it acquires the ability to auto-configure itself is stakeholder. (The same has been explained in greater detail with reference to FIG. 51.)

To take user friendliness to yet another level in business solutions, SEC also provides for sub-structures by way different levels of access to stakeholders based on the nature of interaction. (The same has been explained in greater detail with reference to FIG. 51.)

These levels are called My Transaction, My Self, My Team, and My Organization to encompass CES as per the type of requirement of the stakeholders. (The same has been explained in greater detail with reference to FIG. 51.)

Dynamic Mission Control Center (MCC) is a natural extension of SEC where the focus is on providing ready access to CES that matter for the stakeholders to perform their tasks better. (The same has been explained in greater detail with reference to FIG. 71.)

Dynamic MCC provides CES access to stakeholders based on considerations of time, events, stakeholder concerns, and stakeholder queries. (The same has been explained in greater detail with reference to FIG. 71.)

NSL has the ability to deal with uncertainties in the ecosystem with much greater efficiencies than the current systems.

As everything is CES centric in NSL, the uncertainty associated with them can be determined spontaneously based on changing CES in ecosystem.

Probabilities can be assigned to each event dynamically based on principles of analytics and use of big data.

Machine agents self-learning based on the entities and events (behavior of entities) has been gaining ground in the last decade or so.

NSL as a system is a natural fit for such machine learning as all its entities individually and collectively emulate the way world works (and the mind works) paving the way for experience-based learning.

A natural extension of this is emulation of human intelligence, called artificial intelligence, where NSL provides a fertile ground for the machine agents adapting and responding to ever changing situations in the ecosystem.

NSL is a special case of statements in natural language, where it mainly deals with prescriptive information (statements of intent) and incidentally with descriptive information (information at the information function layer).

One of the most dramatic accomplishments of NSL is its ability to quantify 'solutions' and 'value' just as information theory has been able to quantify information to be counted in 'bits'. (The same has been explained in greater detail with reference to FIG. 61 and FIG. 99B there are 4 variables in the form of customer name, room availability, occupancy, and number of days which cater to trigger 2 LSIs as a whole. Therefore, helping solution designers quantify information as value.)

Every solution requires a given number of independent and attribute binary states to be in a state of reality (number of binary events) rendering it automatically to quantification. (The same has been explained in greater detail with reference to FIG. 61 and FIG. 99B there are 4 variables in the form of customer name, room availability, occupancy, and number of days which cater to trigger 2 LSIs as a whole. Therefore, helping solution designers quantify information as value.)

Similarly, every solution requires given number of trigger CES to happen for the intended fulfillment CES to happen. (The same has been explained with reference to FIG. 99B.)

In NSL all the entities pertaining to application logic exist at the user interface levels in a natural language like format making things highly user friendly. (The same has been explained in greater detail with reference to FIG. 66.)

As NSL makes users participants in solution building, maintenance, or enhancements, there is a need to support them with the right kind of tools and components.

NSL libraries stock useful solution components such as independent entities with variations arising out of their attribute relationships all the way up to 'paragraphs' and above. (The same has been explained in greater detail with reference to FIG. 55 and FIG. 107A.)

These can be used as needed, supported by intelligent search methods or drag and drop mechanisms. (The same has been depicted in FIG. 107I where name, mobile, address, age, and email have been attached as reusable attributes for every student.)

As a general rule, NSL minimizes redundancies by readily identifying reusable components in the library, and only using them, with respect to application development unless modified versions are needed. (The same has been explained in greater detail with reference to FIG. 53 and FIG. 107I where name, mobile, address, age, and email have been attached as reusable attributes for every student.)

These reusable components in the NSL libraries are classified and stored based on support functions for appropriate stakeholders who act as curators. (The same has been explained in greater detail with reference to FIG. 107A.)

NSL application developers can access these components from the libraries for the most part and knit together differentiated solutions as needed. (The same has been explained in greater detail with reference to FIG. 55 and FIG. 107A.)

When NSL translator of programming logic converts programming code to NSL application logic, all the existing code, including open source programming code, becomes transparent to users.

As the application logic is no longer hidden in the black boxes of programming code, a great opportunity exists to identify all the useful solution components for reuse. (The same has been explained in greater detail with reference to FIG. 53.)

SIs can be compared with neurons and every trigger CES with its firing.

Action potential builds up to the threshold levels in neurons resulting in firing of the neuron.

Similarly, the binary entity states at independent entity levels keep turning to reality states on occurrence of events, reaching the threshold of trigger CES resulting in changes in other SIs. (The same has been explained in greater detail with reference to FIG. 99B.)

This has dramatic implications on how NSL can emulate how the human brain works.

By extension its ability to effectively deal with artificial neural networks (ANN) environments is very high. (The same has been explained in greater detail with reference to FIG. 64.)

NSL provides a flexible framework to deal with more structured as well as networked solution environments.

In that sense, it is quite well suited to be applied both in instances of mechanistic as well as biological models.

It is interesting to draw parallels between the Possibility-Selection-Action cycles in NSL and the amino acids presented as possibilities being selected by 'DNA leading to RNA', which action is acted upon for formation of proteins.

NSL is able to consume programming code to convert the same into natural language information format. (The same has been explained in greater detail with reference to FIGS. 102A-102D.)

By the same token, it also holds the potential to extract information as contained in DNA to be converted to NSL format so that it could fall in the domain of natural language search. (The same has been explained in greater with reference to FIG. 73.)

NSL is currently focused on dealing with the level of abstraction in information technology that belongs to programming logic, based on differentiation principles. (The same has been explained in greater detail with reference to FIG. 66.)

As the application of differentiation principle is not limited to programming layer alone, there is a potential in the future to apply the same principles to levels of abstraction at operating system and below also.

When that happens, many of the functions that are in the black boxes under the hood can become more transparent to users for better understanding as well as management.

NSL's agnosticism also extends to even programs written in the past as it has the ability to extract the logic contained in those languages in NSL format and use those solutions just as the new.

Figure 75:
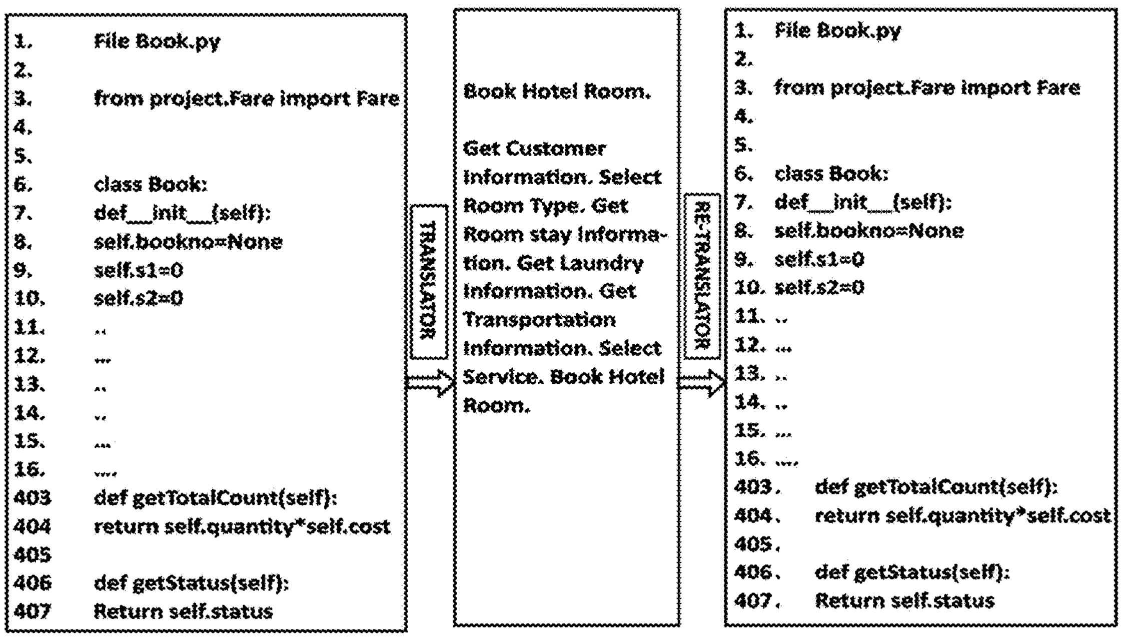
FIG. 75 is an example of NSL Technology Translation Framework (TTF)

NSL has the ability to convert any programming code into natural language like NSL format (The same has been explained in greater detail FIG. 75.)

NSL has the ability to convert solutions constructed in NSL into any programming language code. (The same has been explained in greater detail FIG. 75.)

NSL has the ability to convert the solution in any Programming Language to any other Programming Language/Natural Language. (The same has been explained in greater detail with reference to FIG. 75.)

NSL provides for a solution construct through responses to a series of predefined queries. (The same has been explained in greater detail with reference to FIG. 76.)

NSL provides the user with an experience to view a solution akin to reading a book. (The same has been explained in greater detail with reference to FIG. 77.)

NSL auto assigns verbs to functions so as to make them appear closer to Natural Language. (The same has been explained in greater detail with reference to FIG. 78.)

The logic from any existing practice can be extracted by NSL. (The same has been explained in greater detail with reference to FIG. 79.)

NSL makes solution logic substrate agnostic. (The same has been explained in greater detail with reference to FIG. 80.)

NSL quantifies solution through identification of distance between entities by events, information, space, time, and resource consumption. (The same has been explained in greater detail with reference to FIG. 81.)

By making solution logic transparent and by reuse of existing solution components, NSL helps in logic compression through elimination of redundancies. (The same has been explained in greater detail with reference to FIG. 82.)

NSL helps in reduction of computational resources on account of compression of solution logic.

The principles of NSL can be applied to Engineering design. (The same has been explained in greater detail with reference to FIG. 83.)

NSL adopts a container system for controlled differentiations and auto assigns ids to classes, sub classes, and members. (The same has been explained in greater detail with reference to FIG. 85.)

NSL provides for the conversion of static documents into NSL format. (The same has been explained in greater detail with reference to FIG. 86.)

NSL extends User interfaces beyond regular screens to cover the five primary senses and the extra sensory. (The same has been explained in greater detail with reference to FIG. 87.)

NSL helps in tracking the usage and idle time of resources. (The same has been explained in greater detail with reference to FIG. 89.)

NSL extracts solution logic from flow charts and reconstruct the solution in NSL format.

NSL provides for solution level transaction count, e.g., identifying the count of the users who have used a given solution logic.

The number of times an entity has been used in a particular period or the number of entities in use at a particular time can be captured by NSL.

NSL has API's that are developed in natural language construct which seamlessly integrate with any existing solution while preserving the user experience.

NSL provides for a DLD engine that aids solution development by the machine agent (The same has been explained in greater detail with reference to FIG. 116.)

NSL provides for converting SOPs into NSL format. (The same has been explained in greater detail with reference to FIG. 117.)

All the change units are in a sequential manner to achieve the global statement of intent. (The same has been explained in greater detail with reference to FIG. 118.)

In case of alternative options following the XOR operator, all the change units are arranged in an alternative manner to achieve the global statement of intent. (The same has been explained in greater detail with reference to FIG. 119.)

In case of parallel options triggering, all the change units are arranged in an parallel manner with multiple agents to achieve the global statement of intent. (The same has been explained in greater detail with reference to FIG. 120.)

As one moves up the vantage point, the change units at the lower vantage points become subordinate change units. (The same has been explained in greater detail with reference to FIG. 121.)

When the GSI spans across the GSI of multiple agents, the GSI of one agent triggering the change unit of another GSI of an agent, becomes the transitory change unit. (The same has been explained in greater detail with reference to FIG. 122.)

A change unit can itself have multiple local statements of intent which are called the embedded sub change units. (The same has been explained in greater detail with reference to FIG. 123.)

The solution designed by the designer is at called the solution class and when events arrive upon deployment becomes the transaction class. (The same has been explained in greater detail with reference to FIG. 124.)

The contextual triple identity models allows identities from the organization level up to the lowest level of attribute. (The same has been explained in greater detail with reference to FIG. 125.)

NSL acts a HUB to allow solutions from any of the several substrates. (The same has been explained in greater detail with reference to FIG. 126.)

DETAILED EXPLANATION OF FIGURES

FIG. 91 represents a flowchart depicting a method for building a computer-implemented solution using a natural language understood by users and without using programming codes. According to the method, at step 9102, receiving, by a processor of a computing device from a user, a global statement of intent for building the solution, wherein the global statement of intent is received in a form of the natural language and is set in a state of potentiality. At step 9104, receiving, by the processor from the user, one or more local statements of intent associated with the global statement of intent and details of entities and an agent associated with each local statement of intent, wherein each local statement of intent and the details of each entity and the agent are received in a form of the natural language and are respectively set in a state of potentiality, wherein each local statement of intent is indicative of a step for building the solution, wherein each entity participates in the step indicated by the corresponding local statement of intent, and wherein the agent is at least one of a human agent, a machine agent and a computer function At step 9106, forming, by the processor, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality. At step 9108, determining only one received local statement of intent associated with the global statement of intent and identify the trigger CES of the received local statement of intent as an end of the building of the solution. At step 9110, determining more than one received local statement of intent associated with the global statement of intent, receive, by the processor from the user in a form of the natural language, relationships between the local statements of intent, wherein the relationships are indicative of whether a trigger CES of one local statement of intent is influencing the set of CESs of another local statement of intent or is an end of the building of the solution.

FIG. 92 represents a flowchart depicting a method for converting a programming code into a natural language to build a natural language-based computer-implemented solution. According to the method, at step 9202, parsing, by a processor of a computing device, the programming code to extract symbols, keywords, operators, and functions present in the programming code. At step 9204, determining, by the processor, a plurality of local statements of intent, entities associated with each of the plurality of local statements of intent and attributes associated with each of the entities based on mapping of the extracted symbols, keywords, operators, and functions with natural language data stored in a database and setting each of the plurality of local statements of intent, the entities, and the attributes in a state of potentiality, wherein each local statement of intent is indicative of a step for building the solution, wherein each entity participates in the step indicated by the corresponding local statement of intent, and wherein the attributes define a characteristic of the respective entity and that differentiate the respective entity from other entities of the corresponding local statement of intent. At step 9206, forming, by the processor, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality. At step 9208, determining, by the processor, relationships between the local statements of intent based on mapping of the extracted operators and functions with the natural language data stored in the database, wherein the relationships are indicative of whether a trigger CES of one local statement of intent is influencing the set of CESs of another local statement of intent or is an end of a global statement of intent for the building the computer-implemented solution, wherein the relationships are determined by analyzing the flow charts with respect to the natural language data stored in the database. At step 9210, receiving, by the processor from a user in a form of the natural language, details of an agent associated with each of the plurality of local statements of intent and setting the details of the agent in a state of potentiality, wherein the agent is at least one of a human agent, a machine agent and a computer function.

FIG. 93 represents a flowchart depicting a method for converting a computer-implemented solution built based on a natural language into a programming code. According to the method, at step 9302, parsing, by a processor of a computing device, the computer-implemented solution, wherein the computer-implemented solution comprises a plurality of local statements of intent, entities associated with each of the plurality of local statements of intent, attributes associated with each of the entities, relationships between the plurality of local statements of intent, combinatorial entity states (CESs), one or more trigger CESs, wherein each local statement of intent is indicative of a step for building the solution, wherein each entity participates in the step indicated by the corresponding local statement of intent, and wherein the attributes define a characteristic of the respective entity and that differentiate the respective entity from other entities of the corresponding local statement of intent, wherein the relationships are indicative of whether a trigger CES of one local statement of intent is influencing the set of CESs of another local statement of intent or is an end of a global statement of intent for the building the computer-implemented solution. At step 9304, extracting, by a processor of a computing device, a plurality of natural language solution components, wherein the natural language solution components comprise: the global statement of intent, the plurality of local statements of intent, attributes associated with each of the entities, relationships between the plurality of local statements of intent, combinatorial entity states (CESs), one or more trigger CESs. At step 9306, auto generating a programming language code based on mapping of the natural language solution components with symbols, keywords, operators, and functions of the programming language stored in a database.

NSL may be implemented in or involve one or more computer systems. FIG. 94 shows a generalized example of a computing environment 9402. The computing environment 9402 is not intended to suggest any limitation as to scope of use or functionality of described embodiments.

With reference to FIG. 94, the computing environment 9402 includes at least one processing unit 9404 and memory 9406. The processing unit 9404 executes computer-executable instructions and may be a real or a virtual processor. In a multi-processing system, multiple processing units execute computer-executable instructions to increase processing power. The memory 9406 may be volatile memory (e.g., registers, cache, RAM), non-volatile memory (e.g., ROM, EEPROM, flash memory, etc.), or some combination of the two. In some embodiments, the memory 9406 stores Framework 9416 implementing described techniques.

A computing environment may have additional features. For example, the computing environment 9402 includes storage 9414, one or more input devices 9410, one or more output devices 9412, and one or more communication connections 9408. An interconnection mechanism (not shown) such as a bus, controller, or network interconnects the components of the computing environment 9402. Typically, operating system software (not shown) provides an operating environment for other software executing in the computing environment 9402, and coordinates activities of the components of the computing environment 9402.

The storage 9414 may be removable or non-removable, and includes magnetic disks, magnetic tapes or cassettes, CD-ROMs, CD-RWs, DVDs, or any other medium which may be used to store information, and which may be accessed within the computing environment 9402. In some embodiments, the storage 9414 stores instructions for the framework 9416.

The input device(s) 9410 may be a touch input device such as a keyboard, mouse, pen, trackball, touch screen, or game controller, a voice input device, a scanning device, a digital camera, or another device that provides input to the computing environment 9402. The output device(s) 9412 may be a display, printer, speaker, or another device that provides output from the computing environment 9402.

The communication connection(s) 9408 enables communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 9402, computer-readable media include memory 9406, storage 9414, communication media, and combinations of any of the above.

Having described and illustrated the principles of our disclosure with reference to the described embodiments, it will be recognized that the described embodiments may be modified in arrangement and detail without departing from such principles. In view of the many possible embodiments to which the principles of our disclosure may be applied, we claim as our disclosure all such embodiments as may come within the scope and spirit of the claims and equivalents thereto.

While the present disclosure has been related in terms of the foregoing embodiments, those skilled in the art will recognize that the disclosure is not limited to the embodiments depicted. The present disclosure may be practiced with modification and alteration within the spirit and scope of the appended claims. Thus, the description is to be regarded as illustrative instead of restrictive on the present disclosure.

As will be appreciated by those of ordinary skill in the art, the foregoing example, demonstrations, and method steps may be implemented by suitable code on a processor based system, such as a general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skill in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The detailed description is presented to enable a person of ordinary skill in the art to make and use the disclosure and is provided in the context of the requirement for obtaining a patent. The present description is the best presently contemplated method for carrying out the present disclosure. Various modifications to the preferred embodiment will be readily apparent to those skilled in the art and the generic principles of the present disclosure may be applied to other embodiments, and some features of the present disclosure may be used without the corresponding use of other features. Accordingly, the present disclosure is not intended to be limited to the embodiment shown but is to be accorded the widest scope consistent with the principles and features described herein.

The present subject matter, in accordance with an example implementation, relates to a method for building a computer-implemented solution using a natural language understood by users and without using programming codes, the method comprising: receiving, by a processor of a computing device from a user, a global statement of intent for building the solution, wherein the global statement of intent is received in a form of the natural language and is set in a state of potentiality; receiving, by the processor from the user, one or more local statements of intent associated with the global statement of intent and details of entities and an agent associated with each local statement of intent, wherein each local statement of intent and the details of each entity and the agent are received in a form of the natural language and are respectively set in a state of potentiality, wherein each local statement of intent is indicative of a step for building the solution, wherein each entity participates in the step indicated by the corresponding local statement of intent, and wherein the agent is at least one of a human agent and a machine agent; forming, by the processor, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; in response to determining only one received local statement of intent associated with the global statement of intent, identifying the trigger CES of the received local statement of intent as an end of the building of the solution; and in response to determining more than one received local statement of intent associated with the global statement of intent, receiving, by the processor from the user in a form of the natural language, relationships between the local statements of intent, wherein the relationships are indicative of whether a trigger CES of one local statement of intent is influencing the set of CESs of another local statement of intent or is an end of the building of the solution.

In accordance with an example implementation, the above described method comprises, for each local statement of intent, receiving, by the processor from the user in a form of the natural language, one or more attributes that define a characteristic of the respective local statement of intent.

In accordance with an example implementation, the above described method comprises: for each entity, receiving, by the processor from the user in a form of the natural language, one or more attributes that define a characteristic of the respective entity and that differentiate the respective entity from other entities of the corresponding local statement of intent.

In accordance with an example implementation, receiving the relationships comprises receiving a plurality of distinct relationships between the local statements of intent for the global statement of intent, wherein each distinct relationship is a distinct pathway to building the solution.

In accordance with an example implementation, the above described method comprises: for each entity of each local statement of intent receiving, by the processor from the associated agent in a form of the natural language, a value against the respective entity, wherein receiving the value against the respective entity is recordation of an event to change the state of potentiality to a state of reality for the respective entity based on the received value.

In accordance with an example implementation, the above described method comprises: for each attribute of each local statement of intent receiving, by the processor from the associated agent in a form of the natural language, a value against the respective attribute, wherein receiving the value against the respective attribute is recordation of an event to change the state of potentiality to a state of reality for the respective attribute based on the received value.

In accordance with an example implementation, the above described method comprises: for attribute of each entity receiving, by the processor from the associated agent in a form of the natural language, a value against the respective attribute, wherein receiving the value against the respective attribute is recordation of an event to change the state of potentiality to a state of reality for the respective attribute based on the received value.

In accordance with an example implementation, the above described method comprises: authenticating, by the processor, the associated agent based on one of login details, bio-metric details, a face-recognition technique, and a retina-detection technique.

In accordance with an example implementation, receiving the values against all the entities associated with each local statement of intent is recordation of an event to change the state of potentiality to a state of reality for the respective local statement of intent.

In accordance with an example implementation, receiving the values against all the entities associated with all the local statements of intent is recordation of an event to change the state of potentiality to a state of reality for the global statement of intent.

In accordance with an example implementation, the machine agent is communicatively coupled to the computing device over a wired communication channel or a wireless communication channel.

In accordance with an example implementation, the machine agent is a functional module of the computing device and is coupled to the processor.

In accordance with an example implementation, a local statement of intent associated with the global statement of intent is a local statement of intent of another computer-implemented solution to borrow the other computer-implemented solution; or a global statement of intent of another computer-implemented solution to borrow the other computer-implemented solution.

In accordance with an example implementation, an entity associated with a local statement of intent of the global statement of intent is a local statement of intent of another computer-implemented solution to borrow the other computer-implemented solution; or an entity of another computer-implemented solution to borrow the other computer-implemented solution.

In accordance with an example implementation, an attribute that define a characteristic of the respective local statement of intent is an entity of another computer-implemented solution to borrow the other computer-implemented solution; or an attribute of another computer-implemented solution to borrow the other computer-implemented solution.

In accordance with an example implementation, an attribute that defines the characteristic of the respective entity is: an entity of another computer-implemented solution to borrow the other computer-implemented solution; or an attribute of another computer-implemented solution to borrow the other computer-implemented solution.

In accordance with an example implementation, the solution is built by: dividing a local statement of intent into two or more other local statements of intent and attaching the corresponding entities and agent to each local statement of intent; or combing two or more local statements of intent into one local statement of intent and attaching the corresponding entities and agent to that local statement of intent.

In accordance with an example implementation, the solution is searchable by one or more search engines as the solution is built using a natural language.

In accordance with an example implementation, the above described method comprises assigning one or more information rights or decision rights over each entity to the agent associated with the local statement of intent of the respective entity; and displaying entities to the agent based on the assigned information rights or decision rights.

In accordance with an example implementation, lesser the count of attributes more generalized is the respective entity, and wherein higher the count of attributes more is the differentiation amongst entities.

In accordance with an example implementation, the above described method comprises displaying entities through a user interface to receive values against the entities by the associated agent.

In accordance with an example implementation, the above described method comprises providing one or more distinct relationships between the local statements of intent to receive values against the entities, wherein providing one or more distinct relationships is based on an orchestrated process, an automated process, or a human agent driven process.

In accordance with an example implementation, one or more of the entities or one or more CESs of a local statement of intent are shared with one or more local statements of intent of other computer-implemented solutions, wherein said shared entity or CES participates in only one trigger CES at a given point of time to change the state of potentiality to the state of reality for the local statement of intent corresponding to the one trigger CES, and wherein availability of the shared entity or CES influences an order of change of the state of potentiality to the state of reality for multiple local statements of intent.

In accordance with an example implementation, the entities are physical in nature, and wherein the entities exist in space and time.

In accordance with an example implementation, the receiving the local statement of intent and receiving the details of the entities comprise providing one or more possible local statements of intent and one or more possible entities from libraries in a database storing local statements of intent and entities of other computer-implemented solutions.

In accordance with an example implementation, the above described method comprises selecting, by the processor, one of the distinct relationships to receive the values against the entities and eliminate other distinct relationships.

In accordance with an example implementation, the natural language is based on one or more native languages, one or more sign languages, one or more symbols, one or more numericals, or a combination thereof.

In accordance with an example implementation, information in the forms of the natural language is received through an handwriting-based interface, a touch-sensitive interface, a voice-based interface, an image-based interface, or a video-based interface, or a combination thereof; and the information received in the form of the natural language is deciphered using an object recognition technology, a character recognition technology, an image recognition technology, or a combination thereof.

In accordance with an example implementation, the above described method comprises determining, by the processor, number of events that are remaining to be recorded; and displaying, by the processor, the remaining number of events.

In accordance with an example implementation, location on a user interface of each entity and each local statement of intent is changeable by: a drag and drop functionality, wherein the drag and drop functionality is performed by at least one of a wired input device, a wireless input device, and a touch-sensitive interface; or changing the value of an attribute corresponding to location coordinates of the respective entity or the respective local statement of intent.

In accordance with an example implementation, the above described method comprises applying one of a public blockchain technology, a private blockchain technology, and a hybrid blockchain technology.

In accordance with an example implementation, each of the public blockchain technology, the private blockchain technology, and the hybrid blockchain technology is based on Symmetric Key Cryptography techniques, Asymmetric Key Cryptography techniques, or a combination thereof.

In accordance with an example implementation, the above described method comprises assigning a measurement framework based on one or more predefined norms to the entities, wherein the measurement framework is indicative of a time period in which an entity is changed from the state of potentiality of a state of reality.

In accordance with an example implementation, the above described method comprises receiving, by the processor from the user, details of informational entities associated with each local statement of intent, wherein the details of each informational entity is received in a form of the natural language and is set in a state of potentiality, and wherein each informational entity is different from the entities forming the trigger CES.

In accordance with an example implementation, the above described method comprises storing, in the form of libraries in a database, data associated with one of more of the global statement of intent, the local statement of intent, the entities, and the agents for use in building another computer-implemented solution.

In accordance with an example implementation, the above described method comprises providing query-based access to the libraries in the database, wherein the query-based access relies on search and query-based technologies for identification of appropriate entities for reuse, and wherein the query-based access comprises at least one of a Structured Query Language (SQL) and a Not only Structured Query Language (NoSQL).

In accordance with an example implementation, the above described method comprises providing a drag and drop access to the libraries in the database.

In accordance with an example implementation, the above described method comprises providing one or more uncertainties and probabilities corresponding to one or more of the entities and one or more of the events based on past behavior of one or more of the CES and occurrence of one or more of the events.

In accordance with an example implementation, the above described method comprises integrating accounting and financial systems by attaching one or more entities pertaining to accounting and financial systems to each local statement of intent for the computer-implemented solution.

In accordance with an example implementation, the above described method comprises performing one or more advanced planning and optimization (APO) functions to provide one or more uncertainties and probabilities corresponding to one or more of the entities and one or more of the events and to optimize receiving of the value for recordation of the event.

In accordance with an example implementation, the above described method comprises assessing the past behavior of one or more of the CES and occurrence of one or more of the events based on at least one of: machine learning techniques and artificial intelligence techniques; an entity centric approach, wherein said entity centric approach provides for one or more events to occur; and storing data and behavioral patterns of each events, wherein the machine learning techniques comprise supervised learning techniques and/or unsupervised learning techniques and/or semi-supervised learning techniques, wherein the supervised learning techniques comprise at least one of Support Vector Machines, linear regression, logistic regression, naïve Bayes, linear discriminant analysis, decision trees, k-nearest neighbor algorithm, and Neural Networks, and wherein the unsupervised learning techniques comprise at least one of Hierarchical clustering, K-means clustering, K-NN (k nearest neighbors), and Association rules.

In accordance with an example implementation, the above described method comprises receiving one or more of the global statement of intent, each local statement of intent, and the details of the entities is in response to an interactive questionnaire, wherein the interactive questionnaire comprises questions in a structured format for building the computer-implemented solution.

In accordance with an example implementation, the above described method comprises correcting one of more of the received global statement of intent, each local statement of intent, and the details of the entities based on natural language grammar, wherein the natural language grammar uses natural language libraries to pick one or more appropriate verbs and prepositions for the correction.

In accordance with an example implementation, the above described method comprises determining, by the processor, an amount of time and resources required for the remaining number of events; and displaying, by the processor, the required amount of time and resources.

In accordance with an example implementation, the above described method comprises storing, by the processor in a database, an optimal idle time between two consecutive events recorded upon the change of the state of potentiality to the state of reality; determining, by the processor, in real-time, an idle time between each two consecutive events recorded upon the change of the state of potentiality to the state of reality; and preparing, by the processor, a report based on comparison of the determined idle time with the optimal idle time.

In accordance with an example implementation, the above described method comprises comparing, by the processor, the received value with an optimal value stored in a database; and determining, by the processor, based on the comparison whether the received value is good, bad, or ambivalent for building the computer-implemented solution.

In accordance with an example implementation, the above described method comprises assigning a unique identifier (ID) to each local statement of intent, each entity, and each agent.

In accordance with an example implementation, the above described method comprises: enabling the user to define optimal usage of all available entities so as to optimize a resource idle time; and tracking, in real-time, entity participation in value creation activity through monitoring of attributes of time and space associated with each entity.

In accordance with an example implementation, the above described method comprises: providing one or more value judgements of one or more consequential possibilities and one or more opportunities or one or more risks and assigns one or more probabilities to said one or more consequential possibilities to the agent; or performing one or more actions to intervene and alter one or more pathways by altering said one or more entities, and wherein said actions drive one or more resource optimization principles that are desired by associated agents.

In accordance with an example implementation, the above described method comprises providing one or more possible pathways to pick and choose the one or more distinct pathways, wherein the one or more possible pathways are of solutions, similar to the computer-implemented solution, searched from libraries in a database.

In accordance with an example implementation, the above described method comprises implementing one or more supervised and/or one or more unsupervised machine learning methods on the libraries in the database, wherein the implementation of the one or more supervised and/or one or more unsupervised machine learning methods is by a DLD engine comprising a NLP component, a ANN component, and a Nearest neighbors' component for processing the solution content, wherein the DLD engine mines rich solution content which are part of the libraries and extracts Transaction data from the Transaction Class, wherein the rich solution content which are part of the NSL Solution Library and said Transaction data extracted from the Transaction Class are fed into the DLD engine which enables calculating distances at various levels, and wherein the distance calculation is using NSL Entity values, time and space using machine learning algorithms.

The present subject matter, in accordance with an example implementation, relates to a method for building a computer-implemented solution using a natural language understood by users and without using programming codes, the method comprising: providing a prompt, by a processor of a computing device, to a user to input a global statement of intent in a form of the natural language and setting the global statement of intent in a state of potentiality for building the solution; providing a prompt, by the processor, to the user to input one or more local statements of intent associated with the global statement of intent and details of entities and an agent associated with each local statement of intent in a form of the natural language and setting each of the one or more local statements of intent and the entities in a state of potentiality, wherein each local statement of intent is indicative of a step for building the solution, wherein each entity participates in the step indicated by the corresponding local statement of intent, and wherein the agent is at least one of a human agent and a machine agent; forming, by the processor, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; in response to determining only one received local statement of intent associated with the global statement of intent, identifying, by the processor, the trigger CES of the received local statement of intent as an end of the building of the solution; and in response to determining more than one received local statement of intent associated with the global statement of intent, providing a prompt, by the processor, to the user to input relationships between the local statements of intent in a form of the natural language, wherein the relationships are indicative of whether a trigger CES of one local statement of intent is influencing the set of CESs of another local statement of intent or is an end of the building of the solution.

In accordance with an example implementation, the above described method comprises, for each local statement of intent, providing a prompt, by the processor, to the user to input in a form of the natural language one or more attributes that define a characteristic of the respective local statement of intent.

In accordance with an example implementation, the above described method comprises, for each entity, providing a prompt, by the processor, to the user to input in a form of the natural language, one or more attributes that define a characteristic of the respective entity and that differentiate the respective entity from other entities of the corresponding local statement of intent.

In accordance with an example implementation, providing the prompt for the relationships comprises providing a prompt to the user to input a plurality of distinct relationships between the local statements of intent for the global statement of intent, wherein each distinct relationship is a distinct pathway to building the solution.

In accordance with an example implementation, the above described method comprises, for each entity of each local statement of intent: providing a prompt, by the processor, to the associated agent to input in a form of the natural language a value against the respective entity, wherein receiving the value against the respective entity is recordation of an event to change the state of potentiality to a state of reality for the respective entity based on the received value.

In accordance with an example implementation, the above described method comprises, for each attribute of each local statement of intent: providing a prompt, by the processor, to the associated agent to input in a form of the natural language a value against the respective attribute, wherein receiving the value against the respective attribute is recordation of an event to change the state of potentiality to a state of reality for the respective attribute based on the received value.

In accordance with an example implementation, the above described method comprises, for attribute of each entity: providing a prompt, by the processor, to the associated agent to input in a form of the natural language a value against the respective attribute, wherein receiving the value against the respective attribute is recordation of an event to change the state of potentiality to a state of reality for the respective attribute based on the received value.

In accordance with an example implementation, the above described method comprises authenticating, by the processor, the associated agent based on one of login details, bio-metric details, a face-recognition technique, and a retina-detection technique.

In accordance with an example implementation, the above described method comprises, upon recording the event for each of the entities associated with each local statement of intent, recording, by the processor, an event to change the state of potentiality to a state of reality for the respective local statement of intent.

In accordance with an example implementation, the above described method comprises, upon recording the event to change the state of potentiality to the state of reality for each local statement of intent, recording, by the processor, an event to change the state of potentiality to a state of reality for the global statement of intent.

In accordance with an example implementation, the natural language is based on one or more native languages, one or more sign languages, one or more symbols, one or more numericals, or a combination thereof.

The present subject matter, in accordance with an example implementation, relates to a method for building a computer-implemented solution using a video and a natural language understood by users and without using programming codes, the method comprising: processing, by a processor of a computing device, image frames of the video to identify a plurality of differentiated image frames, wherein each differentiated image frame is identified to be different from previous one or more image frames of the video based on difference in content thereof; determining, by the processor, a plurality of local statements of intent, one each based on difference in content of each differentiated image frame with respect to content of immediate prior image frames of the video and setting each of the local statements of intent in a state of potentiality, wherein each local statement of intent is indicative of a step for building the solution and is determined by analyzing the content of image frames with respect to natural language data stored in a database; determining, by the processor, entities associated with each of the plurality of local statements of intent and attributes associated with each of the entities by analyzing the content of image frames between consecutive pair of differentiated image frames with respect to the natural language data stored in the database and setting each of entities and the attributes in a state of potentiality, wherein each entity participates in the step indicated by the corresponding local statement of intent, and wherein the attributes define a characteristic of the respective entity and that differentiate the respective entity from other entities of the corresponding local statement of intent; determining, by the processor, a global statement of intent for the computer-implemented solution based on changes in the content of a first differentiated image frame and a last differentiated image frame and setting the global statement of intent in a state of potentiality, wherein the global statement of intent is determined by analyzing the content of the first differentiated image frame and the last differentiated image frame with respect to the natural language data stored in the database; forming, by the processor, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; receiving, by the processor from a user in a form of the natural language, details of an agent associated with each of the plurality of local statements of intent and setting the details of the agent in a state of potentiality, wherein the agent is at least one of a human agent and a machine agent; and receiving, by the processor from the user in a form of the natural language, relationships between the local statements of intent, wherein the relationships are indicative of whether a trigger CES of one local statement of intent is influencing the set of CESs of another local statement of intent or is an end of the building of the computer-implemented solution.

In accordance with an example implementation, processing the image frames comprises extracting information based on content of the image frames and changes in the content across the image frames, wherein extracting the information is based on an object recognition technology, a character recognition technology, a voice recognition technology, or a combination thereof.

In accordance with an example implementation, determining the global statement of intent and each of the plurality of local statements of intent comprises tagging the changes in the content with one or more verbs.

In accordance with an example implementation, receiving the relationships comprises receiving a plurality of distinct relationships between the local statements of intent for the global statement of intent, wherein each distinct relationship is a distinct pathway to building the solution.

In accordance with an example implementation, the above described method comprises, for each entity of each local statement of intent: receiving, by the processor from the associated agent in a form of the natural language, a value against the respective entity, wherein receiving the value against the respective entity is recordation of an event to change the state of potentiality to a state of reality for the respective entity based on the received value.

In accordance with an example implementation, the above described method comprises, for attribute of each entity: receiving, by the processor from the associated agent in a form of the natural language, a value against the respective attribute, wherein receiving the value against the respective attribute is recordation of an event to change the state of potentiality to a state of reality for the respective attribute based on the received value.

In accordance with an example implementation, the above described method comprises authenticating, by the processor, the associated agent based on one of login details, bio-metric details, a face-recognition technique, and a retina-detection technique.

In accordance with an example implementation, the above described method comprises, upon recording the event for each of the entities associated with each local statement of intent, recording, by the processor, an event to change the state of potentiality to a state of reality for the respective local statement of intent.

In accordance with an example implementation, the above described method comprises, upon recording the event to change the state of potentiality to the state of reality for each local statement of intent, recording, by the processor, an event to change the state of potentiality to a state of reality for the global statement of intent.

In accordance with an example implementation, the natural language is based on one or more native languages, one or more sign languages, one or more symbols, one or more numericals, or a combination thereof.

The present subject matter, in accordance with an example implementation, relates to a method for building a computer-implemented solution using a standard operating procedure (SOP) file and a natural language understood by users and without using programming codes, wherein the SOP file comprises prescriptive statements, descriptive statements, and flow charts, the method comprising: parsing, by a processor of a computing device, the SOP file to identify the prescriptive statements, the descriptive statements, and the flow charts; determining, by the processor, a plurality of local statements of intent, one each for each of the prescriptive statement, and setting each of the local statements of intent in a state of potentiality, wherein each local statement of intent is indicative of a step for building the solution and is determined by analyzing the corresponding prescriptive statement with respect to natural language data stored in a database; determining, by the processor, entities associated with each of the plurality of local statements of intent and attributes associated with each of the entities by analyzing the descriptive statements associated with the corresponding prescriptive statement with respect to the natural language data stored in the database and setting each of the entities and the attributes in a state of potentiality, wherein each entity participates in the step indicated by the corresponding local statement of intent, and wherein the attributes define a characteristic of the respective entity and that differentiate the respective entity from other entities of the corresponding local statement of intent; forming, by the processor, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; determining, by the processor, relationships between the local statements of intent based on the flow charts, wherein the relationships are indicative of whether a trigger CES of one local statement of intent is influencing the set of CESs of another local statement of intent or is an end of a global statement of intent for the building the computer-implemented solution, wherein the relationships are determined by analyzing the flow charts with respect to the natural language data stored in the database; and receiving, by the processor from a user in a form of the natural language, details of an agent associated with each of the plurality of local statements of intent and setting the details of the agent in a state of potentiality, wherein the agent is at least one of a human agent and a machine agent.

In accordance with an example implementation, each of determining the plurality of local statements of intent, determining the entities and the attributes, and determining the relationships comprises: identifying parts of speech in content of the prescriptive statements, the descriptive statements, the flow charts; resolving co-references in the content, particularly pronouns by their antecedents; traversing inheritance relationships to remove ambiguity in the content; marking one or more portions of the content in case of ambiguity in the analysis; receiving user inputs to disambiguate the one or more ambiguous portions.

In accordance with an example implementation, determining the entities is based on noun phrases in the descriptive statements.

In accordance with an example implementation, parsing the SOP file is using a distributed document parsing system, wherein the distributed document parsing system is parse2Run.

In accordance with an example implementation, the parse2Run comprises at least one of a Core Pass, a Reference Pass, a Relationship Pass, an Understanding Pass, a Process Pass, an Enrichment Pass, and a Compliance Pass.

In accordance with an example implementation, the natural language is based on one or more native languages, one or more sign languages, one or more symbols, one or more numericals, or a combination thereof.

The present subject matter, in accordance with an example implementation, relates to a method for converting a programming code into a natural language to build a natural language-based computer-implemented solution, wherein the natural language-based computer-implemented solution is executable using natural language-based inputs, the method comprising: parsing, by a processor of a computing device, the programming code to extract symbols, keywords, operators, and functions present in the programming code; determining, by the processor, a plurality of local statements of intent, entities associated with each of the plurality of local statements of intent and attributes associated with each of the entities based on mapping of the extracted symbols, keywords, operators, and functions with natural language data stored in a database and setting each of the plurality of local statements of intent, the entities, and the attributes in a state of potentiality, wherein each local statement of intent is indicative of a step for building the solution, wherein each entity participates in the step indicated by the corresponding local statement of intent, and wherein the attributes define a characteristic of the respective entity and that differentiate the respective entity from other entities of the corresponding local statement of intent; forming, by the processor, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; determining, by the processor, relationships between the local statements of intent based on mapping of the extracted operators and functions with the natural language data stored in the database, wherein the relationships are indicative of whether a trigger CES of one local statement of intent is influencing the set of CESs of another local statement of intent or is an end of a global statement of intent for the building the computer-implemented solution, wherein the relationships are determined by analyzing the flow charts with respect to the natural language data stored in the database; and receiving, by the processor from a user in a form of the natural language, details of an agent associated with each of the plurality of local statements of intent and setting the details of the agent in a state of potentiality, wherein the agent is at least one of a human agent and a machine agent.

In accordance with an example implementation, receiving the relationships comprises receiving a plurality of distinct relationships between the local statements of intent for the global statement of intent, wherein each distinct relationship is a distinct pathway to building the solution.

In accordance with an example implementation, the machine agent is communicatively coupled to the computing device over a wired communication channel or a wireless communication channel.

In accordance with an example implementation, an entity associated with a local statement of intent of the global statement of intent is: a local statement of intent of another computer-implemented solution to borrow the other computer-implemented solution; or an entity of another computer-implemented solution to borrow the other computer-implemented solution.

In accordance with an example implementation, the programming code is for at least one of Batch Operating System, Time-Sharing Operating Systems, Distributed Operating System, Network Operating System, and Real-time Operating System.

The present subject matter, in accordance with an example implementation, relates to a method for converting a computer-implemented solution built based on a natural language into a programming code, wherein the computer-implemented solution is executable using natural language-based inputs, the method comprising: parsing, by a processor of a computing device, the computer-implemented solution, wherein the computer-implemented solution comprises a plurality of local statements of intent, entities associated with each of the plurality of local statements of intent, attributes associated with each of the entities, relationships between the plurality of local statements of intent, combinatorial entity states (CESs), one or more trigger CESs, wherein each local statement of intent is indicative of a step for building the solution, wherein each entity participates in the step indicated by the corresponding local statement of intent, and wherein the attributes define a characteristic of the respective entity and that differentiate the respective entity from other entities of the corresponding local statement of intent, wherein the relationships are indicative of whether a trigger CES of one local statement of intent is influencing the set of CESs of another local statement of intent or is an end of a global statement of intent for the building the computer-implemented solution; extracting, by a processor of a computing device, a plurality of natural language solution components, wherein the natural language solution components comprise: the global statement of intent, the plurality of local statements of intent, attributes associated with each of the entities, relationships between the plurality of local statements of intent, combinatorial entity states (CESs), one or more trigger CESs; and auto generating a programming language code based on mapping of the natural language solution components with symbols, keywords, operators, and functions of the programming language stored in a database.

The present subject matter, in accordance with an example implementation, relates to a computing device for building a computer-implemented solution using a natural language understood by users and without using programming codes, the computing device comprising: a processor; and a memory coupled to the processor, the method comprising instructions executable by the processor to: receive, from a user, a global statement of intent for building the solution, wherein the global statement of intent is received in a form of the natural language and is set in a state of potentiality; receive, from the user, one or more local statements of intent associated with the global statement of intent and details of entities and an agent associated with each local statement of intent, wherein each local statement of intent and the details of each entity and the agent are received in a form of the natural language and are respectively set in a state of potentiality, wherein each local statement of intent is indicative of a step for building the solution, wherein each entity participates in the step indicated by the corresponding local statement of intent, and wherein the agent is at least one of a human agent and a machine agent; form, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; in response to determining only one received local statement of intent associated with the global statement of intent, identify the trigger CES of the received local statement of intent as an end of the building of the solution; and in response to determining more than one received local statement of intent associated with the global statement of intent, receive, from the user in a form of the natural language, relationships between the local statements of intent, wherein the relationships are indicative of whether a trigger CES of one local statement of intent is influencing the set of CESs of another local statement of intent or is an end of the building of the solution.

The present subject matter, in accordance with an example implementation, relates to a computing device for building a computer-implemented solution using a natural language understood by users and without using programming codes, the computing device comprising: means to receive, from a user, a global statement of intent for building the solution, wherein the global statement of intent is received in a form of the natural language and is set in a state of potentiality; means to receive, from the user, one or more local statements of intent associated with the global statement of intent and details of entities and an agent associated with each local statement of intent, wherein each local statement of intent and the details of each entity and the agent are received in a form of the natural language and are respectively set in a state of potentiality, wherein each local statement of intent is indicative of a step for building the solution, wherein each entity participates in the step indicated by the corresponding local statement of intent, and wherein the agent is at least one of a human agent and a machine agent; means to form, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; means to, in response to determining only one received local statement of intent associated with the global statement of intent, identify the trigger CES of the received local statement of intent as an end of the building of the solution; and means to, in response to determining more than one received local statement of intent associated with the global statement of intent, receive, from the user in a form of the natural language, relationships between the local statements of intent, wherein the relationships are indicative of whether a trigger CES of one local statement of intent is influencing the set of CESs of another local statement of intent or is an end of the building of the solution.

The present subject matter, in accordance with an example implementation, relates to a computing device for building a computer-implemented solution using a natural language understood by users and without using programming codes, the computing device comprising: a processor; and a memory coupled to the processor, the method comprising instructions executable by the processor to perform the above-described method.

The present subject matter, in accordance with an example implementation, relates to a computing device for building a computer-implemented solution using a natural language understood by users and without using programming codes, the computing device comprising: a processor; and a memory coupled to the processor, the method comprising instructions executable by the processor to: provide a prompt to a user to input a global statement of intent in a form of the natural language and setting the global statement of intent in a state of potentiality for building the solution; provide a prompt to the user to input one or more local statements of intent associated with the global statement of intent and details of entities and an agent associated with each local statement of intent in a form of the natural language and setting each of the one or more local statements of intent and the entities in a state of potentiality, wherein each local statement of intent is indicative of a step for building the solution, wherein each entity participates in the step indicated by the corresponding local statement of intent, and wherein the agent is at least one of a human agent and a machine agent; form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; in response to determining only one received local statement of intent associated with the global statement of intent, identify the trigger CES of the received local statement of intent as an end of the building of the solution; and in response to determining more than one received local statement of intent associated with the global statement of intent, provide a prompt to the user to input relationships between the local statements of intent in a form of the natural language, wherein the relationships are indicative of whether a trigger CES of one local statement of intent is influencing the set of CESs of another local statement of intent or is an end of the building of the solution.

The present subject matter, in accordance with an example implementation, relates to a computing device for building a computer-implemented solution using a natural language understood by users and without using programming codes, the computing device comprising: means to provide a prompt to a user to input a global statement of intent in a form of the natural language and setting the global statement of intent in a state of potentiality for building the solution; means to provide a prompt to the user to input one or more local statements of intent associated with the global statement of intent and details of entities and an agent associated with each local statement of intent in a form of the natural language and setting each of the one or more local statements of intent and the entities in a state of potentiality, wherein each local statement of intent is indicative of a step for building the solution, wherein each entity participates in the step indicated by the corresponding local statement of intent, and wherein the agent is at least one of a human agent and a machine agent; means to form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; means to, in response to determining only one received local statement of intent associated with the global statement of intent, identify the trigger CES of the received local statement of intent as an end of the building of the solution; and means to, in response to determining more than one received local statement of intent associated with the global statement of intent, provide a prompt to the user to input relationships between the local statements of intent in a form of the natural language, wherein the relationships are indicative of whether a trigger CES of one local statement of intent is influencing the set of CESs of another local statement of intent or is an end of the building of the solution.

The present subject matter, in accordance with an example implementation, relates to a computing device for building a computer-implemented solution using a natural language understood by users and without using programming codes, the computing device comprising: a processor; and a memory coupled to the processor, the method comprising instructions executable by the processor to perform the above-described method.

The present subject matter, in accordance with an example implementation, relates to a computing device for building a computer-implemented solution using a video and a natural language understood by users and without using programming codes, the computing device comprising: a processor; and a memory coupled to the processor, the method comprising instructions executable by the processor to: process image frames of the video to identify a plurality of differentiated image frames, wherein each differentiated image frame is identified to be different from previous one or more image frames of the video based on difference in content thereof; determine a plurality of local statements of intent, one each based on difference in content of each differentiated image frame with respect to content of immediate prior image frames of the video and setting each of the local statements of intent in a state of potentiality, wherein each local statement of intent is indicative of a step for building the solution and is determined by analyzing the content of image frames with respect to natural language data stored in a database; determine entities associated with each of the plurality of local statements of intent and attributes associated with each of the entities by analyzing the content of image frames between consecutive pair of differentiated image frames with respect to the natural language data stored in the database and setting each of entities and the attributes in a state of potentiality, wherein each entity participates in the step indicated by the corresponding local statement of intent, and wherein the attributes define a characteristic of the respective entity and that differentiate the respective entity from other entities of the corresponding local statement of intent; determine a global statement of intent for the computer-implemented solution based on changes in the content of a first differentiated image frame and a last differentiated image frame and setting the global statement of intent in a state of potentiality, wherein the global statement of intent is determined by analyzing the content of the first differentiated image frame and the last differentiated image frame with respect to the natural language data stored in the database; form, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; receive, from a user in a form of the natural language, details of an agent associated with each of the plurality of local statements of intent and setting the details of the agent in a state of potentiality, wherein the agent is at least one of a human agent and a machine agent; and receive, from the user in a form of the natural language, relationships between the local statements of intent, wherein the relationships are indicative of whether a trigger CES of one local statement of intent is influencing the set of CESs of another local statement of intent or is an end of the building of the computer-implemented solution.

The present subject matter, in accordance with an example implementation, relates to a computing device for building a computer-implemented solution using a video and a natural language understood by users and without using programming codes, the computing device comprising: means to process image frames of the video to identify a plurality of differentiated image frames, wherein each differentiated image frame is identified to be different from previous one or more image frames of the video based on difference in content thereof; means to determine a plurality of local statements of intent, one each based on difference in content of each differentiated image frame with respect to content of immediate prior image frames of the video and setting each of the local statements of intent in a state of potentiality, wherein each local statement of intent is indicative of a step for building the solution and is determined by analyzing the content of image frames with respect to natural language data stored in a database; means to determine entities associated with each of the plurality of local statements of intent and attributes associated with each of the entities by analyzing the content of image frames between consecutive pair of differentiated image frames with respect to the natural language data stored in the database and setting each of entities and the attributes in a state of potentiality, wherein each entity participates in the step indicated by the corresponding local statement of intent, and wherein the attributes define a characteristic of the respective entity and that differentiate the respective entity from other entities of the corresponding local statement of intent; means to determine a global statement of intent for the computer-implemented solution based on changes in the content of a first differentiated image frame and a last differentiated image frame and setting the global statement of intent in a state of potentiality, wherein the global statement of intent is determined by analyzing the content of the first differentiated image frame and the last differentiated image frame with respect to the natural language data stored in the database; means to form, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; means to receive, from a user in a form of the natural language, details of an agent associated with each of the plurality of local statements of intent and setting the details of the agent in a state of potentiality, wherein the agent is at least one of a human agent and a machine agent; and means to receive, from the user in a form of the natural language, relationships between the local statements of intent, wherein the relationships are indicative of whether a trigger CES of one local statement of intent is influencing the set of CESs of another local statement of intent or is an end of the building of the computer-implemented solution.

The present subject matter, in accordance with an example implementation, relates to a computing device for building a computer-implemented solution using a video and a natural language understood by users and without using programming codes, the computing device comprising: a processor; and a memory coupled to the processor, the method comprising instructions executable by the processor to perform the above-described method.

The present subject matter, in accordance with an example implementation, relates to a computing device for building a computer-implemented solution using a standard operating procedure (SOP) file and a natural language understood by users and without using programming codes, wherein the SOP file comprises prescriptive statements, descriptive statements, and flow charts, the computing device comprising: a processor; and a memory coupled to the processor, the method comprising instructions executable by the processor to: parse the SOP file to identify the prescriptive statements, the descriptive statements, and the flow charts; determine a plurality of local statements of intent, one each for each of the prescriptive statement, and setting each of the local statements of intent in a state of potentiality, wherein each local statement of intent is indicative of a step for building the solution and is determined by analyzing the corresponding prescriptive statement with respect to natural language data stored in a database; determine entities associated with each of the plurality of local statements of intent and attributes associated with each of the entities by analyzing the descriptive statements associated with the corresponding prescriptive statement with respect to the natural language data stored in the database and setting each of the entities and the attributes in a state of potentiality, wherein each entity participates in the step indicated by the corresponding local statement of intent, and wherein the attributes define a characteristic of the respective entity and that differentiate the respective entity from other entities of the corresponding local statement of intent; form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; determine relationships between the local statements of intent based on the flow charts, wherein the relationships are indicative of whether a trigger CES of one local statement of intent is influencing the set of CESs of another local statement of intent or is an end of a global statement of intent for the building the computer-implemented solution, wherein the relationships are determined by analyzing the flow charts with respect to the natural language data stored in the database; and receive, from a user in a form of the natural language, details of an agent associated with each of the plurality of local statements of intent and setting the details of the agent in a state of potentiality, wherein the agent is at least one of a human agent and a machine agent.

The present subject matter, in accordance with an example implementation, relates to a computing device for building a computer-implemented solution using a standard operating procedure (SOP) file and a natural language understood by users and without using programming codes, wherein the SOP file comprises prescriptive statements, descriptive statements, and flow charts, the computing device comprising: means to parse the SOP file to identify the prescriptive statements, the descriptive statements, and the flow charts; means to determine a plurality of local statements of intent, one each for each of the prescriptive statement, and setting each of the local statements of intent in a state of potentiality, wherein each local statement of intent is indicative of a step for building the solution and is determined by analyzing the corresponding prescriptive statement with respect to natural language data stored in a database; means to determine entities associated with each of the plurality of local statements of intent and attributes associated with each of the entities by analyzing the descriptive statements associated with the corresponding prescriptive statement with respect to the natural language data stored in the database and setting each of the entities and the attributes in a state of potentiality, wherein each entity participates in the step indicated by the corresponding local statement of intent, and wherein the attributes define a characteristic of the respective entity and that differentiate the respective entity from other entities of the corresponding local statement of intent; means to form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; means to determine relationships between the local statements of intent based on the flow charts, wherein the relationships are indicative of whether a trigger CES of one local statement of intent is influencing the set of CESs of another local statement of intent or is an end of a global statement of intent for the building the computer-implemented solution, wherein the relationships are determined by analyzing the flow charts with respect to the natural language data stored in the database; and means to receive, from a user in a form of the natural language, details of an agent associated with each of the plurality of local statements of intent and setting the details of the agent in a state of potentiality, wherein the agent is at least one of a human agent and a machine agent.

The present subject matter, in accordance with an example implementation, relates to a computing device for building a computer-implemented solution using a standard operating procedure (SOP) file and a natural language understood by users and without using programming codes, wherein the SOP file comprises prescriptive statements, descriptive statements, and flow charts, the computing device comprising: a processor; and a memory coupled to the processor, the method comprising instructions executable by the processor to perform the above-described method.

The present subject matter, in accordance with an example implementation, relates to a computing device for converting a programming code into a natural language to build a natural language-based computer-implemented solution, wherein the natural language-based computer-implemented solution is executable using natural language-based inputs, the computing device comprising: a processor; and a memory coupled to the processor, the method comprising instructions executable by the processor to: parse the programming code to extract symbols, keywords, operators, and functions present in the programming code; determine a plurality of local statements of intent, entities associated with each of the plurality of local statements of intent and attributes associated with each of the entities based on mapping of the extracted symbols, keywords, operators, and functions with natural language data stored in a database and setting each of the plurality of local statements of intent, the entities, and the attributes in a state of potentiality, wherein each local statement of intent is indicative of a step for building the solution, wherein each entity participates in the step indicated by the corresponding local statement of intent, and wherein the attributes define a characteristic of the respective entity and that differentiate the respective entity from other entities of the corresponding local statement of intent; form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; determine relationships between the local statements of intent based on mapping of the extracted operators and functions with the natural language data stored in the database, wherein the relationships are indicative of whether a trigger CES of one local statement of intent is influencing the set of CESs of another local statement of intent or is an end of a global statement of intent for the building the computer-implemented solution, wherein the relationships are determined by analyzing the flow charts with respect to the natural language data stored in the database; and receive, from a user in a form of the natural language, details of an agent associated with each of the plurality of local statements of intent and setting the details of the agent in a state of potentiality, wherein the agent is at least one of a human agent and a machine agent.

The present subject matter, in accordance with an example implementation, relates to a computing device for converting a programming code into a natural language to build a natural language-based computer-implemented solution, wherein the natural language-based computer-implemented solution is executable using natural language-based inputs, the computing device comprising: means to parse the programming code to extract symbols, keywords, operators, and functions present in the programming code; means to determine a plurality of local statements of intent, entities associated with each of the plurality of local statements of intent and attributes associated with each of the entities based on mapping of the extracted symbols, keywords, operators, and functions with natural language data stored in a database and setting each of the plurality of local statements of intent, the entities, and the attributes in a state of potentiality, wherein each local statement of intent is indicative of a step for building the solution, wherein each entity participates in the step indicated by the corresponding local statement of intent, and wherein the attributes define a characteristic of the respective entity and that differentiate the respective entity from other entities of the corresponding local statement of intent; means to form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; means to determine relationships between the local statements of intent based on mapping of the extracted operators and functions with the natural language data stored in the database, wherein the relationships are indicative of whether a trigger CES of one local statement of intent is influencing the set of CESs of another local statement of intent or is an end of a global statement of intent for the building the computer-implemented solution, wherein the relationships are determined by analyzing the flow charts with respect to the natural language data stored in the database; and means to receive, from a user in a form of the natural language, details of an agent associated with each of the plurality of local statements of intent and setting the details of the agent in a state of potentiality, wherein the agent is at least one of a human agent and a machine agent.

The present subject matter, in accordance with an example implementation, relates to a computing device for converting a programming code into a natural language to build a natural language-based computer-implemented solution, wherein the natural language-based computer-implemented solution is executable using natural language-based inputs, the computing device comprising: a processor; and a memory coupled to the processor, the method comprising instructions executable by the processor to perform the above-described method.

The present subject matter, in accordance with an example implementation, relates to a computing device for converting a computer-implemented solution built based on a natural language into a programming code, wherein the computer-implemented solution is executable using natural language-based inputs, the computing device comprising: a processor; and a memory coupled to the processor, the method comprising instructions executable by the processor to: parse the computer-implemented solution, wherein the computer-implemented solution comprises a plurality of local statements of intent, entities associated with each of the plurality of local statements of intent, attributes associated with each of the entities, relationships between the plurality of local statements of intent, combinatorial entity states (CESs), one or more trigger CESs, wherein each local statement of intent is indicative of a step for building the solution, wherein each entity participates in the step indicated by the corresponding local statement of intent, and wherein the attributes define a characteristic of the respective entity and that differentiate the respective entity from other entities of the corresponding local statement of intent, wherein the relationships are indicative of whether a trigger CES of one local statement of intent is influencing the set of CESs of another local statement of intent or is an end of a global statement of intent for the building the computer-implemented solution; extracting, by a processor of a computing device, a plurality of natural language solution components, wherein the natural language solution components comprise: the global statement of intent, the plurality of local statements of intent, attributes associated with each of the entities, relationships between the plurality of local statements of intent, combinatorial entity states (CESs), one or more trigger CESs; auto generating a programming language code based on mapping of the natural language solution components with symbols, keywords, operators, and functions of the programming language stored in a database.

The present subject matter, in accordance with an example implementation, relates to a computing device for converting a computer-implemented solution built based on a natural language into a programming code, wherein the computer-implemented solution is executable using natural language-based inputs, the computing device comprising: means to parse the computer-implemented solution, wherein the computer-implemented solution comprises a plurality of local statements of intent, entities associated with each of the plurality of local statements of intent, attributes associated with each of the entities, relationships between the plurality of local statements of intent, combinatorial entity states (CESs), one or more trigger CESs, wherein each local statement of intent is indicative of a step for building the solution, wherein each entity participates in the step indicated by the corresponding local statement of intent, and wherein the attributes define a characteristic of the respective entity and that differentiate the respective entity from other entities of the corresponding local statement of intent, wherein the relationships are indicative of whether a trigger CES of one local statement of intent is influencing the set of CESs of another local statement of intent or is an end of a global statement of intent for the building the computer-implemented solution; means to extract a plurality of natural language solution components, wherein the natural language solution components comprise: the global statement of intent, the plurality of local statements of intent, attributes associated with each of the entities, relationships between the plurality of local statements of intent, combinatorial entity states (CESs), one or more trigger CESs; means to auto generate a programming language code based on mapping of the natural language solution components with symbols, keywords, operators, and functions of the programming language stored in a database.

The present subject matter, in accordance with an example implementation, relates to a computing device for converting a computer-implemented solution built based on a natural language into a programming code, wherein the computer-implemented solution is executable using natural language-based inputs, the computing device comprising: a processor; and a memory coupled to the processor, the method comprising instructions executable by the processor to perform the above-described method.

The present subject matter, in accordance with an example implementation, relates to a non-transitory computer-readable medium having stored thereon instructions for building a computer-implemented solution using a natural language understood by users and without using programming codes comprising machine executable code which when executed by a processor, causes the processor to: receive, from a user, a global statement of intent for building the solution, wherein the global statement of intent is received in a form of the natural language and is set in a state of potentiality; receive, from the user, one or more local statements of intent associated with the global statement of intent and details of entities and an agent associated with each local statement of intent, wherein each local statement of intent and the details of each entity and the agent are received in a form of the natural language and are respectively set in a state of potentiality, wherein each local statement of intent is indicative of a step for building the solution, wherein each entity participates in the step indicated by the corresponding local statement of intent, and wherein the agent is at least one of a human agent and a machine agent; form, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; in response to determining only one received local statement of intent associated with the global statement of intent, identify the trigger CES of the received local statement of intent as an end of the building of the solution; and in response to determining more than one received local statement of intent associated with the global statement of intent, receive, from the user in a form of the natural language, relationships between the local statements of intent, wherein the relationships are indicative of whether a trigger CES of one local statement of intent is influencing the set of CESs of another local statement of intent or is an end of the building of the solution.

The present subject matter, in accordance with an example implementation, relates to a non-transitory computer-readable medium having stored thereon instructions for building a computer-implemented solution using a natural language understood by users and without using programming codes comprising machine executable code which when executed by a processor, causes the processor to: provide a prompt to a user to input a global statement of intent in a form of the natural language and setting the global statement of intent in a state of potentiality for building the solution; provide a prompt to the user to input one or more local statements of intent associated with the global statement of intent and details of entities and an agent associated with each local statement of intent in a form of the natural language and setting each of the one or more local statements of intent and the entities in a state of potentiality, wherein each local statement of intent is indicative of a step for building the solution, wherein each entity participates in the step indicated by the corresponding local statement of intent, and wherein the agent is at least one of a human agent and a machine agent; form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; in response to determining only one received local statement of intent associated with the global statement of intent, identify the trigger CES of the received local statement of intent as an end of the building of the solution; and in response to determining more than one received local statement of intent associated with the global statement of intent, provide a prompt to the user to input relationships between the local statements of intent in a form of the natural language, wherein the relationships are indicative of whether a trigger CES of one local statement of intent is influencing the set of CESs of another local statement of intent or is an end of the building of the solution.

The present subject matter, in accordance with an example implementation, relates to a non-transitory computer-readable medium having stored thereon instructions for building a computer-implemented solution using a video and a natural language understood by users and without using programming codes comprising machine executable code which when executed by a processor, causes the processor to: process image frames of the video to identify a plurality of differentiated image frames, wherein each differentiated image frame is identified to be different from previous one or more image frames of the video based on difference in content thereof; determine a plurality of local statements of intent, one each based on difference in content of each differentiated image frame with respect to content of immediate prior image frames of the video and setting each of the local statements of intent in a state of potentiality, wherein each local statement of intent is indicative of a step for building the solution and is determined by analyzing the content of image frames with respect to natural language data stored in a database; determine entities associated with each of the plurality of local statements of intent and attributes associated with each of the entities by analyzing the content of image frames between consecutive pair of differentiated image frames with respect to the natural language data stored in the database and setting each of entities and the attributes in a state of potentiality, wherein each entity participates in the step indicated by the corresponding local statement of intent, and wherein the attributes define a characteristic of the respective entity and that differentiate the respective entity from other entities of the corresponding local statement of intent; determine a global statement of intent for the computer-implemented solution based on changes in the content of a first differentiated image frame and a last differentiated image frame and setting the global statement of intent in a state of potentiality, wherein the global statement of intent is determined by analyzing the content of the first differentiated image frame and the last differentiated image frame with respect to the natural language data stored in the database; form, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; receive, from a user in a form of the natural language, details of an agent associated with each of the plurality of local statements of intent and setting the details of the agent in a state of potentiality, wherein the agent is at least one of a human agent and a machine agent; and receive, from the user in a form of the natural language, relationships between the local statements of intent, wherein the relationships are indicative of whether a trigger CES of one local statement of intent is influencing the set of CESs of another local statement of intent or is an end of the building of the computer-implemented solution.

The present subject matter, in accordance with an example implementation, relates to a non-transitory computer-readable medium having stored thereon instructions for building a computer-implemented solution using a standard operating procedure (SOP) file and a natural language understood by users and without using programming codes, wherein the SOP file comprises prescriptive statements, descriptive statements, and flow charts, the instructions comprising machine executable code which when executed by a processor, causes the processor to: parse the SOP file to identify the prescriptive statements, the descriptive statements, and the flow charts; determine a plurality of local statements of intent, one each for each of the prescriptive statement, and setting each of the local statements of intent in a state of potentiality, wherein each local statement of intent is indicative of a step for building the solution and is determined by analyzing the corresponding prescriptive statement with respect to natural language data stored in a database; determine entities associated with each of the plurality of local statements of intent and attributes associated with each of the entities by analyzing the descriptive statements associated with the corresponding prescriptive statement with respect to the natural language data stored in the database and setting each of the entities and the attributes in a state of potentiality, wherein each entity participates in the step indicated by the corresponding local statement of intent, and wherein the attributes define a characteristic of the respective entity and that differentiate the respective entity from other entities of the corresponding local statement of intent; form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; determine relationships between the local statements of intent based on the flow charts, wherein the relationships are indicative of whether a trigger CES of one local statement of intent is influencing the set of CESs of another local statement of intent or is an end of a global statement of intent for the building the computer-implemented solution, wherein the relationships are determined by analyzing the flow charts with respect to the natural language data stored in the database; and receive, from a user in a form of the natural language, details of an agent associated with each of the plurality of local statements of intent and setting the details of the agent in a state of potentiality, wherein the agent is at least one of a human agent and a machine agent.

The present subject matter, in accordance with an example implementation, relates to a non-transitory computer-readable medium having stored thereon instructions for converting a programming code into a natural language to build a natural language-based computer-implemented solution, wherein the natural language-based computer-implemented solution is executable using natural language-based inputs, the instructions comprising machine executable code which when executed by a processor, causes the processor to: parse the programming code to extract symbols, keywords, operators, and functions present in the programming code; determine a plurality of local statements of intent, entities associated with each of the plurality of local statements of intent and attributes associated with each of the entities based on mapping of the extracted symbols, keywords, operators, and functions with natural language data stored in a database and setting each of the plurality of local statements of intent, the entities, and the attributes in a state of potentiality, wherein each local statement of intent is indicative of a step for building the solution, wherein each entity participates in the step indicated by the corresponding local statement of intent, and wherein the attributes define a characteristic of the respective entity and that differentiate the respective entity from other entities of the corresponding local statement of intent; form, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; determine relationships between the local statements of intent based on mapping of the extracted operators and functions with the natural language data stored in the database, wherein the relationships are indicative of whether a trigger CES of one local statement of intent is influencing the set of CESs of another local statement of intent or is an end of a global statement of intent for the building the computer-implemented solution, wherein the relationships are determined by analyzing the flow charts with respect to the natural language data stored in the database; and receive, from a user in a form of the natural language, details of an agent associated with each of the plurality of local statements of intent and setting the details of the agent in a state of potentiality, wherein the agent is at least one of a human agent and a machine agent.

The present subject matter, in accordance with an example implementation, relates to a non-transitory computer-readable medium having stored thereon instructions for converting a computer-implemented solution built based on a natural language into a programming code, wherein the computer-implemented solution is executable using natural language-based inputs, the instructions comprising machine executable code which when executed by a processor, causes the processor to: parse the computer-implemented solution, wherein the computer-implemented solution comprises a plurality of local statements of intent, entities associated with each of the plurality of local statements of intent, attributes associated with each of the entities, relationships between the plurality of local statements of intent, combinatorial entity states (CESs), one or more trigger CESs, wherein each local statement of intent is indicative of a step for building the solution, wherein each entity participates in the step indicated by the corresponding local statement of intent, and wherein the attributes define a characteristic of the respective entity and that differentiate the respective entity from other entities of the corresponding local statement of intent, wherein the relationships are indicative of whether a trigger CES of one local statement of intent is influencing the set of CESs of another local statement of intent or is an end of a global statement of intent for the building the computer-implemented solution; extract a plurality of natural language solution components, wherein the natural language solution components comprise: the global statement of intent, the plurality of local statements of intent, attributes associated with each of the entities, relationships between the plurality of local statements of intent, combinatorial entity states (CESs), one or more trigger CESs; and auto generate a programming language code based on mapping of the natural language solution components with symbols, keywords, operators, and functions of the programming language stored in a database.

The present subject matter, in accordance with an example implementation, relates to a system for building a computer-implemented solution using a natural language understood by users and without using programming codes, the system comprising: a processor; and a global statement of intent module, a local statement of intent module, a CES module, and a relationship module coupled to the processor, wherein the global statement of intent module, the local statement of intent module, the CES module, and the relationship module are operatively connected to each other, wherein the global statement of intent module is configured to receive, from a user, a global statement of intent for building the solution, wherein the global statement of intent is received in a form of the natural language and is set in a state of potentiality; the local statement of intent module is configured to receive, from the user, one or more local statements of intent associated with the global statement of intent and details of entities and an agent associated with each local statement of intent, wherein each local statement of intent and the details of each entity and the agent are received in a form of the natural language and are respectively set in a state of potentiality, wherein each local statement of intent is indicative of a step for building the solution, wherein each entity participates in the step indicated by the corresponding local statement of intent, and wherein the agent is at least one of a human agent, a machine agent and a computer function; the CES module is configured to form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; in response to determining only one received local statement of intent associated with the global statement of intent, identifying the trigger CES of the received local statement of intent as an end of the building of the solution; and the relationship module is configured to receive, from the user in a form of the natural language, relationships between the local statements of intent, wherein the relationships are indicative of whether a trigger CES of one local statement of intent is influencing the set of CESs of another local statement of intent or is an end of the building of the solution.

The present subject matter, in accordance with an example implementation, relates to a system for converting a programming code into a natural language to build a natural language-based computer-implemented solution, wherein the natural language-based computer-implemented solution is executable using natural language-based inputs, the system comprising: a processor; and a parser module, an extractor module, an interpreter module, a mapping module, a global statement of intent module, a local statement of intent module, a CES module, and a relationship module coupled to the processor, wherein the parser module, the extractor module, the interpreter module, the mapping module, the global statement of intent module, the local statement of intent module, the CES module, and the relationship module are operatively connected to each other, wherein the parser module is configured to parse the programming code to extract symbols, keywords, operators, and functions present in the programming code; the extractor module, the interpreter module, the mapping module, the global statement of intent module, and/or the local statement of intent module are configured to determine a plurality of local statements of intent, entities associated with each of the plurality of local statements of intent and attributes associated with each of the entities based on mapping of the extracted symbols, keywords, operators, and functions with natural language data stored in a database and setting each of the plurality of local statements of intent, the entities, and the attributes in a state of potentiality, wherein each local statement of intent is indicative of a step for building the solution, wherein each entity participates in the step indicated by the corresponding local statement of intent, and wherein the attributes define a characteristic of the respective entity and that differentiate the respective entity from other entities of the corresponding local statement of intent; the CES module is configured to form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; the relationship module is configured to determine relationships between the local statements of intent based on mapping of the extracted operators and functions with the natural language data stored in the database, wherein the relationships are indicative of whether a trigger CES of one local statement of intent is influencing the set of CESs of another local statement of intent or is an end of a global statement of intent for the building the computer-implemented solution, wherein the relationships are determined by analyzing the flow charts with respect to the natural language data stored in the database; and the local statement of intent module is configured to receive, from a user in a form of the natural language, details of an agent associated with each of the plurality of local statements of intent and setting the details of the agent in a state of potentiality, wherein the agent is at least one of a human agent and a machine agent.

The present subject matter, in accordance with an example implementation, relates to a system for converting a computer-implemented solution built based on a natural language into a programming code, wherein the computer-implemented solution is executable using natural language-based inputs, the system comprising: a processor; and a solution parser module, a solution extractor module, an auto generator module, and a mapping module coupled to the processor, wherein the solution parser module, the solution extractor module, the auto generator module and the mapping module are operatively connected to each other, wherein the solution parser module is configured to parse the computer-implemented solution, wherein the computer-implemented solution comprises a plurality of local statements of intent, entities associated with each of the plurality of local statements of intent, attributes associated with each of the entities, relationships between the plurality of local statements of intent, combinatorial entity states (CESs), one or more trigger CESs, wherein each local statement of intent is indicative of a step for building the solution, wherein each entity participates in the step indicated by the corresponding local statement of intent, and wherein the attributes define a characteristic of the respective entity and that differentiate the respective entity from other entities of the corresponding local statement of intent, wherein the relationships are indicative of whether a trigger CES of one local statement of intent is influencing the set of CESs of another local statement of intent or is an end of a global statement of intent for the building the computer-implemented solution; the solution extractor module is configured to extract a plurality of natural language solution components, wherein the natural language solution components comprise the global statement of intent, the plurality of local statements of intent, attributes associated with each of the entities, relationships between the plurality of local statements of intent, combinatorial entity states (CESs), one or more trigger CESs; the auto generator module is configured to auto generate a programming language code based on the mapping module, wherein the mapping module is configured to mapping of the natural language solution components with symbols, keywords, operators, and functions of the programming language stored in a database.

The invention claimed is:

1. A computing device comprising:

a processor; and a memory coupled to the processor, the memory comprising instructions executable by the processor to:

build a computer-executable solution using a natural language understood and input by users and without using programming codes, wherein the computer-executable solution comprises a plurality of ordered change units that contain application logic, and the change units have a one-to-one relationship with local statements of intent, wherein, to build the computer-executable solution, the processor is to:

receive, from a user, a global statement of intent comprising a name of the computer-executable solution being built using the natural language, wherein the global statement of intent is received in a form of the natural language and is set to a binary state designating event potentiality;

receive, from the user, the local statements of intent associated with the global statement of intent, wherein each local statement of intent is a sentence indicative of a sub-step for fulfilling requirements for executing the computer-executable solution, wherein each local statement of intent is received in a form of the natural language and is set to a binary state designating event potentiality;

receive, from the user, details of n number of entities and details of an agent associated with each local statement of intent, wherein n is greater than 0, wherein the details of each entity and the details of the agent are received in a form of the natural language and are respectively set to a binary state designating event potentiality, wherein each entity includes a noun phrase and participates in fulfilling the requirements of the sub-step indicated by the corresponding local statement of intent, and wherein the agent is at least one of a human agent and a machine agent;

for each entity, receive, from the user in a form of the natural language, one or more attributes that define a characteristic of the respective entity and that differentiate the respective entity from other entities of the corresponding local statement of intent and are set to a binary state designating event potentiality, wherein each attribute includes at least one of an adjective phrase and an adverb phrase;

form, for each local statement of intent, a set of combinatorial-entity-states (CESs) including $2^n$ possible combinations of the n number of entities of the local statement of intent, wherein a CES formed based on all (n in number) the entities of the local statement of intent is designated as a trigger combinatorial-entity-state; and receive, from the user in a form of the natural language, a plurality of distinct relationships based on one or more of predefined rules, constraints, and formulae between the local statements of intent, wherein each distinct relationship is a distinct pathway to fulfill the requirements for executing the computer-executable solution, wherein the relationships are indicative of whether a trigger CES of one local statement of intent is connected to the set of CESs of another local statement of intent or is an end of the building of the computer-executable solution, wherein, based on information received by the processor from the agent, the binary state designating event potentiality is changed to a binary state designating event completion for each attribute, the binary state designating event potentiality is changed to a binary state designating event completion for each entity, the binary state designating event potentiality is changed to a binary state designating event completion for each local statement of intent, and the binary state designating event potentiality is changed to a binary state designating event completion for the global statement of intent, wherein each combinatorial-entity-state in the set is changed from a binary state designating event potentiality to a binary state designating event completion in response to changing the associated entities into a binary state designating event completion, wherein, for the trigger combinatorial-entity-state for a given local statement of intent, when all the entities of the given local statement of intent are in a binary state designating event completion, execution passes from a change unit associated with the given local statement of intent to a change unit of a next, connected local statement of intent, and wherein the global statement of intent, each local statement of intent, the details of each entity, the details of the agent, the one or more attributes, and the plurality of distinct relationships are received through a handwriting-based interface, a touch-sensitive interface, a voice-based interface, or a combination thereof.

2. The computing device of claim 1, wherein the memory further comprises instructions executable by the processor to, for each entity of each local statement of intent:

receive, from the associated agent in a form of the natural language, a value against the respective entity, wherein the value received against the respective entity is recordation of an event to change the binary state designating event potentiality to a binary state designating event completion for the respective entity based on the received value, wherein the values received against all the entities associated with each local statement of intent is recordation of an event to change the binary state designating event potentiality to a binary state designating event completion for the respective local statement of intent, and wherein the values received against all the entities associated with all the local statements of intent is recordation of an event to change the binary state designating event potentiality to a binary state designating event completion for the global statement of intent.

3. The computing device of claim 2, wherein the memory further comprises instructions executable by the processor to authenticate the associated agent based on at least one of login details, bio-metric details, a face-recognition technique, and a retina-detection technique.

4. The computing device of claim 2, wherein the memory further comprises instructions executable by the processor to:

determine number of events that are remaining to be recorded; and display the remaining number of events.

5. The computing device of claim 4, wherein the memory further comprises instructions executable by the processor to provide one or more uncertainties and probabilities corresponding to one or more of the entities and one or more of the events based on past behavior of one or more of the CES and occurrence of one or more of the events.

6. The computing device of claim 5, wherein the memory further comprises instructions executable by the processor to perform one or more advanced planning and optimization (APO) functions to provide one or more uncertainties and probabilities corresponding to one or more of the entities and one or more of the events and to optimize receiving of the value for recordation of the event.

7. The computing device of claim 5, wherein the memory further comprises instructions executable by the processor to assess the past behavior of one or more of the CES and occurrence of one or more of the events based on at least one of:

machine learning techniques and artificial intelligence techniques;

an entity centric approach, wherein said entity centric approach provides for one or more events to occur; and storing data and behavioral patterns of each events, wherein the machine learning techniques comprise supervised learning techniques and/or unsupervised learning techniques and/or semi-supervised learning techniques, wherein the supervised learning techniques comprise at least one of Support Vector Machines, linear regression, logistic regression, naïve Bayes, linear discriminant analysis, decision trees, k-nearest neighbor algorithm, and Neural Networks, and wherein the unsupervised learning techniques comprise at least one of Hierarchical clustering, K-means clustering, K-NN (k nearest neighbors), and Association rules.

8. The computing device of claim 5, wherein the memory further comprises instructions executable by the processor to:

provide one or more value judgements of one or more consequential possibilities and one or more opportunities or one or more risks and assigns one or more probabilities to said one or more consequential possibilities to the agent; or perform one or more actions to intervene and alter one or more pathways by altering said one or more entities, and wherein said actions drive one or more resource optimization principles that are desired by associated agents.

9. The computing device of claim 4, wherein the memory further comprises instructions executable by the processor to:

determine an amount of time and resources required for the remaining number of events; and display the required amount of time and resources.

10. The computing device of claim 2, wherein the memory further comprises instructions executable by the processor to:

store, in a database, an optimal idle time between two consecutive events recorded upon the change of the binary state designating event potentiality to the binary state designating event completion;

determine, in real-time, an idle time between each two consecutive events recorded upon the change of the binary state designating event potentiality to the binary state designating event completion; and prepare a report based on comparison of the determined idle time with the optimal idle time.

11. The computing device of claim 2, wherein the memory further comprises instructions executable by the processor to:

compare the received value with an optimal value stored in a database; and determine based on the comparison whether the received value is good, bad, or ambivalent for building the computer-executable solution.

12. The computing device of claim 1, wherein the memory further comprises instructions executable by the processor to, for each attribute of each local statement of intent:

receive, from the associated agent in a form of the natural language, a value against the respective attribute, wherein the value received against the respective attribute is recordation of an event to change the binary state designating event potentiality to a binary state designating event completion for the respective attribute based on the received value.

13. The computing device of claim 1, wherein the memory further comprises instructions executable by the processor to, for attribute of each entity:

receive, from the associated agent in a form of the natural language, a value against the respective attribute, wherein the value received against the respective attribute is recordation of an event to change the binary state designating event potentiality to a binary state designating event completion for the respective attribute based on the received value.

14. The computing device of claim 1, wherein the machine agent is communicatively coupled to the computing device over a wired communication channel or a wireless communication channel.

15. The computing device of claim 1, wherein the machine agent is a functional module of the computing device and is coupled to the processor.

16. The computing device of claim 1, wherein a local statement of intent associated with the global statement of intent is:

a local statement of intent of another computer-executable solution to borrow the other computer-executable solution; or a global statement of intent of another computer-executable solution to borrow the other computer-executable solution.

17. The computing device of claim 1, wherein an entity associated with a local statement of intent of the global statement of intent is:

a local statement of intent of another computer-executable solution to borrow the other computer-executable solution; or an entity of another computer-executable solution to borrow the other computer-executable solution.

18. The computing device of claim 1, wherein an attribute that defines a characteristic of the respective local statement of intent is:

an entity of another computer-executable solution to borrow the other computer-executable solution; or an attribute of another computer-executable solution to borrow the other computer-executable solution.

19. The computing device of claim 1, wherein an attribute that defines the characteristic of the respective entity is:

an entity of another computer-executable solution to borrow the other computer-executable solution; or an attribute of another computer-executable solution to borrow the other computer-executable solution.

20. The computing device of claim 1, wherein the memory further comprises instructions executable by the processor to build the computer-executable solution by:

dividing a local statement of intent into two or more other local statements of intent and attaching the corresponding entities and agent to each local statement of intent; or combing two or more local statements of intent into one local statement of intent and attaching the corresponding entities and agent to that local statement of intent.

21. The computing device of claim 1, wherein the computer-executable solution is searchable by one or more search engines as the computer-executable solution is built using a natural language.

22. The computing device of claim 1, wherein the memory further comprises instructions executable by the processor to assign one or more information rights or decision rights over each entity to the agent associated with the local statement of intent of the respective entity; and display entities to the agent based on the assigned information rights or decision rights.

23. The computing device of claim 1, wherein the memory further comprises instructions executable by the processor to display entities through a user interface to receive values against the entities by the associated agent.

24. The computing device of claim 1, wherein the memory further comprises instructions executable by the processor to provide one or more distinct relationships between the local statements of intent to receive values against the entities, wherein providing one or more distinct relationships is based on an orchestrated process, an automated process, or a human agent driven process.

25. The computing device of claim 1, wherein one or more of the entities or one or more CESs of a local statement of intent are shared with one or more local statements of intent of other computer-executable solutions, wherein said shared entity or CES participates in only one trigger CES at a given point of time to change the binary state designating event potentiality to the binary state designating event completion for the local statement of intent corresponding to the one trigger CES, and wherein availability of the shared entity or CES influences an order of change of the binary state designating event potentiality to the binary state designating event completion for multiple local statements of intent.

26. The computing device of claim 1, wherein the entities are physical in nature, and wherein the entities exist in space and time.

27. The computing device of claim 1, wherein, for receiving the local statement of intent and the details of the entities, the processor is to provide one or more possible local statements of intent and one or more possible entities from libraries in a database storing local statements of intent and entities of other computer-executable solutions.

28. The computing device of claim 1, wherein the memory further comprises instructions executable by the processor to select one of the distinct relationships to receive values against the entities and eliminate other distinct relationships.

29. The computing device of claim 1, wherein the natural language is based on one or more native languages, one or more sign languages, one or more symbols, one or more numericals, or a combination thereof.

30. The computing device of claim 1, wherein the information received in the form of the natural language is deciphered using an object recognition technology, a character recognition technology, an image recognition technology, or a combination thereof.

31. The computing device of claim 1, wherein location on a user interface of each entity and each local statement of intent is changeable by:

a drag and drop functionality, wherein the drag and drop functionality is performed by at least one of a wired input device, a wireless input device, and a touch-sensitive interface; or changing a value of an attribute corresponding to location coordinates of the respective entity or the respective local statement of intent.

32. The computing device of claim 1, wherein the memory further comprises instructions executable by the processor to apply one of a public blockchain technology, a private blockchain technology, and a hybrid blockchain technology.

33. The computing device of claim 32, wherein each of the public blockchain technology, the private blockchain technology, and the hybrid blockchain technology is based on Symmetric Key Cryptography techniques, Asymmetric Key Cryptography techniques, or a combination thereof.

34. The computing device of claim 1, wherein the memory further comprises instructions executable by the processor to assign a measurement framework based on one or more predefined norms to the entities, wherein the measurement framework is indicative of a time period in which an entity is changed from the binary state designating event potentiality of a binary state designating event completion.

35. The computing device of claim 1, wherein the memory further comprises instructions executable by the processor to store, in the form of libraries in a database, data associated with one or more of the global statement of intent, the local statement of intent, the entities, and the agents for use in building another computer-executable solution.

36. The computing device of claim 35, wherein the memory further comprises instructions executable by the processor to provide query-based access to the libraries in the database, wherein the query-based access relies on search and query-based technologies for identification of appropriate entities for reuse, and wherein the query-based access comprises at least one of a Structured Query Language (SQL) and a Not only Structured Query Language (NoSQL).

37. The computing device of claim 35, wherein the memory further comprises instructions executable by the processor to provide a drag and drop access to the libraries in the database.

38. The computing device of claim 1, wherein the memory further comprises instructions executable by the processor to integrate accounting and financial systems by attaching one or more entities pertaining to accounting and financial systems to each local statement of intent for the computer-executable solution.

39. The computing device of claim 1, wherein one or more of the global statement of intent, each local statement of intent, and the details of the entities are received in response to an interactive questionnaire, wherein the interactive questionnaire comprises questions in a structured format for building the computer-executable solution.

40. The computing device of claim 1, wherein the memory further comprises instructions executable by the processor to correct one or more of the received global statement of intent, each local statement of intent, and the details of the entities based on natural language grammar, wherein the natural language grammar uses natural language libraries to pick one or more appropriate verbs and prepositions for the correction.

41. The computing device of claim 1, wherein the memory further comprises instructions executable by the processor to assign a unique identifier (ID) to each local statement of intent, each entity, and each agent.

42. The computing device of claim 1, wherein the memory further comprises instructions executable by the processor to:

enable the user to define optimal usage of all available entities so as to optimize a resource idle time; and track, in real-time, entity participation in value creation activity through monitoring of attributes of time and space associated with each entity.

43. The computing device of claim 1, wherein the memory further comprises instructions executable by the processor to provide one or more possible pathways to pick and choose the one or more distinct pathways, wherein the one or more possible pathways are of solutions, similar to the computer-executable solution, searched from libraries in a database.

44. The computing device of claim 43, wherein the memory further comprises instructions executable by the processor to implement one or more supervised and/or one or more unsupervised machine learning methods on the libraries in the database, wherein the implementation of the one or more supervised and/or one or more unsupervised machine learning methods is by a DLD engine comprising a NLP component, a ANN component, and a Nearest neighbors' component for processing solution content, wherein the DLD engine mines rich solution content which are part of the libraries and extracts Transaction data from a Transaction Class, wherein the rich solution content which are part of an NSL Solution Library and said Transaction data extracted from the Transaction Class are fed into the DLD engine which enables calculating distances at various levels, and wherein the distance calculation is using NSL Entity values, time and space using machine learning algorithms.

45. The computing device of claim 1, wherein the memory further comprises instructions executable by the processor to:

parse, by a processor of a computing device, the natural language based computer-executable solution, wherein the computer-executable solution comprises the global statement of intent, the local statements of intent, the n number of entities and the agent associated with each of the local statements of intent, the attributes associated with each of the entities, the plurality of distinct relationships between the local statements of intent, the set of combinatorial-entity-states (CESs) for each local statement of intent, the trigger CESs;

extract, by a processor of a computing device, a plurality of natural language solution components based on parsing the natural language based computer-executable solution, wherein the natural language solution components comprise: the global statement of intent, the local statements of intent, the attributes associated with each of the entities, the plurality of distinct relationships between the local statements of intent, the combinatorial-entity-states (CESs), the trigger CESs; and auto generate a programming language code based on mapping of the natural language solution components with symbols, keywords, operators, and functions of the programming language stored in a database.

* * * * *